United States Patent
Li

(10) Patent No.: US 12,521,444 B2
(45) Date of Patent: Jan. 13, 2026

(54) ANTI-HER2 ANTIBODY-DRUG CONJUGATES AND USES THEREOF

(71) Applicant: Fortvita Biologics Limited, Suzhou (CN)

(72) Inventor: Wei Li, Acton, MA (US)

(73) Assignee: Fortvita Biologics Limited, Suzhou (CN)

( * ) Notice: Subject to any disclaimer, the term of this patent is extended or adjusted under 35 U.S.C. 154(b) by 0 days.

(21) Appl. No.: 17/680,041

(22) Filed: Feb. 24, 2022

(65) Prior Publication Data

US 2022/0378929 A1  Dec. 1, 2022

Related U.S. Application Data

(60) Provisional application No. 63/153,530, filed on Feb. 25, 2021.

(51) Int. Cl.

| | |
|---|---|
| A61K 47/65 | (2017.01) |
| A61K 31/4745 | (2006.01) |
| A61K 39/00 | (2006.01) |
| A61K 47/10 | (2017.01) |
| A61K 47/68 | (2017.01) |
| A61P 35/00 | (2006.01) |
| C07K 16/32 | (2006.01) |

(52) U.S. Cl.
CPC .... *A61K 47/68037* (2023.08); *A61K 31/4745* (2013.01); *A61K 47/65* (2017.08); *A61K 47/6855* (2017.08); *A61P 35/00* (2018.01); *C07K 16/32* (2013.01); *A61K 2039/505* (2013.01); *A61K 2039/545* (2013.01); *A61K 47/10* (2013.01)

(58) Field of Classification Search
CPC ............ A61K 47/6803; A61K 31/4745; A61K 47/65; A61K 47/6855; A61K 2039/505; A61K 2039/545; C07K 16/32
See application file for complete search history.

(56) References Cited

U.S. PATENT DOCUMENTS

| | | | |
|---|---|---|---|
| 4,166,452 A | 9/1979 | Generales, Jr. | |
| 4,604,463 A | 8/1986 | Miyasaka et al. | |
| 4,816,397 A | 3/1989 | Boss et al. | |
| 4,816,567 A | 3/1989 | Cabilly et al. | |
| 5,004,758 A | 4/1991 | Boehm et al. | |
| 5,049,668 A | 9/1991 | Wall et al. | |
| 5,061,800 A | 10/1991 | Yaegashi et al. | |
| 5,208,020 A | 5/1993 | Chari et al. | |
| 5,225,539 A | 7/1993 | Winter | |
| 5,475,092 A | 12/1995 | Chari et al. | |
| 5,585,089 A | 12/1996 | Queen et al. | |
| 5,821,337 A | 10/1998 | Carter et al. | |
| 5,834,476 A | 11/1998 | Terasawa et al. | |
| 6,403,604 B1 | 6/2002 | Yang et al. | |
| 6,441,163 B1 | 8/2002 | Chari et al. | |
| 6,512,118 B1 | 1/2003 | Tsujihara et al. | |
| 6,716,821 B2 | 4/2004 | Zhao et al. | |
| 6,913,748 B2 | 7/2005 | Widdison | |
| 7,276,497 B2 | 10/2007 | Chari et al. | |
| 7,276,499 B2 | 10/2007 | Chari et al. | |
| 7,368,565 B2 | 5/2008 | Chari et al. | |
| 7,388,026 B2 | 6/2008 | Zhao et al. | |
| 7,414,073 B2 | 8/2008 | Baloglu et al. | |
| 9,840,627 B2 | 12/2017 | Feng et al. | |
| 12,029,736 B2 | 7/2024 | Li | |
| 2003/0032624 A1 | 2/2003 | Yang | |
| 2005/0169933 A1 | 8/2005 | Steeves et al. | |
| 2008/0171040 A1 | 7/2008 | Ebens et al. | |
| 2008/0305044 A1 | 12/2008 | McDonagh et al. | |
| 2009/0274713 A1 | 11/2009 | Chari et al. | |
| 2010/0129314 A1 | 5/2010 | Singh et al. | |

(Continued)

FOREIGN PATENT DOCUMENTS

| | | |
|---|---|---|
| CN | 1704416 A | 12/2005 |
| CN | 1246323 C | 3/2006 |

(Continued)

OTHER PUBLICATIONS

Wei Li et. al. Synthesis and Evaluation of Camptothecin Antibody-Drug Conjugates. ACS Med. Chem. Lett. 2019, 10, 1386-1392. (Year: 2019).*
Wei Li et al. Synthesis and Evaluation of Camptothecin Antibody-Drug Conjugates. ACS Med. Chem. Lett. 2019, 10, 1386-1392. Supporting Information. (Year: 2019).*
Kussie PH, Parhami-Seren B, Wysocki LJ, Margolies MN. J Immunol. Jan. 1, 1994;152(1):146-52. PMID: 8254187. (Year: 1994).*
Chen C, Roberts VA, Stevens S, Brown M, Stenzel-Poore MP, Rittenberg MB. Embo J. Jun. 15, 1995;14(12):2784-94. doi: 10.1002/j.1460-2075.1995.tb07278.x. PMID: 7796805; PMCID: PMC398397. (Year: 1995).*

(Continued)

*Primary Examiner* — Adam Weidner
*Assistant Examiner* — Laura Ann Essex
(74) *Attorney, Agent, or Firm* — Fish & Richardson P.C.

(57) ABSTRACT

Disclosed are new anti-HER2 ADCs conjugated to camptothecin derivatives as toxins for therapeutic use. The antitumor effects of the ADCs of Formula (PL-A) (e.g., compounds MB-2a and MB-3a (trastuzumab meditecan)) render these compounds useful for treating cell proliferative diseases such as cancers.

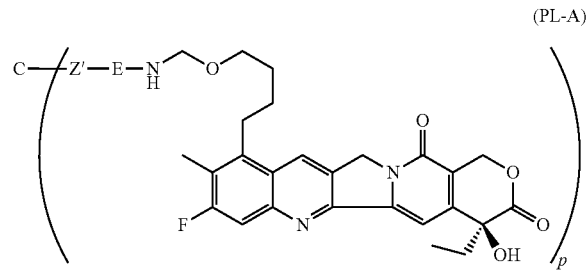

(PL-A)

15 Claims, 11 Drawing Sheets

Specification includes a Sequence Listing.

(56) References Cited

U.S. PATENT DOCUMENTS

| | | | | |
|---|---|---|---|---|
| 2015/0017246 | A1* | 1/2015 | Huang | A61K 47/68 424/490 |
| 2015/0297748 | A1 | 10/2015 | Masuda et al. | |
| 2021/0283125 | A1 | 9/2021 | Li | |
| 2025/0000996 | A1 | 1/2025 | Li | |

FOREIGN PATENT DOCUMENTS

| | | | | |
|---|---|---|---|---|
| CN | 100354279 | C | 12/2007 | |
| CN | 100406460 | C | 7/2008 | |
| CN | 102477042 | A | 5/2012 | |
| CN | 103289461 | A | 9/2013 | |
| CN | 109467563 | A | 3/2019 | |
| EP | 0171496 | B1 | 2/1986 | |
| EP | 0173494 | A2 | 3/1986 | |
| EP | 0184187 | A2 | 6/1986 | |
| EP | 0325247 | A1 | 7/1989 | |
| EP | 1383772 | B1 | 8/2006 | |
| EP | 3130608 | A1 * | 2/2017 | A61K 31/4745 |
| EP | 3254267 | A1 | 12/2017 | |
| EP | 3524267 | A1 | 8/2019 | |
| EP | 3130608 | B1 | 9/2019 | |
| JP | H1-186892 | A | 7/1989 | |
| JP | H1-186893 | A | 7/1989 | |
| JP | H03 232888 | A | 10/1991 | |
| WO | WO 1986/01533 | A1 | 3/1986 | |
| WO | WO 1987/02671 | A1 | 5/1987 | |
| WO | WO 1990/07861 | A1 | 7/1990 | |
| WO | WO 1991/004260 | A2 | 4/1991 | |
| WO | WO 1991/11465 | A1 | 8/1991 | |
| WO | WO 1992/01047 | A1 | 1/1992 | |
| WO | WO 1992/005785 | A1 | 4/1992 | |
| WO | WO 1992/011263 | A1 | 7/1992 | |
| WO | WO 1992/20791 | A1 | 11/1992 | |
| WO | WO 1993/06213 | A1 | 4/1993 | |
| WO | WO 1993/11236 | A1 | 6/1993 | |
| WO | WO 1993/011770 | A1 | 6/1993 | |
| WO | WO 1993/19172 | A1 | 9/1993 | |
| WO | WO 1995/01438 | A1 | 1/1995 | |
| WO | WO 1995/15388 | A1 | 6/1995 | |
| WO | WO 1997/34631 | A1 | 9/1997 | |
| WO | WO 1999/54342 | A1 | 10/1999 | |
| WO | WO 2000/61739 | A1 | 10/2000 | |
| WO | WO 2002/31140 | A1 | 4/2002 | |
| WO | WO 2005/044821 | A1 | 5/2005 | |
| WO | WO 2007/095389 | A2 | 8/2007 | |
| WO | WO 2009/134976 | A1 | 11/2009 | |
| WO | WO 2011/154574 | A1 | 12/2011 | |
| WO | WO 2012/007619 | A1 | 1/2012 | |
| WO | WO 2015/000240 | A1 | 1/2015 | |
| WO | WO 2015/155998 | A1 | 10/2015 | |
| WO | WO 2019/034176 | A1 | 2/2019 | |
| WO | WO 2019/195655 | A1 | 10/2019 | |
| WO | WO 2019/195665 | A1 | 10/2019 | |
| WO | WO 2019/236954 | A1 | 12/2019 | |
| WO | WO-2020219287 | A1 * | 10/2020 | A61K 31/4745 |
| WO | WO 2021/173773 | A1 | 9/2021 | |
| WO | WO-2021212638 | A1 * | 10/2021 | A61K 45/06 |

OTHER PUBLICATIONS

Hong, B., Meng, G., Tan, H. et al. Synthesis and antitumor activity of pyrano[3,2-i]-fused camptothecin derivatives. Med Chem Res 28, 884-891 (2019). https://doi.org/10.1007/s00044-019-02342-4 (Year: 2019).*

Hansch et al., "20-(S)-Camptothecin Analogues as DNA Topoisomerase I Inhibitors: A QSAR Study", ChemMedChem Communications, vol. 2, No. 12, Dec. 10, 2007 (Dec. 10, 2007), pp. 1807-1813.

Hyz et al., "Topotecan dynamics, tautomerism and reactivity-1 H/13C NMR and ESI MS study", Magnetic resonance in chemistry, Jan. 1, 2010 (Jan. 1, 2010) (10 pages).

International Search Report and Written Opinion for PCT/US2021/019565, dated Jun. 14, 2021 (13 pages).

International Search Report and Written Opinion for PCT/IB2022/051660, dated Sep. 12, 2022 (9 pages).

Li, "Synthesis and Evaluation of Camptothecin Antibody-Drug Conjugates." Sep. 6, 2019. ACS Medical Chemistry Letters. 10 (10), pp. 1386-1392 (7 pages).

Nakada et al., "Novel antibody drug conjugates containing exatecan derivative-based cytotoxic payloads", Biorganic & Medicinal Chemistry Letters, Elsevier, Amsterdam, NL, vol. 26, No. 6, Feb. 8, 2016 (Feb. 8, 2016), pp. 1542-1545.

U.S. Appl. No. 62/981,197, filed Feb. 25, 2020, Li.

Adams et al., "Structural and functional analysis of the interaction between the agonistic monoclonal antibody Apomab and the proapoptotic receptor DR5," Cell Death & Differentiation, Apr. 2008, 15(4):751-61,1 page (abstract only).

Altschul et al., "Gapped BLAST and PSI-BLAST: a new generation of protein database search programs," Nucleic acids research, Sep. 1, 1997, 25(17):3389-402.

Athornberry et al., "Interleukin-1β converting enzyme," Methods in Enzymology, Jan. 1994, 244:615-31, 1 page (abstract only).

Austin et al., "Endocytosis and sorting of ErbB2 and the site of action of cancer therapeutics trastuzumab and geldanamycin," Molecular biology of the cell, Dec. 2004, 15(12):5268-82.

Beidler et al., "Cloning and high level expression of a chimeric antibody with specificity for human carcinoembryonic antigen," Journal of Immunology, Dec. 1, 1988, 141(11):4053-60, 1 page (abstract only).

Better et al., "*Escherichia coli* secretion of an active chimeric antibody fragment," Science, May 20, 1988, 240(4855):1041-3, 1 page (abstract only).

Bouvier et al., "[37] Leishmanolysin: Surface metalloproteinase of Leishmania," Methods in enzymology, Jan. 1, 1995, 248:614-33.

Burton et al., "Use of microcalorimetry and its correlation with size exclusion chromatography for rapid screening of the physical stability of large pharmaceutical proteins in solution," Pharmaceutical development and technology, Jan. 2007, 12(3):265-73.

Caceres et al., "Determination of chemotherapeutic activity in vivo by luminescent imaging of luciferase-transfected human tumors," Anti-cancer drugs, Aug. 1, 2003, 14(7):569-74, 2 pages (abstract only).

Carmen et al., "Concepts in antibody phage display," Briefings in Functional Genomics, Jul. 1, 2002, 1(2):189-203.

Dallavalle et al., "Novel 7-oxyiminomethyl derivatives of camptothecin with potent in vitro and in vivo antitumor activity," Journal of medicinal chemistry, Sep. 27, 2001, 44(20):3264-74.

Davies et al., "Antibody-antigen complexes," Annual review of biochemistry, Jul. 1990, 59(1):439-73.

Dunn et al., "[14] Subsite preferences of retroviral proteinases," Methods in enzymology, Jan. 1, 1994, 241:254-IN12, 1 page (abstract only).

Fishwild et al., "High-avidity human IgG kappa monoclonal antibodies from a novel strain of minilocus transgenic mice," Nature biotechnology, Jul. 1, 1996, 14(7):845-51, 1 page (abstract only).

Galfre et al., "Antibodies to major histocompatibility antigens produced by hybrid cell lines," Nature, Apr. 7, 1977, 266(5602):550-2, 1 page (abstract).

Genbank Accession No. NP_004439.2, "Receptor tyrosine-protein kinase erbB-2 isoform a precursor [*Homo sapiens*]," dated Oct. 29, 2024, 6 pages.

Gluzman et al., "SV40-transformed simian cells support the replication of early SV40 mutants," Cell, Jan. 1, 1981, 23(1):175-82, 1 page (abstract only).

Harris et al., "Processing of C-terminal lysine and arginine residues of proteins isolated from mammalian cell culture," Journal of chromatography A, Jun. 23, 1995, 705(1):129-34, 1 page (abstract only).

Hoogenboom et al., "Construction and expression of antibody-tumor necrosis factor fusion proteins," Molecular immunology, Sep. 1991, 28(9):1027-37, 1 page (abstract only).

Hoogenboom et al., "Selecting and screening recombinant antibody libraries," Nature biotechnology, Sep. 2005, 23(9):1105-16.

International Preliminary Report on Patentability for International Appln. No. PCT/US2021/019565 mailed Aug. 30, 2022, 9 pages.

(56) References Cited

OTHER PUBLICATIONS

International Preliminary Report on Patentability for International Appln. No. PCT/182022/051660 mailed Aug. 30, 2022, 9 pages.

Jackson et al., "Antigen specificity and tumour targeting efficiency of a human carcinoembryonic antigen-specific scFv and affinity-matured derivatives," British Journal of cancer, Jul. 1998, 78(2):181-8.

Johnson et al., "Cation exchange-HPLC and mass spectrometry reveal C-terminal amidation of an IgG1 heavy chain," Analytical biochemistry, Jan. 2007, 360(1):75-83, 2 pages (abstract only).

Jones et al., "Replacing the complementarity-determining regions in a human antibody with those from a mouse," Nature, May 29, 1986, 321(6069):522-5, 1 page (abstract only).

Kabat et al., "Origins of antibody complementarity and specificity—hypervariable regions and minigene hypothesis," Journal of Immunology, Sep. 1980, 125(3):961-9.

Köhler et al., "Continuous cultures of fused cells secreting antibody of predefined specificity," Nature, Aug. 7, 1975, 256(5517):495-7, 1 page (abstract only).

Köhler et al., "Immunoglobulin production by lymphocyte hybridomas," European Journal of Immunology, Feb. 1978, 8(2):82-8, 1 page (abstract only).

Kohls et al., "Mab-ZAP: A tool for evaluating antibody efficacy for use in an immunotoxin," Biotechniques, Jan. 2000, 28(1):162-5.

Kozbor et al., "The production of monoclonal antibodies from human lymphocytes," Immunology Today, Mar. 1, 1983, 4(3):72-9, 1 page (abstract only).

Kuroiwa et al., "Efficient modification of a human chromosome by telomere-directed truncation in high homologous recombination-proficient chicken DT40 cells," Nucleic acids research, Jul. 1, 1998, 26(14):3447-8.

Larrick et al., "PCR amplification of antibody genes," Methods, Apr. 1, 1991, 2(2):106-10, 1 page (abstract only).

Liu et al., "Chimeric mouse-human IgG1 antibody that can mediate lysis of cancer cells," Proceedings of the National Academy of Sciences, May 1987, 84(10):3439-43.

Liu et al., "Production of a mouse-human chimeric monoclonal antibody to CD20 with potent Fc-dependent biologic activity," Journal of immunology, Nov. 15, 1987, 139(10):3521-6, 1 page (abstract only).

Lonberg et al., "Antigen-specific human antibodies from mice comprising four distinct genetic modifications, " Nature, Apr. 28, 1994, 368(6474):856-9.

Losman et al., "Baboon anti-idiotype antibodies mimic a carcinoembryonic antigen epitope," International journal of cancer, Aug. 15, 1990, 46(2):310-4, 1 page (abstract only).

Marks et al., "By-passing immunization: building high affinity human antibodies by chain shuffling, " Biotechnology, Jul. 1, 1992, 10(7):779-83.

Marks et al., "By-passing immunization: human antibodies from V-gene libraries displayed on phage, " Journal of molecular biology, Dec. 5, 1991, 222(3):581-97.

Matayoshi et al., "Novel fluorogenic substrates for assaying retroviral proteases by resonance energy transfer," Science, Feb. 23, 1990, 247(4945):954-8, 1 page (abstract only).

Milstein et al., "Hybrid hybridomas and their use in immunohistochemistry," Nature, Oct. 6, 1983, 305(5934):537-40, 1 page (abstract only).

Morrison et al., "Transfectomas provide novel chimeric antibodies," Science, Sep. 20, 1985, 229(4719):1202-7, 1 page (abstract only).

Ncbi.nlm.nih.gov/blast [online], "Basic Local Alignment Search Tool, " retrieved on Nov. 7, 2024, retrieved from URL <https://blast.ncbi.nlm.nih.gov/Blast.cgi>, 2 pages.

Nishimura et al., "Recombinant human-mouse chimeric monoclonal antibody specific for common acute lymphocytic leukemia antigen," Cancer research, Feb. 15, 1987, 47(4):999-1005.

Olsson et al., "[1] Human-human monoclonal antibody-producing hybridomas: Technical aspects," Methods in Enzymology, Jan. 1, 1983,92:3-16, 1 page (abstract only).

Osbourn et al., "Generation of a panel of related human scFv antibodies with high affinities for human CEA," Immunotechnology, Sep. 1, 1996, 2(3):181-96.

Ridder et al., "Generation of rabbit monoclonal antibody fragments from a combinatorial phage display library and their production in the yeast *Pichia pastoris*," Biotechnology, Mar. 1, 1995, 13(3):255-60, 1 page (abstract only).

Riechmann et al., "Reshaping human antibodies for therapy," Nature, Mar. 24, 1988, 332(6162):323-7, 1 page (abstract only).

Saiki et al., "Primer-directed enzymatic amplification of DNA with a thermostable DNA polymerase, " Science, Jan. 29, 1988, 239(4839):487-91.

Seidah et al., "[13] Pro-protein convertases of subtilisin/kexin family," Methods in Enzymology, Jan. 1, 1994, 244: 175-188, 1 page (abstract only).

Shaw et al., "Mouse/human chimeric antibodies to a tumor-associated antigen: biologic activity of the four human IgG subclasses," JNCI: Journal of the National Cancer Institute, Dec. 7, 1988, 80(19):1553-9, 1 page (abstract only).

Siriwardena et al., "Human antitransforming growth factor β2 monoclonal antibody—a new modulator of wound healing in trabeculectomy: a randomized placebo controlled clinical study," Ophthalmology, Mar. 1, 2002, 109(3):427-31, 3 pages (abstract only).

Smith et al., "[29] Purification and kinetic characterization of human cytomegalovirus assemblin," Methods in Enzymology, Jan. 1, 1994, 244:412-423, 1 page (abstract only).

Sun et al., "Chimeric antibody with human constant regions and mouse variable regions directed against carcinoma-associated antigen 17-1A," Proceedings of the National Academy of Sciences, Jan. 1987, 84(1):214-8.

Teng et al., "Construction and testing of mouse—human heteromyelomas for human monoclonal antibody production," Proceedings of the National Academy of Sciences, Dec. 1983, 80(23):7308-12.

Tomizuka et al., "Double trans-chromosomic mice: maintenance of two individual human chromosome fragments containing Ig heavy and κ loci and expression of fully human antibodies," Proceedings of the National Academy of Sciences, Jan. 18, 2000, 97(2):722-7.

Tomizuka et al., "Functional expression and germline atransmission of a human chromosome fragment in chimaeric mice," Nature genetics, Jun. 1, 1997, 16(2):133-43, 1 page (abstract only).

Urlaub et al., "Isolation of Chinese hamster cell mutants deficient in dihydrofolate reductase activity," Proceedings of the National Academy of Sciences, Jul. 1980, 77(7):4216-20.

Vaughan et al., "Human antibodies with sub-nanomolar affinities isolated from a large non-immunized phage display library," Nature biotechnology, Mar. 1, 1996, 14(3):309-14.

Verhoeyen et al., "Reshaping human antibodies: grafting an antilysozyme activity," Science, Mar. 25, 1988, 239(4847):1534-6, 1 page (abstract only).

Wang et al., "Development and properties of valine-alanine based antibody-drug conjugates with monomethyl auristatin e as the potent payload," International Journal of molecular sciences, Aug. 25, 2017, 18(9):1860.

Weber et al., "[41] Adenovirus endopeptidases," Methods in Enzymology, Jan. 1, 1994, 244:595-604, 1 page (abstract only).

Winter et al., "Making antibodies by phage display technology," Annual review of immunology, Apr. 1994, 12(1):433-55, 1 page (abstract only).

Wood et al., "The synthesis and in vivo assembly of functional antibodies in yeast," Nature, Apr. 4, 1985, 314(6010):446-9.

Wormstone et al., "TGF-β2-induced matrix modification and cell transdifferentiation in the human lens capsular bag," Investigative ophthalmology & visual science, Jul. 1, 2002, 43(7):2301-8.

Yang et al., "Design, synthesis, and cytotoxic activity of novel 7-substituted camptothecin derivatives incorporating piperazinyl-sulfonylamidine moieties," Bioorganic & medicinal chemistry letters, Sep. 1, 2017, 27(17):3959-62.

Burke et al., "Design, synthesis, and biological evaluation of antibody-drug conjugates comprised of potent camptothecin analogues," Bioconjugate Chemistry, Jun. 17, 2009, 20(6):1242-50.

(56) References Cited

OTHER PUBLICATIONS

STN Registry No. 1349695-57-3, "1H-Pyrano[3',4':6,7]indolizino[1,2-b]quinoline-3,14 (4H,12H)-dione, 9-(dimethylamino)-4-ethyl-4,10-dihydroxy-, (4S)-," dated Dec. 6, 2011, 1 page.

* cited by examiner

SEQUENCE LISTING

```
<160> NUMBER OF SEQ ID NOS: 19

<210> SEQ ID NO 1
<211> LENGTH: 450
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 1

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30
```

```
Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445
```

```
Gly Lys
    450

<210> SEQ ID NO 2
<211> LENGTH: 214
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 2

Asp Ile Gln Met Thr Gln Ser Pro Ser Ser Leu Ser Ala Ser Val Gly
1               5                  10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 3
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Gly Phe Asn Ile Lys Asp Thr Tyr Ile His
1               5                  10

<210> SEQ ID NO 4
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 4

Arg Ile Tyr Pro Thr Asn Gly Tyr Thr Arg Tyr Ala Asp Ser Val Lys
1               5                   10                  15

Gly

<210> SEQ ID NO 5
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Trp Gly Gly Asp Gly Phe Tyr Ala Met Asp Tyr
1               5                   10

<210> SEQ ID NO 6
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Arg Ala Ser Gln Asp Val Asn Thr Ala Val Ala
1               5                   10

<210> SEQ ID NO 7
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Ser Ala Ser Phe Leu Tyr Ser
1               5

<210> SEQ ID NO 8
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Gln Gln His Tyr Thr Thr Pro Pro Thr
1               5

<210> SEQ ID NO 9
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 9

His His His His His His
1               5

<210> SEQ ID NO 10
```

-continued

<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Ala Val Ala Gly
1

<210> SEQ ID NO 11
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Gly Phe Gly Gly
1

<210> SEQ ID NO 12
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Gly Gly Phe Gly
1

<210> SEQ ID NO 13
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Ala Val Gly Gly
1

<210> SEQ ID NO 14
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 14

Ala Ala Ala Ala
1

<210> SEQ ID NO 15
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

```
<400> SEQUENCE: 15

Ala Val Ala Ala
1

<210> SEQ ID NO 16
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Ala Leu Ala Leu
1

<210> SEQ ID NO 17
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Leu Ala Leu Ala
1

<210> SEQ ID NO 18
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Gly Phe Leu Gly
1

<210> SEQ ID NO 19
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Gly Leu Phe Gly
1
```

ANTI-HER2 ANTIBODY-DRUG CONJUGATES AND USES THEREOF

CROSS-REFERENCE TO RELATED APPLICATIONS

The present application claims benefit of U.S. Provisional Application No. 63/153,530, filed Feb. 25, 2021, which is incorporated by reference in its entirety.

SEQUENCE LISTING

The instant application contains a Sequence Listing which has been submitted electronically in ASCII format and is hereby incorporated by reference in its entirety. Said ASCII copy, created on Feb. 17, 2022, is named MDB-002US1_SL.txt and is 9,723 bytes in size.

BACKGROUND OF THE INVENTION

HER2 (human epidermal growth factor receptor 2) has emerged as an important therapeutic target due its role in the development of cancers such as breast cancer. For example, overexpression of the HER2 gene is found in up to 25-30% of breast cancer cases, as well as in some gastric and gastroesophageal cancer cases. As the overexpression of HER2 can be associated with a faster rate of growth and a poorer prognosis, there remains a need for new, effective anti-HER2 therapeutic agents.

SUMMARY OF INVENTION

Antibody Drug Conjugates (ADCs) have attracted significant interest as a new class of therapeutics. For example, ADCs can leverage monoclonal antibodies (mAbs) for the targeted delivery of cytotoxic agents to tumor cells, thereby permitting the use of highly cytotoxic drugs that could not be used using conventional, non-targeted modes. The design of ADCs—which typically feature attachment of a cytotoxic agent to antibody, typically via a linker—involves consideration of a variety of factors, including the presence of a conjugation handle on the drug for attachment to the linker and linker technology for attaching the drug to an antibody in a conditionally stable manner. Non-optimal design can result in reduced ADC potency, insufficient immunologic specificity of the conjugate and increased toxicity due to non-specific release of the drug from the conjugate.

The present invention is based, at least in part, on the antitumor therapeutic effect, of Anti-HER2 ADCs conjugated to camptothecin derivatives as toxin for therapeutic use. ADCs described herein are useful for treating cell proliferative diseases such as cancers.

In embodiments, the invention features a compound having the structure of Formula PL-A,

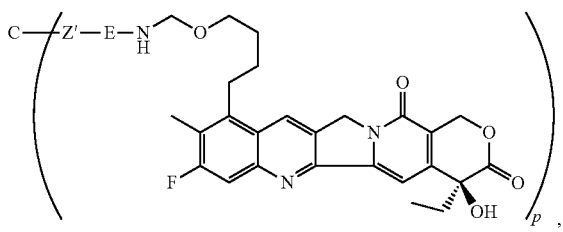

(PL-A)

or a pharmaceutically acceptable salt thereof, wherein

E is a peptide comprising 2 to 8 amino acids; wherein E is optionally substituted with one or more polyol; and wherein the N terminal of the peptide is covalently attached to Z';

Z' is $-C(=O)-L^1-Y'$,

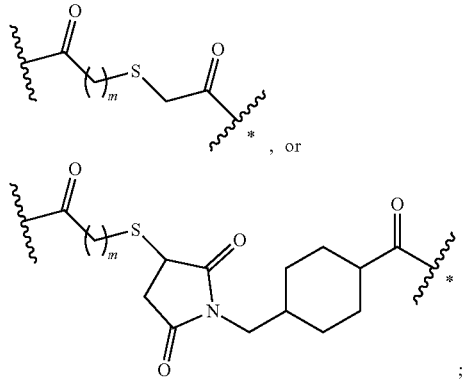

wherein m represents an integer of 1-10 and * denotes the site covalently linked to said C;

$L^1$ is $-(C_1-C_{10}\text{alkylene})-$, $-CH_2CH_2(OCH_2CH_2)_nN(R_1)C(=O)-L^2-*$, or $-CH_2(OCH_2CH_2)_nN(R_1)C(=O)-L^2-*$; wherein n represents an integer of 1-10; and wherein * denotes the site covalently linked to Y';

$L^2$ is $-(C_1-C_{10}$ alkylene$)-$; $R_1$ is $-H$ or $-CH_3$;

Y' is a group formed by the reaction of an electrophilic group with a reactive nucleophilic group present on cell binding agent C; and p is the drug to antibody ratio (DAR), which is an average number that is about 2-10; and C is a binding agent that targets Her2 comprising:
  a heavy chain comprising an amino acid sequence having at least about 80% identity to SEQ ID NO:1; and
  a light chain comprising an amino acid sequence having at least about 80% identity to SEQ ID NO:2.

In embodiments, C is a binding agent comprising
  a heavy chain comprising an amino acid sequence having at least about 85%, 90%, or 95% identity to SEQ ID NO:1; and
  a light chain comprising an amino acid sequence having at least about 85%, 90%, or 95% identity to SEQ ID NO:2.

In embodiments, C is a binding agent comprising
  a heavy chain amino acid sequence of SEQ ID NO:1; and
  a light chain amino acid sequence of SEQ ID NO:2.

Exemplary compounds according to Formula (PL-A) include MB-2a and MB-3a (trastuzumab meditecan) as described herein.

In embodiments, C is a binding agent that is an antibody or antigen-binding fragment thereof.

In embodiments, C is a binding agent that is trastuzumab (Herceptin), trastuzumab-dkst (Ogivri), trastuzumab-pkrb (Herzuma), trastuzumab-dttb (Ontruzant), trastuzumab-qyyp (Trazimera), or trastuzumab-anns (Kanjinti).

In embodiments, $L^1$ is $-(C_1-C_{10}\text{alkylene})-$.

In embodiments, $L^1$ is $-CH_2CH_2(OCH_2CH_2)_nN(R_1)C(=O)-L^2-*$ or $-CH_2(OCH_2CH_2)_nN(R_1)C(=O)-L^2-*$, wherein n represents an integer of 1-10; and wherein * denotes the site covalently linked to Y'.

In embodiments, $L^1$ is —CH$_2$CH$_2$CH$_2$CH$_2$CH$_2$—, —CH$_2$CH$_2$—, —CH$_2$—, —CH$_2$CH$_2$OCH$_2$CH$_2$OCH$_2$CH$_2$NHC(=O)CH$_2$CH$_2$—* or —CH$_2$OCH$_2$CH$_2$OCH$_2$CH$_2$NHC(=O)CH$_2$CH$_2$—*; wherein * denotes the site covalently linked to Y'.

In embodiments, Y' is formed from a Michael acceptor group, a succinimide, an epoxide, or a halogen.

In embodiments, Y' is formed from

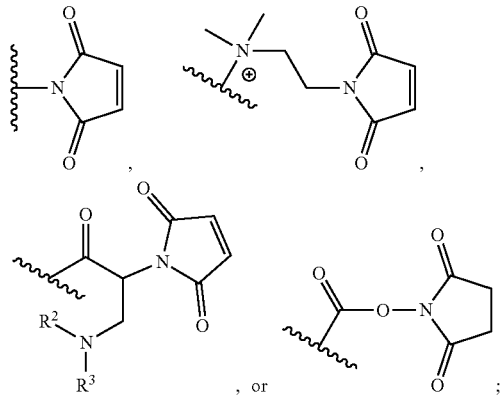

, or ;

wherein $R^2$ and $R^3$ are each independently —H or $C_1$-$C_3$ alkyl.

In embodiments, Y' is

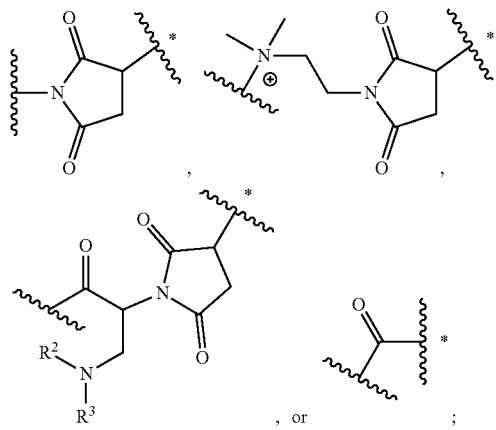

, or ;

wherein $R^2$ and $R^3$ are each independently —H or $C_1$-$C_3$ alkyl and * denotes the site covalently linked to said C.

In embodiments, Z' is formed from:

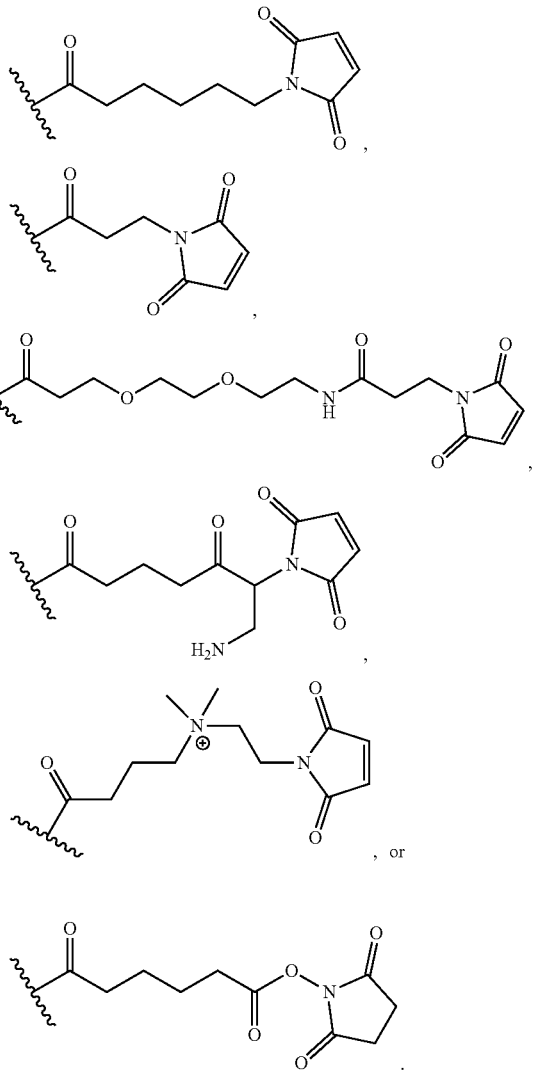

, or

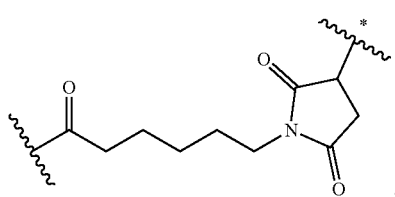

.

In embodiments, Z' is:

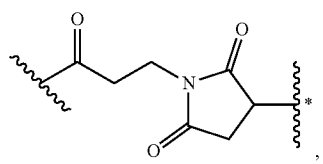

,

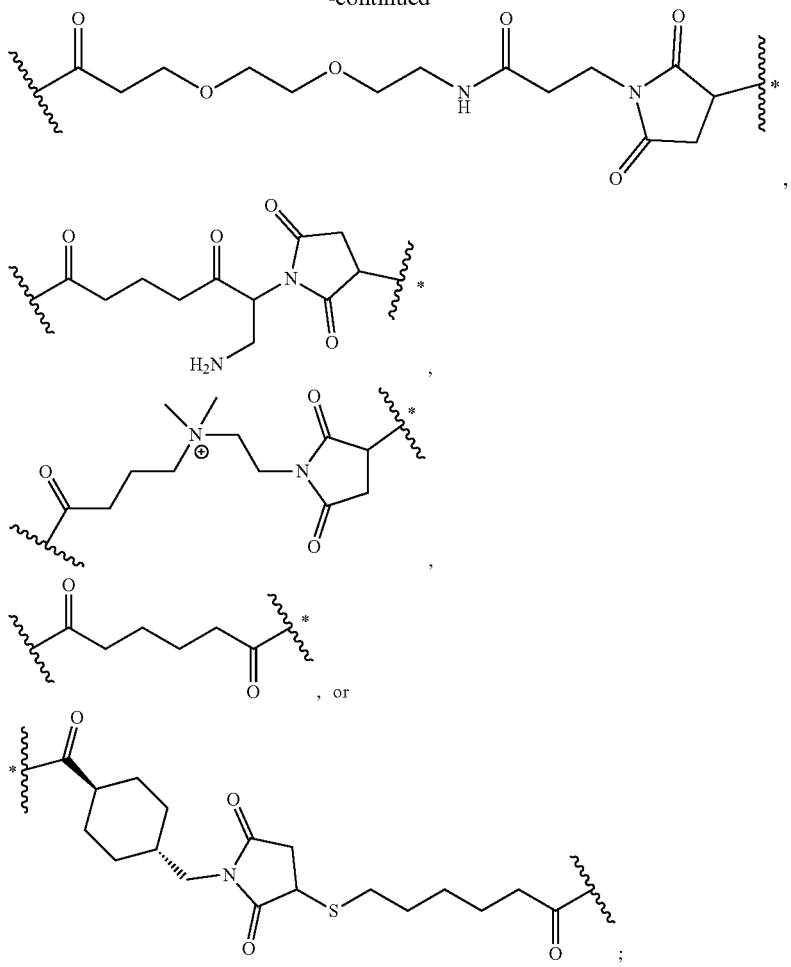

wherein * denotes the site covalently linked to C.

In embodiments, Z' is

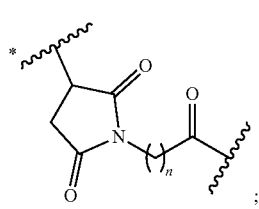

wherein * denotes the covalent attachment to C, and n is an integer of 2-10.

In embodiments, Z' is

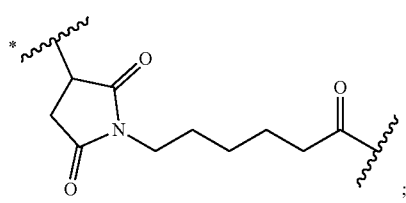 [SMILES: *C(=O)CCCCCN1C(=O)CC(*)C1=O]

wherein * denotes the covalent attachment to C.

In embodiments, Z' is

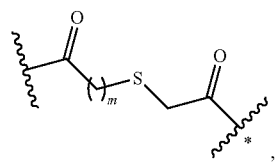

wherein * denotes the site covalently linked to said C. In embodiments, m is 1. In embodiments, m is 2. In embodiments, m is 3. In embodiments, m is 4. In embodiments, m is 5. In embodiments, m is 6. In embodiments, m is 7. In embodiments, m is 8. In embodiments, m is 9. In embodiments, m is 10.

In embodiments, Z' is

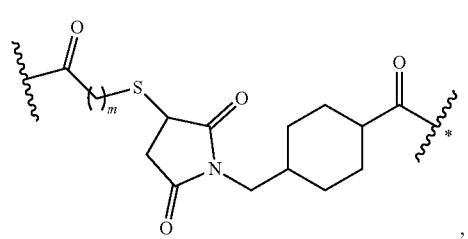

wherein * denotes the site covalently linked to said C. In embodiments, m is 1. In embodiments, m is 2. In embodiments, m is 3. In embodiments, m is 4. In embodiments, m is 5. In embodiments, m is 6. In embodiments, m is 7. In embodiments, m is 8. In embodiments, m is 9. In embodiments, m is 10.

In embodiments, E is a peptide of 2, 3, 4, or 5 amino acids.

In embodiments, E is a peptide of 2, 3, or 4 amino acids.

In embodiments, each amino acid in said peptide is an L amino acid, or wherein at least one amino acid in said peptide is a D amino acid.

In embodiments, E comprises one or more amino acids selected from glycine, alanine, valine, glutamine, glutamic acid, phenylalanine, and leucine, and wherein said glutamine or glutamic acid is optionally substituted by a polyol.

In embodiments, E comprises amino acids selected from glycine, alanine, valine, glutamine, glutamic acid, phenylalanine, and leucine, and wherein said glutamine or glutamic acid is optionally substituted by a polyol.

In embodiments, E comprises an amino acid having the following structure,

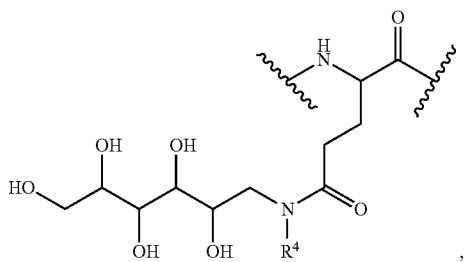

wherein $R^4$ is —H or $C_1$-$C_6$ alkyl.

In embodiments, E comprises an amino acid having the following structure,

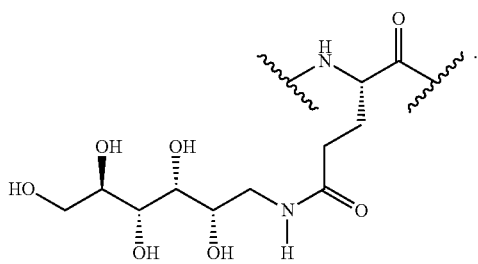 [SMILES: *N[C@@H](CCC(=O)NC[C@H](O)[C@@H](O)[C@H](O)[C@H](O)CO)C(*)=O]

In embodiments, E is selected from the group consisting of -Ala-Val-*, -Val-Ala-*, -Gly-Gly-*, -Val-Cit-*, -Cit-Val-*, -Leu-Ala-*, -Ala-Leu-*, -Leu-Cit-*, -Cit-Leu-*, -Leu-Ala-*, -Ala-Leu-*, -Lys-Lys-*, -Ala-Lys-*, -Lys-Ala-*, -Val-Lys-*, -Lys-Val-*, -Tyr-Arg-*, -Arg-Tyr-*, -Arg-Arg-*, -Ala-Ala-*, -Phe-Lys-*, -Lys-Phe-*, -Thr-Thr-*, -Thr-Met-*, -Met-Thr-*, -Met-Tyr-*, -Tyr-Met-*, -Phe-Gln-*, -Gln-Phe-*, -Gly-Ser-*, -Leu-Gln-*, -Gln-Leu-*, -Ser-Ala-*, -Ser-Gly-*, -Val-Thr-*, -Thr-Val-*, -Val-Gln-*, -Ser-Val-*, -Val-Ser-*, -Ala-Met-*, -Met-Ala-*, -Val-Arg-*, -Arg-Val-*, -Phe-Ala-*, -Ala-Phe-*, -Cit-Val-*, -Gln-Val-*, -Phe-Arg-*, -Arg-Phe-*, -Ala-Ala-Ala-*, -Gly-Gly-Gly-*, -Ala-Val-Ala-*, -Gly-Val-Gly-*, -Ala-Val-Gly-*, -Gly-Phe-Lys-*, -Lys-Phe-Gly-*, -Leu-Ala-Leu-*, -Val-Ala-Leu-*, -Leu-Ala-Val-*, -Val-Ala-Val-*, -Ala-Val-Ala-Gly-* (SEQ ID NO: 10), -Gly-Phe-Gly-Gly-* (SEQ ID NO: 11), -Gly-Gly-Phe-Gly-* (SEQ ID NO: 12), -Ala-Val-Gly-Gly-* (SEQ ID NO: 13), -Ala-Ala-Ala-Ala-* (SEQ ID NO: 14), -Ala-Val-Ala-Ala-* (SEQ ID NO: 15), -Ala-Leu-Ala-Leu-* (SEQ ID NO: 16), -Leu-Ala-Leu-Ala-* (SEQ ID NO: 17), -Gly-Phe-Leu-Gly-* (SEQ ID NO: 18) and -Gly-Leu-Phe-Gly-* (SEQ ID NO: 19), and wherein * denotes the N-terminal of the peptides covalently attached to Z'.

In embodiments, E is selected from the group consisting of -L-Ala-D-Val-*, -L-Val-D-Ala-*, -L-Val-D-Lys-*, -L-Val-D-Arg-*, -L-Val-D-Cit-*, -L-Val-D-Arg-*, -L-Val-D-Cit-*, -L-Val-D-Lys-*, -L-Val-D-Arg-*, -L-Arg-D-Arg-*, -L-Ala-D-Ala-*, -L-Ala-D-Lys-*, -L-Ala-D-Arg-*, -L-Ala-D-Ala-L-Ala-*, -L-Ala-D-Val-L-Ala-*, -L-Ala-D-Ala-Gly-*, and -L-Ala-D-Val-Gly-*, and wherein * denotes the N-terminal of the peptides covalently attached to Z'.

In embodiments, E comprises -(L-Val)-(L-Ala)-. In embodiments, E further comprises an amino acid having the following structure,

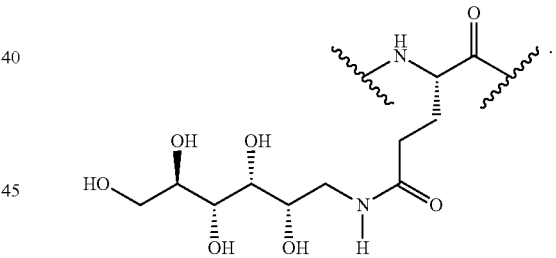

In embodiments,

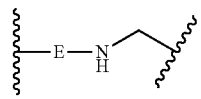

has one of the following structures, wherein * denotes the N-terminal of the peptides covalently attached to Z':

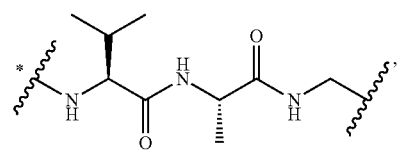

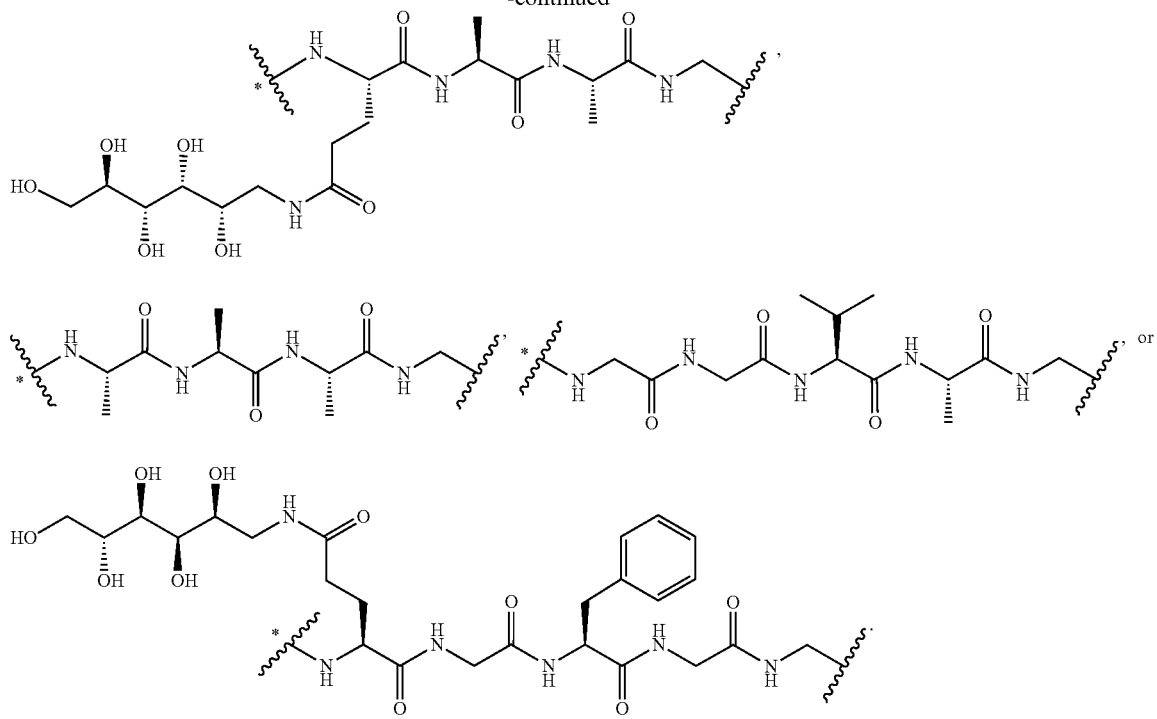
In embodiments,
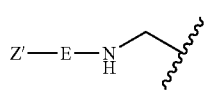
is formed from one of the following structures:
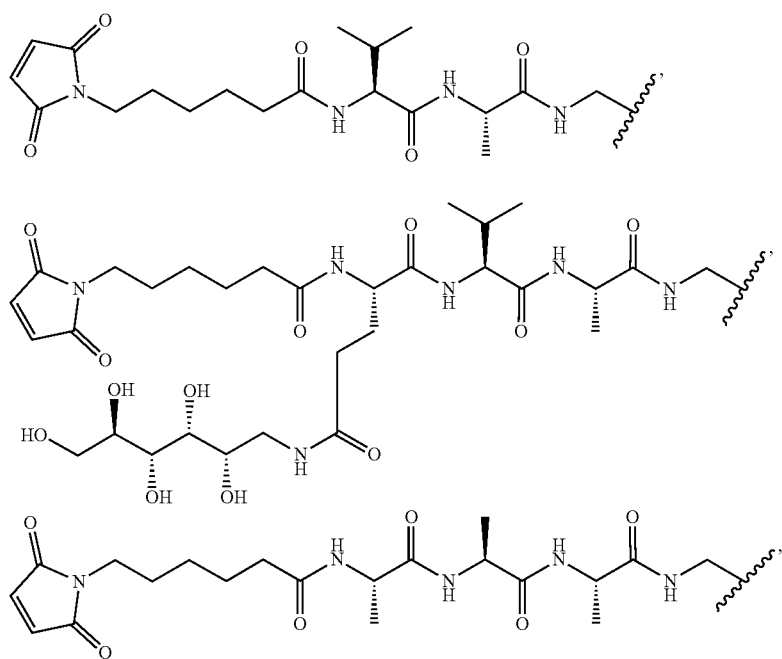

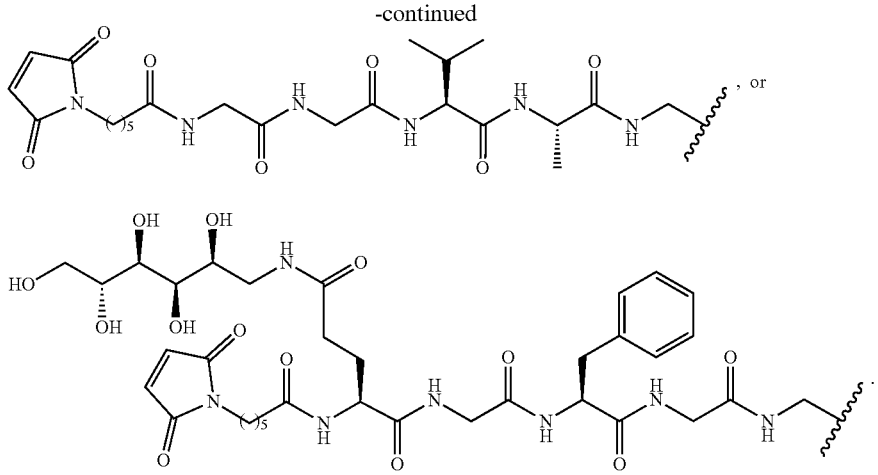, or
In embodiments,
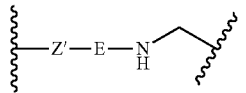
is one of the following structures, wherein * denotes the point of attachment to the C:
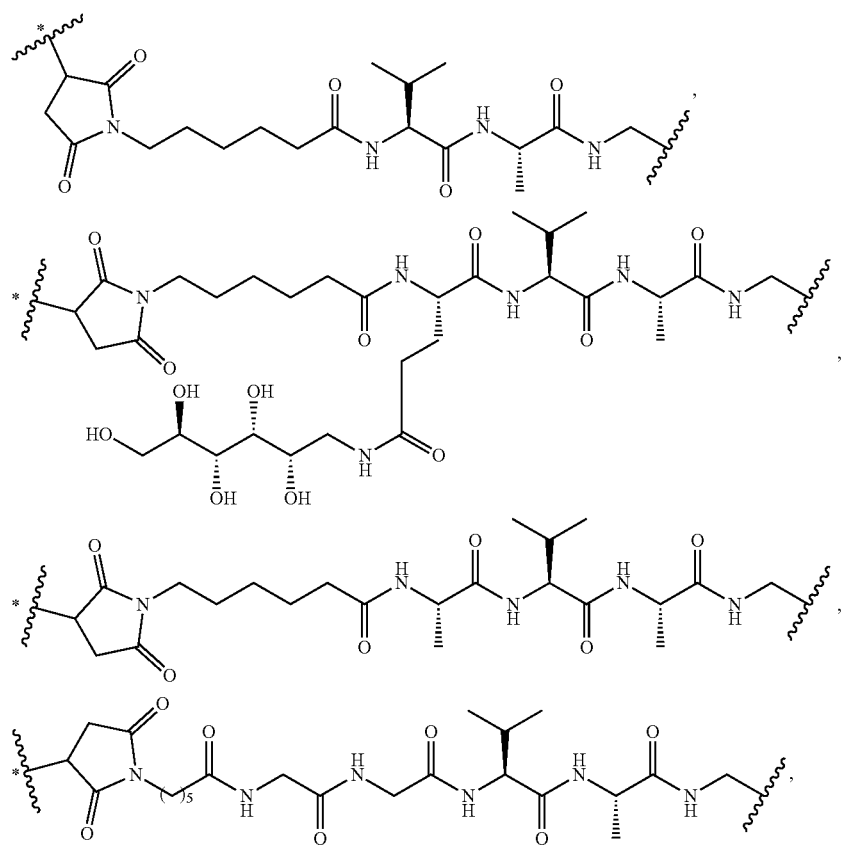

-continued
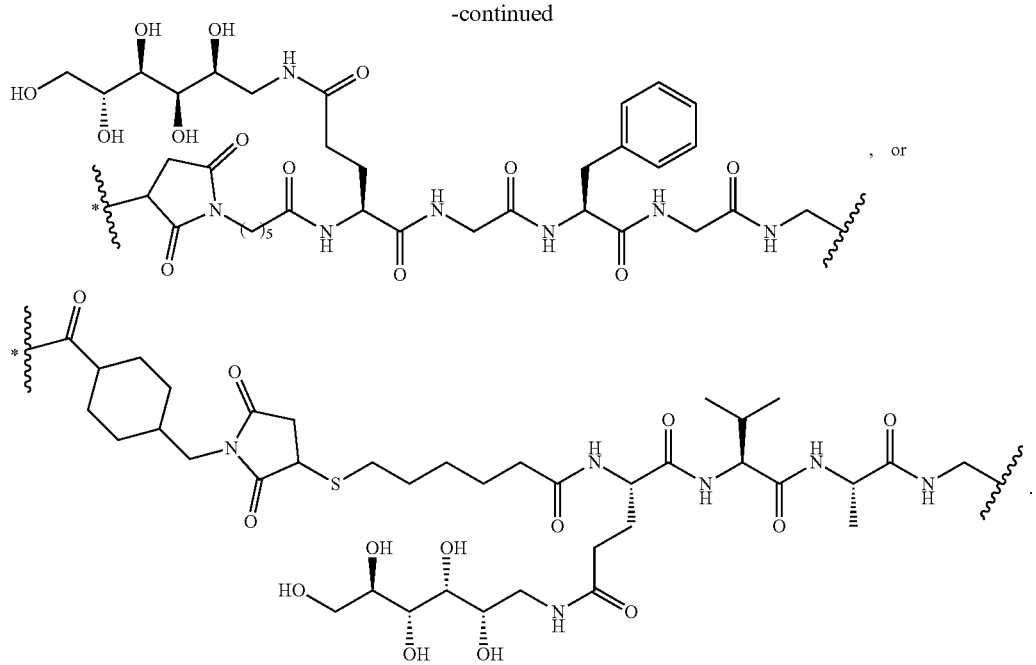
In embodiments, the compound is one of the following structures, or a pharmaceutically acceptable salt thereof:
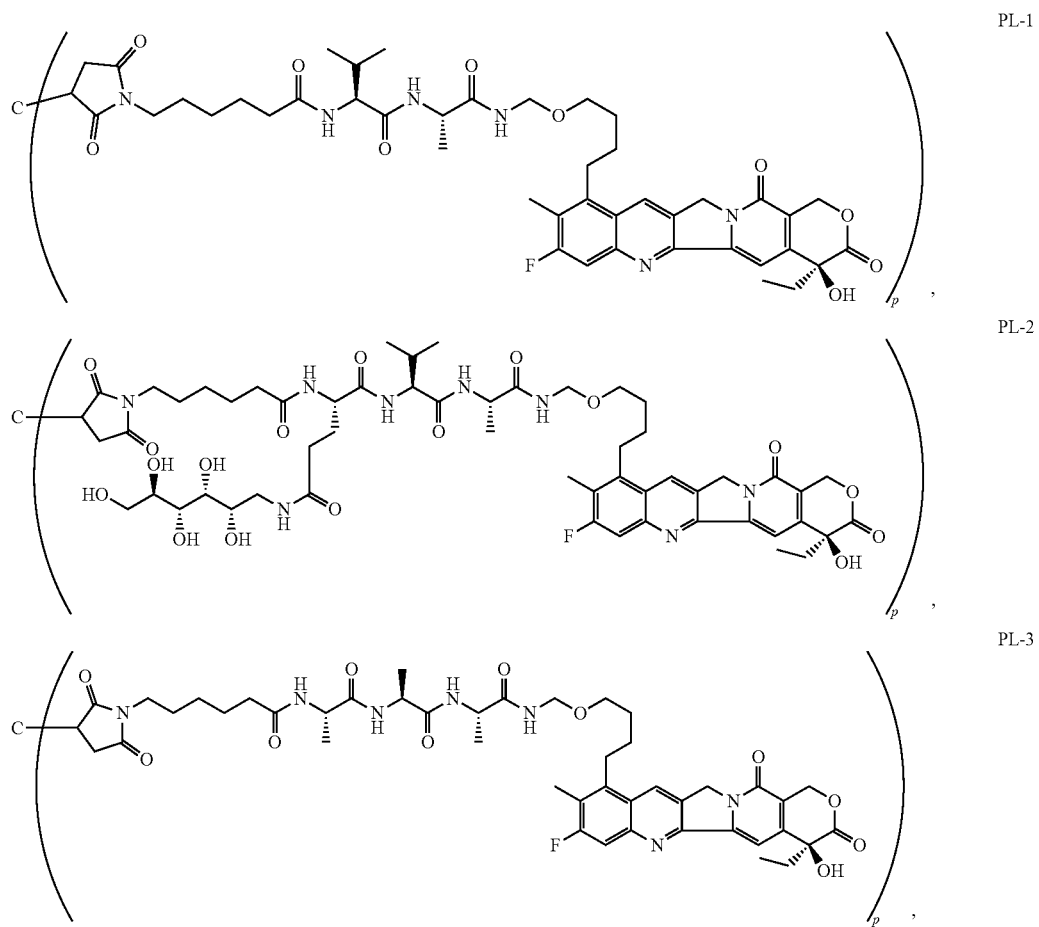

-continued
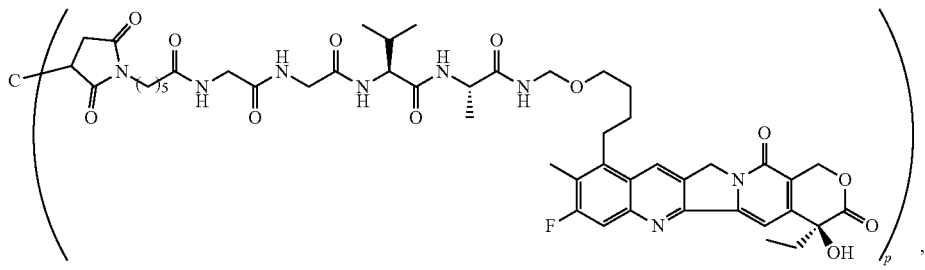
PL-4
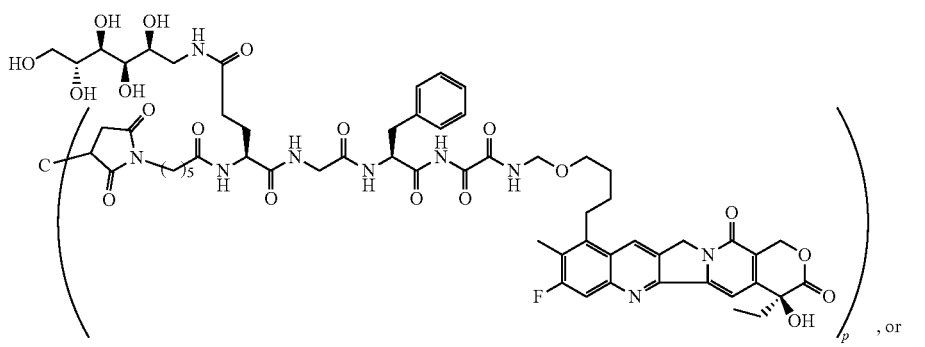
PL-5, or
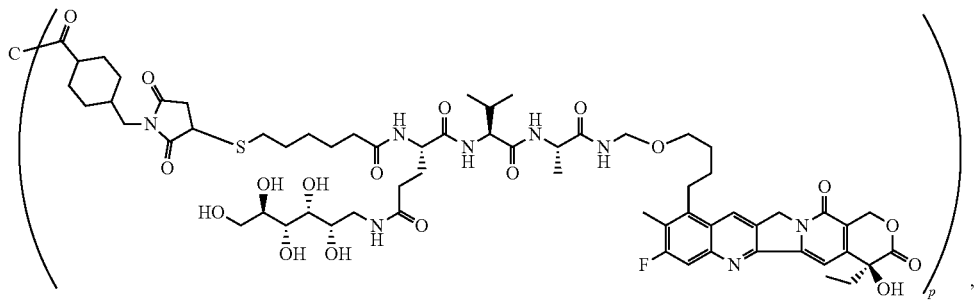
PL-6
and wherein p is about 2-10, 4-8, or 7-8.
In embodiments, the compound is one of the following structures, or a pharmaceutically acceptable salt thereof:
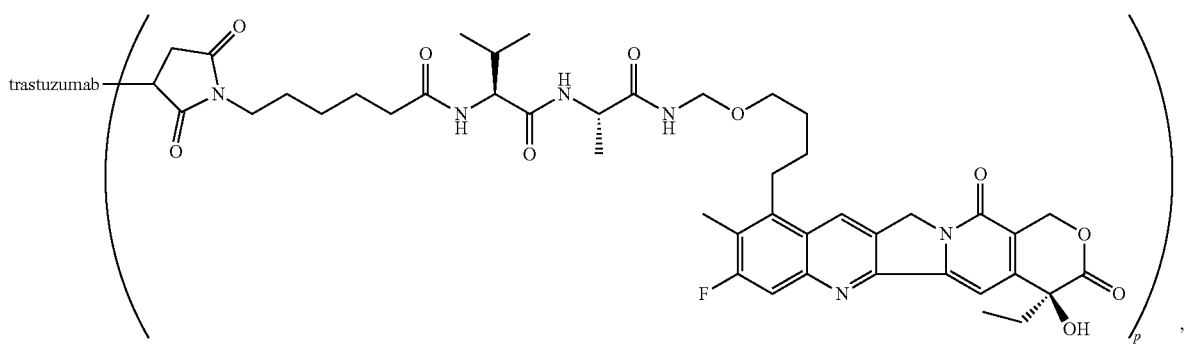
MB-2a
or

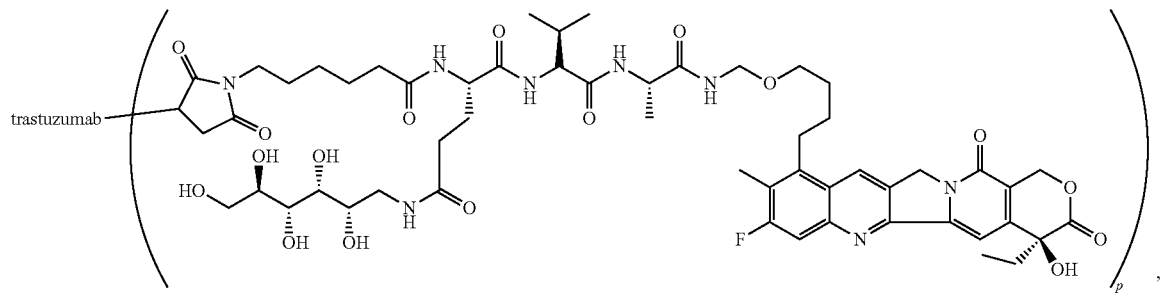

MB-3a and
wherein p is about 4-8, or 7-8.
In embodiments, p is about 7-8.
In embodiments, p is 8.

In another aspect, the invention features a pharmaceutical composition comprising any compound described herein, or a pharmaceutically acceptable salt thereof.

In another aspect, the invention features method of treating cancer comprising administering to a subject in need thereof any compound described herein, or a pharmaceutically acceptable salt thereof.

In embodiments, said compound is

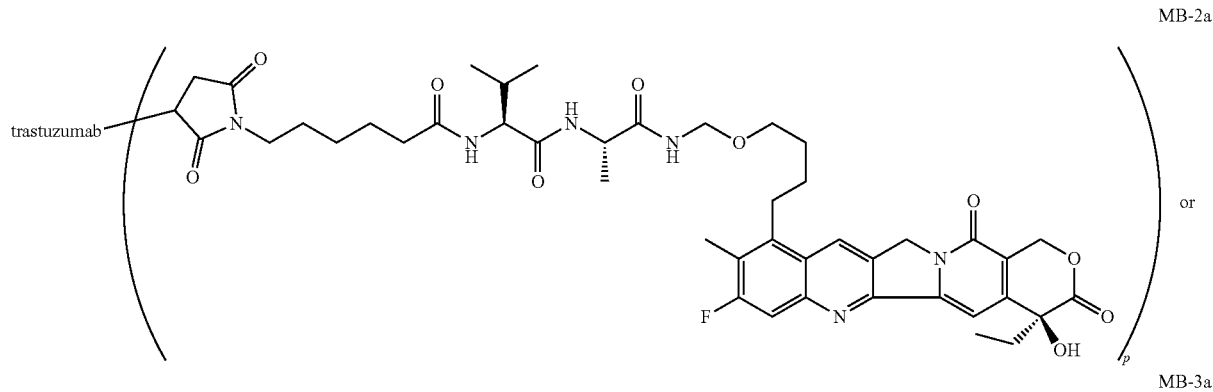

MB-2a or

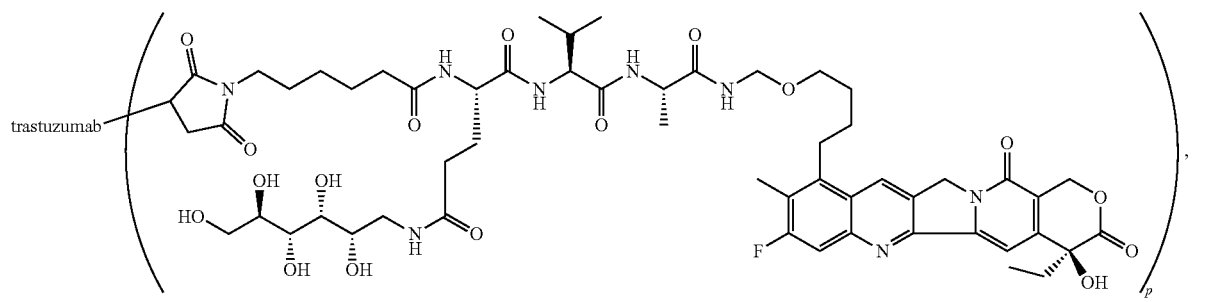

MB-3a or a pharmaceutically acceptable salt thereof.
In embodiments, p is about 4-8, or 7-8.
In embodiments, p is about 7-8.
In embodiments, p is 8.
In embodiments, the cancer is lung cancer, urothelial cancer, colorectal cancer, prostate cancer, ovarian cancer, pancreatic cancer, breast cancer, bladder cancer, gastric cancer, gastrointestinal stromal tumor, uterine cervix cancer, esophageal cancer, squamous cell carcinoma, peritoneal cancer, liver cancer, hepatocellular cancer, colon cancer, rectal cancer, colorectal cancer, endometrial cancer, uterine cancer, salivary gland cancer, kidney cancer, vulval cancer, thyroid cancer, penis cancer, leukemia, malignant lymphoma, plasmacytoma, myeloma, or sarcoma.

In embodiments, the cancer is breast cancer.
In embodiments, the cancer is gastric cancer.
In embodiments, the cancer is lung cancer (e.g., non-small cell lung cancer)
In embodiments, the cancer is ovarian cancer.
In embodiments, the cancer is metastatic.
In embodiments, the cancer is characterized by low Her2-expression.
In embodiments, the cancer is characterized by moderate Her2-expression.
In embodiments, the cancer is characterized by high Her2-expression.
In embodiments, the cancer is trastuzumab resistant.

BRIEF DESCRIPTION OF DRAWINGS

FIG. 6 illustrates a selection of data from FIG. 5 showing the antitumor effect using 2.5 mg/kg i.v. single doses of MB-2a and MB-3a.

FIG. 7 illustrates a selection of data from FIG. 5 showing the antitumor effect using 5 mg/kg i.v. single doses of MB-2a and MB-3a.

FIG. 8 illustrates a selection of data from FIG. 5 showing the antitumor effect using 10 mg/kg i.v. single doses of MB-2a and MB-3a.

DETAILED DESCRIPTION OF THE INVENTION

Figure 1A:
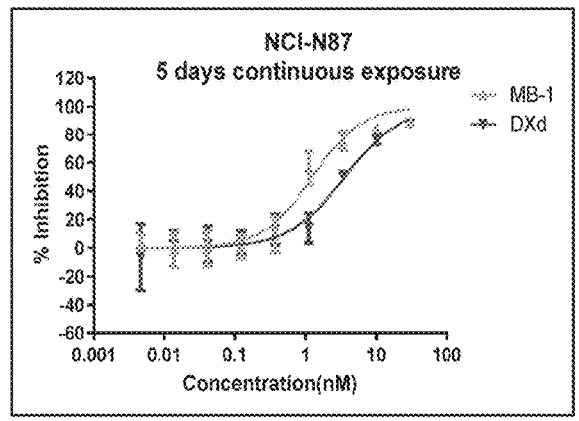
FIGS. 1A-1F show exemplary results of in vitro cell growth inhibitory activity of the ADC metabolites in NCI-N87 cell line (FIG. 1A); JIMT-1 cell line (FIG. 1B); MDA-MB-468 cell line (FIG. 1C); SK-OV-3 cell line (FIG. 1D); SK-Br-3 cell line (FIG. 1E); and MCF-7 cell line (FIG. 1F). DXd is the metabolite of DS-8201a (Enhertu) in cells, and MB-1 is the metabolite of certain ADCs described herein.
Figure 1B:
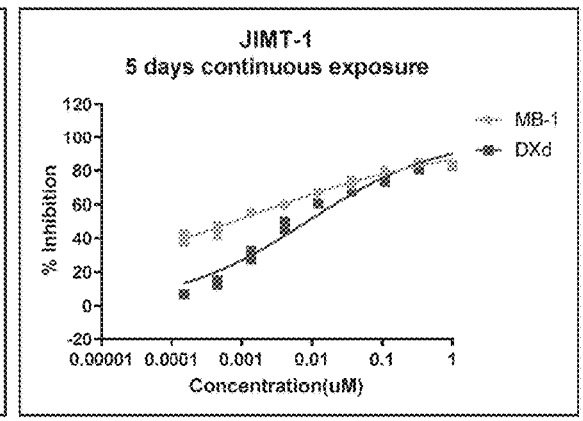
Figure 1C:
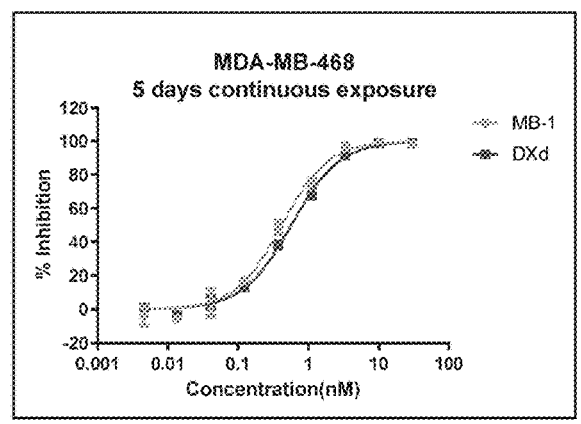
Figure 1D:
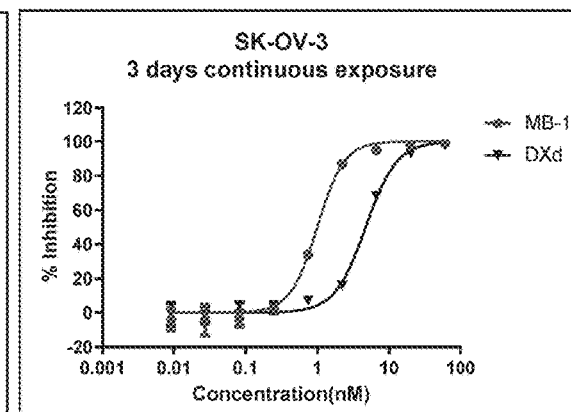
Figure 1E:
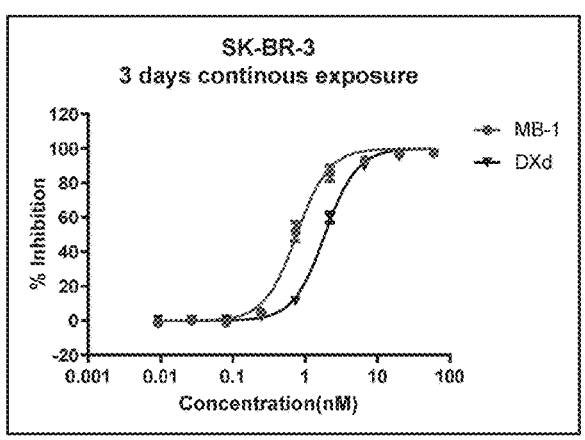
Figure 1F:
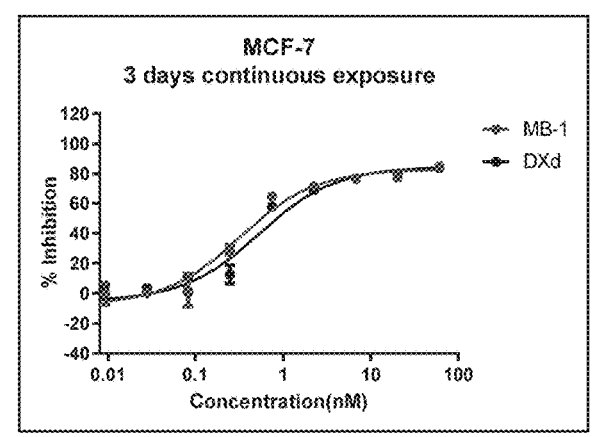

The present invention relates to antibody-drug conjugates comprising an antitumor drug conjugated to an anti-HER2 antibody via a linker structure moiety. Such compounds can be particularly useful for the treatment of cancers (e.g., breast and gastric cancers), which may be characterized by HER2 overexpression and/or be metastatic and/or trastuzumab resistant.

Definitions

Unless stated otherwise, the following terms and phrases as used herein are intended to have the following meanings. When trade names are used herein, the trade name includes the product formulation, the generic drug, and the active pharmaceutical ingredient(s) of the trade name product, unless otherwise indicated by context.

As used herein, the term "antibody" refers to an agent that specifically binds to a particular antigen. In some embodiments, the term encompasses any polypeptide or polypeptide complex that includes immunoglobulin structural elements sufficient to confer specific binding. Exemplary antibodies include, but are not limited to monoclonal antibodies or polyclonal antibodies. In some embodiments, an antibody may include one or more constant region sequences that are characteristic of mouse, rabbit, primate, or human antibodies. In some embodiments, an antibody may include one or more sequence elements are humanized, primatized, chimeric, etc., as is known in the art. In many embodiments, the term "antibody" is used to refer to one or more of the art-known or developed constructs or formats for utilizing antibody structural and functional features in alternative presentation. For example, embodiments, an antibody utilized in accordance with the present invention is in a format selected from, but not limited to, intact IgA, IgG, IgE or IgM antibodies; bi- or multi-specific antibodies (e.g., Zybodies®, etc.); antibody fragments such as Fab fragments, Fab' fragments, F(ab')2 fragments, Fd' fragments, Fd fragments, and isolated CDRs or sets thereof; single chain Fvs; polypeptide-Fc fusions; single domain antibodies (e.g., shark single domain antibodies such as IgNAR or fragments thereof); cameloid antibodies; masked antibodies (e.g., Probodies®); Small Modular ImmunoPharmaceuticals ("SMIPs™"); single chain or Tandem diabodies (TandAb®); VHHs; Anticalins®; Nanobodies® minibodies; BiTE®s; ankyrin repeat proteins or DARPINs®; Avimers®; DARTs; TCR-like antibodies; Adnectins®; Affilins®; Transbodies®; Affibodies®; TrimerX®; MicroProteins; Fynomers®, Centyrins®; and KALBITOR®s. In some embodiments, an antibody may lack a covalent modification (e.g., attachment of a glycan) that it would have if produced naturally. In some embodiments, an antibody may contain a covalent modification (e.g., attachment of a glycan, a payload [e.g., a detectable moiety, a therapeutic moiety, a catalytic moiety, etc.], or other pendant group [e.g., polyethylene glycol, etc.]). In many embodiments, an antibody is or comprises a polypeptide whose amino acid sequence includes one or more structural elements recognized by those skilled in the art as a complementarity determining region (CDR); in some embodiments, an antibody is or comprises a polypeptide whose amino acid sequence includes at least one CDR (e.g., at least one heavy chain CDR and/or at least one light chain CDR) that is substantially identical to one found in a reference antibody. In some embodiments, an antibody agent is or comprises a polypeptide whose amino acid sequence includes structural elements recognized by those skilled in the art as an immunoglobulin variable domain. In some embodiments, an antibody agent is a polypeptide protein having a binding domain which is homologous or largely homologous to an immunoglobulin-binding domain.

The term "monoclonal antibody" as used herein refers to an antibody obtained from a population of substantially homogeneous antibodies, i.e., the individual antibodies comprising the population are identical except for possible naturally-occurring mutations that may be present in minor amounts. Monoclonal antibodies are highly specific, being directed against a single antigenic site. The modifier "monoclonal" indicates the character of the antibody as being obtained from a substantially homogeneous population of antibodies, and is not to be construed as requiring production of the antibody by any particular method.

As used herein, the term "human antibody" is intended to include antibodies having variable and constant regions generated (or assembled) from human immunoglobulin sequences. In some embodiments, antibodies (or antibody components) may be considered to be "human" even though their amino acid sequences include residues or elements not encoded by human germline immunoglobulin sequences (e.g., include sequence variations, for example that may (originally) have been introduced by random or site-specific mutagenesis in vitro or by somatic mutation in vivo), for example in one or more CDRs and in particular CDR3.

As is known in the art, the term "humanized" is commonly used to refer to antibodies (or antibody components) whose amino acid sequence includes $V_H$ and $V_L$ region sequences from a reference antibody raised in a non-human species (e.g., a mouse), but also includes modifications in those sequences relative to the reference antibody intended to render them more "human-like", i.e., more similar to human germline sequences. In some embodiments, a "humanized" antibody (or antibody component) is one that immunospecifically binds to an antigen of interest and that has a framework (FR) region having substantially the amino acid sequence as that of a human antibody, and a complementary determining region (CDR) having substantially the amino acid sequence as that of a non-human antibody. A humanized antibody comprises substantially all of at least one, and typically two, variable domains (Fab, Fab', F(ab')2, FabC, Fv) in which all or substantially all of the CDR regions correspond to those of a non-human immunoglobulin (i.e., donor immunoglobulin) and all or substantially all of the framework regions are those of a human immunoglobulin consensus sequence. In some embodiments, a humanized antibody also comprises at least a portion of an immunoglobulin constant region (Fc), typically that of a human immunoglobulin constant region. In some embodiments, a humanized antibody contains both the light chain as well as at least the variable domain of a heavy chain. The antibody also may include a $CH_1$, hinge, $CH_2$, $CH_3$, and, optionally, a $CH_4$ region of a heavy chain constant region. In some embodiments, a humanized antibody only contains a humanized $V_L$ region. In some embodiments, a humanized antibody only contains a humanized $V_H$ region. In some certain embodiments, a humanized antibody contains humanized $V_H$ and $V_L$ regions.

An "intact antibody" is one which comprises an antigen-binding variable region as well as a light chain constant domain ($C_L$) and heavy chain constant domains, $CH_1$, $CH_2$, $CH_3$ and $C_H4$, as appropriate for the antibody class. The constant domains may be native sequence constant domains (e.g., human native sequence constant domains) or amino acid sequence variant thereof.

An "antibody fragment" comprises a portion of an intact antibody, comprising the antigen-binding or variable region thereof. Examples of antibody fragments include Fab, Fab', F(ab')2, and Fv fragments, diabodies, triabodies, tetrabodies, linear antibodies, single-chain antibody molecules, scFv, scFv-Fc, multispecific antibody fragments formed from antibody fragment(s), a fragment(s) produced by a Fab expression library, or an epitope-binding fragments of any of the above which immunospecifically bind to a target antigen (e.g., a cancer cell antigen, a viral antigen or a microbial antigen).

An "antigen" is an entity to which an antibody specifically binds.

It will be understood that the term "binding", as used herein, typically refers to a non-covalent association between or among two or more entities. "Direct" binding involves physical contact between entities or moieties; indirect binding involves physical interaction by way of physical contact with one or more intermediate entities. Binding between two or more entities can typically be assessed in any of a variety of contexts—including where interacting entities or moieties are studied in isolation or in the context of more complex systems (e.g., while covalently or otherwise associated with a carrier entity and/or in a biological system or cell). In some embodiments, "binding" refers to the non-covalent interactions of the type which occur between an immunoglobulin molecule and an antigen for which the immunoglobulin is specific. The strength, or affinity of immunological binding interactions can be expressed in terms of the dissociation constant ($K_d$) of the interaction, wherein a smaller $K_d$ represents a greater affinity. Immunological binding properties of selected polypeptides can be quantified using methods well known in the art. One such method entails measuring the rates of antigen-binding site/antigen complex formation and dissociation, wherein those rates depend on the concentrations of the complex partners, the affinity of the interaction, and geometric parameters that equally influence the rate in both directions. Thus, both the "on rate constant" ($K_{on}$) and the "off rate constant" ($K_{off}$) can be determined by calculation of the concentrations and the actual rates of association and dissociation. (See Nature 361:186-87 (1993)). The ratio of $K_{off}/K_{on}$ enables the cancellation of all parameters not related to affinity, and is equal to the dissociation constant $K_d$. (See, generally, Davies et al. (1990) Annual Rev Biochem 59:439-473).

The terms "specific binding" and "specifically binds" mean that the antibody or antibody derivative will bind, in a highly selective manner, with its corresponding epitope of a target antigen and not with the multitude of other antigens. Typically, the antibody or antibody derivative binds with an affinity of at least about $1\times10^{-7}$ M, and preferably $10^{-8}$ M to $10^{-9}$ M, $10^{-10}$ M, $10^{-11}$ M, or $10^{-12}$ M and binds to the predetermined antigen with an affinity that is at least two-fold greater than its affinity for binding to a non-specific antigen (e.g., BSA, casein) other than the predetermined antigen or a closely-related antigen. The term "specificity" refers to the ability of a cell binding agent (e.g., as described herein such as an antibody or a fragment thereof) to specifically bind (e.g., immunoreact with) a given target antigen, e.g., a human target antigen.

In general, a "protein" is a polypeptide (i.e., a string of at least two amino acids linked to one another by peptide bonds). Proteins may include moieties other than amino acids (e.g., may be glycoproteins) and/or may be otherwise processed or modified. Those of ordinary skill in the art will appreciate that a "protein" can be a complete polypeptide chain as produced by a cell (with or without a signal sequence), or can be a functional portion thereof. Those of ordinary skill will further appreciate that a protein can sometimes include more than one polypeptide chain, for example linked by one or more disulfide bonds or associated by other means.

The term "inhibit" or "inhibition or" means to reduce by a measurable amount, or to prevent entirely.

The term "substantial" or "substantially" refers to a majority, i.e. >50% of a population, of a mixture or a sample, preferably more than 50%, 55%, 60%, 65%, 70%, 75%, 80%, 85%, 90%, 91%, 92%, 93%, 94%, 95%, 96%, 97%, 98%, or 99% of a population.

The term "cytotoxic activity" refers to a cell-killing effect of a drug or Camptothecin Conjugate or an intracellular metabolite of a Camptothecin Conjugate. Cytotoxic activity may be expressed as the $IC_{50}$ value, which is the concentration (molar or mass) per unit volume at which half the cells survive.

The term "cytostatic activity" refers to an antiproliferative effect of a drug or Camptothecin Conjugate or an intracellular metabolite of a Camptothecin Conjugate.

The term "cytotoxic agent" as used herein refers to a substance that has cytotoxic activity and causes destruction of cells. The term is intended to include chemotherapeutic agents, and toxins such as small molecule toxins or enzymatically active toxins of bacterial, fungal, plant or animal origin, including synthetic analogs and derivatives thereof.

The term "cytostatic agent" as used herein refers to a substance that inhibits a function of cells, including cell growth or multiplication. Cytostatic agents include inhibitors such as protein inhibitors, e.g., enzyme inhibitors. Cytostatic agents have cytostatic activity.

The terms "cancer" and "cancerous" refer to or describe the physiological condition or disorder in mammals that is typically characterized by unregulated cell growth. A "tumor" comprises one or more cancerous cells.

As used herein, the term "patient" or "subject" refers to any organism to which provided compound or compounds described herein are administered in accordance with the present invention e.g., for experimental, diagnostic, prophylactic, and/or therapeutic purposes. Typical subjects include animals. The term "animal" refers to any member of the animal kingdom. In some embodiments, "animal" refers to humans, at any stage of development. In some embodiments, "animal" refers to non-human animals, at any stage of development. In certain embodiments, the non-human animal is a mammal (e.g., a rodent, a mouse, a rat, a rabbit, a monkey, a dog, a cat, a sheep, cattle, a primate, and/or a pig). In some embodiments, animals include, but are not limited to, mammals, birds, reptiles, amphibians, fish, insects, and/or worms. In some embodiments, an animal may be a transgenic animal, genetically-engineered animal, and/or a clone. In embodiments, animals are mammals such as mice, rats, rabbits, non-human primates, and humans; insects; worms; etc. In embodiments, a subject is a human. In some embodiments, a subject may be suffering from, and/or susceptible to a disease, disorder, and/or condition (e.g., cancer). As used herein, a "patient population" or "population of subjects" refers to a plurality of patients or subjects.

As used herein, the term "normal," when used to modify the term "individual" or "subject" refers to an individual or group of individuals who does not have a particular disease or condition and is also not a carrier of the disease or condition. The term "normal" is also used herein to qualify a biological specimen or sample isolated from a normal or wild-type individual or subject, for example, a "normal biological sample."

An individual who is "suffering from" a disease, disorder, and/or condition (e.g., any cancer described herein) has been diagnosed with or displays one or more symptoms of the disease, disorder, and/or condition.

An individual who is "susceptible to" a disease, disorder, and/or condition has not been diagnosed with and/or may not exhibit symptoms of the disease, disorder, and/or condition. In some embodiments, an individual who is susceptible to a disease, disorder, and/or condition (for example, cancer) may be characterized by one or more of the following: (1) a genetic mutation associated with development of the disease, disorder, and/or condition; (2) a genetic polymorphism associated with development of the disease, disorder, and/or condition; (3) increased and/or decreased expression and/or activity of a protein associated with the disease, disorder, and/or condition; (4) habits and/or lifestyles associated with development of the disease, disorder, and/or condition; (5) a family history of the disease, disorder, and/or condition; (6) reaction to certain bacteria or viruses; (7) exposure to certain chemicals. In some embodiments, an individual who is susceptible to a disease, disorder, and/or condition will develop the disease, disorder, and/or condition. In some embodiments, an individual who is susceptible to a disease, disorder, and/or condition will not develop the disease, disorder, and/or condition.

The terms "treat" or "treatment", unless otherwise indicated by context, refer to any administration of a therapeutic molecule (e.g., any compound described herein) that partially or completely alleviates, ameliorates, relieves, inhibits, delays onset of, delays progression of, reduces severity of and/or reduces incidence of one or more symptoms or features of a particular disease, disorder, and/or condition (e.g., cancer). Such treatment may be of a subject who does not exhibit signs of the relevant disease, disorder and/or condition and/or of a subject who exhibits only early signs of the disease, disorder, and/or condition. Alternatively or additionally, such treatment may be of a subject who exhibits one or more established signs of the relevant disease, disorder and/or condition. Alternatively, the pharmacologic and/or physiologic effect may be prophylactic, i.e., the effect of completely or partially prevents a disease or symptom thereof (e.g., delaying onset or slowing progression of a disease or symptom thereof). In this respect, the inventive method comprises administering a "prophylactically effective amount" of the binding agent. A "prophylactically effective amount" refers to an amount effective, at dosages and for periods of time necessary, to achieve a desired prophylactic result. Accordingly, treatment (including prophylactic treatment) where the object is to inhibit or slow down (lessen) an undesired physiological change or disorder, such as the development or spread of cancer. For purposes of this invention, beneficial or desired clinical results include, but are not limited to, alleviation of symptoms, diminishment of extent of disease, stabilized (i.e., not worsening) state of disease, delay or slowing of disease progression, amelioration or palliation of the disease state, and remission (whether partial or total), whether detectable or undetectable. Treatment can also include the prolonging of survival as compared to expected survival if not receiving treatment. Those in need of treatment include those already with the condition or disorder as well as those prone to have the condition or disorder.

In the context of cancer, the term "treating" includes any or all of: killing tumor cells; inhibiting growth of tumor cells, cancer cells, or of a tumor; inhibiting replication of tumor cells or cancer cells, lessening of overall tumor burden or decreasing the number of cancerous cells, and ameliorating one or more symptoms associated with the disease.

In the context of an autoimmune disease, the term "treating" includes any or all of: inhibiting replication of cells associated with an autoimmune disease state including, but not limited to, cells that produce an autoimmune antibody, lessening the autoimmune-antibody burden and ameliorating one or more symptoms of an autoimmune disease.

The term "therapeutically effective amount" or "effective amount" refers to an amount of a conjugate effective to treat or prevent a disease or disorder in a mammal (e.g., as described herein). In the case of cancer, the therapeutically effective amount of the conjugate may reduce the number of cancer cells; reduce the tumor size; inhibit (i.e., slow to some extent and preferably stop) cancer cell infiltration into peripheral organs; inhibit (i.e., slow to some extent and preferably stop) tumor metastasis; inhibit, to some extent, tumor growth; and/or relieve to some extent one or more of the symptoms associated with the cancer. To the extent the drug may inhibit growth and/or kill existing cancer cells, it may be cytostatic and/or cytotoxic. For cancer therapy, efficacy can, for example, be measured by assessing the time to disease progression (TTP) and/or determining the response rate (RR).

The term "pharmaceutically acceptable form" as used herein refers to a form of a disclosed compound including, but is not limited to, pharmaceutically acceptable salts, esters, hydrates, solvates, polymorphs, isomers, prodrugs, and isotopically labeled derivatives thereof. In one embodiment, a "pharmaceutically acceptable form" includes, but is not limited to, pharmaceutically acceptable salts, esters, prodrugs and isotopically labeled derivatives thereof. In embodiments, a "pharmaceutically acceptable form" includes, but is not limited to, pharmaceutically acceptable isomers and stereoisomers, prodrugs and isotopically labeled derivatives thereof.

In embodiments, the pharmaceutically acceptable form is a pharmaceutically acceptable salt. The term "pharmaceutically acceptable salt," as used herein, refers to pharmaceutically acceptable organic or inorganic salts of a compound (e.g., a camptothecin, a camptothecin payload, or a camptothecin conjugate). In some aspects, the compound can contain at least one amino group, and accordingly acid addition salts can be formed with the amino group. Exemplary salts include, but are not limited to, sulfate, trifluoroacetate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucuronate, saccharate, formate, benzoate, glutamate, methanesulfonate, ethanesulfonate, benzenesulfonate, p-toluenesulfonate, and pamoate (i.e., 1,1'-methylene-bis-(2-hydroxy-3-naphthoate)) salts. A pharmaceutically acceptable salt may involve the inclusion of another molecule such as an acetate ion, a succinate ion or other counterion. The counterion may be any organic or inorganic moiety that stabilizes the charge on the parent compound. Furthermore, a pharmaceutically acceptable salt may have more than one charged atom in its structure. Instances where multiple charged atoms are part of the pharmaceutically acceptable salt can have multiple counter ions. Hence, a pharmaceutically acceptable salt can have one or more charged atoms and/or one or more counterion.

As used herein, the term "pharmaceutical composition" refers to a composition in which an active agent (e.g., a compound according to any of Formulas (I)-(III) as described herein) is formulated together with one or more pharmaceutically acceptable carriers. In some embodiments, the active agent is present in unit dose amount appropriate for administration in a therapeutic regimen that shows a statistically significant probability of achieving a predetermined therapeutic effect when administered to a relevant population. In some embodiments, a pharmaceutical composition may be specially formulated for administration in solid or liquid form, including those adapted for the following: oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream, or foam; sublingually; ocularly; transdermally; or nasally, pulmonary, and to other mucosal surfaces.

As used herein, a "carrier" or a "pharmaceutically acceptable carrier" refers to a diluent, adjuvant, excipient, or vehicle with which a composition is administered. In some exemplary embodiments, carriers can include sterile liquids, such as, for example, water and oils, including oils of petroleum, animal, vegetable or synthetic origin, such as, for example, peanut oil, soybean oil, mineral oil, sesame oil and the like. In some embodiments, carriers are or include one or more solid components. In some embodiments, the carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In some cases, it may be desirable to include isotonic agents, for example, sugars, polyalcohols such as manitol, sorbitol, sodium chloride in the composition. Prolonged absorption of the injectable compositions can be brought about by including in the composition an agent which delays absorption, for example, aluminum monostearate and gelatin.

As used herein, the term "kit" refers to any delivery system for delivering materials. Such delivery systems may include systems that allow for the storage, transport, or delivery of various diagnostic or therapeutic reagents (e.g., oligonucleotides, enzymes, etc. in the appropriate containers) and/or supporting materials (e.g., buffers, written instructions for performing the assay, etc.) from one location to another. For example, kits include one or more enclosures (e.g., boxes, cartridges, bottles, ampoules, etc.) containing the relevant reaction reagents and/or supporting materials. As used herein, the term "fragmented kit" refers to a delivery system comprising two or more separate containers that each contain a subportion of the total kit components. The containers may be delivered to the intended recipient together or separately. For example, a first container may contain an enzyme for use in an assay, while a second container contains oligonucleotides. The term "fragmented kit" is intended to encompass kits containing Analyte Specific Reagents (ASR's) regulated under section 520(e) of the Federal Food, Drug, and Cosmetic Act, but are not limited thereto. Indeed, any delivery system comprising two or more separate containers that each contains a subportion of the total kit components are included in the term "fragmented kit." In contrast, a "combined kit" refers to a delivery system containing all of the components in a single container (e.g., in a single box housing each of the desired components). The term "kit" includes both fragmented and combined kits.

As used herein, the term "administration" typically refers to the administration of a composition to a subject or system to achieve delivery of an agent that is, or is included in, the composition. Those of ordinary skill in the art will be aware of a variety of routes that may, in appropriate circumstances, be utilized for administration to a subject, for example a human. Examples of routes of administration include parenteral, e.g., intravenous, intradermal, subcutaneous, oral (e.g., inhalation), transdermal (i.e., topical), transmucosal, and rectal administration. For example, in some embodiments, administration may be ocular, oral, parenteral, topical, etc. In embodiments, administration is parenteral (e.g., intravenous administration). In embodiments, intravenous administration is intravenous infusion. In some particular embodiments, administration may be bronchial (e.g., by bronchial instillation), buccal, dermal (which may be or comprise, for example, one or more of topical to the dermis, intradermal, interdermal, transdermal, etc.), enteral, intra-arterial, intradermal, intragastric, intramedullary, intramuscular, intranasal, intraperitoneal, intrathecal, intravenous, intraventricular, within a specific organ (e. g. intrahepatic), mucosal, nasal, oral, rectal, subcutaneous, sublingual, topical, tracheal (e.g., by intratracheal instillation), vaginal, vitreal, etc.

As used herein, the term "nucleophilic" refers to a reactive group that is electron rich, has an unshared pair of electrons acting as a reactive site, and reacts with a positively charged or electron-deficient site. Examples of nucleophilic groups suitable for use in the invention include, without limitation, amino groups (e.g., primary amines, secondary amines, hydroxyamines, and/or hydrazines), thiols, phenols, and alcohols. In embodiments, a nucleophilic functional group comprises: amino, hydrazino, hydroxyamino, hydroxy, or thio. In embodiments, a nucleophilic functional group is carboxamide, N-hydroxycarboxamide, carboxyl hydrazide, or guanidino. In embodiments, a nucleophilic group is a thiol group or comprises a thiol group. Certain nucleophilic groups must be activated with a base so as to be capable of reaction with an electrophilic group. For example, when there are nucleophilic thiol and hydroxyl groups in the multifunctional compound, the compound must be admixed with an aqueous base in order to remove a proton and provide a thiolate or hydroxylate anion to enable reaction with the electrophilic group. Unless it is desirable for the base to participate in the reaction, a non-nucleophilic base is preferred. In some embodiments, the base may be present as a component of a buffer solution.

As used herein, the term "electrophilic" refers to a reactive group that is susceptible to nucleophilic attack; that is, susceptible to reaction with an incoming nucleophilic group. Selection of electrophilic group can be made such that reaction is possible with the nucleophilic groups of the paired reactant. For example, when a nucleophilic reactive group is an amino group, the electrophilic group(s) can be selected so as to react with amino groups. Analogously, when the nucleophilic reactive group is a thiol moiety, a corresponding electrophilic group can be thiol-reactive groups, and the like. Examples of electrophilic groups suitable for use in the invention include, without limitation, carboxylic acid esters, acid chloride groups, anhydrides, isocyanato, thioisocyanato, epoxides, activated hydroxyl groups, succinimidyl ester, sulfosuccinimidyl ester, maleimido, and ethenesulfonyl. In embodiments, an electrophilic group is an aldehyde, an α-halo ketone, a maleimide, a succinimide, a hydroxysuccinimide, an isothiocyanate, an isocyanate, an acyl azide, a sulfonyl chloride, a tosylate ester, a glyoxal, an epoxide, an oxirane, a carbonate, an imidoester, an anhydride, a fluorophenyl ester, a hydroxymethyl phosphine derivative, a carbonate, a haloacetyl, a chlorotriazine, a haloacetyl, an alkyl halide, an aziridine, an acryloyl derivative, ketone, carboxylic acid, ester, acetyl chloride, or acetic anhydride. In embodiments, an electrophilic group is or comprises a maleimide or succinimide group. Carboxylic acid groups may be activated so as to be reactive with a nucleophile, including reaction with a suitable hydroxyl-containing compound in the presence of a dehydrating agent such as dicyclohexylcarbodiimide (DCC) or dicyclohexylurea (DHU). For example, a carboxylic acid can be reacted with an alkoxy-substituted N-hydroxysuccinimide or N-hydroxysulfosuccinimide in the presence of DCC to form reactive electrophilic groups, the N-hydroxysuccinimide ester and the N-hydroxysulfosuccinimide ester, respectively. Carboxylic acids may also be activated by reaction with an acyl halide such as an acyl chloride (e.g., acetyl chloride), to provide a reactive anhydride group. In a further example, a carboxylic acid may be converted to an acid chloride group using, e.g., thionyl chloride or an acyl chloride capable of an exchange reaction.

Unless otherwise indicated, the term "alkyl" by itself or as part of another term refers to a substituted or unsubstituted straight chain or branched, saturated or unsaturated hydrocarbon having the indicated number of carbon atoms (e.g., "—$C_1$-$C_8$ alkyl" or "—$C_1$-$C_{10}$" alkyl refer to an alkyl group having from 1 to 8 or 1 to 10 carbon atoms, respectively). When the number of carbon atoms is not indicated, the alkyl group has from 1 to 8 carbon atoms. Representative straight chain "—$C_1$-$C_8$ alkyl" groups include, but are not limited to, -methyl, -ethyl, -n-propyl, -n-butyl, -n-pentyl, -n-hexyl, -n-heptyl and -n-octyl; while branched —$C_3$-$C_8$ alkyls include, but are not limited to, -isopropyl, -sec-butyl, -isobutyl, -tert-butyl, -isopentyl, and -2-methylbutyl; unsaturated —$C_2$-$C_8$ alkyls include, but are not limited to, -vinyl, -allyl, -1-butenyl, -2-butenyl, -isobu-tylenyl, -1 pentenyl, -2 pentenyl, -3-methyl-1-butenyl, -2 methyl-2-butenyl, -2,3 dimethyl-2-butenyl, -1-hexyl, 2-hexyl, -3-hexyl, -acetylenyl, -propynyl, -1 butynyl, -2 butynyl, -1 pentynyl, -2 pentynyl and -3 methyl 1 butynyl. Sometimes an alkyl group is unsubstituted. An alkyl group can be substituted with one or more groups. In other aspects, an alkyl group will be saturated.

Unless otherwise indicated, "alkylene", by itself of as part of another term, refers to a substituted or unsubstituted saturated, branched or straight chain or cyclic hydrocarbon radical of the stated number of carbon atoms, typically 1-10 carbon atoms, and having two monovalent radical centers derived by the removal of two hydrogen atoms from the same or two different carbon atoms of a parent alkane. Typical alkylene radicals include, but are not limited to: methylene (—$CH_2$—), 1,2-ethylene (—$CH_2CH_2$—), 1,3-propylene (—$CH_2CH_2CH_2$—), 1,4-butylene (—$CH_2CH_2CH_2CH_2$—), and the like. In preferred aspects, an alkylene is a branched or straight chain hydrocarbon (i.e., it is not a cyclic hydrocarbon).

Unless otherwise indicated, "aryl", by itself or as part of another term, means a substituted or unsubstituted monovalent carbocyclic aromatic hydrocarbon radical of the stated number of carbon atoms, typically 6-20 carbon atoms, derived by the removal of one hydrogen atom from a single carbon atom of a parent aromatic ring system. Some aryl groups are represented in the exemplary structures as "Ar". Typical aryl groups include, but are not limited to, radicals derived from benzene, substituted benzene, naphthalene, anthracene, biphenyl, and the like. An exemplary aryl group is a phenyl group.

Unless otherwise indicated, an "arylene", by itself or as part of another term, is an aryl group as defined above which has two covalent bonds (i.e., it is divalent) and can be in the ortho, meta, or para orientations.

Unless otherwise indicated, a "$C_3$-$C_8$ heterocycle" by itself or as part of another term, refers to a monovalent substituted or unsubstituted aromatic or non-aromatic monocyclic or bicyclic ring system having from 3 to 8 carbon atoms (also referred to as ring members) and one to four heteroatom ring members independently selected from N, O, P or S, and derived by removal of one hydrogen atom from a ring atom of a parent ring system. One or more N, C or S atoms in the heterocycle can be oxidized. The ring that includes the heteroatom can be aromatic or nonaromatic. Heterocycles in which all of the ring atoms are involved in aromaticity are referred to as heteroaryls and otherwise are referred to heterocarbocycles. Unless otherwise noted, the heterocycle is attached to its pendant group at any heteroatom or carbon atom that results in a stable structure. As such a heteroaryl may be bonded through an aromatic carbon of its aromatic ring system, referred to as a C-linked heteroaryl, or through a non-double-bonded N atom (i.e., not =N—) in its aromatic ring system, which is referred to as an N-linked heteroaryl. Thus, nitrogen-containing heterocycles may be C-linked or N-linked and include pyrrole moieties, such as pyrrol-1-yl (N-linked) and pyrrol-3-yl (C-linked), and imidazole moieties such as imidazol-1-yl and imidazol-3-yl (both N-linked), and imidazol-2-yl, imidazol-4-yl and imidazol-5-yl moieties (all of which are C-linked).

Unless otherwise indicated, a "$C_3$-$C_8$ heteroaryl" is an aromatic $C_3$-$C_8$ heterocycle in which the subscript denotes the total number of carbons of the cyclic ring system of the heterocycle or the total number of aromatic carbons of the aromatic ring system of the heteroaryl and does not implicate the size of the ring system or the presence or absence of ring fusion. Representative examples of a $C_3$-$C_8$ heterocycle include, but are not limited to, pyrrolidinyl, azetidinyl, piperidinyl, morpholinyl, tetrahydrofuranyl, tetrahydropyranyl, benzofuranyl, benzothiophene, indolyl, benzopyrazolyl, pyrrolyl, thiophenyl (thiophene), furanyl, thiazolyl, imidazolyl, pyrazolyl, pyrimidinyl, pyridinyl, pyrazinyl, pyridazinyl, isothiazolyl, and isoxazolyl. When explicitly given, the size of the ring system of a heterocycle or heteroaryl is indicated by the total number of atoms in the ring. For example, designation as a 5- or 6-membered heteroaryl indicates the total number or aromatic atoms (i.e., 5 or 6) in the heteroaromatic ring system of the heteroaryl, but does not imply the number of aromatic heteroatoms or aromatic carbons in that ring system. Fused heteroaryls are explicitly stated or implied by context as such and are typically indicated by the number of aromatic atoms in each aromatic ring that are fused together to make up the fused heteroaromatic ring system. For example, a 5,6-membered heteroaryl is an aromatic 5-membered ring fused to an aromatic 6-membered ring in which one or both of the rings have aromatic heteroatom(s) or where a heteroatom is shared between the two rings.

A heterocycle fused to an aryl or heteroaryl such that the heterocycle remains non-aromatic and is part of a larger structure through attachment with the non-aromatic portion of the fused ring system is an example of an optionally substituted heterocycle in which the heterocycle is substituted by ring fusion with the aryl or heteroaryl. Likewise, an aryl or heteroaryl fused to heterocycle or carbocycle that is part of a larger structure through attachment with the aromatic portion of the fused ring system is an example of an optionally substituted aryl or heterocycle in which the aryl or heterocycle is substituted by ring fusion with the heterocycle or carbocycle.

Unless otherwise indicated, "$C_3$-$C_8$ heterocyclo" by itself or as part of another term, refers to a $C_3$-$C_8$ heterocyclic defined above wherein one of the hydrogen atoms of the heterocycle is replaced with a bond (i.e., it is divalent). Unless otherwise indicated, a "$C_3$-$C_8$ heteroarylene," by itself or as part of another term, refers to a $C_3$-$C_8$ heteroaryl group defined above wherein one of the heteroaryl group's hydrogen atoms is replaced with a bond (i.e., it is divalent).

Unless otherwise indicated, a "$C_3$-$C_8$ carbocycle" by itself or as part of another term, is a 3-, 4-, 5-, 6-, 7- or 8-membered monovalent, substituted or unsubstituted, saturated or unsaturated non-aromatic monocyclic or bicyclic carbocyclic ring derived by the removal of one hydrogen atom from a ring atom of a parent ring system. Representative —$C_3$-$C_8$ carbocycles include, but are not limited to, cyclopropyl, cyclobutyl, cyclopentyl, cyclopentadienyl, cyclohexyl, cyclohexenyl, 1,3-cyclohexadienyl, 1,4-cyclohexadienyl, cycloheptyl, 1,3-cycloheptadienyl, 1,3,5-cycloheptatrienyl, cyclooctyl, and cyclooctadienyl.

Unless otherwise indicated, a "$C_3$-$C_8$ carbocyclo" by itself or as part of another term, refers to a $C_3$-$C_8$ carbocycle group defined above wherein another of the carbocycle groups' hydrogen atoms is replaced with a bond (i.e., it is divalent).

Unless otherwise indicated, the term "heteroalkyl" by itself or in combination with another term, means, unless otherwise stated, a stable straight or branched chain hydrocarbon, or combinations thereof, fully saturated or containing from 1 to 3 degrees of unsaturation, consisting of the stated number of carbon atoms and from one to ten, preferably one to three, heteroatoms selected from the group consisting of O, N, Si and S, and wherein the nitrogen and sulfur atoms may optionally be oxidized and the nitrogen heteroatom may optionally be quaternized. The heteroatom (s) O, N and S may be placed at any interior position of the heteroalkyl group or at the position at which the alkyl group is attached to the remainder of the molecule. The heteroatom Si may be placed at any position of the heteroalkyl group, including the position at which the alkyl group is attached to the remainder of the molecule. Examples include —$CH_2$—, $CH_2$—O—$CH_3$, —$CH_2$—$CH_2$—NH—$CH_3$, —$CH_2$— $CH_2$—N($CH_3$)—$CH_3$, $CH_2$—S—$CH_2$—$CH_3$, —$CH_2$—$CH_2$—S(O)—$CH_3$, —NH—$CH_2$—$CH_2$—NH—C(O)—$CH_2$—$CH_3$, —$CH_2$—$CH_2$—S(O)Z—$CH_3$, —CH=CH—O—$CH_3$, —Si($CH_3$)$_3$, —$CH_2$—CH=N—O—$CH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Typically, a $C_1$ to $C_4$ heteroalkyl or heteroalkylene has 1 to 4 carbon atoms and 1 or 2 heteroatoms and a $C_1$ to $C_3$ heteroalkyl or heteroalkylene has 1 to 3 carbon atoms and 1 or 2 heteroatoms. In some aspects, a heteroalkyl or heteroalkylene is saturated.

Unless otherwise indicated, the term "heteroalkylene" by itself or in combination with another term means a divalent group derived from heteroalkyl (as discussed above), as exemplified by —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini. Still further, for alkylene and heteroalkylene linking groups, no orientation of the linking group is implied.

Unless otherwise indicated, "aminoalkyl" by itself or in combination with another term means a heteroalkyl wherein an alkyl moiety as defined herein is substituted with an amino, alkylamino, dialkylamino or cycloalkylamino group. Exemplary non-limiting aminoalkyls are $CH_2NH_2$, —$CH_2CH_2NH_2$, —$CH_2CH_2NHCH_3$ and —$CH_2CH_2N(CH_3)_2$ and further includes branched species such as —CH($CH_3$)$NH_2$ and —C($CH_3$)$CH_2NH_2$ in the (R)- or (S)-configuration. Alternatively, an aminoalkyl is an alkyl moiety, group, or substituent as defined herein wherein a sp$^3$ carbon other than the radical carbon has been replaced with an amino or alkylamino moiety wherein its sp$^3$ nitrogen replaces the sp$^3$ carbon of the alkyl provided that at least one sp$^3$ carbon remains. When referring to an aminoalkyl moiety as a substituent to a larger structure or another moiety the aminoalkyl is covalently attached to the structure or moiety through the carbon radical of the alkyl moiety of the aminoalkyl.

Unless otherwise indicated "alkylamino" and "cycloalkylamino" by itself or in combination with another term means an alkyl or cycloalkyl radical, as described herein, wherein the radical carbon of the alkyl or cycloalkyl radical has been replaced with a nitrogen radical, provided that at least one sp$^3$ carbon remains. In those instances where the alkylamino is substituted at its nitrogen with another alkyl moiety the resulting substituted radical is sometimes referred to as a dialkylamino moiety, group or substituent wherein the alkyl moieties substituting nitrogen are independently selected. Exemplary and non-limiting amino, alkylamino and dialkylamino substituents, include those having the structure of —N(R')$_2$, wherein R' in these examples are independently selected from hydrogen or $C_{1-6}$ alkyl, typically hydrogen or methyl, whereas in cycloalkyl amines, which are included in heterocycloalkyls, both R' together with the nitrogen to which they are attached define a heterocyclic ring. When both R' are hydrogen or alkyl, the moiety is sometimes described as a primary amino group and a tertiary amine group, respectively. When one R' is hydrogen and the other is alkyl, then the moiety is sometimes described as a secondary amino group. Primary and secondary alkylamino moieties are more reactive as nucleo-philes towards carbonyl-containing electrophilic centers whereas tertiary amines are more basic.

"Substituted alkyl" and "substituted aryl" mean alkyl and aryl, respectively, in which one or more hydrogen atoms, typically one, are each independently replaced with a substituent. Typical substituents include, but are not limited to a —X, —R', —OH, —OR', —SR', —N(R')$_2$, —N(R')$_3$, =NR', —CX$_3$, —CN, —NO$_2$, —NR'C(=O)R', —C(=O)R', —C(=O)N(R')$_2$, —S(=O)$_2$R', —S(=O)$_2$NR, —S(=O)R', —OP(=O)(OR')$_2$, —P(=O)(OR')$_2$, —PO$_3$=, PO$_3$H$_2$, —C(=O)R', —C(=S)R', —CO$_2$R', —CO$_2$—, —C(=S)OR', —C(=O)SR', —C(=S)SR', C(=O)N(R')$_2$, —C(=S)N(R)$_2$, and —C(=NR)N(R')$_2$, where each X is independently selected from the group consisting of a halogen: —F, —Cl, —Br, and —I; and wherein each R' is independently selected from the group consisting of —H, —C$_1$-C$_{20}$ alkyl, —C$_6$-C$_{20}$ aryl, —C$_3$-C$_{14}$ heterocycle, a protecting group, and a prodrug moiety.

More typically substituents are selected from the group consisting of —X, —R', —OH, —OR', —SR', —N(R')$_2$, —N(R')$_3$, =NR', —NR'C(=O)R, —C(=O)R', —C(=O)N(R')$_2$, —S(=O)$_2$R', —S(=O)$_2$NR', —S(=O) R', —C(=O)R', —C(=S)R, —C(=O)N(R')$_2$, —C(=S)N(R')$_2$, and —C(=NR)N(R')$_2$, wherein each X is independently selected from the group consisting of —F and —Cl, or are selected from the group consisting of —X, —R, —OH, —OR', —N(R')$_2$, —N(R')$_3$, —NR' C(=O)R', —C(=O)N(R')$_2$, —S(=O)$_2$R', —S(=O)$_2$NR', —S(=O) R', —C(=O)R', —C(=O)N(R')$_2$, —C(=NR)N(R')$_2$, a protecting group, and a prodrug moiety wherein each X is —F; and wherein each R' is independently selected from the group consisting of hydrogen, —C$_1$-C$_{20}$ alkyl, —C$_6$-C$_{20}$ aryl, —C$_3$-C$_{14}$ heterocycle, a protecting group, and a prodrug moiety. In some aspects, an alkyl substituent is selected from the group consisting —N(R')$_2$, —N(R')$_3$ and —C(=NR)N(R')$_2$, wherein R is selected from the group consisting of hydrogen and —C$_1$-C$_{20}$ alkyl. In other aspects, alkyl is substituted with a series of ethyleneoxy moieties to define a PEG unit. Alkylene, carbocycle, carbocyclo, arylene, heteroalkyl, heteroalkylene, heterocycle, heterocyclo, heteroaryl, and heteroarylene groups as described above may also be similarly substituted.

"Protecting group" as used here means a moiety that prevents or reduces the ability of the atom or functional group to which it is linked from participating in unwanted reactions. Typical protecting groups for atoms or functional groups are given in Greene (1999), "PROTECTIVE GROUPS IN ORGANIC SYNTHESIS, 3$^{RD}$ ED.", Wiley Interscience. Protecting groups for heteroatoms such as oxygen, sulfur and nitrogen are used in some instances to minimize or avoid unwanted their reactions with electrophilic compounds. In other instances, the protecting group is used to reduce or eliminate the nucleophilicity and/or basicity of the unprotected heteroatom. Non-limiting examples of protected oxygen are given by —OR$^{PR}$, wherein R$^{PR}$ is a protecting group for hydroxyl, wherein hydroxyl is typically protected as an ester (e.g. acetate, propionate or benzoate). Other protecting groups for hydroxyl avoid interfering with the nucleophilicity of organometallic reagents or other highly basic reagents, where hydroxyl is typically protected as an ether, including alkyl or heterocycloalkyl ethers, (e.g., methyl or tetrahydropyranyl ethers), alkoxymethyl ethers (e.g., methoxymethyl or ethoxymethyl ethers), optionally substituted aryl ethers, and silyl ethers (e.g., trimethylsilyl (TMS), triethylsilyl (TES), tert-butyldiphenylsilyl (TBDPS), tert-butyldimethylsilyl (TBS/TBDMS), triisopropylsilyl (TIPS) and [2-(trimethylsilyl)ethoxy]-methylsilyl (SEM)). Nitrogen protecting groups include those for primary or secondary amines as in —NHR$^{PR}$ or —N(R$^{PR}$)$_2$—, wherein least one of R$^{PR}$ is a nitrogen atom protecting group or both R$^{PR}$ together comprise a protecting group.

A protecting group is suitable when it is capable of preventing or avoiding unwanted side-reactions or premature loss of the protecting group under reaction conditions required to effect desired chemical transformation elsewhere in the molecule and during purification of the newly formed molecule when desired, and can be removed under conditions that do not adversely affect the structure or stereochemical integrity of that newly formed molecule. By way of example and not limitation, a suitable protecting group may include those previously described for protecting functional groups. A suitable protecting group is sometimes a protecting group used in peptide coupling reactions.

"Aromatic alcohol" by itself or part of a larger structure refers to an aromatic ring system substituted with the hydroxyl functional group —OH. Thus, aromatic alcohol refers to any aryl, heteroaryl, arylene and heteroarylene moiety as described herein having a hydroxyl functional group bonded to an aromatic carbon of its aromatic ring system. The aromatic alcohol may be part of a larger moiety as when its aromatic ring system is a substituent of this moiety, or may be embedded into the larger moiety by ring fusion, and may be optionally substituted with moieties as described herein including one or more other hydroxyl substitutents. A phenolic alcohol is an aromatic alcohol having a phenol group as the aromatic ring.

"Aliphatic alcohol" by itself or part of a larger structure refers to a moiety having a non-aromatic carbon bonded to the hydroxyl functional group —OH. The hydroxy-bearing carbon may be unsubstituted (i.e., methyl alcohol) or may have one, two or three optionally substituted branched or unbranched alkyl substituents to define a primary alcohol, or a secondary or tertiary aliphatic alcohol within a linear or cyclic structure. When part of a larger structure, the alcohol may be a substituent of this structure by bonding through the hydroxy bearing carbon, through a carbon of an alkyl or other moiety as described herein to this hydroxyl-bearing carbon or through a substituent of this alkyl or other moiety. An aliphatic alcohol contemplates a non-aromatic cyclic structure (i.e., carbocycles and hetero-carbocycles, optionally substituted) in which a hydroxy functional group is bonded to a non-aromatic carbon of its cyclic ring system.

"Arylalkyl" or "heteroarylalkyl" as used herein means a substituent, moiety or group where an aryl moiety is bonded to an alkyl moiety, i.e., aryl-alkyl-, where alkyl and aryl groups are as described above, e.g., $C_6H_5$—$CH_2$— or $C_6H_5$—$CH(CH_3)CH_2$—. An arylalkyl or heteroarylalkyl is associated with a larger structure or moiety through a $sp^a$ carbon of its alkyl moiety.

"Succinimide moiety" as used herein refers to an organic moiety comprised of a succinimide ring system, which is present in one type of Y' in the compounds of Formula (PL-A) that is typically further comprised of an alkylene-containing moiety bonded to the imide nitrogen of that ring system. A succinimide moiety typically results from Michael addition of a thiol group of a cell binding agent to the maleimide ring system of a camptothecin payload compound (Formula II). A succinimide moiety is therefore comprised of a thio-substituted succinimide ring system and when present in a camptothecin conjugate has its imide nitrogen substituted with the remainder of the cell binding agent of the camptothecin conjugate and is optionally substituted with substituent(s) that were present on the maleimide ring system of the compounds of Formula II.

"Acid-amide moiety" as used herein refers to succinic acid having an amide substituent that results from the thio-substituted succinimide ring system of a succinimide moiety having undergone breakage of one of its carbonyl-nitrogen bonds by hydrolysis. Hydrolysis resulting in a succinic acid-amide moiety provides a linker less likely to suffer premature loss of the linker to which it is bonded through elimination of the antibody-thio substituent. Hydrolysis of the succinimide ring system of the thio-substituted succinimide moiety is expected to provide regiochemical isomers of acid-amide moieties that are due to differences in reactivity of the two carbonyl carbons of the succinimide ring system attributable at least in part to any substituent present in the maleimide ring system of the compounds of Formula II and to the thio substituent introduced by the targeting ligand.

The term "Prodrug" as used herein refers to a less biologically active or inactive compound which is transformed within the body into a more biologically active compound via a chemical or biological process (i.e., a chemical reaction or an enzymatic biotransformation). Typically, a biologically active compound is rendered less biologically active (i.e., is converted to a prodrug) by chemically modifying the compound with a prodrug moiety. In some aspects the prodrug is a Type II prodrug, which are bioactivated outside cells, e.g., in digestive fluids, or in the body's circulation system, e.g., in blood. Exemplary prodrugs are esters and (β-D-glucopyranosides.

In many instances, the assembly of the conjugates, linkers and components described herein will refer to reactive groups. A "reactive group" or RG is a group that contains a reactive site (RS) that is capable of forming a bond with either the components of the linker of camptothecin payload or camptothecin conjugate; or the camptothecin. RS is the reactive site within a Reactive Group (RG). Reactive groups include thiol groups to form disulfide bonds or thioether bonds, aldehyde, ketone, or hydrazine groups to form hydrazone bonds, carboxylic or amino groups to form peptide bonds, carboxylic or hydroxy groups to form ester bonds, sulfonic acids to form sulfonamide bonds, alcohols to form carbamate bonds, and amines to form sulfonamide bonds or carbamate bonds. The following table is illustrative of Reactive Groups, Reactive Sites, and exemplary functional groups that can form after reaction of the reactive site. The table is not limiting. One of skill in the art will appreciate that the noted R' and R" portions in the table are effectively any organic moiety (e.g., an alkyl group, aryl group, heteroaryl group, or substituted alkyl, aryl, or heteroaryl, group) which is compatible with the bond formation provided in converting RG to one of the Exemplary Functional Groups. It will also be appreciated that, as applied to the embodiments of the present invention, R' may represent one or more components of the self-stabilizing linker or optional secondary linker, as the case may be, and R" may represent one or more components of the optional secondary linker, Camptothecin, stabilizing unit, or detection unit, as the case may be.

| RG | RS | Exemplary Functional Groups |
|---|---|---|
| 1) R'—SH | —S— | R'—S—R"<br>R'—S—S—R" |
| 2) R'—C(=O)OH | —C(=O)— | R'—C(=O)NH—R" |
| 3) R'—C(=O)ONHS | —C(=O)— | R'—C(=O)NH—R" |
| 4) R'S(=O)$_2$—OH | —S(=O)$_2$— | R'S(=O)$_2$NH—R" |
| 5) R'—CH$_2$—X (X is Br, 1, Cl) | —CH$_2$— | R'—CH$_2$—S—R" |
| 6) R'—NH$_2$ | —N— | R'—NHC(=O)R" |

Combinations of substituents and variables envisioned by this invention are only those that result in the formation of stable compounds. The term "stable", as used herein, refers to compounds which possess stability sufficient to allow manufacture and which maintains the integrity of the compound for a sufficient period of time to be useful for the purposes detailed herein (e.g., therapeutic or prophylactic administration to a subject).

Compounds of the present invention are, subsequent to their preparation, preferably isolated and purified to obtain a composition containing an amount by weight equal to or greater than 95% ("substantially pure"), which is then used or formulated as described herein.

The term "conjugate" as used herein refers to a compound described herein or a derivative thereof that is linked to a cell binding agent.

The term "linkable to a cell binding agent" as used herein refers to the compounds described herein or derivatives thereof comprising at least one linking group or a precursor thereof suitable to bond these compounds or derivatives thereof to a cell binding agent.

The term "precursor" of a given group refers to any group which may lead to that group by any deprotection, a chemical modification, or a coupling reaction.

The term "linked to a cell binding agent" refers to a conjugate molecule comprising at least one of the compounds described herein, or derivative thereof bound to a cell binding agent via a suitable linking group or a precursor thereof.

The terms "abnormal cell growth" and "proliferative disorder" are used interchangeably in this application. "Abnormal cell growth", as used herein, unless otherwise indicated, refers to cell growth that is independent of normal regulatory mechanisms (e.g., loss of contact inhibition). This includes, for example, the abnormal growth of: (1) tumor cells (tumors) that proliferate by expressing a mutated tyrosine kinase or overexpression of a receptor tyrosine kinase; (2) benign and malignant cells of other proliferative diseases in which aberrant tyrosine kinase activation occurs; (3) any tumors that proliferate by receptor tyrosine kinases; (4) any tumors that proliferate by aberrant serine/threonine kinase activation; and (5) benign and malignant cells of other proliferative diseases in which aberrant serine/threonine kinase activation occurs.

The terms "cancer" and "cancerous" refer to or describe the physiological condition in mammals that is typically characterized by unregulated cell growth. A "tumor" comprises one or more cancerous cells, and/or benign or precancerous cells.

A "therapeutic agent" encompasses both a biological agent such as an antibody, a peptide, a protein, an enzyme or a chemotherapeutic agent.

A "chemotherapeutic agent" is a chemical compound useful in the treatment of cancer.

A "metabolite" is a product produced through metabolism in the body of a specified compound, a derivative thereof, or a conjugate thereof, or salt thereof. Metabolites of a compound, a derivative thereof, or a conjugate thereof, may be identified using routine techniques known in the art and their activities determined using tests such as those described herein. Such products may result for example from the oxidation, hydroxylation, reduction, hydrolysis, amidation, deamidation, esterification, deesterification, enzymatic cleavage, and the like, of the administered compound. Accordingly, the invention includes metabolites of compounds, a derivative thereof, or a conjugate thereof, of the invention, including compounds, a derivative thereof, or a conjugate thereof, produced by a process comprising contacting a compound, a derivative thereof, or a conjugate thereof, of this invention with a mammal for a period of time sufficient to yield a metabolic product thereof.

A "linker", "linker moiety", or "linking group" as defined herein refers to a moiety that connects two groups, such as a cell binding agent and a cytotoxic compound, together. Typically, the linker is substantially inert under conditions for which the two groups it is connecting are linked. A bifunctional crosslinking agent may comprise two reactive groups, one at each ends of a linker moiety, such that one reactive group can be first reacted with the cytotoxic compound to provide a compound bearing the linker moiety and a second reactive group, which can then react with a cell binding agent. Alternatively, one end of the bifunctional crosslinking agent can be first reacted with the cell binding agent to provide a cell binding agent bearing a linker moiety and a second reactive group, which can then react with a cytotoxic compound. The linking moiety may contain a chemical bond that allows for the release of the cytotoxic moiety at a particular site. Suitable chemical bonds are well known in the art and include disulfide bonds, thioether bonds, acid labile bonds, photolabile bonds, peptidase labile bonds and esterase labile bonds (see for example U.S. Pat. Nos. 5,208,020; 5,475,092; 6,441,163; 6,716,821; 6,913,748; 7,276,497; 7,276,499; 7,368,565; 7,388,026 and 7,414,073). Preferred are disulfide bonds, thioether and peptidase labile bonds. Other linkers that can be used in the present invention include non-cleavable linkers, such as those described in are described in detail in U.S. publication number 20050169933, or charged linkers or hydrophilic linkers and are described in US 2009/0274713, US 2010/01293140 and WO 2009/134976, each of which is expressly incorporated herein by reference, each of which is expressly incorporated herein by reference.

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, γ-carboxyglutamate, selinocystiene and O-phosphoserine. Amino acid analogs refers to compounds that have the same basic chemical structure as a naturally occurring amino acid, i.e., an α carbon that is bound to a hydrogen, a carboxyl group, an amino group, and an R group, e.g., homoserine, norleucine, methionine sulfoxide, methionine methyl sulfonium. Such analogs have modified R groups (e.g., norleucine) or modified peptide backbones, but retain the same basic chemical structure as a naturally occurring amino acid. One amino acid that may be used in particular is citrulline, which is a derivative of arginine and is involved in the formation of urea in the liver. Amino acid mimetics refers to chemical compounds that have a structure that is different from the general chemical structure of an amino acid, but functions in a manner similar to a naturally occurring amino acid. The term "unnatural amino acid" is intended to represent the "D" stereochemical form of the twenty naturally occurring amino acids described above. It is further understood that the term unnatural amino acid includes homologues of the natural amino acids or their D isomers, and synthetically modified forms of the natural amino acids. The synthetically modified forms include, but are not limited to, amino acids having side chains shortened or lengthened by up to two carbon atoms, amino acids comprising optionally substituted aryl groups, and amino acids comprised halogenated groups, preferably halogenated alkyl and aryl groups and also N substituted amino acids e.g. N-methyl-alanine. An amino acid or peptide can be attached to a linker/spacer or a cell binding agent through the terminal amine or terminal carboxylic acid of the amino acid or peptide. The amino acid can also be attached to a linker/spacer or a cell-binding agent through a side chain reactive group, such as but not restricted to the thiol group of cysteine, the epsilon amine of lysine or the side chain hydroxyls of serine or threonine.

In embodiments, the amino acid is represented by $NH_2$—$C(R^{aa'}R^{aaa})$—$C(=O)OH$, wherein $R^{aa}$ and $R^{aa'}$ are each independently H, an optionally substituted linear, branched or cyclic alkyl, alkenyl or alkynyl having 1 to 10 carbon atoms, aryl, heteroaryl or heterocyclyl, or R and the N-terminal nitrogen atom can together form a heterocyclic ring (e.g., as in proline). The term "amino acid residue" refers to the corresponding residue when one hydrogen atom is removed from the amine and/or the hydroxyl group is removed from the carboxy end of the amino acid, such as —NH—$C(R^{aa'}R^{aa})$—$C(=O)O$—.

As used herein, the amino acid can be L or D isomers. Unless specified otherwise, when an amino acid is referenced, it can be L or D isomer or a mixture thereof. In embodiments, when a peptide is referenced by its amino acid sequence, each of the amino acid can be L or D isomer unless otherwise specified. If one of the amino acid in a peptide is specified as D isomer, the other amino acid(s) are L isomer unless otherwise specified. For example, the peptide D-Ala-Ala means D-Ala-L-Ala.

Amino acids and peptides may be protected by blocking groups. A blocking group is an atom or a chemical moiety that protects the N-terminus of an amino acid or a peptide from undesired reactions and can be used during the synthesis of a drug-ligand conjugate. It should remain attached to the N-terminus throughout the synthesis, and may be removed after completion of synthesis of the drug conjugate by chemical or other conditions that selectively achieve its removal. The blocking groups suitable for N-terminus protection are well known in the art of peptide chemistry. Exemplary blocking groups include, but are not limited to, methyl esters, tert-butyl esters, 9-fluorenylmethyl carbamate (Fmoc) and carbobenzoxy (Cbz).

The term "peptide cleavable by a protease" refers to peptides containing a cleavage recognition sequence of a protease. As used herein, a protease is an enzyme that can cleave a peptide bond. A cleavage recognition sequence for a protease is a specific amino acid sequence recognized by the protease during proteolytic cleavage. Many protease cleavage sites are known in the art, and these and other cleavage sites can be included in the linker moiety. See, e.g., Matayoshi et al. Science 247: 954 (1990); Dunn et al. Meth. Enzymol. 241: 254 (1994); Seidah et al. Meth. Enzymol. 244: 175 (1994); Thornberry, Meth. Enzymol. 244: 615 (1994); Weber et al. Meth. Enzymol. 244: 595 (1994); Smith et al. Meth. Enzymol. 244: 412 (1994); Bouvier et al. Meth. Enzymol. 248: 614 (1995), Hardy et al, in AMYLOID PROTEIN PRECURSOR IN DEVELOPMENT, AGING, AND ALZHEIMER'S DISEASE, ed. Masters et al. pp. 190-198 (1994).

The peptide sequence is chosen based on its ability to be cleaved by a protease, non-limiting examples of which include cathepsins B, C, D, H, L and S, and furin. Preferably, the peptide sequence is capable of being cleaved by an appropriate isolated protease in vitro, which can be tested using in vitro protease cleavage assays known in the art.

In another embodiment, the peptide sequence is chosen based on its ability to be cleaved by a lysosomal protease. A lysosomal protease is a protease located primarily in the lysosomes, but can also be located in endosomes. Examples of a lysosomal protease include, but are not limited to, cathepsins B, C, D, H, L and S, and furin.

In another embodiment, the peptide sequence is chosen based on its ability to be cleaved by a tumor-associated protease, such as a protease that is found on the surface of a cancerous cell or extracellularly in the vicinity of tumor cells, non-limiting examples of such proteases include thimet oligopeptidase (TOP), CD10 (neprilysin), a matrix metalloprotease (such as MMP2 or MMP9), a type II transmembrane serine protease (such as Hepsin, testisin, TMPRSS4 or matriptase/MT-SP1), legumain and enzymes described in the following reference (Current Topics in Developmental Biology: Cell Surface Proteases, vol. 54 Zucker S. 2003, Boston, MA). The ability of a peptide to be cleaved by tumor-associated protease can be tested using in vitro protease cleavage assays known in the art.

The term "cation" refers to an ion with positive charge. The cation can be monovalent (e.g., $Na^+$, $K^+$, etc.), bi-valent (e.g., $Ca^{2+}$, $Mg^{2+}$, etc.) or multi-valent (e.g., $Al^{3+}$ etc.). In embodiments, the cation is monovalent.

HER2

HER2 is one of the oncogene products of a typical growth factor receptor oncogene identified as human epidermal cell growth factor receptor 2-related oncogene, and is a transmembrane receptor protein having a molecular weight of 185 kDa and having a tyrosine kinase domain. HER2 is a member of the EGFR family consisting of HER1 (EGFR, ErbB-1), HER2 (neu, ErbB-2), HER3 (ErbB-3), and HER4 (ErbB-4) and is known to be autophosphorylated at intracellular tyrosine residues by its homodimer formation or heterodimer formation with another EGFR receptor HER1, HER3, or HER4 and is itself activated in that manner, thereby playing an important role in cell growth, differentiation, and survival in normal cells and tumor cells.

As for the HER2 protein to be used in the present invention, the HER2 protein can be directly purified from HER2-expressing cells of a human or a non-human mammal (such as a rat or a mouse) and used, or a cell membrane fraction of the above-described cells can be prepared and used. Further, HER2 can be obtained by in vitro synthesis thereof or production thereof in a host cell through genetic engineering. In the genetic engineering, specifically, after HER2 cDNA is integrated into a vector capable of expressing HER2 cDNA, the HER2 protein can be obtained by synthesizing it in a solution containing an enzyme, a substrate and an energy substance required for transcription and translation, or by expressing HER2 in another prokaryotic or eucaryotic transformed host cell. Alternatively, the above-described genetically engineered HER2-expressing cells, or a cell line expressing HER2 may be used as the HER2 protein.

The DNA sequence and amino acid sequence of HER2 are disclosed on a public database, and can be referred to, for example, under Accession No. M11730 (GenBank), NP_004439.2 (NCBI), or the like.

Further, a protein which consists of an amino acid sequence wherein one or several amino acids are substituted, deleted and/or added in any of the above-described amino acid sequences of HER2 and also has a biological activity equivalent to that of the protein is also included in HER2.

Human HER2 protein is composed of a signal sequence consisting of N-terminal 22 amino acid residues, an extracellular domain consisting of 630 amino acid residues, a transmembrane domain consisting of 23 amino acid residues, and an intracellular domain consisting of 580 amino acid residues.

HER2 is overexpressed in various cancer types such as breast cancer, gastric cancer, lung cancer (e.g., non-small cell lung cancer), and ovarian cancer and has been reported to be a negative prognosis factor for breast cancer.

Anti-HER2 Antibodies

The anti-HER2 antibody is the antibody, which is capable of targeting tumor cells, that is, possesses a property of recognizing a tumor cell, a property of binding to a tumor cell, a property of internalizing in a tumor cell, cytocidal activity against tumor cells, or the like, and can be conjugated with a drug having antitumor activity via a linker to form an antibody-drug conjugate. Non-limiting anti-HER2 antibodies suitable for use in the compounds, compositions, and methods described herein include those having any of the below exemplary properties, or any combination thereof:

(1) An anti-HER2 antibody having the following properties:
 (a) specifically binding to HER2, and
 (b) having an activity of internalizing in HER2-expressing cells by binding to HER2.
(2) The antibody according to (1) above, wherein the antibody binds to the extracellular domain of HER2.
(3) The antibody according to (1) or (2) above, wherein the antibody is a monoclonal antibody.
(4) The antibody according to any of (1) to (3) above, wherein the antibody has an antibody-dependent cellular cytotoxicity (ADCC) activity and/or a complement-dependent cytotoxicity (CDC) activity.
(5) The antibody according to any of (1) to (4) above, wherein the antibody is a mouse monoclonal antibody, a chimeric monoclonal antibody, or a humanized monoclonal antibody.

(6) The antibody according to any of (1) to (5) above, wherein the antibody is a humanized monoclonal antibody.

Trastuzumab (Herceptin®) is a humanized monoclonal antibody of a mouse anti-HER2 antibody 4D5 named as recombinant humanized anti-HER2 monoclonal antibody (huMAb4D5-8, rhuMAb HER2). Trastuzumab specifically binds to the extracellular domain IV of HER2 and induces antibody-dependent cellular cytotoxicity (ADCC) or exerts an anticancer effect via the inhibition of signal transduction from HER2. Trastuzumab is highly effective for tumors overexpressing HER2, and as such, was launched in 1999 in the USA and in 2001 in Japan as a therapeutic agent for patients with metastatic breast cancer overexpressing HER2.

Although trastuzumab is therapeutically effect in treating breast cancer, some patients with breast cancer overexpressing HER2 have no or merely weak response to trastuzumab treatment. The anti-HER2 antibody used in the anti-HER2 antibody-drug conjugate of the present invention may be derived from any species, and preferred examples of the species can include humans, rats, mice, and rabbits. In case when the antibody is derived from other than human species, it is preferably chimerized or humanized using a well-known technique. The antibody of the present invention may be a polyclonal antibody or a monoclonal antibody and is preferably a monoclonal antibody.

Trastuzumab comprises a heavy chain consisting of the amino acid sequence represented by SEQ ID NO: 1 and a light chain consisting of the amino acid sequence represented by SEQ ID NO: 2.

```
Heavy Chain Amino Acid Sequence of trastuzumab:
                                       (SEQ ID NO: 1)
EVQLVESGGGLVQPGGSLRLSCAASGFNIKDTYIHWVRQAPGKGLEWVAR

IYPTNGYTRYADSVKGRFTISADTSKNTAYLQMNSLRAEDTAVYYCSRWG

GDGFYAMDYWGQGTLVTVSSASTKGPSVFPLAPSSKSTSGGTAALGCLVK

DYFPEPVTVSWNSGALTSGVHTFPAVLQSSGLYSLSSVVTVPSSSLGTQT

YICNVNHKPSNTKVDKKVEPKSCDKTHTCPPCPAPELLGGPSVFLFPPKP

KDTLMISRTPEVTCVVVDVSHEDPEVKFNWYVDGVEVHNAKTKPREEQYN

STYRVVSVLTVLHQDWLNGKEYKCKVSNKALPAPIEKTISKAKGQPREPQ

VYTLPPSREEMTKNQVSLTCLVKGFYPSDIAVEWESNGQPENNYKTTPPV

LDSDGSFFLYSKLTVDKSRWQQGNVFSCSVMHEALHNHYTQKSLSLSPGK

Light Chain Amino Acid Sequence of trastuzumab:
                                       (SEQ ID NO: 2)
DIQMTQSPSSLSASVGDRVTITCRASQDVNTAVAWYQQKPGKAPKLLIYS

ASFLYSGVPSRFSGSRSGTDFTLTISSLQPEDFATYYCQQHYTTPPTFGQ

GTKVEIKRTVAAPSVFIFPPSDEQLKSGTASVVCLLNNFYPREAKVQWKV

DNALQSGNSQESVTEQDSKDSTYSLSSTLTLSKADYEKHKVYACEVTHQG

LSSPVTKSFNRGEC
```

The CDR sequences of trastuzumab according to Kabat are:

```
                                       (SEQ ID NO: 3)
    HCDR1: GFNIKDTYIH (SEQ ID NO: 4)
    HCDR2: RIYPTNGYTRYADSVKG (SEQ ID NO: 5)
    HCDR3: WGGDGFYAMDY (SEQ ID NO: 6)
    LCDR1: RASQDVNTAVA (SEQ ID NO: 7)
    LCDR2: SASFLYS (SEQ ID NO: 8)
    LCDR3: QQHYTTPPT
```

In some embodiments, the anti-HER2 antibody comprises one, two, or three sequences selected from: (a) an amino acid sequence of SEQ ID NO:3, (b) an amino acid sequence of SEQ ID NO:4, and (c) an amino acid sequence of SEQ ID NO:5. In embodiments, the In some embodiments, the anti-HER2 antibody comprises a heavy chain comprising an amino acid sequence having at least 80% identity to SEQ ID NO:1. In some embodiments, the anti-HER2 antibody comprises a light chain comprising an amino acid sequence having at least 80% identity to SEQ ID NO:2.

In some embodiments, the anti-HER2 antibody comprises a heavy chain comprising an amino acid sequence having at least 80%, 85%, 90%, 95% or 100% identity to SEQ ID NO:1 and a light chain comprising an amino acid sequence having at least 80%, 85%, 90%, 95% or 100% identity to SEQ ID NO:2

In embodiments, the antibody lacks a lysine residue at the carboxyl terminus of the heavy chain that is otherwise defined by the sequence of SEQ ID NO:1. In embodiments, the antibody comprises a heavy chain consisting of an amino acid sequence consisting of amino acid residues 1 to 449 of SEQ ID NO:1 and a light chain consisting of an amino acid sequence consisting of amino acid residues 1 to 214 of SEQ ID NO:2.

In some embodiments, the anti-HER2 antibody is trastuzumab.

In some embodiments, the anti-HER2 antibody is a biosimilar of trastuzumab. The ADCs of the present invention are also effective with antibody constructs that are highly similar, or biosimilar, to the commercially available, or "innovator", antibody constructs. A biosimilar ADC is expected to perform similarly to immunoconjugates of the innovator product (e.g., trastuzumab). As used herein, the term "biosimilar" in reference to a biological product, means that the biological product is highly similar to the reference product notwithstanding minor differences in clinically inactive components, and there are no clinically meaningful differences between the biological product and the reference product in terms of the safety, purity, and potency of the product.

In some embodiments, the anti-HER2 antibody is a trastuzumab biosimilar. In some embodiments, the anti-HER2 trastuzumab biosimilar is selected from the group consisting of trastuzumab-dkst (Ogivri), trastuzumab-pkrb (Herzuma), trastuzumab-dttb (Ontruzant), trastuzumab-qyyp (Trazimera), and trastuzumab-anns (Kanjinti).

In other embodiments, an anti-HER2 antibody is interchangeable with trastuzumab. In embodiments, said interchangeable anti-HER2 antibody is biosimilar to trastuzumab and is expected to produce the same clinical result as trastuzumab in any given patient.

In other embodiments, an anti-HER2 antibody is a biobetter of trastuzumab. In embodiments, a "biobetter" biological product is in the same class as an FDA-approved biological product, is aimed at the same target protein as the reference biologic but is not identical and is improved in terms of safety, efficacy, stability, route of administration, etc. over the reference product.

Binding and Antitumor Activity of Antibody

The binding activity of the antibody against tumor cells can be confirmed using flow cytometry. The internalization of the antibody into tumor cells can be confirmed using (1) an assay of visualizing an antibody incorporated in cells under a fluorescence microscope using a secondary antibody (fluorescently labeled) binding to the therapeutic antibody (Cell Death and Differentiation (2008) 15, 751-761), (2) an assay of measuring a fluorescence intensity incorporated in cells using a secondary antibody (fluorescently labeled) binding to the therapeutic antibody (Molecular Biology of the Cell, Vol. 15, 5268-5282, December 2004), or (3) a Mab-ZAP assay using an immunotoxin binding to the therapeutic antibody wherein the toxin is released upon incorporation into cells to inhibit cell growth (Bio Techniques 28: 162-165, January 2000) As the immunotoxin, a recombinant complex protein of a diphtheria toxin catalytic domain and protein G may be used.

The antitumor activity of the antibody can be confirmed in vitro by determining inhibitory activity against cell growth. For example, a cancer cell line overexpressing a target protein for the antibody is cultured, and the antibody is added at varying concentrations into the culture system to determine an inhibitory activity against focus formation, colony formation, and spheroid growth. The antitumor activity can be confirmed in vivo, for example, by administering the antibody to a nude mouse with a transplanted tumor cell line highly expressing the target protein, and determining change in the cancer cell.

Since the compound conjugated in the antibody-drug conjugate exerts an antitumor effect, it is preferred but not essential that the antibody itself should have an antitumor effect. For the purpose of specifically and selectively exerting the cytotoxic activity of the antitumor compound against tumor cells, it is important and also preferred that the antibody should have the property of internalizing to migrate into tumor cells.

Production of Anti-HER2 Antibody

The antibody against HER2 of the present invention can be obtained according to, for example, a method usually carried out in the art, which involves immunizing animals with HER2 or an arbitrary polypeptide selected from the amino acid sequence of HER2 and collecting and purifying antibodies produced in vivo. The biological species of HER2 to be used as an antigen is not limited to being human, and an animal can be immunized with HER2 derived from an animal other than humans such as a mouse or a rat or with rat p185neu. In this case, by examining the cross-reactivity between an antibody binding to the obtained heterologous HER2 and human HER2, an antibody applicable to a human disease can be selected.

Further, a monoclonal antibody can be obtained from a hybridoma established by fusing antibody-producing cells which produce an antibody against HER2 with myeloma cells according to a known method (for example, Kohler and Milstein, Nature, (1975) 256, pp. 495-497; Kennet, R. ed., Monoclonal Antibodies, pp. 365-367, Plenum Press, N.Y. (1980)).

HER2 to be used as an antigen can be obtained by expressing HER2 gene in a host cell using genetic engineering. Specifically, a vector capable of expressing HER2 gene is produced, and the resulting vector is transfected into a host cell to express the gene, and then, the expressed HER2 is purified.

Alternatively, the above-described genetically engineered HER2-expressing cells, or a cell line expressing HER2 may be used as the HER2 protein. The anti-HER2 antibody can be obtained by a procedure known in the art. Hereinafter, a method of obtaining an antibody against HER2 is specifically described.

Preparation of Antigen

Examples of the antigen to be used for producing the anti-HER2 antibody include HER2, or a polypeptide consisting of a partial amino acid sequence comprising at least 6 consecutive amino acids of HER2, or a derivative obtained by adding a given amino acid sequence or carrier thereto.

HER2 can be purified directly from human tumor tissues or tumor cells and used. Further, HER2 can be obtained by synthesizing it in vitro or by producing it in a host cell by genetic engineering.

With respect to the genetic engineering, specifically, after HER2 cDNA is integrated into a vector capable of expressing HER2 cDNA, HER2 can be obtained by synthesizing it in a solution containing an enzyme, a substrate and an energy substance required for transcription and translation, or by expressing HER2 in another prokaryotic or eucaryotic transformed host cell.

Further, the antigen can also be obtained as a secretory protein by expressing a fusion protein obtained by ligating the extracellular domain of HER2, which is a membrane protein, to the constant region of an antibody in an appropriate host-vector system.

HER2 cDNA can be obtained by, for example, a so-called PCR method in which a polymerase chain reaction is performed using a cDNA library expressing HER2 cDNA as a template and primers which specifically amplify HER2 cDNA (PCR; Saiki, R. K., et al., Science, (1988) 239, pp. 487-489).

As the in vitro synthesis of the polypeptide, for example, Rapid Translation System (RTS) manufactured by Roche Diagnostics, Inc. can be exemplified, but it is not limited thereto.

Examples of the prokaryotic host cells include *Escherichia coli* and *Bacillus subtilis*. In order to transform the host cells with a target gene, the host cells are transformed by a plasmid vector comprising a replicon, i.e., a replication origin derived from a species compatible with the host, and a regulatory sequence. Further, the vector preferably has a sequence capable of imposing phenotypic selectivity on the transformed cell.

Examples of the eucaryotic host cells include vertebrate cells, insect cells, and yeast cells. As the vertebrate cells, for example, simian COS cells (Gluzman, Y., Cell, (1981) 23, pp. 175-182, ATCC CRL-1650; ATCC: American Type Culture Collection), murine fibroblasts NIH3T3 (ATCC No. CRL-1658), and dihydrofolate reductase-deficient strains (Urlaub, G. and Chasin, L. A., Proc. Natl. Acad. Sci. USA (1980) 77, pp. 4126-4220) of Chinese hamster ovarian cells (CHO cells; ATCC: CCL-61); and the like are often used, however, the cells are not limited thereto.

The thus obtained transformant can be cultured according to a method usually carried out in the art, and by the culturing of the transformant, a target polypeptide is produced intracellularly or extracellularly.

A suitable medium to be used for the culturing can be selected from various commonly used culture media depending on the employed host cells. If *Escherichia coli* is employed, for example, an LB medium supplemented with an antibiotic such as ampicillin or IPMG as needed can be used.

A recombinant protein produced intracellularly or extracellularly by the transformant through such culturing can be separated and purified by any of various known separation methods utilizing the physical or chemical property of the protein.

Specific examples of the methods include treatment with a common protein precipitant, ultrafiltration, various types of liquid chromatography such as molecular sieve chromatography (gel filtration), adsorption chromatography, ion exchange chromatography, and affinity chromatography, dialysis, and a combination thereof.

Further, by attaching a tag of six histidine residues (SEQ ID NO:9) to a recombinant protein to be expressed, the protein can be efficiently purified with a nickel affinity column. Alternatively, by attaching the IgG Fc region to a recombinant protein to be expressed, the protein can be efficiently purified with a protein A column.

By combining the above-described methods, a large amount of a target polypeptide can be easily produced in high yield and high purity.

The above-described transformant itself may be used as the antigen. A cell line expressing HER2 may also be used as the antigen. Examples of such a cell line can include human breast cancer lines SK-BR-3, BT-474, KPL-4, and JIMT-1, a human gastric cancer line NCI-N87, and a human ovarian cancer line SK-OV-3. The cell line of the present invention is not limited to these cell lines as long as it expresses HER2.

Production of Anti-HER2 Monoclonal Antibody

Examples of the antibody specifically bind to HER2 include a monoclonal antibody specifically bind to HER2, and a method of obtaining such antibody is as described below.

The production of a monoclonal antibody generally requires the following operational steps of:

(a) purifying a biopolymer to be used as an antigen, or preparing antigen-expressing cells;
(b) preparing antibody-producing cells by immunizing an animal by injection of the antigen, collecting the blood, assaying its antibody titer to determine when the spleen is excised;
(c) preparing myeloma cells (hereinafter referred to as "myeloma");
(d) fusing the antibody-producing cells with the myeloma;
(e) screening a group of hybridomas producing a desired antibody;
(f) dividing the hybridomas into single cell clones (cloning);
(g) optionally, culturing the hybridoma or rearing an animal implanted with the hybridoma for producing a large amount of monoclonal antibody;
(h) examining the thus produced monoclonal antibody for biological activity and binding specificity, or assaying the same for properties as a labeled reagent; and the like.

Hereinafter, the method of producing a monoclonal antibody will be described in detail following the above steps, however, the method is not limited thereto, and, for example, antibody-producing cells other than spleen cells and myeloma can be used.

Purification of Antigen

As the antigen, HER2 prepared by the method as described above or a partial peptide thereof can be used.

Further, a membrane fraction prepared from recombinant cells expressing HER2 or the recombinant cells expressing HER2 themselves, and also a partial peptide of the protein of the invention chemically synthesized by a method known to those skilled in the art can also be used as the antigen.

Furthermore, a HER2-expressing cell line can also be used as the antigen.

Preparation of Antibody-Producing Cells

The antigen obtained in the step (a) is mixed with an adjuvant such as Freund's complete or incomplete adjuvant or auxiliary agent such as aluminum potassium sulfate and the resulting mixture is used as an immunogen to immunize an experimental animal. Another method involves immunizing an experimental animal with antigen-expressing cells as an immunogen. As the experimental animal, any animal used in a known hybridoma production method can be used without hindrance. Specifically, for example, a mouse, a rat, a goat, sheep, cattle, a horse, or the like can be used. However, from the viewpoint of ease of availability of myeloma cells to be fused with the extracted antibody-producing cells, a mouse or a rat is preferably used as the animal to be immunized.

Further, the strain of a mouse or a rat to be used is not particularly limited, and in the case of a mouse, for example, various strains such as A, AKR, BALB/c, BDP, BA, CE, C3H, 57BL, C57BL, C57L, DBA, FL, HTH, HT1, LP, NZB, NZW, RF, R III, SJL, SWR, WB, and 129 and the like can be used, and in the case of a rat, for example, Wistar, Low, Lewis, Sprague, Dawley, ACI, BN, Fischer and the like can be used.

These mice and rats are commercially available from breeders/distributors of experimental animals, for example, CLEA Japan, Inc. and Charles River Laboratories Japan, Inc.

As the animal to be immunized, in consideration of compatibility of fusing with myeloma cells described below, in the case of a mouse, BALB/c strain, and in the case of a rat, Wistar and Low strains are particularly preferred.

Further, in consideration of antigenic homology between humans and mice, it is also preferred to use a mouse having decreased biological function to remove auto-antibodies, that is, a mouse with an autoimmune disease.

The age of such mouse or rat at the time of immunization is preferably 5 to 12 weeks of age, more preferably 6 to 8 weeks of age.

In order to immunize an animal with HER2 or a recombinant thereof, for example, a known method described in detail in, for example, Weir, D. M., Handbook of Experimental Immunology Vol. I. II. III., Blackwell Scientific Publications, Oxford (1987); Kabat, E. A. and Mayer, M. M., Experimental Immunochemistry, Charles C Thomas Publisher Springfield, Ill. (1964) or the like can be used.

Among these immunization methods, a preferred specific method in the present invention is, for example, as follows.

That is, first, a membrane protein fraction serving as the antigen or cells caused to express the antigen is/are intradermally or intraperitoneally administered to an animal. However, the combination of both routes of administration is preferred for increasing the immunization efficiency, and when intradermal administration is performed in the first half and intraperitoneal administration is performed in the latter half or only at the last dosing, the immunization efficiency can be particularly increased.

The administration schedule of the antigen varies depending on the type of animal to be immunized, individual difference or the like. However, in general, an administration schedule in which the frequency of administration of the antigen is 3 to 6 times and the dosing interval is 2 to 6 weeks is preferred, and an administration schedule in which the frequency of administration of the antigen is 3 to 4 times and the dosing interval is 2 to 4 weeks is more preferred.

Further, the dose of the antigen varies depending on the type of animal, individual differences or the like, however, the dose is generally set to 0.05 to 5 mg, preferably about 0.1 to 0.5 mg.

A booster immunization is performed 1 to 6 weeks, preferably 1 to 4 weeks, more preferably 1 to 3 weeks after the administration of the antigen as described above. When the immunogen is cells, $1 \times 10^6$ to $1 \times 10^7$ cells are used.

The dose of the antigen at the time of performing the booster immunization varies depending on the type or size of animal or the like, however, in the case of, for example, a mouse, the dose is generally set to 0.05 to 5 mg, preferably 0.1 to 0.5 mg, more preferably about 0.1 to 0.2 mg. When the immunogen is cells, $1 \times 10^6$ to $1 \times 10^7$ cells are used.

Spleen cells or lymphocytes including antibody-producing cells are aseptically removed from the immunized animal after 1 to 10 days, preferably 2 to 5 days, more preferably 2 to 3 days from the booster immunization. At this time, the antibody titer is measured, and if an animal having a sufficiently increased antibody titer is used as a supply source of the antibody-producing cells, the subsequent procedure can be carried out more efficiently.

Examples of the method of measuring the antibody titer to be used here include an RIA method and an ELISA method, but the method is not limited thereto. For example, if an ELISA method is employed, the measurement of the antibody titer in the invention can be carried out according to the procedures as described below.

First, a purified or partially purified antigen is adsorbed to the surface of a solid phase such as a 96-well plate for ELISA, and the surface of the solid phase having no antigen adsorbed thereto is covered with a protein unrelated to the antigen such as bovine serum albumin (BSA). After washing the surface, the surface is brought into contact with a serially-diluted sample (for example, mouse serum) as a primary antibody to allow the antibody in the sample to bind to the antigen.

Further, as a secondary antibody, an antibody labeled with an enzyme against a mouse antibody is added and is allowed to bind to the mouse antibody. After washing, a substrate for the enzyme is added and a change in absorbance which occurs due to color development induced by degradation of the substrate or the like is measured and the antibody titer is calculated based on the measurement.

The separation of the antibody-producing cells from the spleen cells or lymphocytes of the immunized animal can be carried out according to a known method (for example, Kohler et al., Nature (1975), 256, p. 495; Kohler et al., Eur. J. Immunol. (1977), 6, p. 511; Milstein et al., Nature (1977), 266, p. 550; Walsh, Nature (1977), 266, p. 495). For example, in the case of spleen cells, a general method in which the antibody-producing cells are separated by homogenizing the spleen to obtain the cells through filtration with a stainless steel mesh and suspending the cells in Eagle's Minimum Essential Medium (MEM) can be employed.
Preparation of Myeloma Cells (Hereinafter Referred to as "Myeloma")

The myeloma cells to be used for cell fusion are not particularly limited and suitable cells can be selected from known cell lines. However, in consideration of convenience when a hybridoma is selected from fused cells, it is preferred to use an HGPRT (hypoxanthine-guanine phosphoribosyl transferase) deficient strain whose selection procedure has been established.

More specifically, examples of the HGPRT-deficient strain include X63-Ag8(X63), NS1-ANS/1(NS1), P3X63-Ag8.U1(P3U1), X63-Ag8.653(X63.653), SP2/0-Ag14(SP2/0), MPC11-45.6TG1.7(45.6TG), FO, S149/SXXO, and BU.1 derived from mice; 210.RSY3.Ag.1.2.3(Y3) derived from rats; and U266AR(SKO-007), GM1500.GTG-A12(GM1500), UC729-6, LICR-LOW-HMy2(HMy2) and 8226AR/NIP4-1(NP41) derived from humans. These HGPRT-deficient strains are available from, for example, ATCC or the like.

These cell strains are subcultured in an appropriate medium such as an 8-azaguanine medium [a medium obtained by adding 8-azaguanine to an RPMI 1640 medium supplemented with glutamine, 2-mercaptoethanol, gentamicin, and fetal calf serum (hereinafter referred to as "FCS")], Iscove's Modified Dulbecco's Medium (hereinafter referred to as "IMDM"), or Dulbecco's Modified Eagle Medium (hereinafter referred to as "DMEM"). In this case, 3 to 4 days before performing cell fusion, the cells are subcultured in a normal medium (for example, an ASF104 medium (manufactured by Ajinomoto Co., Ltd.) containing 10% FCS) to ensure not less than $2 \times 10^7$ cells on the day of cell fusion.
Cell Fusion Fusion between the antibody-producing cells and the myeloma cells can be appropriately performed according to a known method (Weir, D. M. Handbook of Experimental Immunology Vol. I. II. III., Blackwell Scientific Publications, Oxford (1987); Kabat, E. A. and Mayer, M. M., Experimental Immunochemistry, Charles C Thomas Publisher, Springfield, Ill. (1964), etc.), under conditions such that the survival rate of cells is not excessively reduced.

As such a method, for example, a chemical method in which the antibody-producing cells and the myeloma cells are mixed in a solution containing a polymer such as polyethylene glycol at a high concentration, a physical method using electric stimulation, or the like can be used. Among these methods, a specific example of the chemical method is as described below.

That is, in the case where polyethylene glycol is used in the solution containing a polymer at a high concentration, the antibody-producing cells and the myeloma cells are mixed in a solution of polyethylene glycol having a molecular weight of 1500 to 6000, more preferably 2000 to 4000 at a temperature of from 30 to 40° C., preferably from 35 to 38° C. for 1 to 10 minutes, preferably 5 to 8 minutes.
Selection of a Group of Hybridomas The method of selecting hybridomas obtained by the above-described cell fusion is not particularly limited. Usually, an HAT (hypoxanthine, aminopterin, thymidine) selection method (Kohler et al., Nature (1975), 256, p. 495; Milstein et al., Nature (1977), 266, p. 550) is used.

This method is effective when hybridomas are obtained using the myeloma cells of an HGPRT-deficient strain which cannot survive in the presence of aminopterin. That is, by culturing unfused cells and hybridomas in an HAT medium, only hybridomas resistant to aminopterin are selectively allowed to survive and proliferate.
Division into Single Cell Clone (Cloning)

As a cloning method for hybridomas, a known method such as a methylcellulose method, a soft agarose method, or a limiting dilution method can be used (see, for example, Barbara, B. M. and Stanley, M. S.: Selected Methods in Cellular Immunology, W. H. Freeman and Company, San Francisco (1980)). Among these methods, particularly, a three-dimensional culture method such as a methylcellulose method is preferred. For example, the group of hybridomas produced by cell fusion are suspended in a methylcellulose medium such as ClonaCell-HY Selection Medium D (manufactured by StemCell Technologies, Inc., #03804) and cultured. Then, the formed hybridoma colonies are collected, whereby monoclonal hybridomas can be obtained. The collected respective hybridoma colonies are cultured, and a hybridoma which has been confirmed to have a stable antibody titer in an obtained hybridoma culture supernatant is selected as a HER2 monoclonal antibody-producing hybridoma strain.

Preparation of Monoclonal Antibody by Culturing Hybridoma

By culturing the thus selected hybridoma, a monoclonal antibody can be efficiently obtained. However, prior to culturing, it is preferred to perform screening of a hybridoma which produces a target monoclonal antibody.

In such screening, a known method can be employed. The measurement of the antibody titer in the invention can be carried out by, for example, an ELISA method explained in item (b) described above. The hybridoma obtained by the method described above can be stored in a frozen state in liquid nitrogen or in a freezer at −80° C. or below. After completion of cloning, the medium is changed from an HT medium to a normal medium, and the hybridoma is cultured.

Large-scale culture is performed by rotation culture using a large culture bottle or by spinner culture. From the supernatant obtained by the large-scale culture, a monoclonal antibody which specifically binds to the protein of the invention can be obtained by purification using a method known to those skilled in the art such as gel filtration.

Further, the hybridoma is injected into the abdominal cavity of a mouse of the same strain as the hybridoma (for example, the above-described BALB/c) or a Nu/Nu mouse to proliferate the hybridoma, whereby the ascites containing a large amount of the monoclonal antibody of the invention can be obtained.

In the case where the hybridoma is administered in the abdominal cavity, if a mineral oil such as 2,6,10,14-tetramethyl pentadecane (pristane) is administrated 3 to 7 days prior thereto, a larger amount of the ascites can be obtained.

For example, an immunosuppressant is previously injected into the abdominal cavity of a mouse of the same strain as the hybridoma to inactivate T cells. 20 days thereafter, $10^6$ to $10^7$ hybridoma clone cells are suspended in a serum-free medium (0.5 ml), and the suspension is administrated in the abdominal cavity of the mouse. In general, when the abdomen is expanded and filled with the ascites, the ascites is collected from the mouse. By this method, the monoclonal antibody can be obtained at a concentration which is about 100 times or much higher than that in the culture solution.

The monoclonal antibody obtained by the above-described method can be purified by a method described in, for example, Weir, D. M.: Handbook of Experimental Immunology Vol. I, II, III, Blackwell Scientific Publications, Oxford (1978).

The thus obtained monoclonal antibody has high antigen specificity for HER2. Examples of the monoclonal antibody of the present invention can include, but are not particularly limited to, a mouse monoclonal antibody 4D5 (ATCC CRL 10463).

Assay of Monoclonal Antibody

The isotype and subclass of the thus obtained monoclonal antibody can be determined as follows.

First, examples of the identification method include an Ouchterlony method, an ELISA method, and an RIA method.

An Ouchterlony method is simple, but when the concentration of the monoclonal antibody is low, a condensation operation is required.

On the other hand, when an ELISA method or an RIA method is used, by directly reacting the culture supernatant with an antigen-adsorbed solid phase and using antibodies corresponding to various types of immunoglobulin isotypes and subclasses as secondary antibodies, the isotype and subclass of the monoclonal antibody can be identified.

In addition, as a simpler method, a commercially available identification kit (for example, Mouse Typer Kit manufactured by Bio-Rad Laboratories, Inc.) or the like can also be used.

Further, the quantitative determination of a protein can be performed by the Folin Lowry method and a method of calculation based on the absorbance at 280 nm (1.4 (OD 280)=Immunoglobulin 1 mg/ml).

Further, even when the monoclonal antibody is separately and independently obtained by performing again the steps of (a) to (h) in (2), it is possible to obtain an antibody having a cytotoxic activity equivalent to that of the HER2 antibody obtained in the step of (g). As one example of such an antibody, an antibody which binds to the same epitope as the HER2 antibody obtained in the step of (g) can be exemplified. If a newly produced monoclonal antibody binds to a partial peptide or a partial tertiary structure to which the anti-HER2 antibody binds, it can be determined that the monoclonal antibody binds to the same epitope as the anti-HER2 antibody. Further, by confirming that the monoclonal antibody competes with the anti-HER2 antibody for the binding to HER2 (that is, the monoclonal antibody inhibits the binding between the anti-HER2 antibody and HER2), it can be determined that the monoclonal antibody binds to the same epitope as the anti-HER2 antibody even if the specific epitope sequence or structure has not been determined. When it is confirmed that the monoclonal antibody binds to the same epitope as the anti-HER2 antibody, the monoclonal antibody is strongly expected to have an antigen-binding affinity or biological activity equivalent to that of the anti-HER2 antibody.

Other Antibodies

The antibody of the invention includes not only the above-described monoclonal antibody against HER2 but also a recombinant antibody obtained by artificial modification for the purpose of decreasing heterologous antigenicity to humans such as a chimeric antibody, a humanized antibody and a human antibody. These antibodies can be produced using a known method.

As the chimeric antibody, an antibody in which antibody variable and constant regions are derived from different species, for example, a chimeric antibody in which a mouse- or rat-derived antibody variable region is connected to a human-derived antibody constant region can be exemplified (see Proc. Natl. Acad. Sci. USA, 81, 6851-6855, (1984)). Examples of the chimeric antibody of the present invention can include, but are not particularly limited to, a chimeric antibody 4D5 comprising a heavy chain constant region of human IgG1 or IgG2.

As the humanized antibody, an antibody obtained by integrating only a complementarity determining region (CDR) into a human-derived antibody (see Nature (1986) 321, pp. 522-525), and an antibody obtained by grafting a part of the amino acid residues of the framework as well as the CDR sequence to a human antibody by a CDR-grafting method (WO 90/07861), and an antibody humanized using gene conversion mutagenesis strategy (U.S. Pat. No. 5,821,337) can be exemplified.

The term "several" as used herein refers to 1 to 10, 1 to 9, 1 to 8, 1 to 7, 1 to 6, 1 to 5, 1 to 4, 1 to 3, or 1 or 2.

As the amino acid substitution in this specification, a conservative amino acid substitution is preferred. The conservative amino acid substitution refers to a substitution occurring within a group of amino acids related to amino acid side chains. Preferred amino acid groups are as follows: an acidic group (aspartic acid and glutamic acid); a basic group (lysine, arginine, and histidine); a non-polar group (alanine, valine, leucine, isoleucine, proline, phenylalanine, methionine, and tryptophan); and an uncharged polar family (glycine, asparagine, glutamine, cysteine, serine, threonine, and tyrosine). More preferred amino acid groups are as follows: an aliphatic hydroxy group (serine and threonine); an amide-containing group (asparagine and glutamine); an aliphatic group (alanine, valine, leucine, and isoleucine); and an aromatic group (phenylalanine, tryptophan, and tyrosine). Such an amino acid substitution is preferably performed within a range which does not impair the properties of a substance having the original amino acid sequence.

By combining a sequence having a high homology with the above-described heavy chain amino acid sequence with a sequence having a high homology with the above-described light chain amino acid sequence, it is possible to select an antibody having a biological activity equivalent to that of each of the above-described antibodies. Such a homology is generally a homology of 80% or more, preferably a homology of 90% or more, more preferably a homology of 95% or more, most preferably a homology of 99% or more. Further, by combining an amino acid sequence wherein one to several amino acid residues are substituted, deleted or added in the heavy chain or light chain amino acid sequence, it is also possible to select an antibody having a biological activity equivalent to that of each of the above-described antibodies. The term "homology" as used herein is used with the same meaning as "identity".

The homology between two amino acid sequences can be determined using default parameters of Blast algorithm version 2.2.2 (Altschul, Stephen F., Thomas L. Madden, Alejandro A. Schaeffer, Jinghui Zhang, Zheng Zhang, Webb Miller, and David J. Lipman (1997), "Gapped BLAST and PSI-BLAST: a new generation of protein database search programs", Nucleic Acids Res. 25: 3389-3402). The Blast algorithm can be used also through the Internet by accessing the site www.ncbi.nlm.nih.gov/blast.

Further, the antibody of the invention includes a human antibody which binds to HER2. An anti-HER2 human antibody refers to a human antibody having only a sequence of an antibody derived from a human chromosome. The anti-HER2 human antibody can be obtained by a method using a human antibody-producing mouse having a human chromosome fragment comprising heavy and light chain genes of a human antibody (see Tomizuka, K. et al., Nature Genetics (1997) 16, pp. 133-143; Kuroiwa, Y. et al., Nucl. Acids Res. (1998) 26, pp. 3447-3448; Yoshida, H. et al., Animal Cell Technology: Basic and Applied Aspects vol. 10, pp. 69-73 (Kitagawa, Y., Matuda, T. and Iijima, S. eds.), Kluwer Academic Publishers, 1999; Tomizuka, K. et al., Proc. Natl. Acad. Sci. USA (2000) 97, pp. 722-727, etc.).

Such a human antibody-producing mouse can be created specifically as follows. A genetically modified animal in which endogenous immunoglobulin heavy and light chain gene loci have been disrupted, and instead, human immunoglobulin heavy and light chain gene loci have been introduced via a yeast artificial chromosome (YAC) vector or the like is created by producing a knockout animal and a transgenic animal and mating these animals.

Further, according to a recombinant DNA technique, by using cDNAs encoding each of such a heavy chain and a light chain of a human antibody, and preferably a vector comprising such cDNAs, eukaryotic cells are transformed, and a transformant cell which produces a recombinant human monoclonal antibody is cultured, whereby the antibody can also be obtained from the culture supernatant.

Here, as the host, for example, eukaryotic cells, preferably mammalian cells such as CHO cells, lymphocytes, or myeloma cells can be used.

Further, a method of obtaining a phage display-derived human antibody selected from a human antibody library (see Wormstone, I. M. et al., Investigative Ophthalmology & Visual Science. (2002) 43 (7), pp. 2301-2308; Carmen, S. et al., Briefings in Functional Genomics and Proteomics (2002), 1 (2), pp. 189-203; Siriwardena, D. et al., Ophthalmology (2002) 109 (3), pp. 427-431, etc.) is also known.

For example, a phage display method in which a variable region of a human antibody is expressed on the surface of a phage as a single-chain antibody (scFv), and a phage which binds to an antigen is selected (Nature Biotechnology (2005), 23, (9), pp. 1105-1116) can be used.

By analyzing the gene of the phage selected based on the binding to an antigen, a DNA sequence encoding the variable region of a human antibody which binds to an antigen can be determined.

If the DNA sequence of scFv which binds to an antigen is determined, a human antibody can be obtained by preparing an expression vector comprising the sequence and introducing the vector into an appropriate host to express it (WO 92/01047, WO 92/20791, WO 93/06213, WO 93/11236, WO 93/19172, WO 95/01438, WO 95/15388; Annu. Rev. Immunol. (1994) 12, pp. 433-455, Nature Biotechnology (2005) 23 (9), pp. 1105-1116).

As one example of another index for use in the comparison of the properties of antibodies, the stability of antibodies can be exemplified. The differential scanning calorimetry (DSC) is a device capable of quickly and accurately measuring a thermal denaturation midpoint temperature (Tm) to be used as a favorable index of the relative conformational stability of proteins. By measuring the Tm values using DSC and comparing the values, a difference in thermal stability can be compared. It is known that the storage stability of antibodies shows some correlation with the thermal stability of antibodies (Lori Burton, et. al., Pharmaceutical Development and Technology (2007) 12, pp. 265-273), and a preferred antibody can be selected by using thermal stability as an index. Examples of other indices for selecting antibodies include the following features: the yield in an appropriate host cell is high; and the aggregability in an aqueous solution is low. For example, an antibody which shows the highest yield does not always show the highest thermal stability, and therefore, it is necessary to select an antibody most suitable for the administration to humans by making comprehensive evaluation based on the above-described indices.

In the present invention, a modified variant of the antibody is also included. The modified variant refers to a variant obtained by subjecting the antibody of the present invention to chemical or biological modification. Examples of the chemically modified variant include variants chemically modified by linking a chemical moiety to an amino acid skeleton, variants chemically modified with an N-linked or O-linked carbohydrate chain, etc. Examples of the biologically modified variant include variants obtained by post-translational modification (such as N-linked or O-linked glycosylation, N- or C-terminal processing, deamidation, isomerization of aspartic acid, or oxidation of methionine), and variants in which a methionine residue has been added to the N terminus by being expressed in a prokaryotic host cell. Further, an antibody labeled so as to enable the detection or isolation of the antibody or an antigen of the invention, for example, an enzyme-labeled antibody, a fluorescence-labeled antibody, and an affinity-labeled antibody are also included in the meaning of the modified variant. Such a modified variant of the antibody of the invention is useful for improving the stability and blood retention of the antibody, reducing the antigenicity thereof, detecting or isolating an antibody or an antigen, and so on.

Further, by regulating the modification of a glycan which is linked to the antibody of the invention (glycosylation, defucosylation, etc.), it is possible to enhance an antibody-dependent cellular cytotoxic activity. As the technique for regulating the modification of a glycan of antibodies, WO 99/54342, WO 00/61739, WO 02/31140, etc. are known. However, the technique is not limited thereto. In the antibody of the present invention, an antibody in which the modification of a glycan is regulated is also included.

In the case where an antibody is produced by first isolating an antibody gene and then introducing the gene into an appropriate host, a combination of an appropriate host and an appropriate expression vector can be used. Specific examples of the antibody gene include a combination of a gene encoding a heavy chain sequence of an antibody described in this specification and a gene encoding a light chain sequence thereof. When a host cell is transformed, it is possible to insert the heavy chain sequence gene and the light chain sequence gene into the same expression vector, and also into different expression vectors separately.

In the case where eukaryotic cells are used as the host, animal cells, plant cells, and eukaryotic microorganisms can be used. As the animal cells, mammalian cells, for example, simian COS cells (Gluzman, Y, Cell, (1981) 23, pp. 175-182, ATCC CRL-1650), murine fibroblasts NIH3T3 (ATCC No. CRL-1658), and dihydrofolate reductase-deficient strains (Urlaub, G. and Chasin, L. A., Proc. Natl. Acad. Sci. USA (1980) 77, pp. 4126-4220) of Chinese hamster ovarian cells (CHO cells; ATCC: CCL-61) can be exemplified. In the case where prokaryotic cells are used, for example, *Escherichia coli* and *Bacillus subtilis* can be exemplified.

By introducing a desired antibody gene into these cells through transformation, and culturing the thus transformed cells in vitro, the antibody can be obtained. In the above-described culture method, the yield may sometimes vary depending on the sequence of the antibody, and therefore, it is possible to select an antibody which is easily produced as a pharmaceutical by using the yield as an index among the antibodies having an equivalent binding activity. Therefore, in the antibody of the present invention, an antibody obtained by a method of producing an antibody, characterized by including a step of culturing the transformed host cell and a step of collecting a desired antibody from a cultured product obtained in the culturing step is also included.

It is known that a lysine residue at the carboxyl terminus of the heavy chain of an antibody produced in a cultured mammalian cell is deleted (Journal of Chromatography A, 705: 129-134 (1995)), and it is also known that two amino acid residues (glycine and lysine) at the carboxyl terminus of the heavy chain of an antibody produced in a cultured mammalian cell are deleted and a proline residue newly located at the carboxyl terminus is amidated (Analytical Biochemistry, 360: 75-83 (2007)). However, such deletion and modification of the heavy chain sequence do not affect the antigen-binding affinity and the effector function (the activation of a complement, the antibody-dependent cellular cytotoxicity, etc.) of the antibody. Therefore, in the antibody according to the present invention, an antibody subjected to such modification and a functional fragment of the antibody is also included, and a deletion variant in which one or two amino acids have been deleted at the carboxyl terminus of the heavy chain, a variant obtained by amidation of the deletion variant (for example, a heavy chain in which the carboxyl terminal proline residue has been amidated), and the like are also included. The type of deletion variant having a deletion at the carboxyl terminus of the heavy chain of the antibody according to the invention is not limited to the above variants as long as the antigen-binding affinity and the effector function are conserved. The two heavy chains constituting the antibody according to the invention may be of one type selected from the group consisting of a full-length heavy chain and the above-described deletion variant, or may be of two types in combination selected therefrom. The ratio of the amount of each deletion variant can be affected by the type of cultured mammalian cells which produce the antibody according to the invention and the culture conditions, however, a case where one amino acid residue at the carboxyl terminus has been deleted in both of the two heavy chains contained as main components in the antibody according to the invention can be exemplified.

As isotype of the antibody of the invention, for example, IgG (IgG1, IgG2, IgG3, IgG4) can be exemplified, and IgG1 or IgG2 can be exemplified preferably.

As the biological activity of the antibody, generally an antigen-binding activity, an activity of internalizing in cells expressing an antigen by binding to the antigen, an activity of neutralizing the activity of an antigen, an activity of enhancing the activity of an antigen, an antibody-dependent cellular cytotoxicity (ADCC) activity, a complement-dependent cytotoxicity (CDC) activity, and an antibody-dependent cell-mediated phagocytosis (ADCP) can be exemplified. The biological activity of the antibody of the present invention is a binding activity to HER2, and preferably an activity of internalizing in HER2-expressing cells by binding to HER2. Further, the antibody of the present invention may have an ADCC activity, a CDC activity, and/or an ADCP activity in addition to an activity of internalizing in cells.

The obtained antibody can be purified to homogeneity. The separation and purification of the antibody may be performed employing a conventional protein separation and purification method. For example, the antibody can be separated and purified by appropriately selecting and combining column chromatography, filter filtration, ultrafiltration, salt precipitation, dialysis, preparative polyacrylamide gel electrophoresis, isoelectric focusing electrophoresis, and the like (Strategies for Protein Purification and Characterization: A Laboratory Course Manual, Daniel R. Marshak et al. eds., Cold Spring Harbor Laboratory Press (1996); Antibodies: A Laboratory Manual. Ed Harlow and David Lane, Cold Spring Harbor Laboratory (1988)), but the method is not limited thereto.

Examples of such chromatography include affinity chromatography, ion exchange chromatography, hydrophobic chromatography, gel filtration chromatography, reverse phase chromatography, and adsorption chromatography. Such chromatography can be performed employing liquid chromatography such as HPLC or FPLC.

As a column to be used in affinity chromatography, a Protein A column and a Protein G column can be exemplified. For example, as a column using a Protein A column, Hyper D, POROS, Sepharose FF (Pharmacia Corporation) and the like can be exemplified.

Further, by using a carrier having an antigen immobilized thereon, the antibody can also be purified utilizing the binding property of the antibody to the antigen.

Antibody-Drug Conjugates Comprising an Anti-HER2 Antibody

In some aspects, the invention features a conjugate comprising a cell-binding agent (e.g., an anti-HER2 antibody as described herein) and a camptothecin derivative.

In embodiments, suitable compounds for conjugation to an anti-HER2 antibody (e.g., trastuzumab) include compounds described in U.S. Provisional Application No. 62/981,197, filed on Feb. 25, 2020, which is hereby incorporated by reference in its entirety. For example, suitable compounds include compounds of Formula (I), (II), and (III) as described in U.S. Ser. No. 62/981,197.

In a still further aspect, the invention features a compound of Formula (PL-A'), {D-$L_1$-$L_2$-Q'—$CH_2$—NH-E-Z'}$_p$—C    (PL-A'), or a pharmaceutically acceptable salt thereof, wherein:
D is represented by the following structural formula:

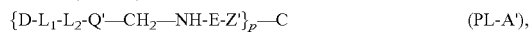

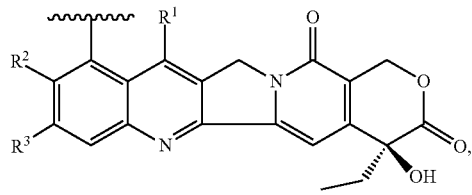

wherein
$R^1$ independently is —H, $C_1$-$C_6$ alkyl, $C_2$-$C_6$ alkenyl, $C_2$-$C_6$ alkynyl, silyl, $C_3$-$C_6$ cycloalkyl, $C_1$-$C_6$ halogenated alkyl, $C_2$-$C_6$ halogenated alkenyl, or $C_2$-$C_6$ halogenated alkynyl;
$R^2$ independently is —H, —F, —N($R^4$)$_2$, —N($R^4$)($R^5$), —O$R^4$, —S$R^4$, —S(=O)$R^5$, —SO$_2R^5$, $C_1$-$C_6$ alkyl, or $C_1$-$C_6$ fluoroalkyl; and $R^3$ is —H, —F, —CN, —OCH$_3$, —CH$_3$, or —CF$_3$; or $R^2$ and $R^3$ together form a group of the formula —O(CH$_2$)$_n$O— or —O(CF$_2$)$_n$O— wherein n is 1 or 2;
$R^4$ independently is —H or $C_1$-$C_4$ alkyl;
$R^5$ independently is $C_1$-$C_4$ alkyl;
$L_1$ independently is absent or —($C_1$-$C_{10}$alkylene)-;
$L_2$ independently is absent or is —OCH$_2$-$L_3$-*, —SCH$_2$-$L_3$-*, —S(=O)-$L_3$-*, —SO$_2$-$L_3$-*, —C(=O)-$L_3$-*, —N($R^6$)CH$_2$-$L_3$-*, —N($R^6$)C(=O)-$L_3$-*, —N($R^6$)C(=O)N($R^7$)-$L_3$-*, —C(=O)N($R^6$)CH$_2$-$L_3$-*, —OC(=O)N($R^6$)CH$_2$-$L_3$-*, or —N($R^6$)C(=O)OCH$_2$-$L_3$-*; wherein * denotes the site covalently linked to Q';
$L_3$ independently is —($C_1$-$C_{10}$alkylene)-, —CH$_2$OCH$_2$CH$_2$—, or —CH$_2$CH$_2$OCH$_2$CH$_2$—;
each $R^6$ and $R^7$ independently is —H, $C_1$-$C_6$ alkyl, $C_1$-$C_6$ fluoroalkyl, $C_3$-$C_6$ cycloalkyl, aryl, heteroaryl, or benzyl;
Q' is —O— or —S—;
E is a peptide comprising 2 to 10 amino acids; wherein E is optionally substituted with one or more polyol; and wherein the N terminal of the peptide is covalently attached to Z';
Z' is —C(=O)-$L_4$-Y',

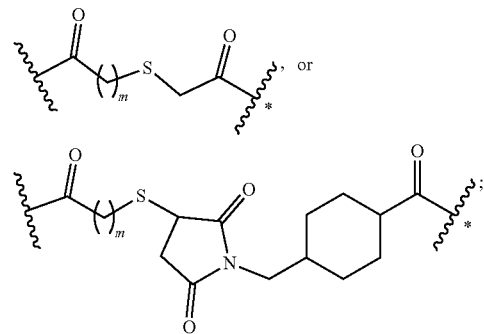

wherein m represents an integer of 1-10 and * denotes the site covalently linked to said C;
$L_4$ is —($C_1$-$C_{10}$alkylene)-, —CH$_2$CH$_2$(OCH$_2$CH$_2$)$_n$N($R^8$)C(=O)-$L_5$-*, or —CH$_2$(OCH$_2$CH$_2$)$_n$N($R^8$)C(=O)-$L_5$-*; wherein n represents an integer of 1-10; and wherein * denotes the site covalently linked to Y';
$L_5$ is —($C_1$-$C_{10}$alkylene)-;
$R^8$ is —H or —CH$_3$;
C represents a cell binding agent;
Y' is a group formed by the reaction of an electrophilic group with a reactive nucleophilic group present on said cell binding agent; and
wherein when $R^2$ and $R^3$ combine to form —OCH$_2$O—, $R^1$ is not —CH$_2$CH$_2$CH$_2$CH$_3$; and
p has an value between 1 to 18.

Exemplary compounds of Formula (PL-A') include compounds of Formula (PL-A) such as MB-2a and MB-3a (trastuzumab meditecan) as described herein.

In embodiments, $L_4$ is —($C_1$-$C_{10}$alkylene)-.

In embodiments, $L_4$ is —CH$_2$CH$_2$(OCH$_2$CH$_2$)$_n$N($R^8$)C(=O)-$L_5$-* or —CH$_2$(OCH$_2$CH$_2$)$_n$N($R^8$)C(=O)-$L_5$-*, wherein n represents an integer of 1-10; and wherein * denotes the site covalently linked to Y'.

In embodiments, $L_4$ is —CH$_2$CH$_2$CH$_2$CH$_2$CH$_2$—, —CH$_2$CH$_2$—, —CH$_2$—, —CH$_2$CH$_2$OCH$_2$CH$_2$OCH$_2$CH$_2$NHC(=O)CH$_2$CH$_2$—* or —CH$_2$OCH$_2$CH$_2$OCH$_2$CH$_2$NHC(=O)CH$_2$CH$_2$—*, wherein * denotes the site covalently linked to Y'.

In embodiments, Y' is formed from a Michael acceptor group, a succinimide, an epoxide, or a halogen.

In embodiments, Y' is formed from

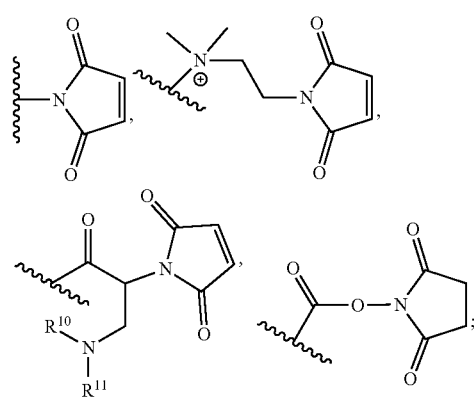

wherein $R^{10}$ and $R^{11}$ are each independently —H or $C_1$-$C_3$ alkyl.

In embodiments, Y' is

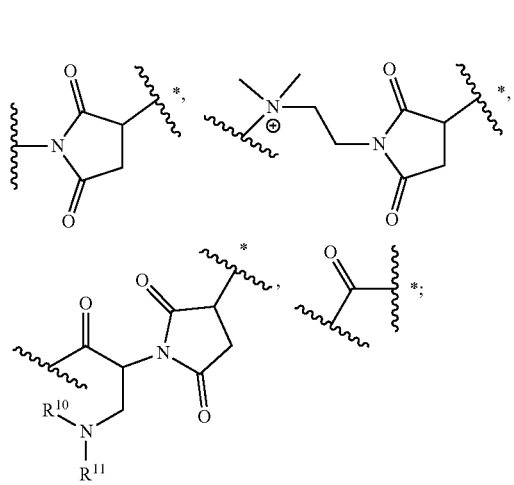

wherein $R^{10}$ and $R^{11}$ are each independently —H or $C_1$-$C_3$ alkyl and * denotes the site covalently linked to said C.

In embodiments, Z' is formed from:

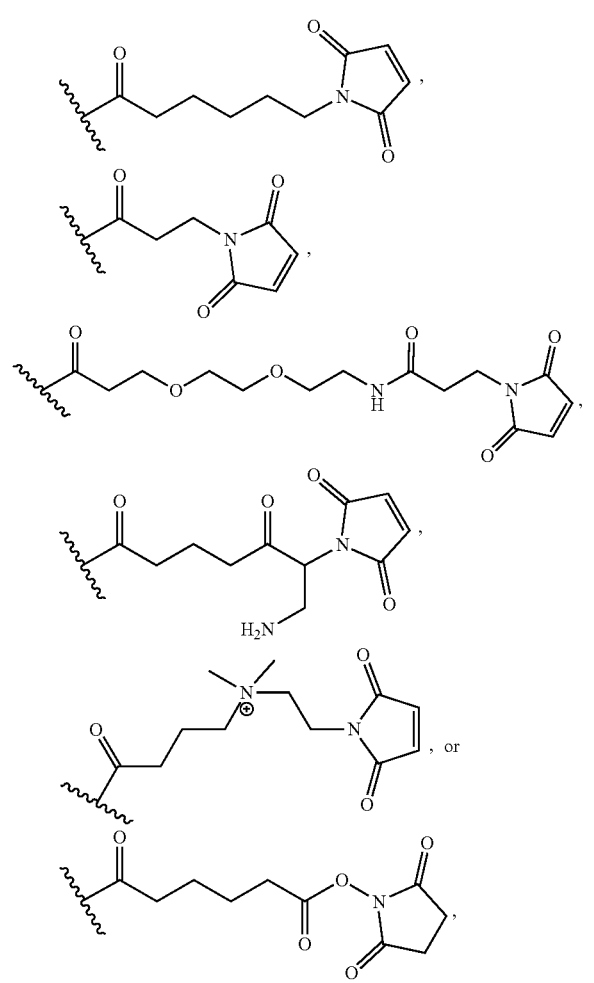

In embodiments, Z' is:

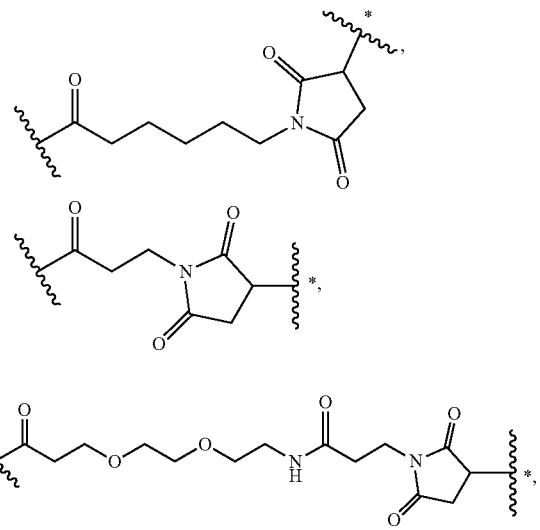

wherein * denotes the site covalently linked to C.

In embodiments, Z' is

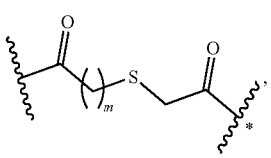

wherein * denotes the site covalently linked to said C. In embodiments, m is 1. In embodiments, m is 2. In embodiments, m is 3. In embodiments, m is 4. In embodiments, m is 5. In embodiments, m is 6. In embodiments, m is 7. In embodiments, m is 8. In embodiments, m is 9. In embodiments, m is 10.

In embodiments, Z' is

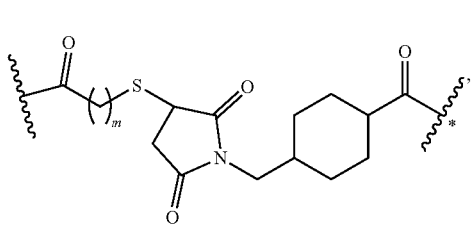

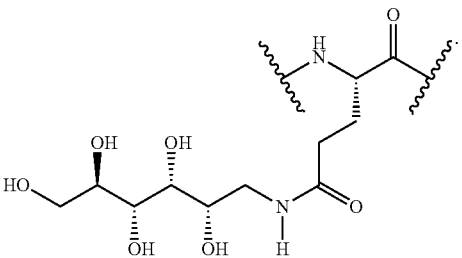

wherein * denotes the site covalently linked to said C. In embodiments, m is 1. In embodiments, m is 2. In embodiments, m is 3. In embodiments, m is 4. In embodiments, m is 5. In embodiments, m is 6. In embodiments, m is 7. In embodiments, m is 8. In embodiments, m is 9. In embodiments, m is 10.

In embodiments, E is a peptide of 2, 3, or 4 amino acids. Each amino acid in said peptide is an L amino acid, or at least one amino acid in said peptide is a D amino acid.

In embodiments, E comprises one or more amino acids selected from glycine, alanine, valine, glutamine, glutamic acid, phenylalanine, and leucine, and wherein said glutamine or glutamic acid is optionally substituted by a polyol.

In embodiments, E comprises amino acids selected from glycine, alanine, valine, glutamine, glutamic acid, phenylalanine, and leucine, and wherein said glutamine or glutamic acid is optionally substituted by a polyol.

In embodiments, E comprises an amino acid having the following structure,

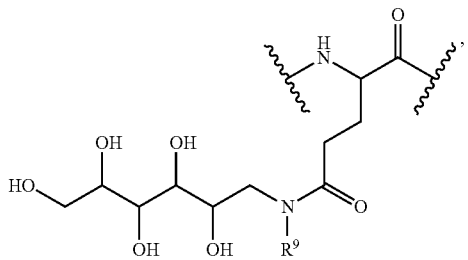

wherein $R^9$ is —H or $C_1$-$C_6$ alkyl.

In embodiments, E comprises an amino acid having the following structure,

In embodiments, E is selected from the group consisting of -Ala-Val-*, -Val-Ala-*, -Gly-Gly-*, -Val-Cit-*, -Cit-Val-*, -Leu-Ala-*, -Ala-Leu-*, -Leu-Cit-*, -Cit-Leu-*, -Leu-Ala-*, -Ala-Leu-*, -Lys-Lys-*, -Ala-Lys-*, -Lys-Ala-*, -Val-Lys-*, -Lys-Val-*, -Tyr-Arg-*, -Arg-Tyr-*, -Arg-Arg-*, -Ala-Ala-*, -Phe-Lys-*, -Lys-Phe-*, -Thr-Thr-*, -Thr-Met-*, -Met-Thr-*, -Met-Tyr-*, -Tyr-Met-*, -Phe-Gln-*, -Gln-Phe-*, -Gly-Ser-*, -Leu-Gln-*, -Gln-Leu-*, -Ser-Ala-*, -Ser-Gly-*, -Val-Thr-*, -Thr-Val-*, -Val-Gln-*, -Ser-Val-*, -Val-Ser-*, -Ala-Met-*, -Met-Ala-*, -Val-Arg-*, -Arg-Val-*, -Phe-Ala-*, -Ala-Phe-*, -Cit-Val-*, -Gln-Val-*, -Phe-Arg-*, -Arg-Phe-*, -Ala-Ala-Ala-*, -Gly-Gly-Gly-*, -Ala-Val-Ala-*, -Gly-Val-Gly-*, -Ala-Val-Gly-*, -Gly-Phe-Lys-*, -Lys-Phe-Gly-*, -Leu-Ala-Leu-*, -Val-Ala-Leu-*, -Leu-Ala-Val-*, -Val-Ala-Val-*, -Ala-Val-Ala-Gly-* (SEQ ID NO: 10), -Gly-Phe-Gly-Gly-* (SEQ ID NO: 11), -Gly-Gly-Phe-Gly-* (SEQ ID NO: 12), -Ala-Val-Gly-Gly-* (SEQ ID NO: 13), -Ala-Ala-Ala-Ala-* (SEQ ID NO: 14), -Ala-Val-Ala-Ala-* (SEQ ID NO: 15), -Ala-Leu-Ala-Leu-* (SEQ ID NO: 16), -Leu-Ala-Leu-Ala-* (SEQ ID NO: 17), -Gly-Phe-Leu-Gly-* (SEQ ID NO: 18) and -Gly-Leu-Phe-Gly-* (SEQ ID NO: 19), wherein * denotes the N-terminal of the peptides covalently attached to Z'.

In embodiments, E is selected from the group consisting of -L-Ala-D-Val-*, -L-Val-D-Ala-*, -L-Val-D-Lys-*, -L-Val-D-Arg-*, -L-Val-D-Cit-*, -L-Val-D-Arg-*, -L-Val-D-Cit-*, -L-Val-D-Lys-*, -L-Val-D-Arg-*, -L-Arg-D-Arg-*, -L-Ala-D-Ala-*, -L-Ala-D-Lys-*, -L-Ala-D-Arg-*, -L-Ala-D-Ala-L-Ala-*, -L-Ala-D-Val-L-Ala-*, -L-Ala-D-Ala-Gly-*, and -L-Ala-D-Val-Gly-*, wherein * denotes the N-terminal of the peptides covalently attached to Z'.

In embodiments, -E-NH—CH$_2$— has one of the following structures, wherein * denotes the N-terminal of the peptides covalently attached to Z':

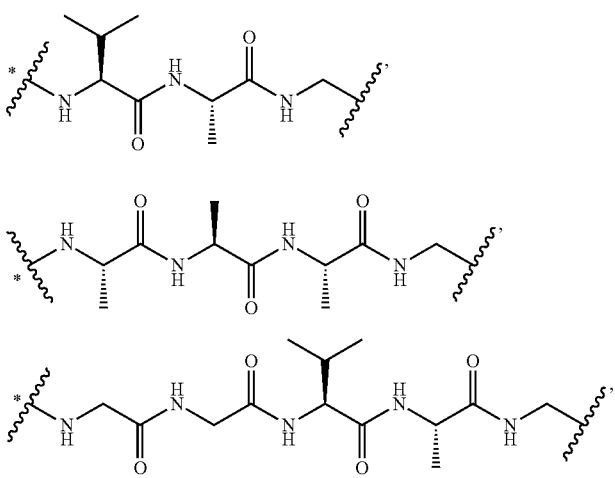

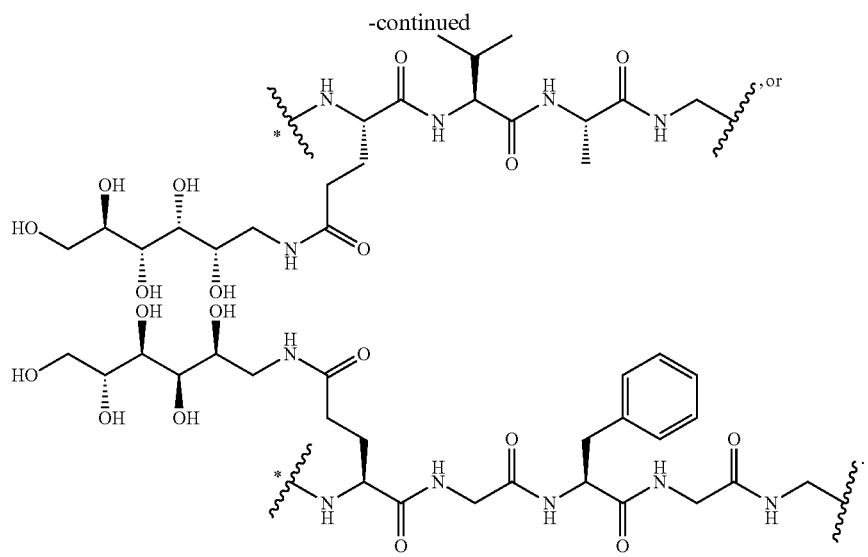
In embodiments, Z'-E-NH—CH₂ is formed from one of the following structures:
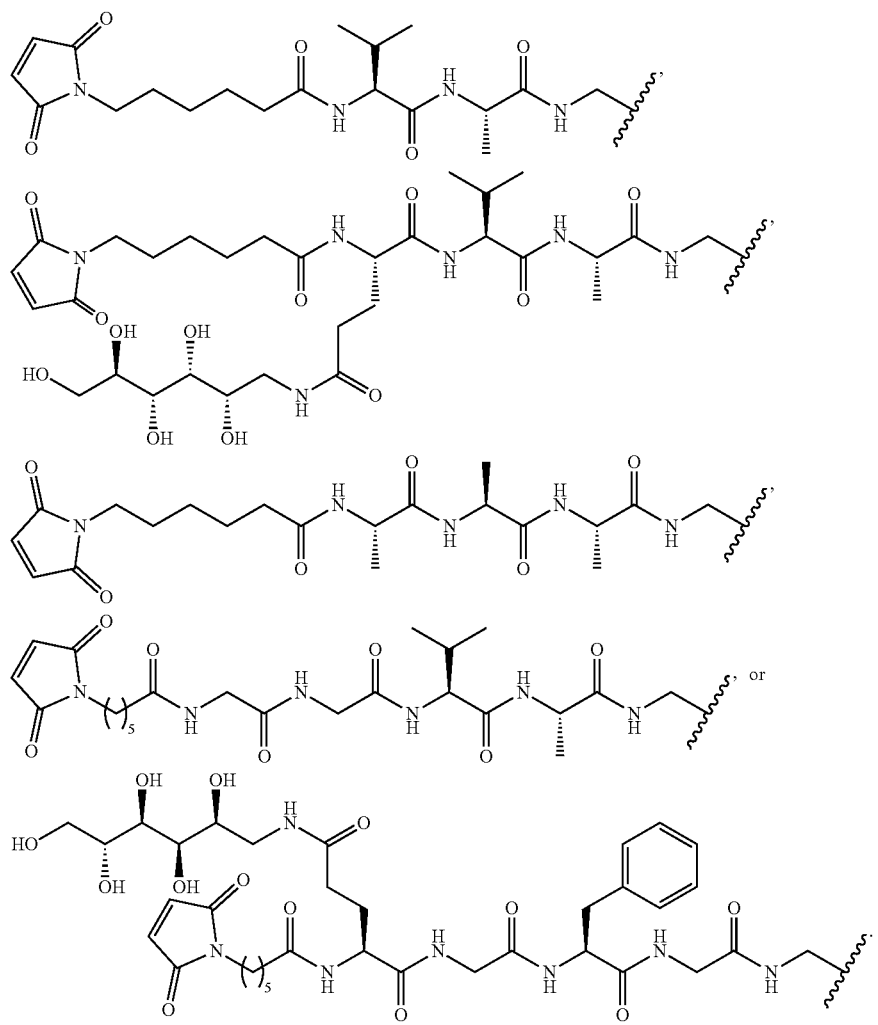

In embodiments, Z'-E-NH—CH₂ is one of the following structures, wherein * denotes the point of attachment to the C:

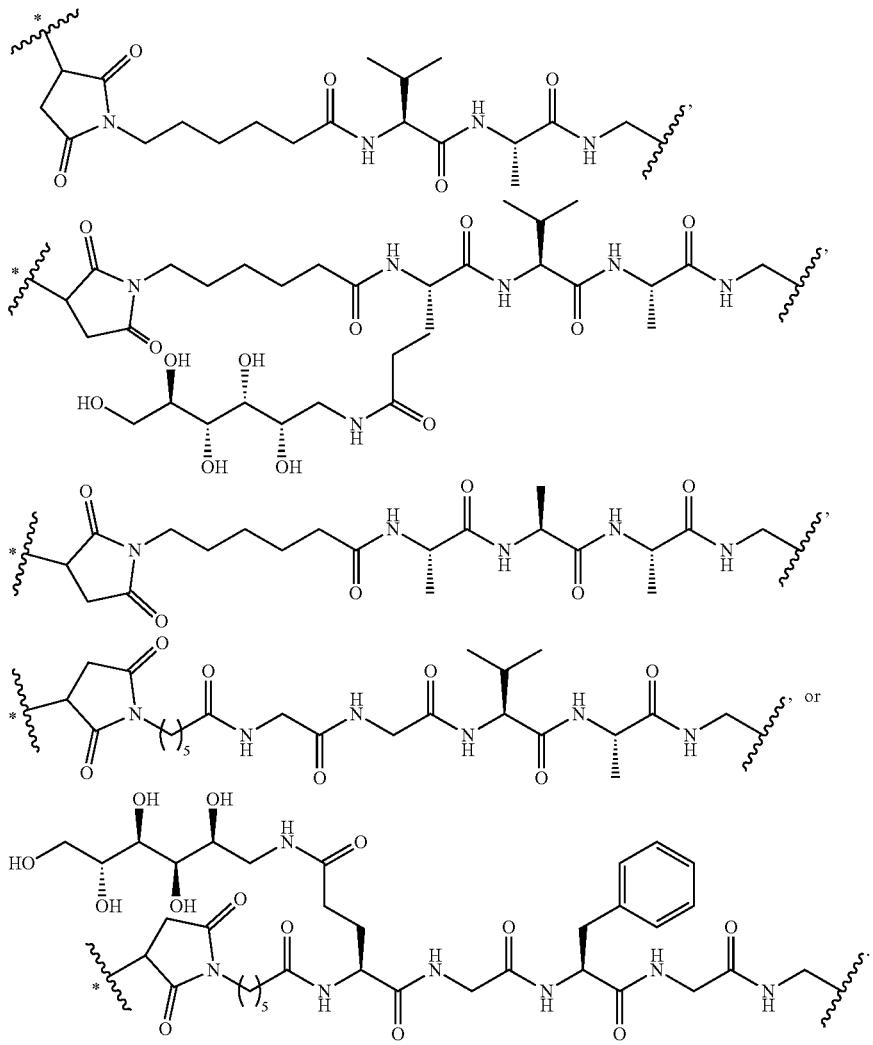

In embodiments, when R¹ is —H or —CH₂CH₃, R² is —OH or alkoxy and R³ is —H, then -L₁-L₂-Q'- is not —CH(R')CH₂O— or —CH(R')(CH₂)₂O—, wherein R' is —H or C₁-C₆ alkyl, alkoxy, substituted alkyl, phenyl or PhCH₂—. In embodiments, when R¹ is —H or —CH₂CH₃, R² is —OH or alkoxy and R³ is —H, then -L₁-L₂-Q'- is not —CH(R')CH₂O— or —CH(R')(CH₂)₂O—, wherein R' is —H or C₁-C₆ alkyl, alkoxy, substituted alkyl, phenyl or PhCH₂—.

In embodiments, at least one of L₁ and L₂ is present.

In embodiments, at least one of R¹, R² and R³, is not —H.

In embodiments, R¹ independently is C₁-C₆ alkyl, C₂-C₆ alkenyl, C₂-C₆ alkynyl, silyl, C₃-C₆ cycloalkyl, C₁-C₆ halogenated alkyl, alkene or alkyne.

In embodiments, R¹ independently is —H or C₁-C₆ alkyl.

In embodiments, R² independently is —H, —F, —N(R⁴)₂, —N(R⁴)(R⁵), —OR⁴, —SR⁴, —S(=O)R⁵, —SO₂R⁵, C₁-C₆ alkyl, or C₁-C₆ fluoroalkyl; and R³ independently is —H, —F, —CN, —OCH₃, —CH₃, or —CF₃.

In embodiments, R² independently is C₁-C₆ alkyl, C₁-C₆ fluoroalkyl, or —F.

In embodiments, R³ independently is —H, —F, —CN, or —CF₃.

In embodiments, R³ independently is —F, —CN, —OCH₃, —CH₃, or —CF₃.

In embodiments, R² and R³ combine to form —O(CH₂)ₙO— or —O(CF₂)ₙO—, wherein n is 1 or 2.

In embodiments, D is represented by one of the following structures:

(D-I)

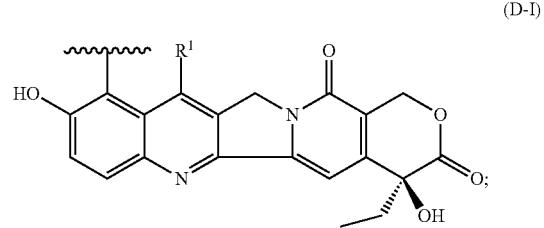

(D-II)
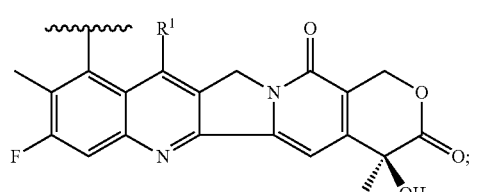
(D-III)
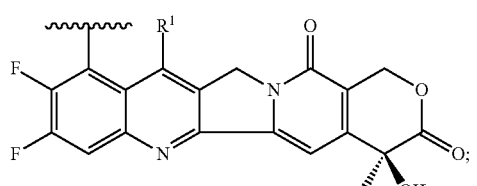
(D-IV)
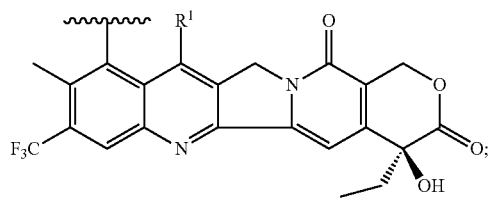
(D-V)
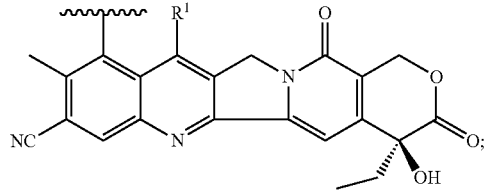
(D-VI)
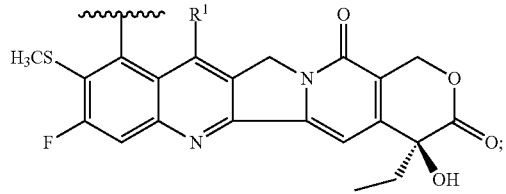
(D-VII)
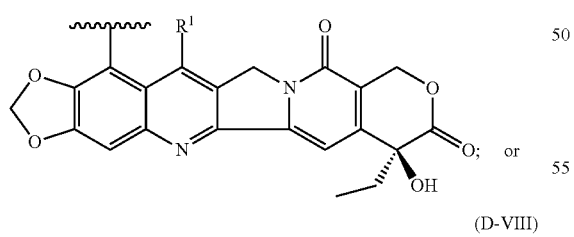
(D-VIII)
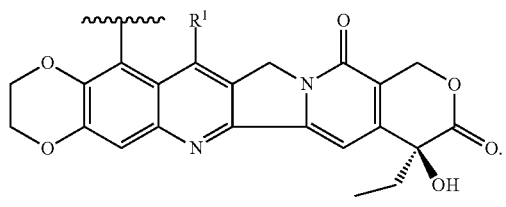
In embodiments, D is
(D-II)
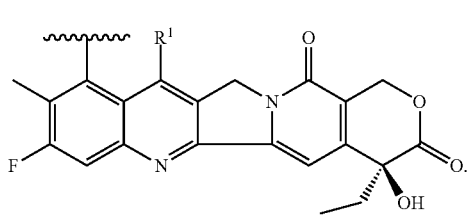
In embodiments, $R^1$ is —H or $C_1$-$C_6$ alkyl.
In embodiments, D is represented by one of the following structures:
(D1)
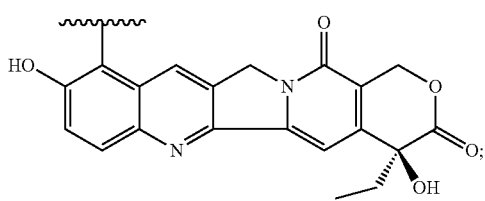
(D2)
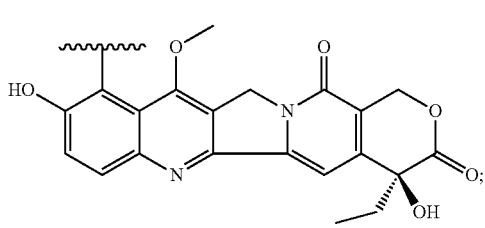
(D3)
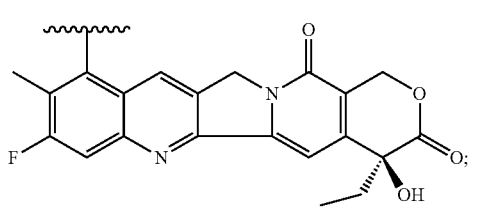
(D4)
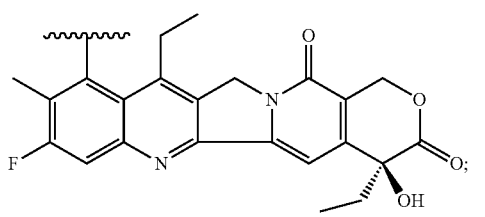
(D5)
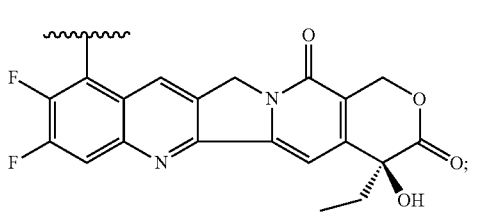

-continued

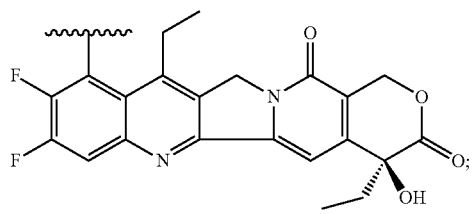
(D6)

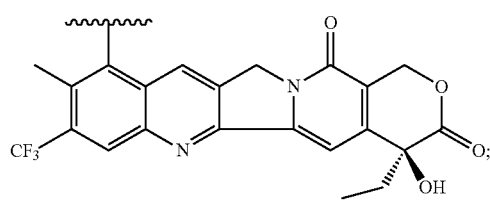
(D7)

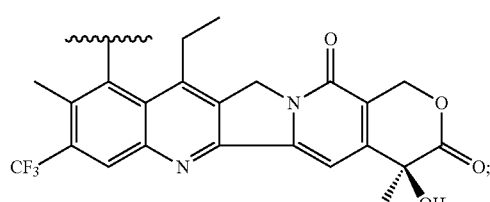
(D8)

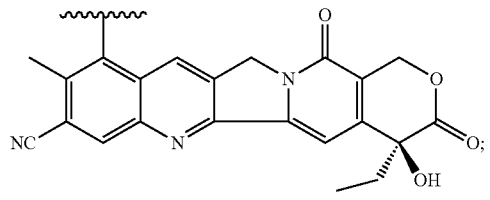
(D9)

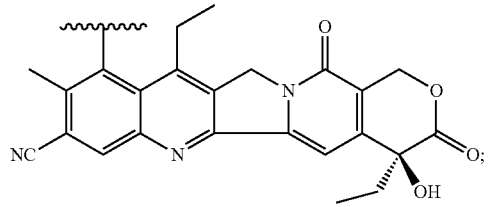
(D10)

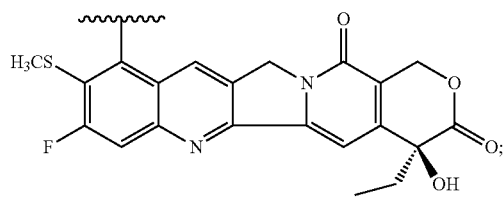
(D11)

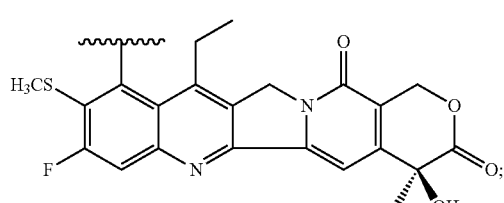
(D12)

-continued

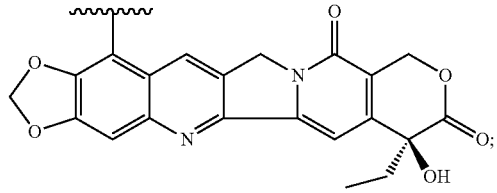
(D13)

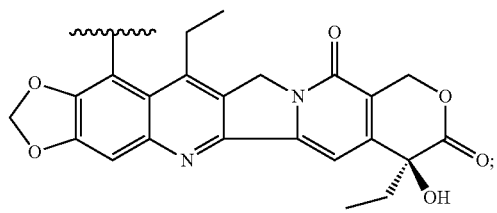
(D14)

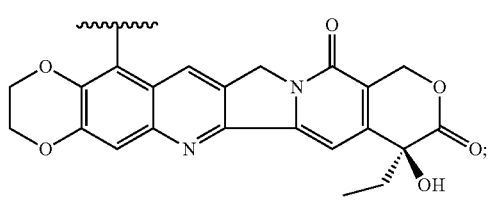
(D15)

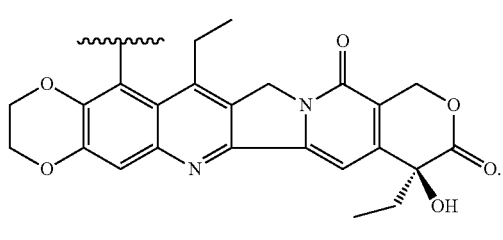
(D16)

In embodiments, D is

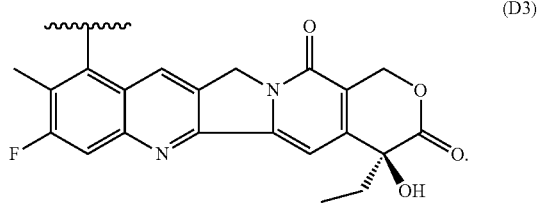 [SMILES: *c1c(C)c(F)cc2nc3c(cc12)Cn1c-3cc2c(c1=O)COC(=O)[C@]2(O)CC]
(D3)

In embodiments, $L_1$ is —($C_1$-$C_{10}$alkylene)- and $L_2$ is absent.

In embodiments, $L_1$ is —($C_1$-$C_{10}$alkylene)- and $L_2$ is —N($R^6$)CH$_2$-$L_3$-* or —N($R^6$)C(=O)-$L_3$-*, wherein * denotes the site covalently linked to Q'.

In embodiments, $L_1$ is absent and $L_2$ is —N($R^6$)CH$_2$-$L_3$-* or —N($R^6$)C(=O)-$L_3$-*, wherein * denotes the site covalently linked to Q'.

In embodiments, $L_3$ is —($C_1$-$C_{10}$alkylene)-.

In embodiments, $R^6$ is —H or —CH$_3$.

In embodiments, $L_1$-$L_2$ is —CH$_2$—, —CH$_2$CH$_2$—, —CH$_2$CH$_2$CH$_2$—, or —CH$_2$CH$_2$CH$_2$CH$_2$—.

In embodiments, $L_1$-$L_2$ is —OCH$_2$CH$_2$—*, —OCH$_2$CH$_2$OCH$_2$CH$_2$—*, —SCH$_2$CH$_2$—*, —SCH$_2$CH$_2$OCH$_2$CH$_2$—*, —S(=O)CH$_2$—*, —SO$_2$CH$_2$—*, —C(=O)CH$_2$—*, —NHCH$_2$CH$_2$—*, —N(CH$_3$)

CH$_2$CH$_2$—*, —N(CF$_3$)CH$_2$CH$_2$—*, —NHC(=O)CH$_2$—*, —CH$_2$NHC(=O)CH$_2$—*, —CH$_2$CH$_2$NHC(=O)CH$_2$—*, —CH$_2$N(CH$_3$)C(=O)CH$_2$—* —N(CH$_3$)C(=O)CH$_2$—*, —N(CH$_3$)C(=O)CH$_2$CH$_2$—*, —C(=O)NHCH$_2$CH$_2$—*, —NHC(=O)NHCH$_2$CH$_2$—*, —NHC(=O)OCH$_2$CH$_2$—*, —CH$_2$OC(=O)NHCH$_2$CH$_2$—*, or —C(=O)N(CH$_3$)CH$_2$CH$_2$—*, wherein * denotes the site covalently linked to Q'.

In embodiments, L$_1$-L$_2$-Q' is —CH$_2$CH$_2$CH$_2$CH$_2$O—, —CH$_2$CH$_2$CH$_2$O—, —CH$_2$CH$_2$O—, —CH$_2$CH$_2$OCH$_2$CH$_2$O—, —CH$_2$SCH$_2$CH$_2$O—, —CH$_2$NHC(=O)CH$_2$O—, —CH$_2$CH$_2$NHC(=O)CH$_2$O—, —CH$_2$N(CH$_3$)C(=O)CH$_2$O—, —OCH$_2$CH$_2$O—, —OCH$_2$CH$_2$CH$_2$O—, —SCH$_2$CH$_2$CH$_2$O—, —SCH$_2$CH$_2$O—, —NHCH$_2$CH$_2$O—, —NHCH$_2$CH$_2$CH$_2$O—, —N(CH$_3$)CH$_2$CH$_2$O—, —C(=O)NHCH$_2$CH$_2$O—, —NHC(=O)CH$_2$O—, —CH$_2$S(=O)CH$_2$O—, —CH$_2$SO$_2$CH$_2$O—, —CH$_2$CH$_2$CH$_2$CH$_2$S—, —CH$_2$CH$_2$CH$_2$S—, —CH$_2$ CH$_2$S—, —CH$_2$CH$_2$OCH$_2$CH$_2$S—, —CH$_2$SCH$_2$CH$_2$S—, —CH$_2$NHC(=O)CH$_2$S—, —OCH$_2$CH$_2$CH$_2$S—, —SCH$_2$CH$_2$CH$_2$S—, —SCH$_2$CH$_2$S—, —NHCH$_2$CH$_2$CH$_2$S—, —N(CH$_3$)CH$_2$CH$_2$S—, —C(=O)NHCH$_2$CH$_2$S—, —NHC(=O)CH$_2$S—, —CH$_2$S(=O)CH$_2$S—, or —CH$_2$SO$_2$CH$_2$S—.

In embodiments, D-L$_1$-L$_2$ is represented by a structure that is (P-I)

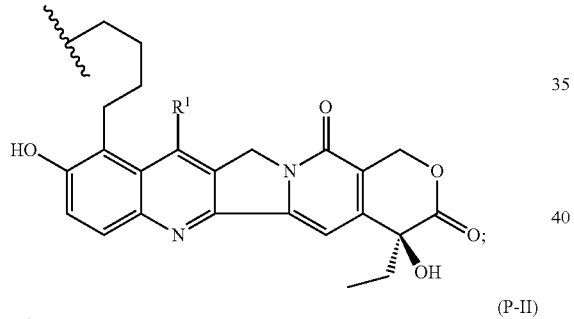

(P-II)

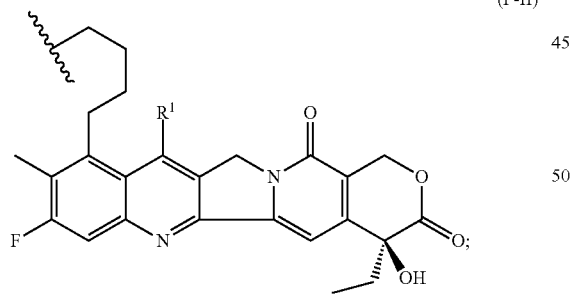

(P-III)

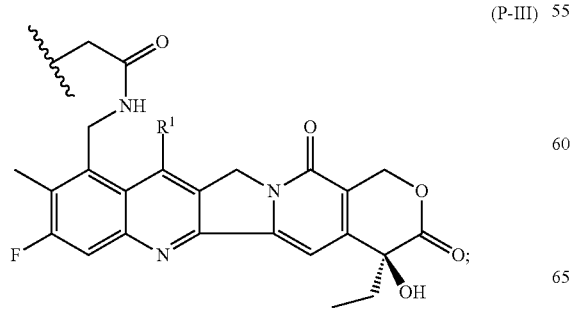

(P-IV)

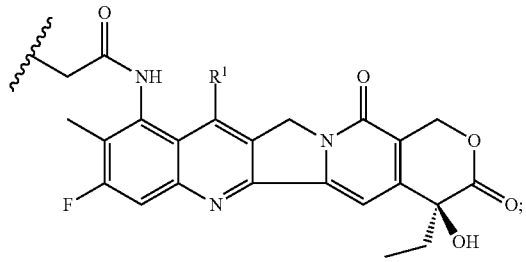

or (P-V)

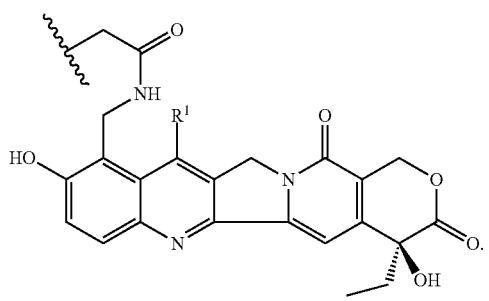

In embodiments, D-L$_1$-L$_2$ is represented by a structure that is (P-II)

In embodiments, R$^1$ is —H or C$_1$-C$_6$ alkyl.
In embodiments, R$^1$ is —H or —CH$_2$CH$_3$.
In embodiments, Q' is —O—.
In embodiments, Q' is —S—.
In embodiments, D-L$_1$-L$_2$-Q'— has one of the following structures:

(P1')

(P2′)
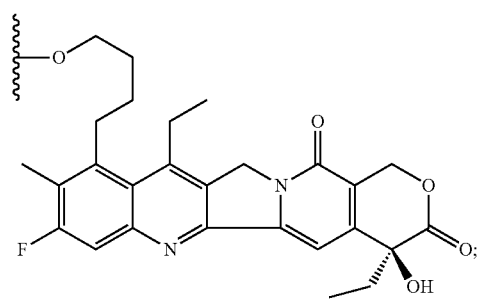
(P5′)
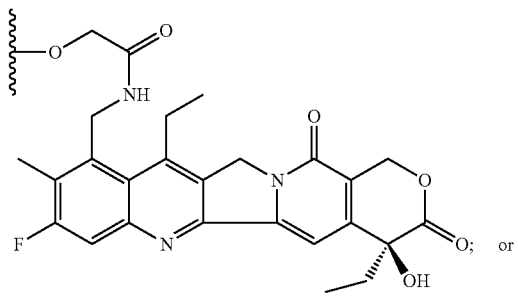
or
(P3′)
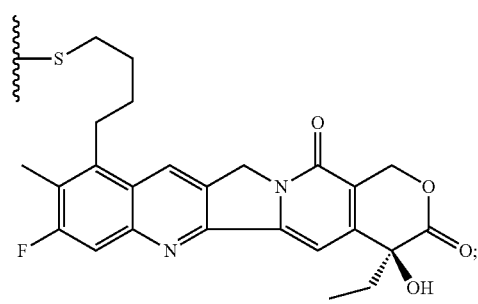
(P6′)
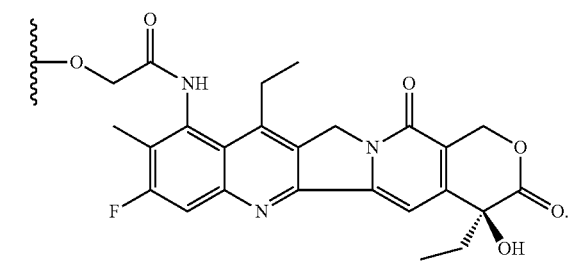
In embodiments, D-L$_1$-L$_2$-Q′— is:
(P4′)
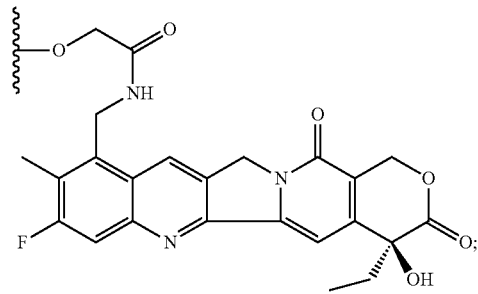
(P1′)
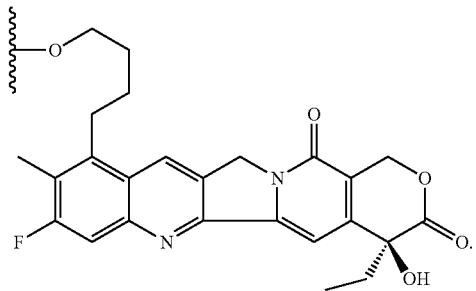
In embodiments, D-L$_1$-L$_2$-Q′—CH$_2$—NH-E-Z′— is formed from one of the following structures,
(PL1)
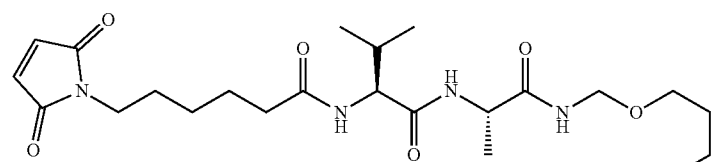
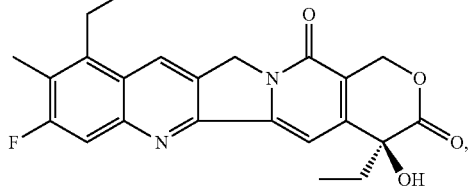

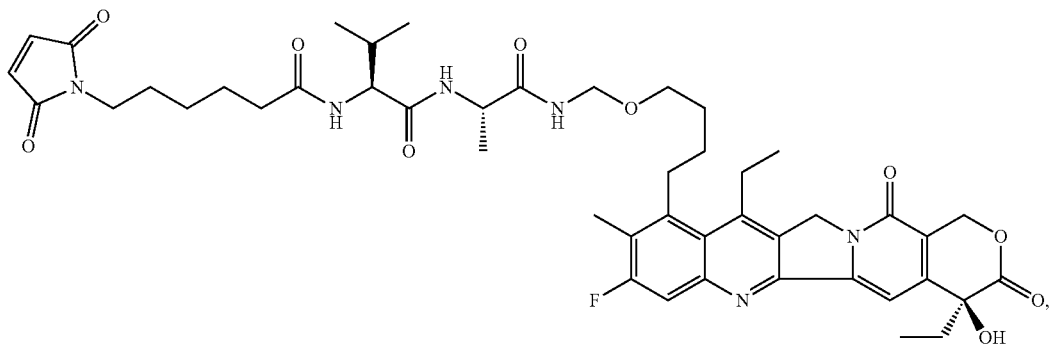
(PL2)
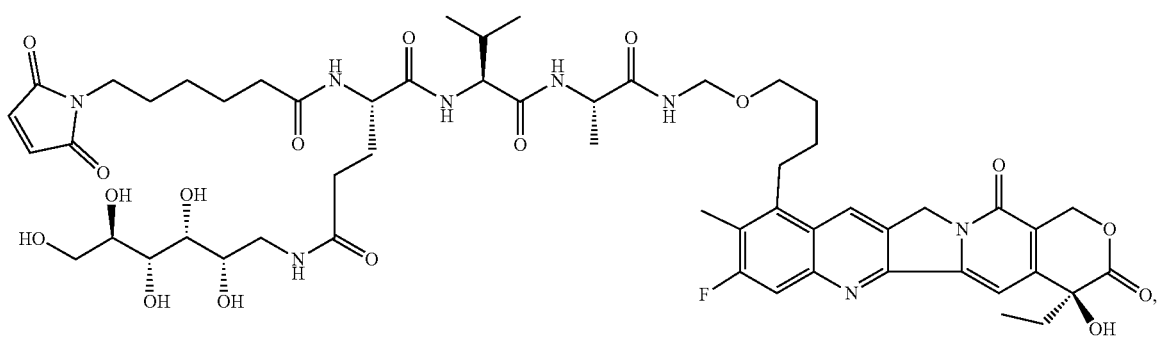
(PL3)
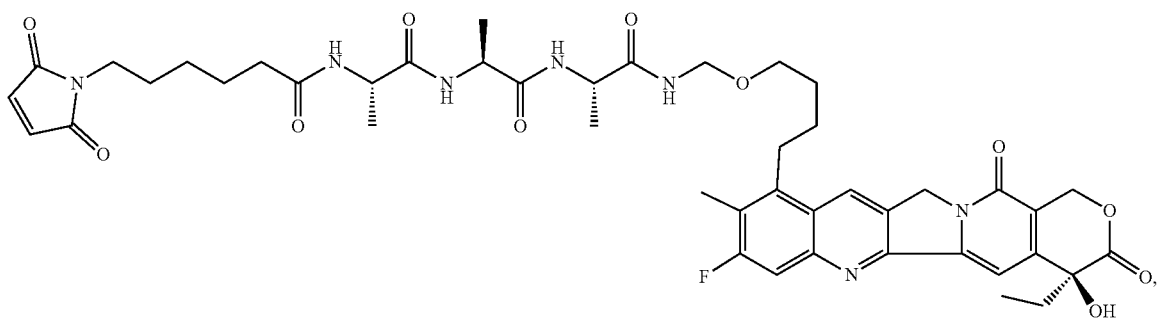
(PL4)
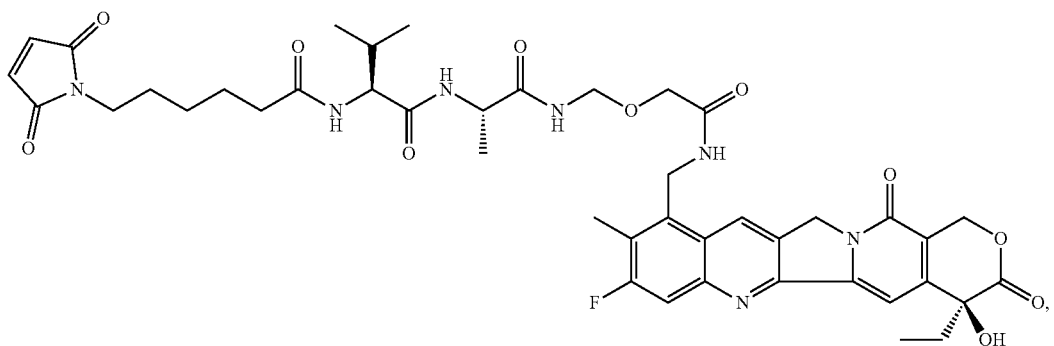
(PL5)

-continued
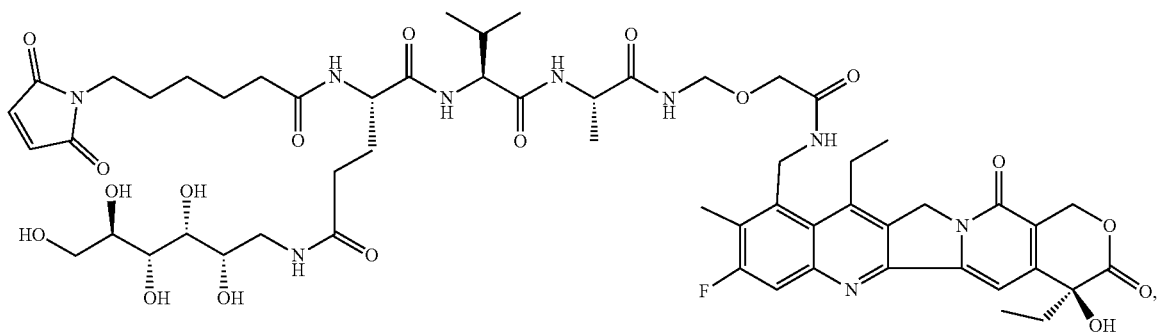
(PL6)
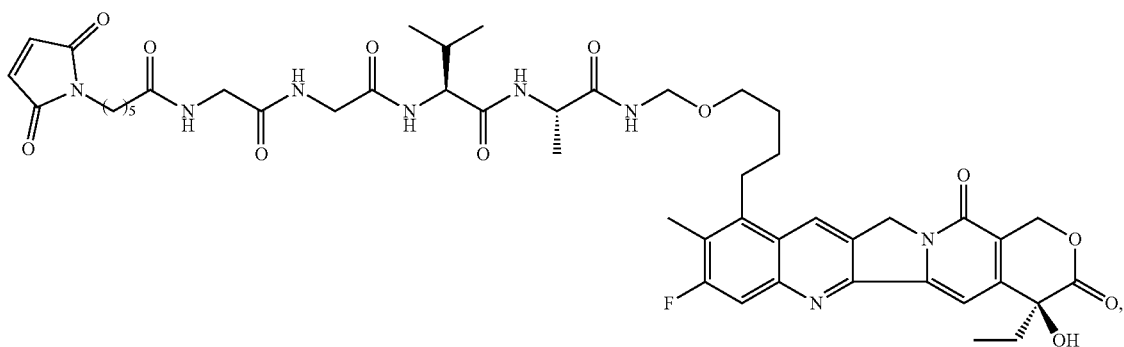
(PL7)
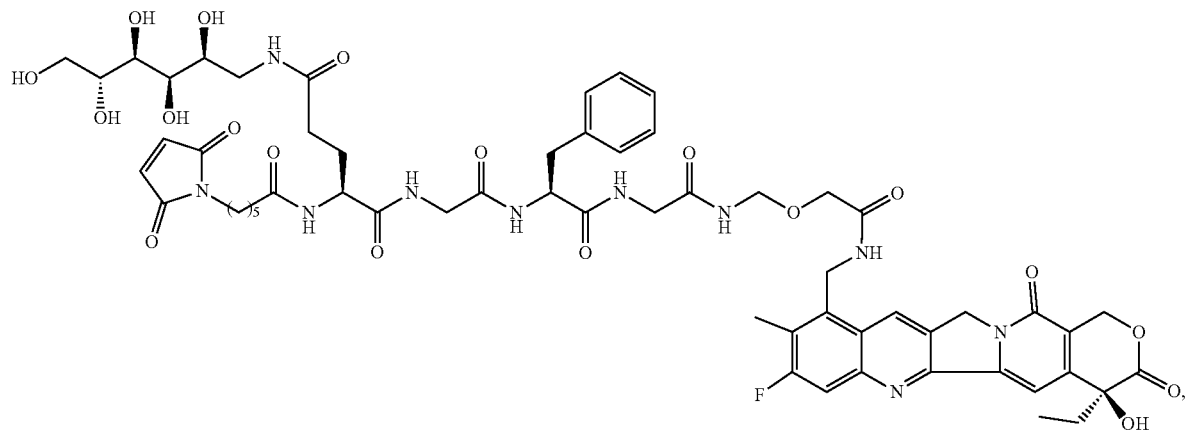
(PL8)
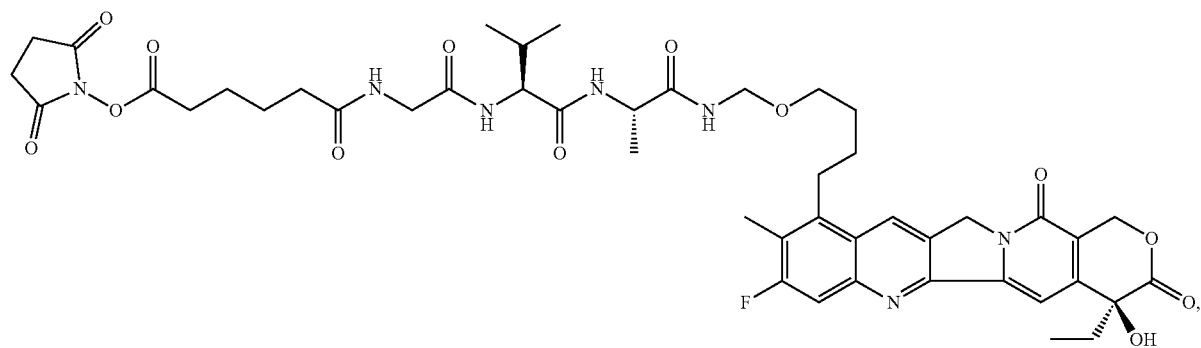
(PL9)

(PL10)
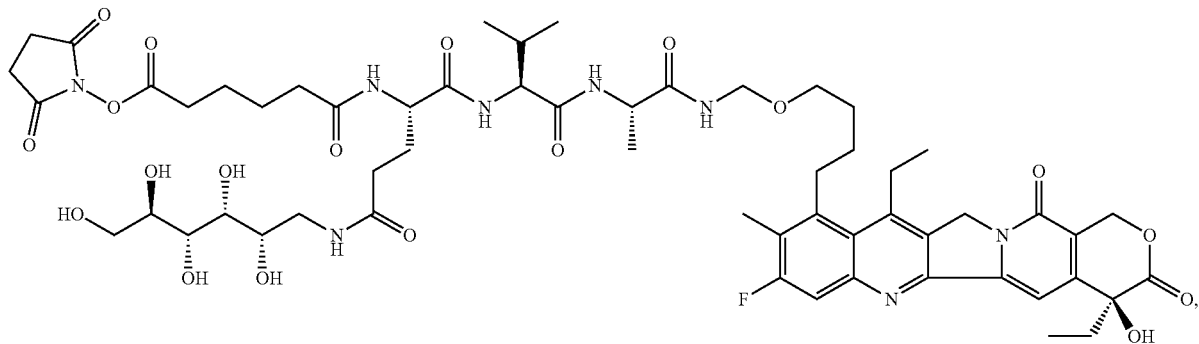
(PL11)
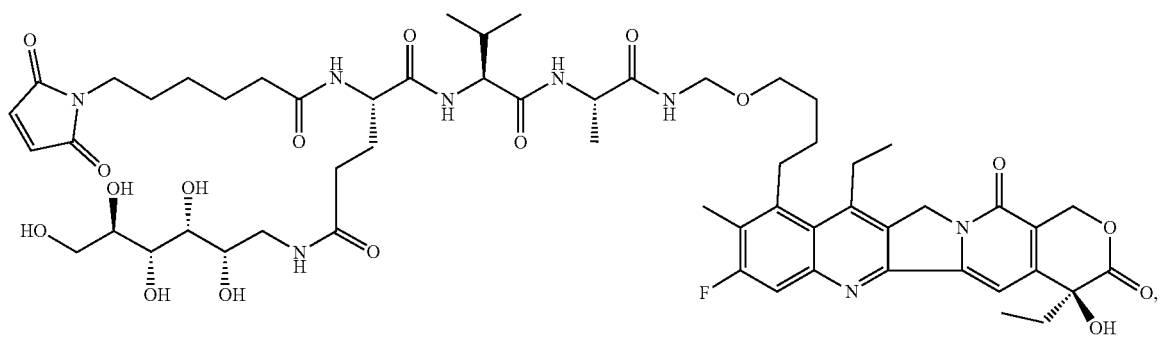
(PL12)
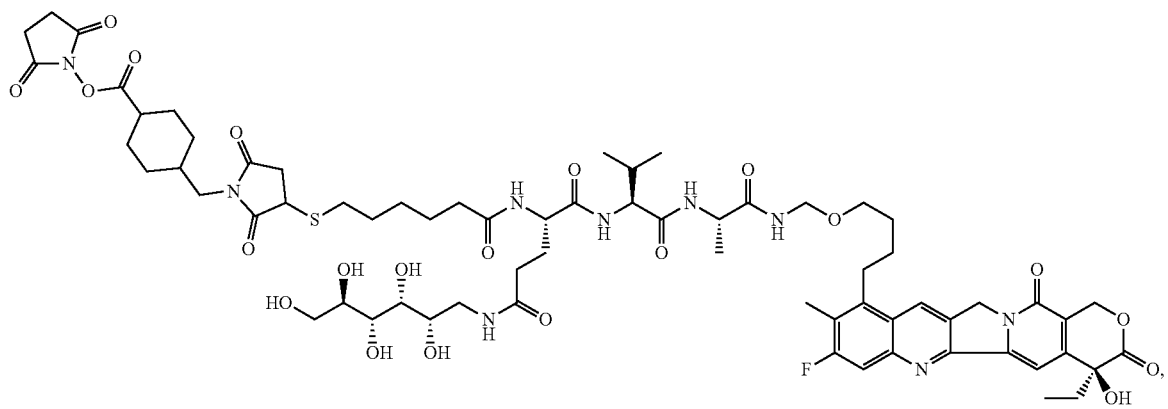
(PL13)
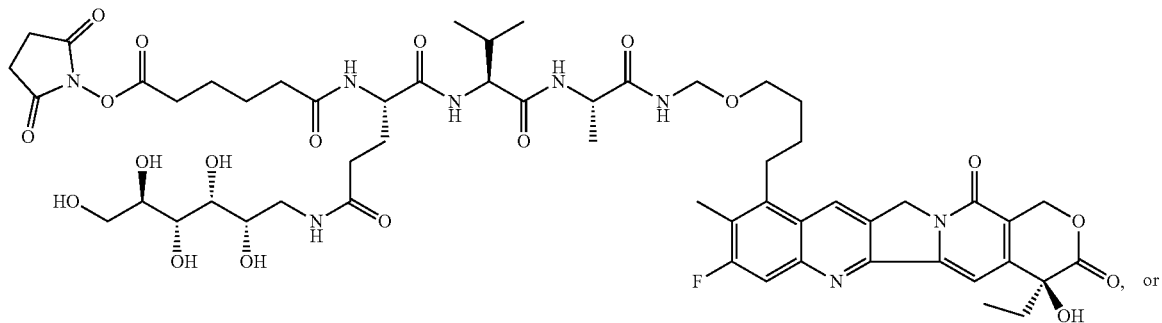
or

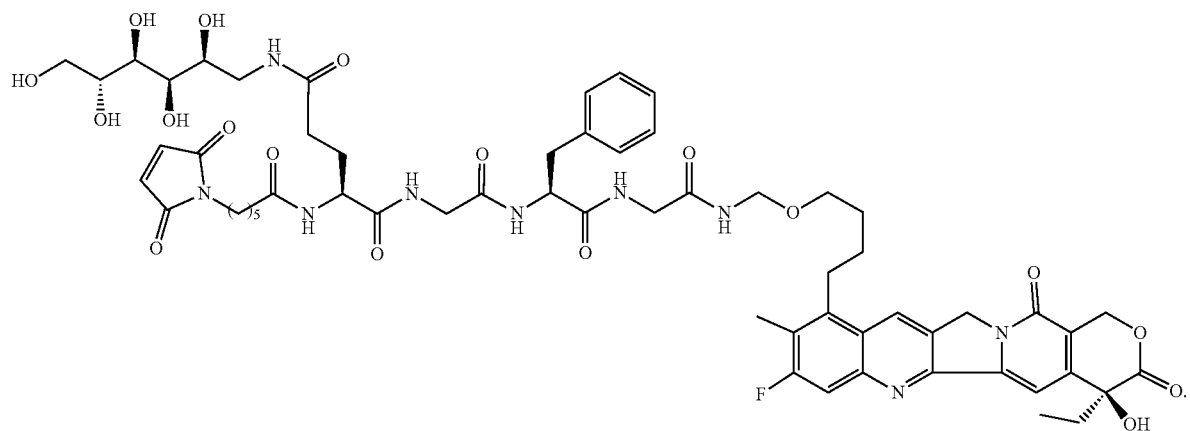
(PL14)
In embodiments, D-L$_1$-L$_2$-Q'—CH$_2$—NH-E-Z'— is formed from MB-2,
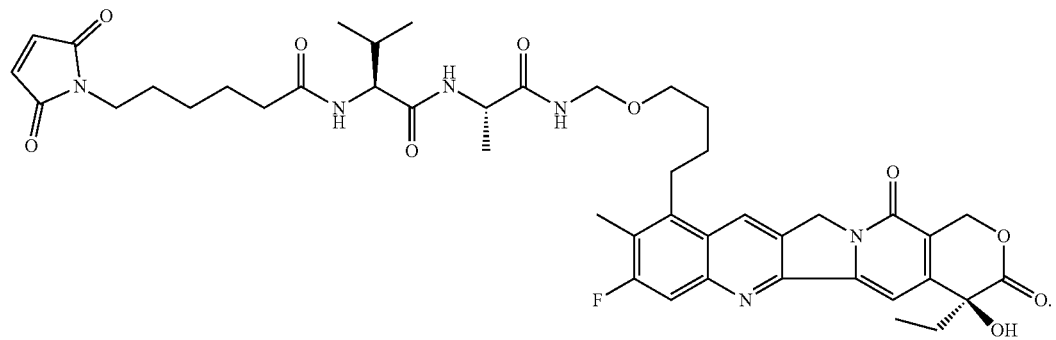
(PL1)
MB-2
In embodiments, D-L$_1$-L$_2$-Q'—CH$_2$—NH-E-Z'— is formed from MB-3 (meditecan),
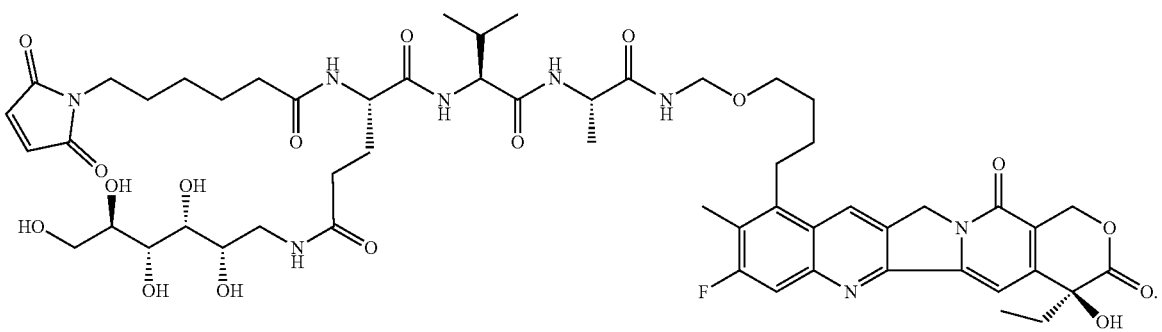
(PL3)
MB-3
(meditecan)

In embodiments, {D-L$_1$-L$_2$-Q'—CH$_2$—NH-E-Z'}$_p$—C is one of the following structures, wherein C is a monoclonal antibody and p is the drug to antibody ratio (DAR) and p is a average number ranging from about 2-10, 4-8, or 7-8 (e.g., 3.2 to 8.0),
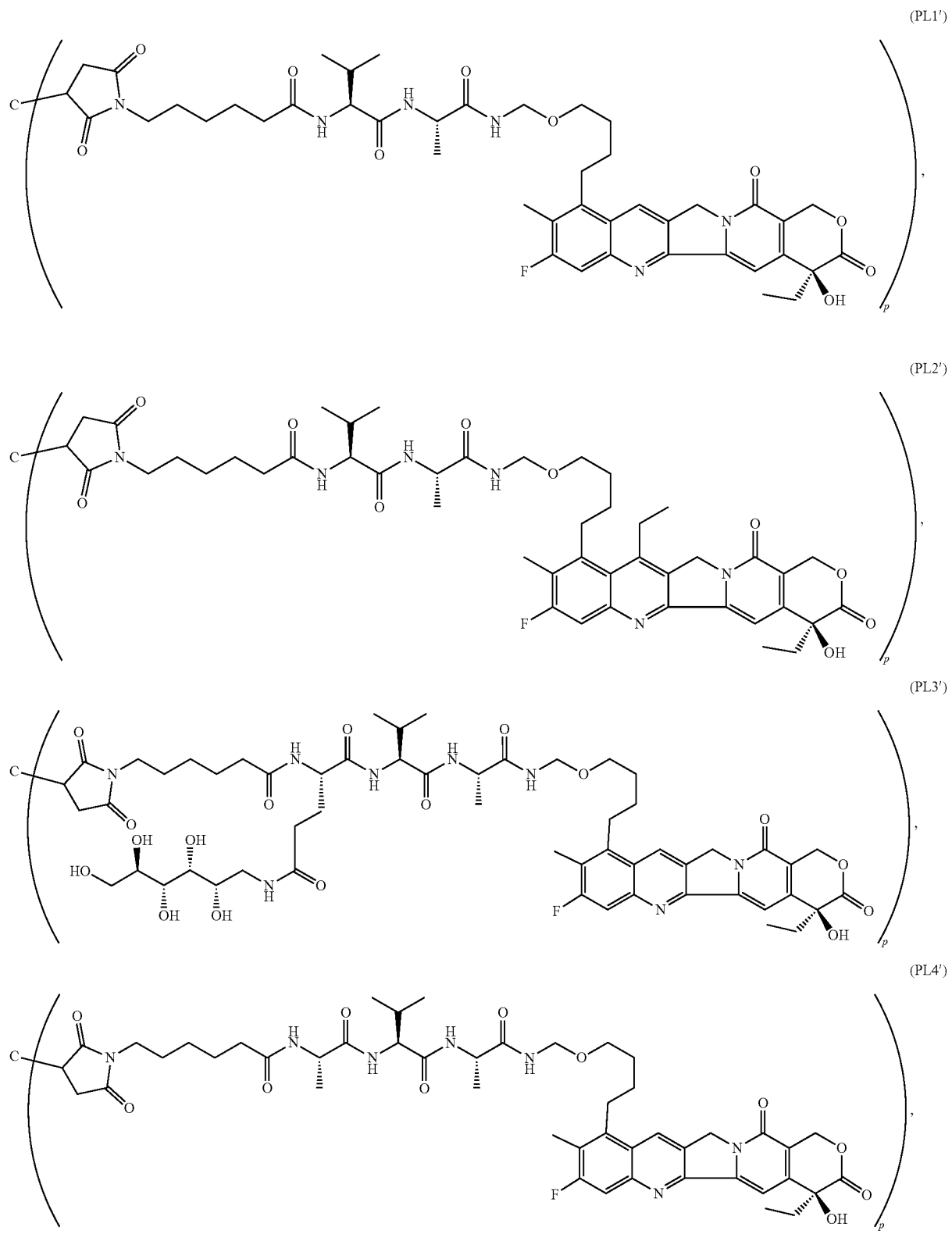

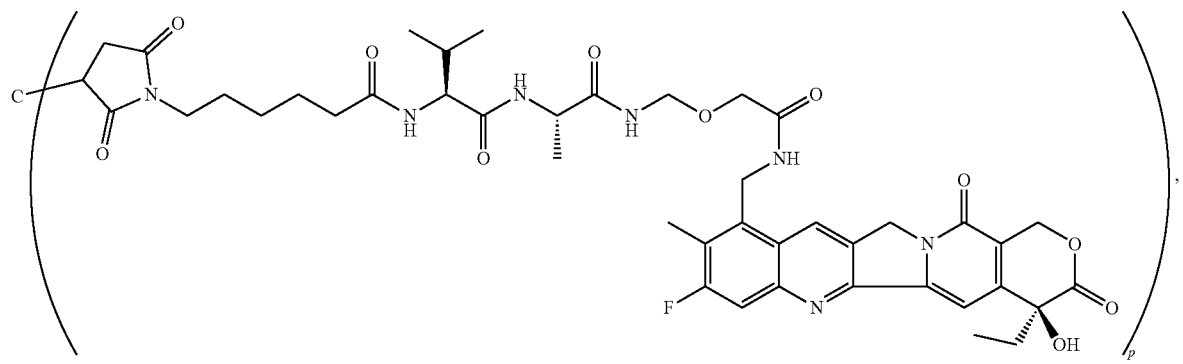
(PL5')
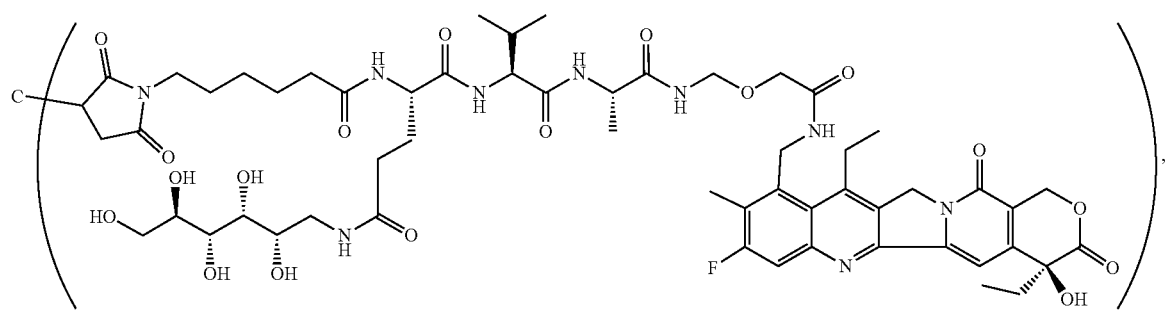
(PL6')
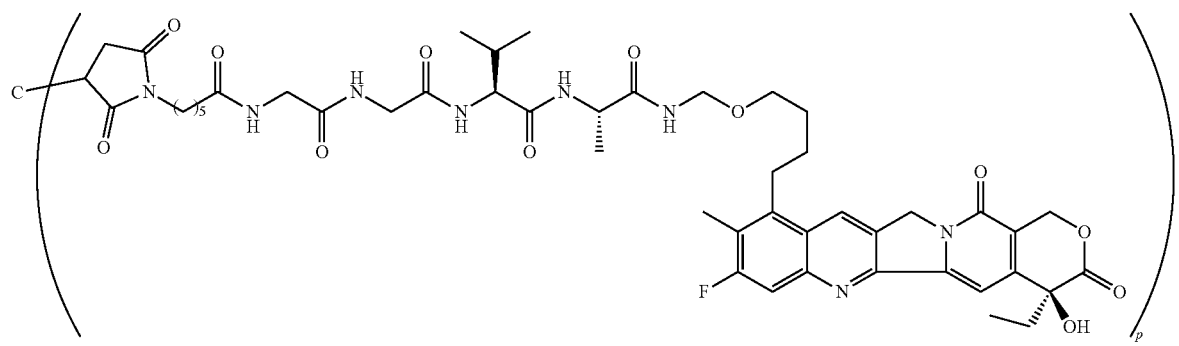
(PL7')
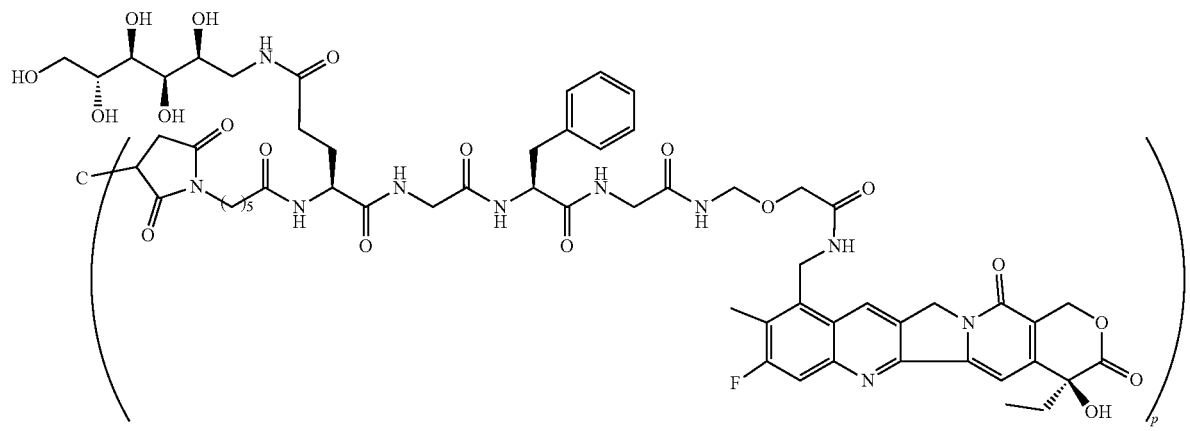
(PL8')

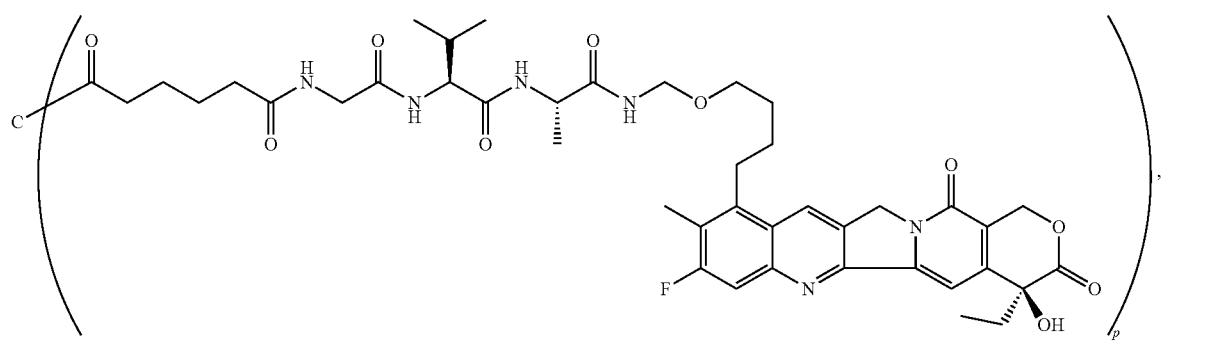
(PL9′)
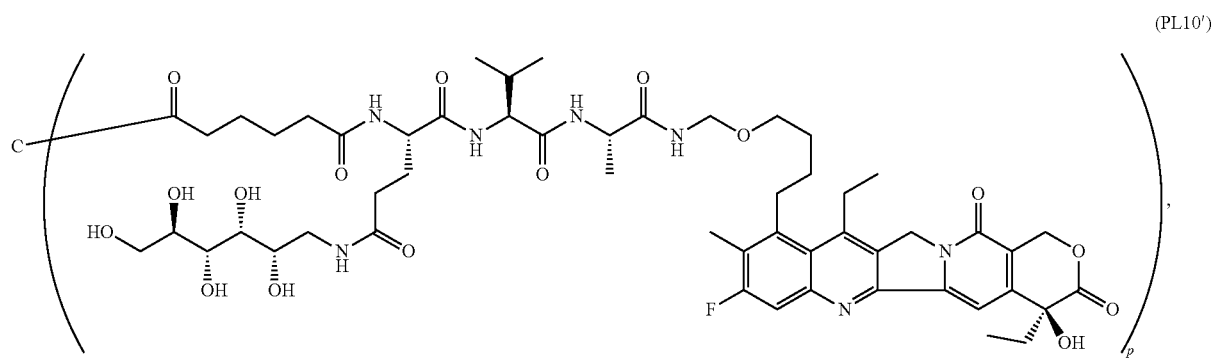
(PL10′)
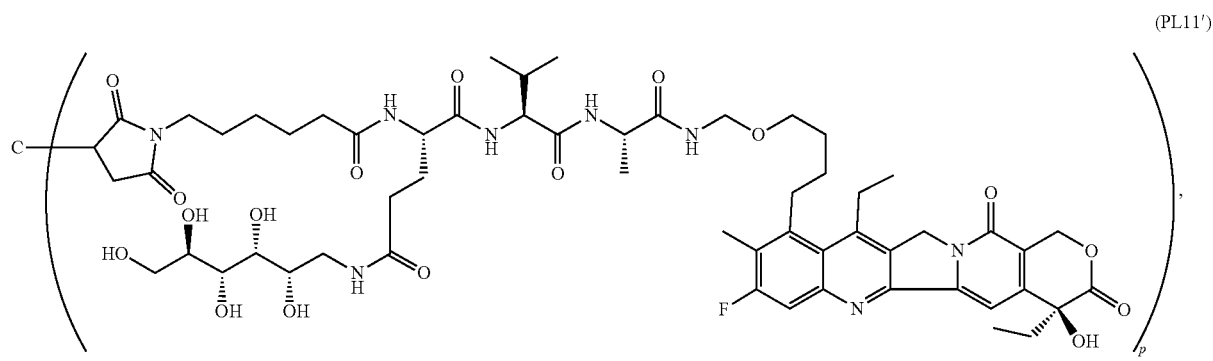
(PL11′)
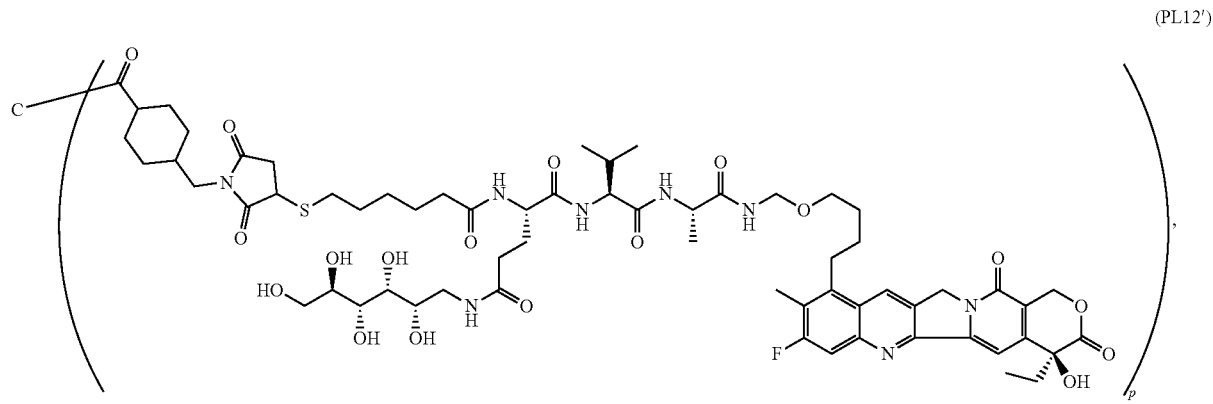
(PL12′)

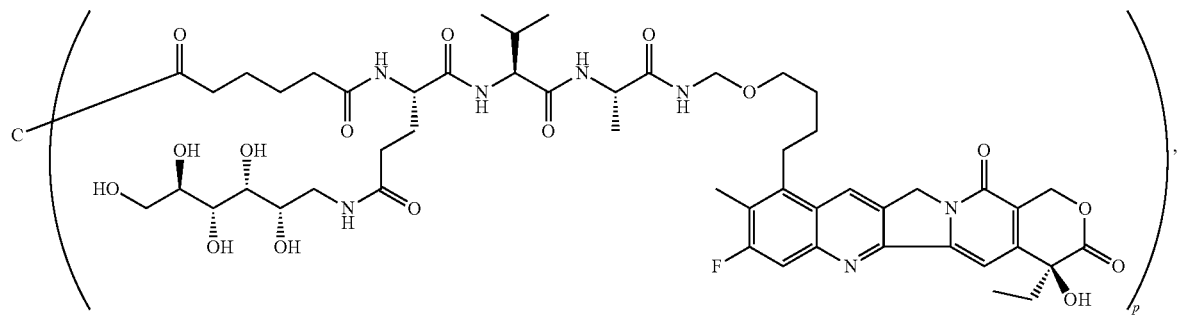
(PL13')
or
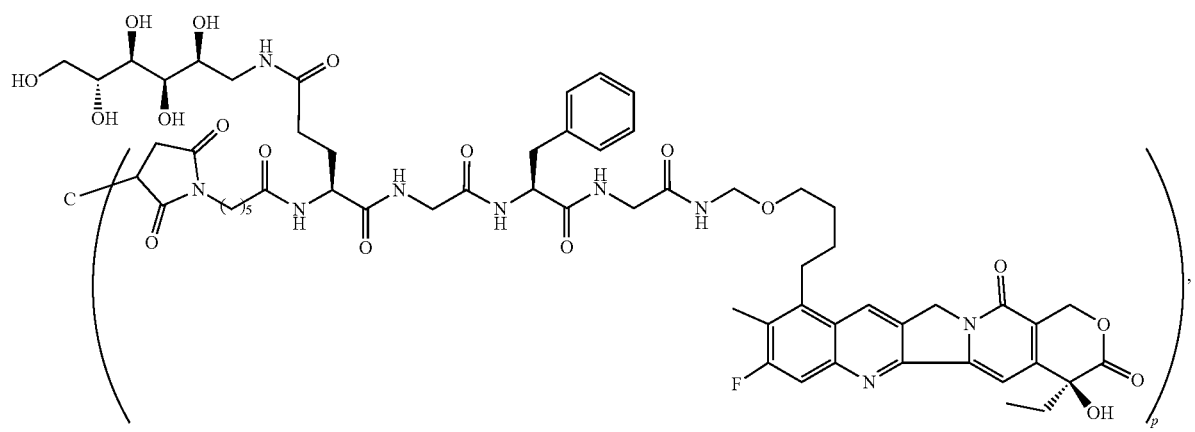
(PL14')
In embodiments, $\{D\text{-}L_1\text{-}L_2\text{-}Q'\text{—}CH_2\text{—}NH\text{-}E\text{-}Z'\}_p\text{—}C$ is
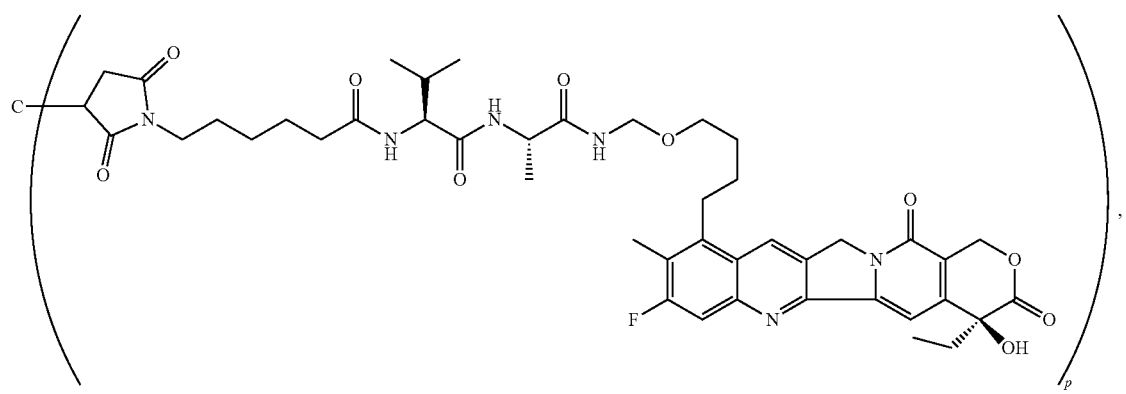
(PL1')
wherein C is a monoclonal antibody and p is the drug to antibody ratio (DAR). In embodiments, p is a average number ranging from about 2-10, 4-8, or 7-8 (e.g., 3.2 to 8.0).

In embodiments, {D-L$_1$-L$_2$-Q'—CH$_2$—NH-E-Z'}$_p$—C is

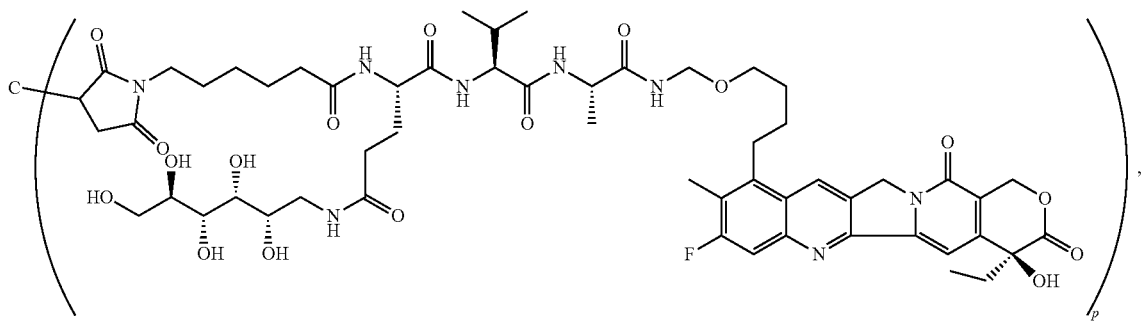

(PL3')

wherein C is a monoclonal antibody and p is the drug to antibody ratio (DAR). In embodiments, p is a average number ranging from about 2-10, 4-8, or 7-8 (e.g., 3.2 to 8.0).

In embodiments, C is an anti-HER2 antibody.
In embodiments, C is trastuzumab (Herceptin).
In embodiments, C is trastuzumab-dkst (Ogivri).
In embodiments, C is trastuzumab-pkrb (Herzuma).
In embodiments, C is trastuzumab-dttb (Ontruzant).
In embodiments, C is trastuzumab-qyyp (Trazimera).
In embodiments, C is trastuzumab-anns (Kanjinti).
In embodiments, {D-L$_1$-L$_2$-Q'—CH$_2$—NH-E-Z'}$_p$—C is MB-2a,

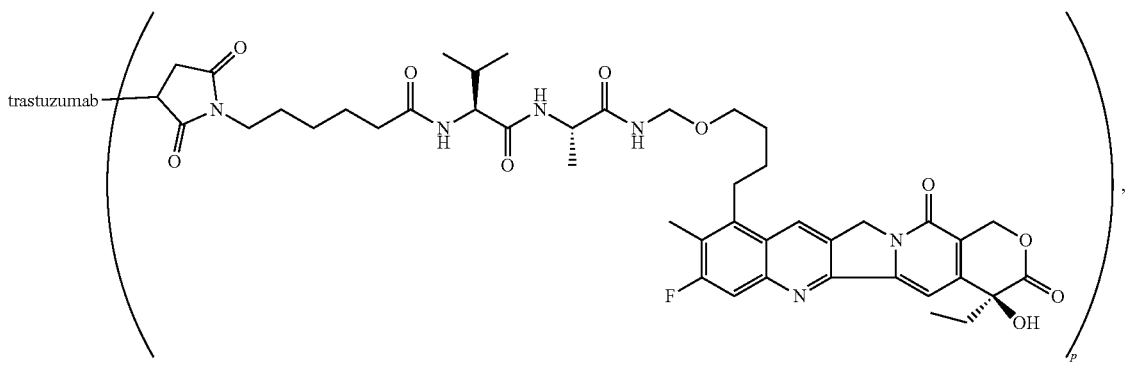

MB-2a wherein p is the drug to antibody ratio (DAR). In embodiments, p is a average number ranging from about 4-8 or 7-8 (e.g., 7.9).

In embodiments, {D-L$_1$-L$_2$-Q'—CH$_2$—NH-E-Z'}$_p$—C is MB-3a (trastuzumab meditecan),

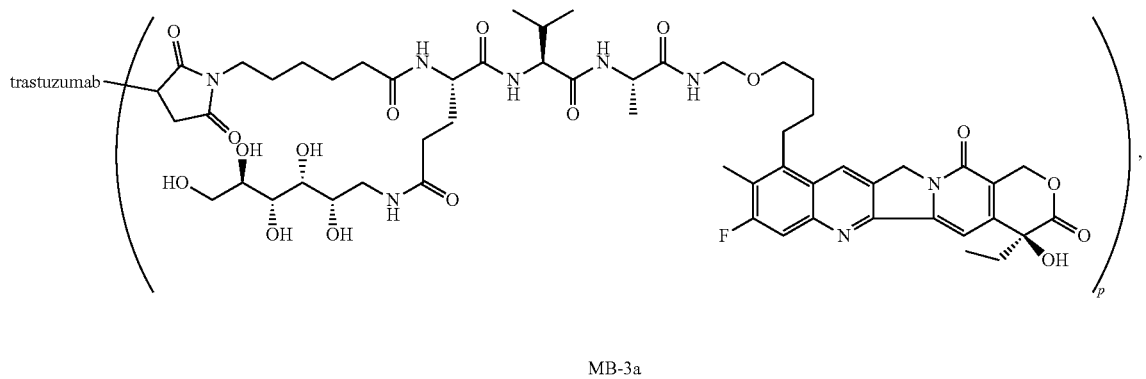

MB-3a wherein p is the drug to antibody ratio (DAR). In embodiments, p is a average number ranging from about 4-8 or 7-8 or p is 8.

Conjugates described herein (e.g., any compound according to Formula PL-A' or Formula PL-A such as MB-2a and MB-3a) can comprise covalent attachments at least camptothecin derivative.

In embodiments, the subscript p represents the number of camptothecin payload moieties on a cell binding agent on a cell binding agent and has a value from 1 to 18, 1 to 12, or 1 to 8. Individual camptothecin conjugates can also be referred to as a camptothecin conjugate compound. In embodiments herein, there can be 1, 2, 3, 4, 5, 6, 7, 8, 9, 10, 11, 12, 13, 14, 15, 16, 17, or 18 camptothecin payload moieties conjugated to a cell binding agent of an individual camptothecin conjugate.

In embodiments, a population of individual camptothecin conjugates substantially identical except for the number of camptothecin payload moieties bound to each cell binding agent (i.e., a camptothecin conjugate composition) so that p represents the average number of camptothecin payload moieties bound to the cell binding agents of the camptothecin conjugate composition. In that group of embodiments, p is a average number ranging from 1 to about 18, 1 to about 10, or 1 to about 8, from 2 to about 6, 3 to about 5, or 6 to about 8. In embodiments, p is a average number ranging from about 2-10, 4-8, or 7-8 (e.g., 3.2 to 8.0). In embodiments, p is about 2. In embodiments, p is about 4. In embodiments, p is about 6. In embodiments, p is about 8. In embodiments, p is about 10. In embodiments, p is about 12. In embodiments, p is 2. In embodiments, p is 4. In embodiments, p is 8. In embodiments, p has a value from 3 to 4. In embodiments, p has a value from 4 to 5. In embodiments, p has a value from 5 to 6. In embodiments, p has a value from 6 to 7. In embodiments, p has a value from 7 to 8. In embodiments, p has a value from 7.4 to 8. In embodiments, the p value refers to the average drug loading as well as the drug loading of the predominate ADC in the composition.

In embodiments, conjugation (e.g., as found in any compound according to Formula PL-A' or Formula PL-A such as MB-2a or MB-3a as described herein) will be via the reduced interchain disulfides and can be from about 1 to about 8, or from 3 to 5, or from 6 to 8 camptothecin payload compounds conjugated to a cell binding agent.

In embodiments, conjugation (e.g., as found in any compound according to Formula PL-A' or Formula PL-A such as MB-2a or MB-3a as described herein) will be via an introduced cysteine residue as well as the reduced interchain disulfides and there can be from 1 to 8, or 1 to 10, or 1 to 12, or 1 to 18 camptothecin payload compounds conjugated to a cell binding agent.

In embodiments, conjugation (e.g., as found in any compound according to Formula PL-A' or Formula PL-A such as MB-2a or MB-3a as described herein) will be via an introduced cysteine residue and there will be 2, or 3, or 4, or 5, or 6, or 7, or 8 camptothecin payload compounds conjugated to a cell binding agent.

In embodiments, conjugation (e.g., as found in any compound according to Formula PL-A' or Formula PL-A such as MB-2a or MB-3a as described herein) will be via an lysine residue and there can be from 1 to 10, or 1 to 12, or 1 to 14, or 1 to 18 camptothecin payload compounds conjugated to a cell binding agent.

Reactive Groups on Cell Binding Agent for Covalent Attachment

In embodiments a cell binding agent is bonded to a peptide releasable linker to form conjugates such as those according to Formula PL-A' or Formula PL-A (e.g., MB-2a or MB-3a). As noted above, still other linking components can be present in the conjugates described herein to serve the purpose of providing additional space between the camptothecin compound and the cell binding agent. In embodiments, the cell binding agent is bonded to the linker unit in via a heteroatom of the cell binding agent.

Heteroatoms that may be present on a cell binding agent for that bonding include sulfur (in one embodiment, from a thiol group of a targeting ligand), oxygen (in one embodiment, from a carboxyl or hydroxyl group of a targeting ligand) and nitrogen, optionally substituted (in one embodiment, from a primary or secondary amine functional group of a targeting ligand or in another embodiment from an optionally substituted amide nitrogen). Those heteroatoms can be present on the targeting ligand in the cell binding agent's natural state, for example in a naturally-occurring antibody, or can be introduced into the targeting ligand via chemical modification or biological engineering.

In one embodiment, a cell binding agent has a thiol functional group so that the cell binding agent is bonded to a camptothecin payload compound via the sulfur atom of the thiol functional group.

In another embodiment, a cell binding agent has one or more lysine residues that are capable of reacting with activated esters (such esters include, but are not limited to, N-hydroxysuccimide, pentafluorophenyl, and p-nitrophenyl esters) of a camptothecin payload compound and thus provides an amide bond consisting of the nitrogen atom of the cell binding agent and the C=O group of a compound.

In yet another aspect, a cell binding agent has one or more lysine residues capable of chemical modification to introduce one or more thiol groups. In those embodiments, the cell binding agent is covalently attached to the camptothecin payload compound via the thiol functional group's sulfur atom. The reagents that can be used to modify lysines in that manner include, but are not limited to, N-succinimidyl S-acetylthioacetate (SATA) and 2-iminothiolane hydrochloride (Traut's Reagent).

In another embodiment, a cell binding agent has one or more carbohydrate groups capable of modification to provide one or more thiol functional groups. The chemically modified cell binding agent in a camptothecin conjugate is bonded to a camptothecin payload compound via the sulfur atom of the thiol functional group.

In yet another embodiment, the cell binding agent has one or more carbohydrate groups that can be oxidized to provide an aldehyde (—CHO) functional group (see, e.g., Laguzza, et al., 1989, *J. Med. Chem.* 32(3):548-55). In these embodiments, the corresponding aldehyde interacts with a reactive site on a camptothecin payload compound to form a bond between the camptothecin payload compound and the cell binding agent. Reactive sites on a camptothecin payload compound that is capable of interacting with a reactive carbonyl-containing functional group on a targeting ligand include, but are not limited to, hydrazine and hydroxylamine.

In some aspects, a cell binding agent is capable of forming a bond by interacting with a reactive functional group Y to form a covalent bond between the Y' in Formula PL-A' and the cell binding agent corresponding to the targeting ligand. The functional group Y having that capability for interacting with a targeting ligand will depend on the nature of the cell binding agent. In embodiments, the reactive group is a maleimide that is present on a camptothecin payload compound prior to its attachment to form a cell binding agent. Covalent attachment of a cell binding agent to a camptothecin payload compound is accomplished through a thiol functional group of a cell binding agent interacting with the maleimide functional group Y of a payload compound to form a thio-substituted succinimide. The thiol functional group can be present on the cell binding agent in the cell binding agent's natural state, for example, in a naturally-occurring residue, or can be introduced into the cell binding agent via chemical modification or by biological engineering.

In still another embodiment, the cell binding agent is an antibody and the thiol group is generated by reduction of an interchain disulfide of the antibody. Accordingly, In embodiments, the camptothecin payload compound is conjugated to a cysteine residue from reduced interchain disulfide(s).

In yet another embodiment, the cell binding agent is an antibody and the thiol functional group is chemically introduced into the antibody, for example, by introduction of a cysteine residue. Accordingly, in embodiments, the camptothecin payload compound is conjugated to a cell binding agent through an introduced cysteine residue of a cell binding agent.

It has been observed for bioconjugates that the site of drug conjugation can affect a number of parameters including ease of conjugation, drug-linker stability, effects on biophysical properties of the resulting bioconjugates, and in-vitro cytotoxicity. With respect to drug-linker stability, the site of conjugation of a drug-linker moiety to a cell binding agent can affect the ability of the conjugated drug-linker moiety to undergo an elimination reaction, in some instances, to cause premature release of free drug. Sites for conjugation on a targeting ligand include, for example, a reduced interchain disulfide as well as selected cysteine residues at engineered sites. In embodiments conjugation methods to form camptothecin conjugates as described herein use thiol residues at genetically engineered sites that are less susceptible to the elimination reaction (e.g., positions 239 according to the EU index as set forth in Kabat) in comparison to conjugation methods that use thiol residues from a reduced disulfide bond. In other embodiments conjugation methods to form camptothecin conjugates as described herein use thiol residues at sites that are more susceptible to the elimination reaction (e.g. resulting from interchain disulfide reduction).

Methods of Synthesis

Exemplary synthetic methods are described herein. Still other exemplary synthetic methods include those described in U.S. Provisional Application No. 62/981,197, which is hereby incorporated by reference in its entirety as well as methods known in the art.

In embodiments, Scheme 1 provides an exemplary synthetic method for described compound MB-1 (hydrotecan, 海洛替康) (P1).

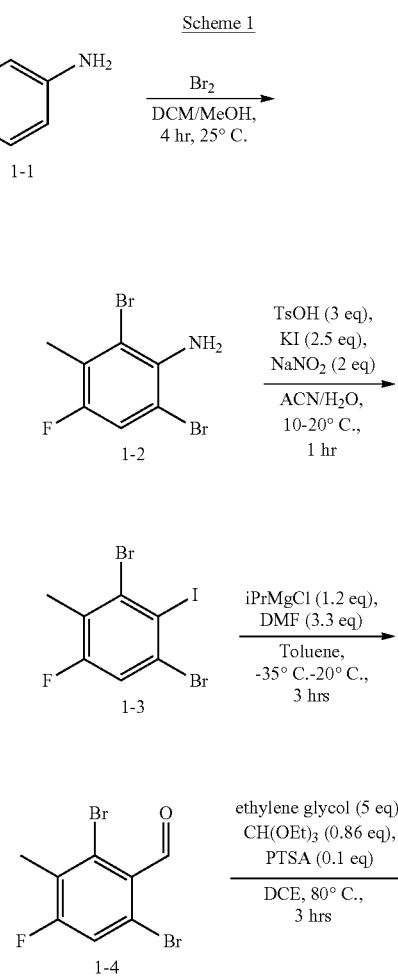

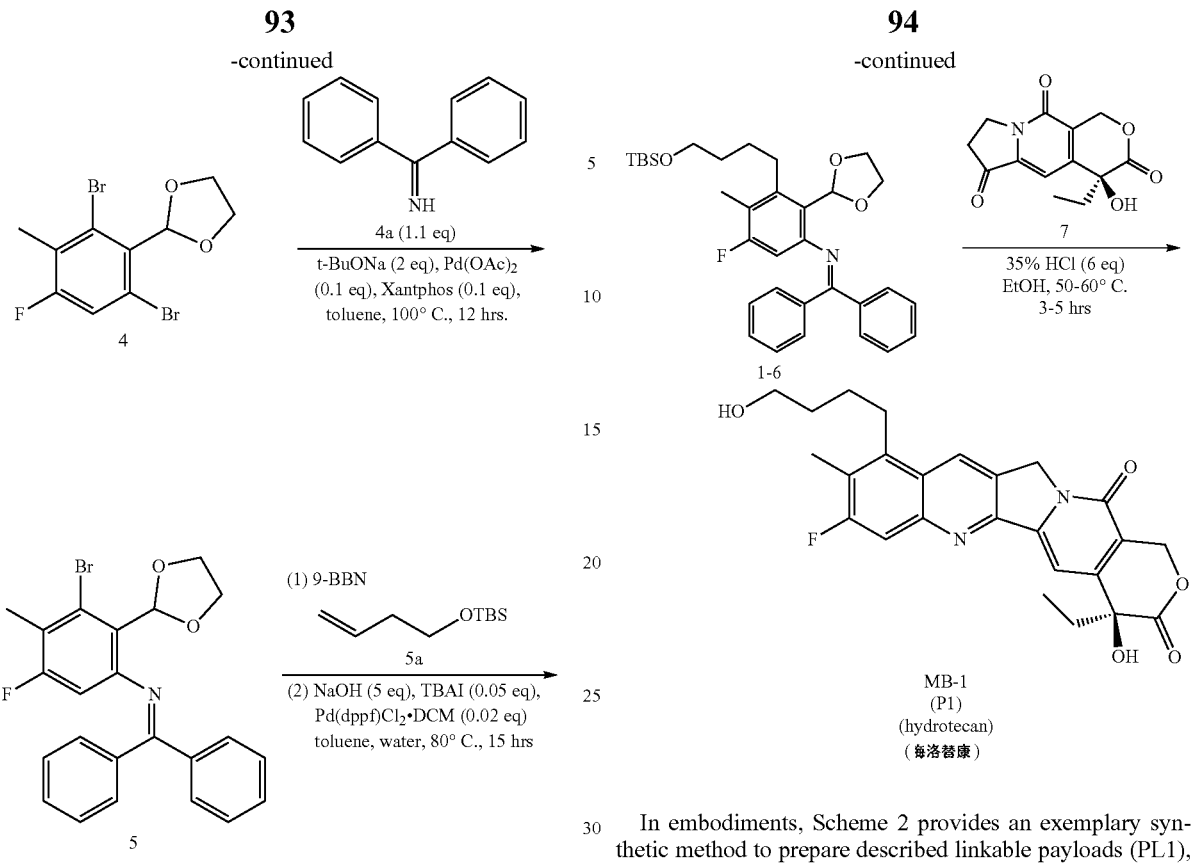
In embodiments, Scheme 2 provides an exemplary synthetic method to prepare described linkable payloads (PL1), (PL2), (PL4) and (PL7):
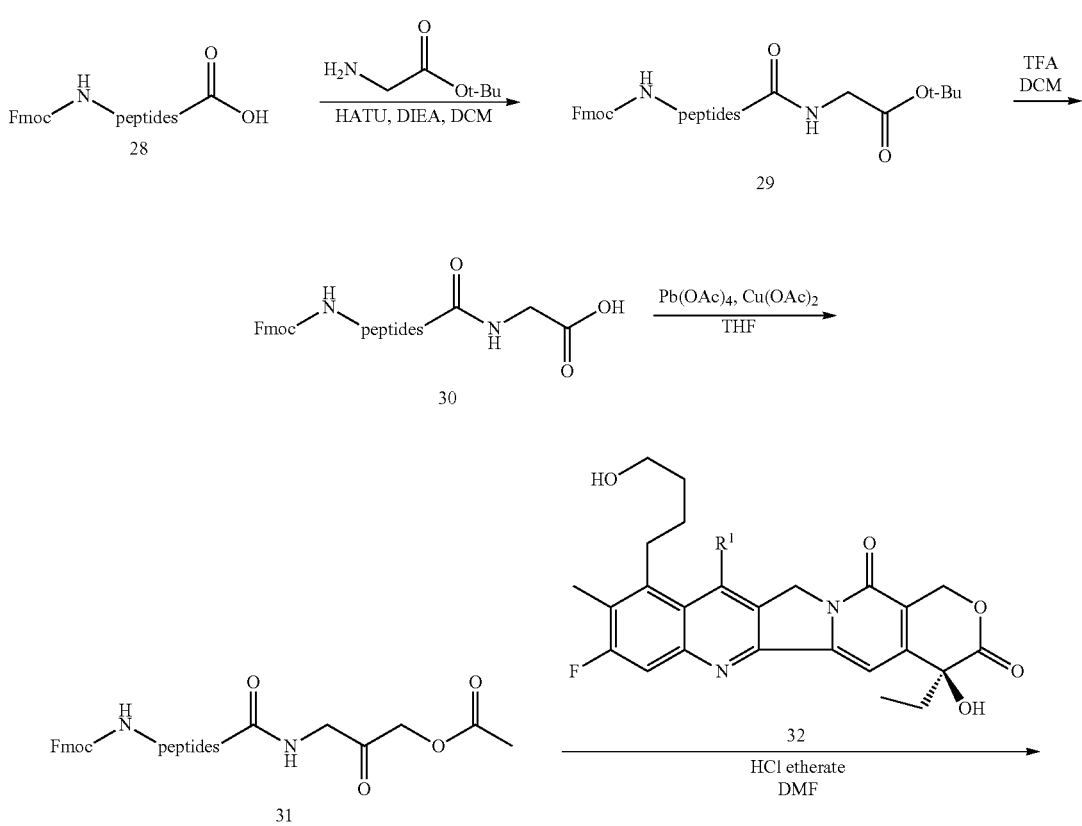

-continued
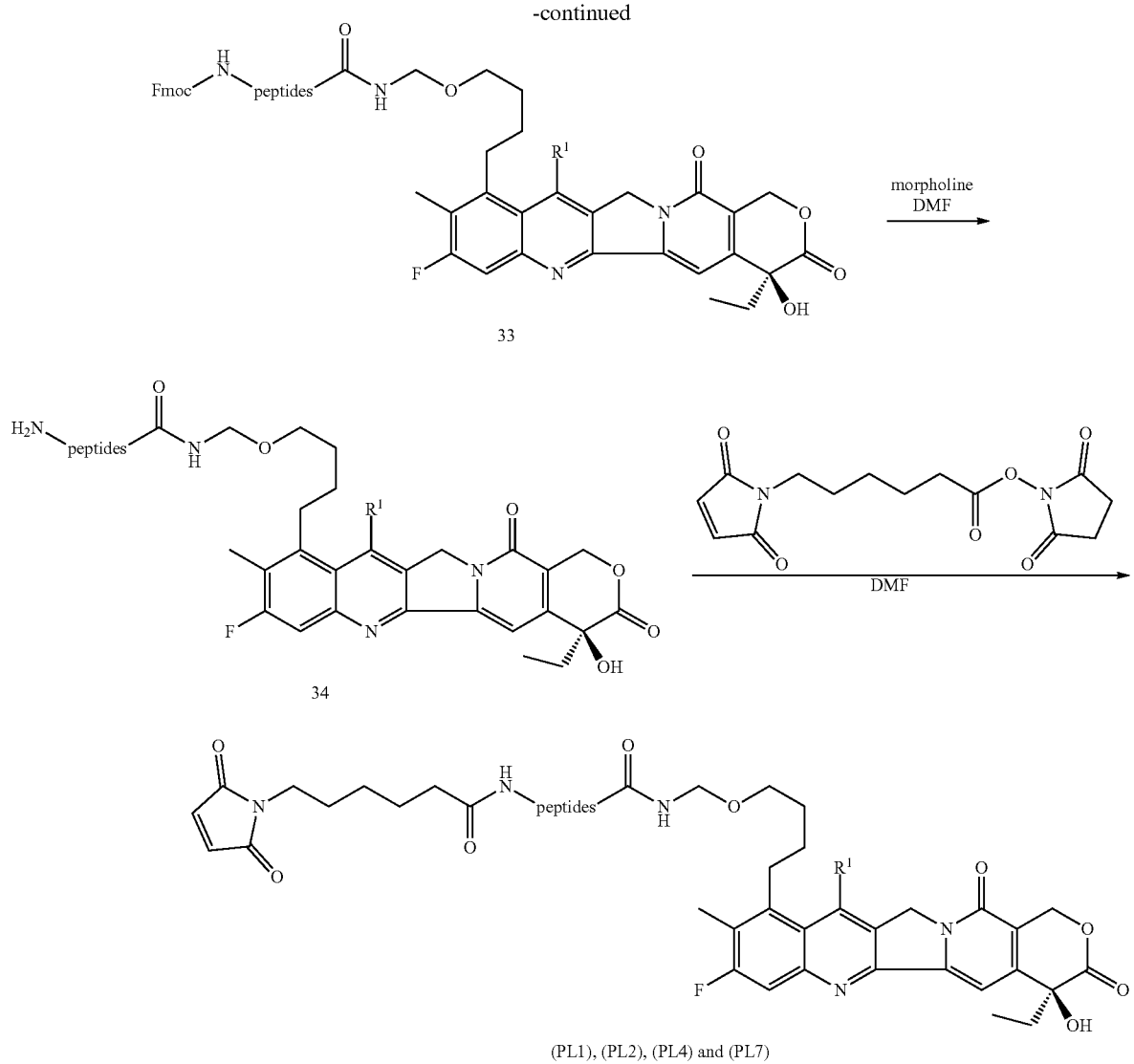
(PL1), (PL2), (PL4) and (PL7)
In embodiments, Scheme 3 provides an exemplary synthetic method for described compound MB-2 (PL1):
Scheme 3
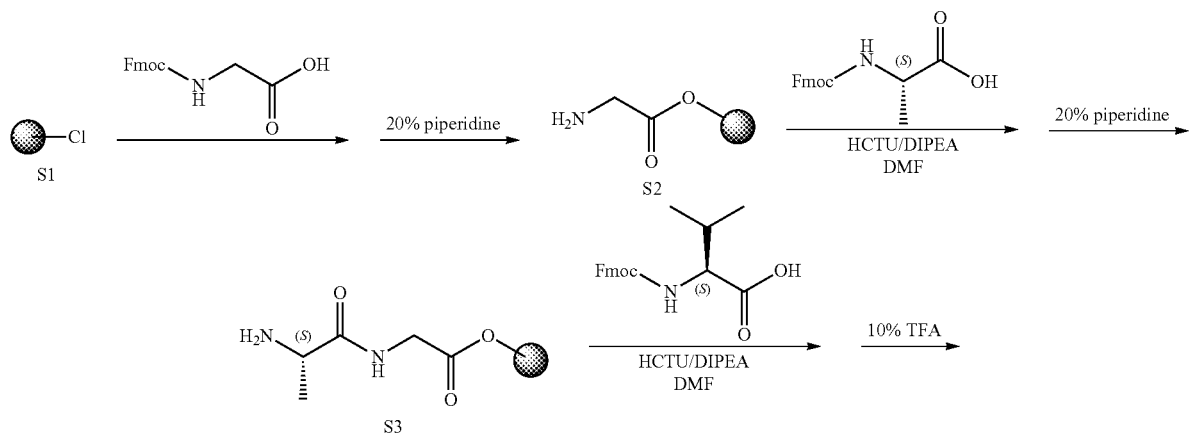

97
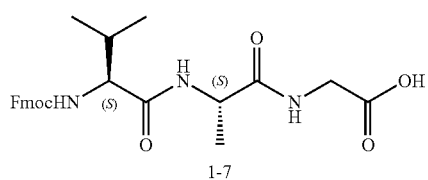
1-7
-continued
Pb(OAc)$_4$
Pyridine
Cu(OAc)$_2$
THF/Toluene (4:1)
50-60° C., 2 hrs
98
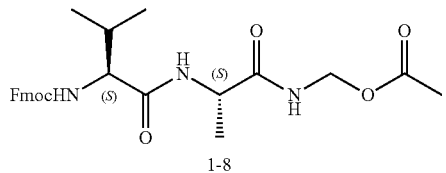
1-8
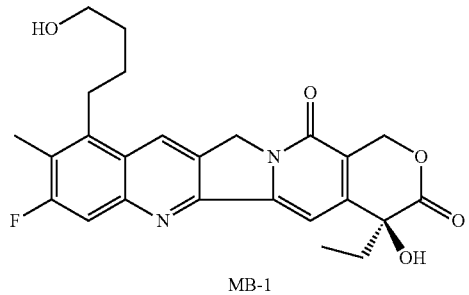
MB-1
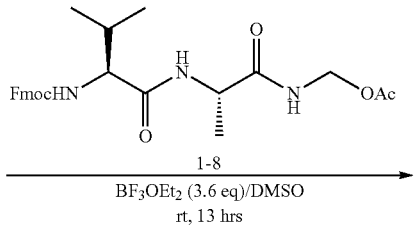
1-8
BF$_3$OEt$_2$ (3.6 eq)/DMSO
rt, 13 hrs
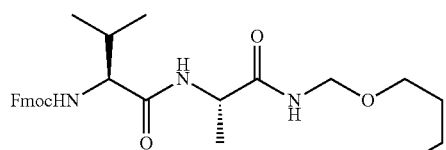
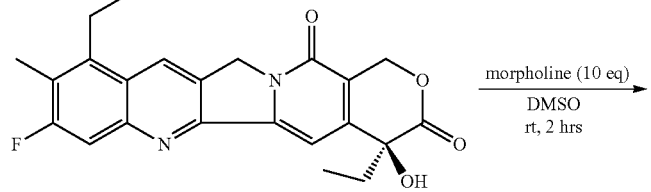
1-9
morpholine (10 eq)
DMSO
rt, 2 hrs
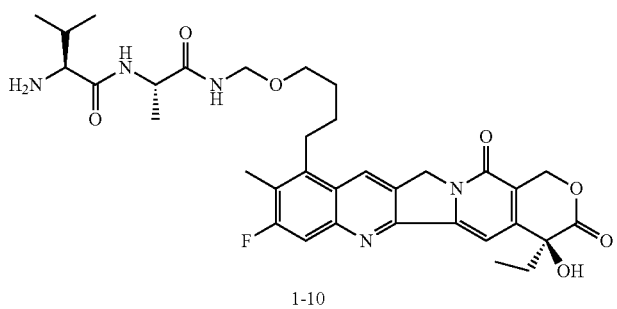
1-10
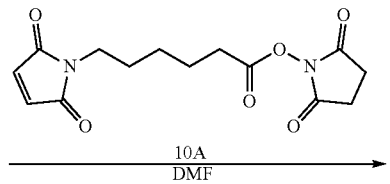
10A
DMF
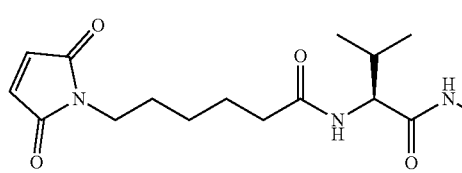
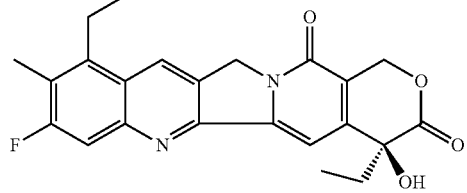
(PL1)
MB-2

In embodiments, Scheme 4 provides an exemplary synthetic method for described compound MB-3 (meditecan, 美迪梽康) (PL3):
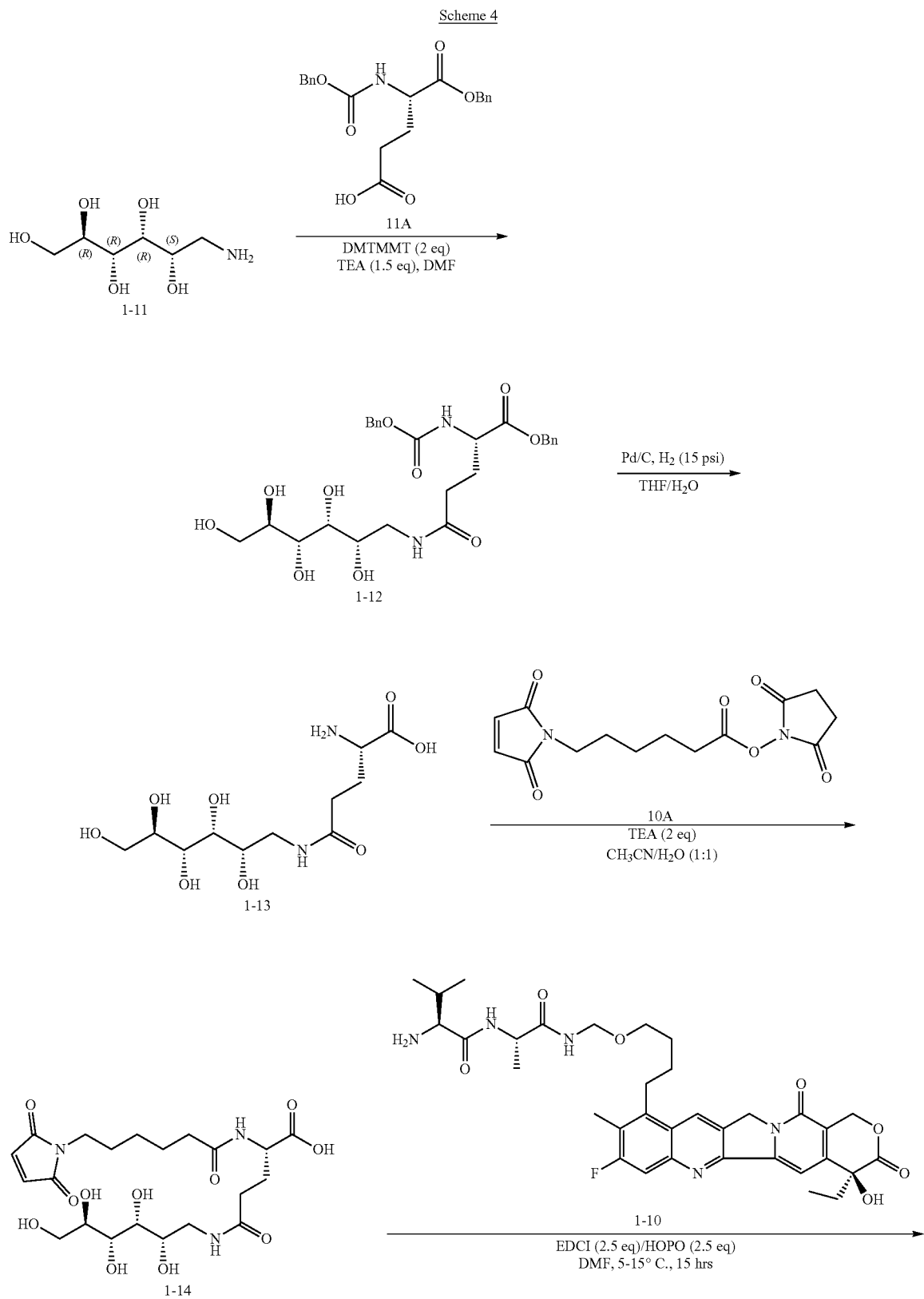

-continued

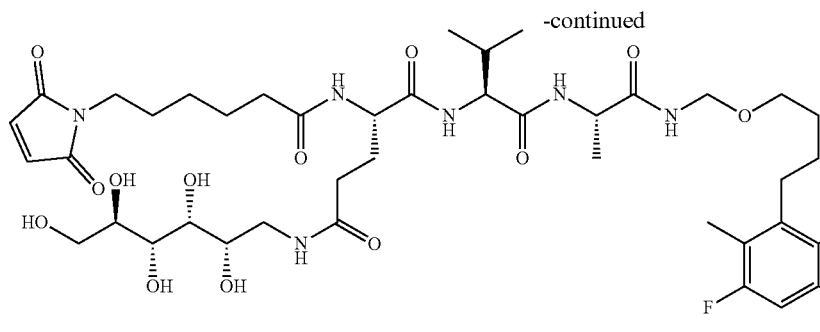

(PL3)
MB-3
(meditacan)
(美迪替康)

In embodiments, Scheme 5 provides an exemplary general method to prepare the conjugate (PL'):

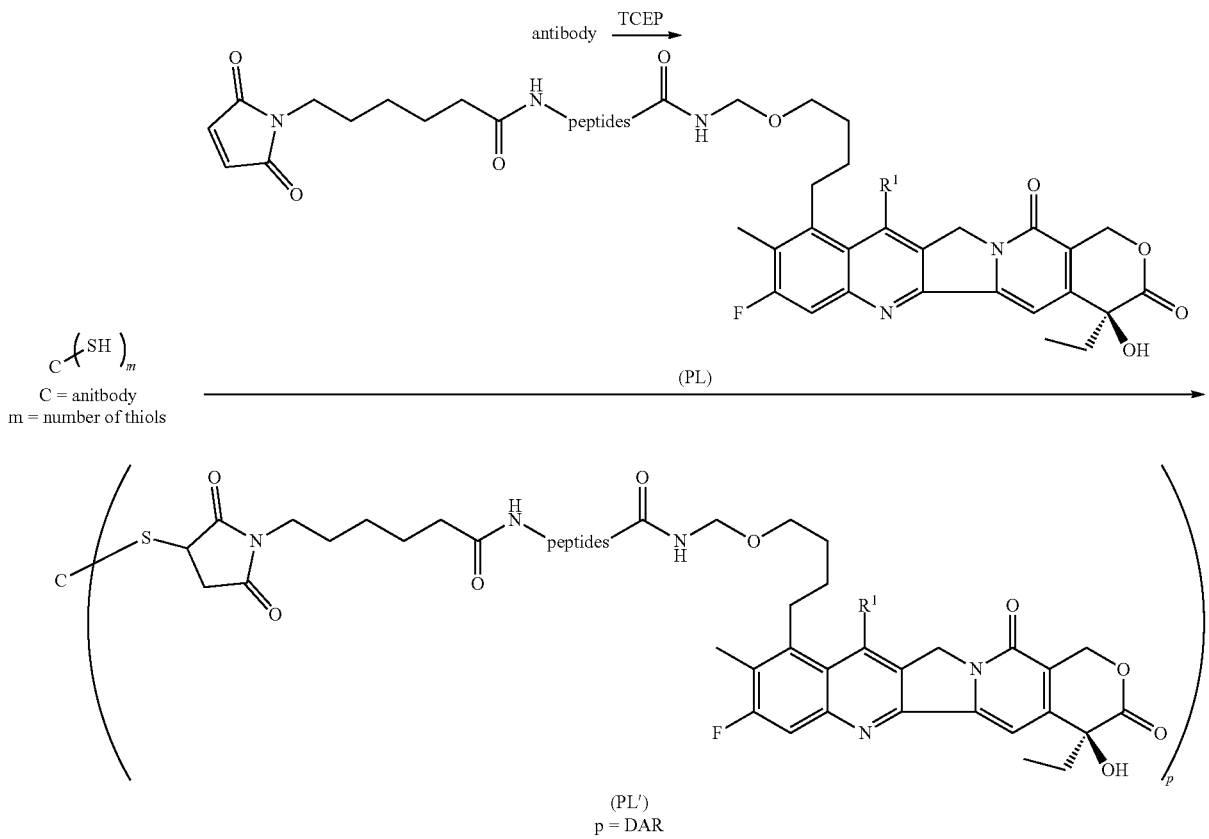

In embodiments, an exemplary general experimental procedure to prepare the conjugate (PL') with a drug to antibody ratio (DAR) between 7-8 or 8:
Antibody C is treated with 8 equivalents (2 equivalents per disulfide bond) of tris(2-carboxyethyl)phosphine hydrochloride (TCEP) in 50 mM pH7.4 phosphate buffer and 10 mM DTPA (diethylenetriaminepentaacetic acid) at 25° C. for 2 hours, followed by the addition of 12 equivalents of payload (PL) in DMSO (volume of DMSO is about 12-15% of the volume of the phosphate buffer). The obtained reaction solution is spinning on a tube rotator for 1 hour at 25° C. The reaction mixture is immediately purified using ultrafiltration tube (30 KD) for a few cycles with the formulation buffer. The resulting conjugate (PL') usually has a drug to antibody ratio (DAR) between 7-8 or 8, and is >95% monomeric measured by size exclusion chromatography.

In embodiments, an antibody-drug conjugate is MB-2a. In embodiments, Scheme 6 provides an exemplary synthetic method for described antibody-drug conjugate MB-2a:

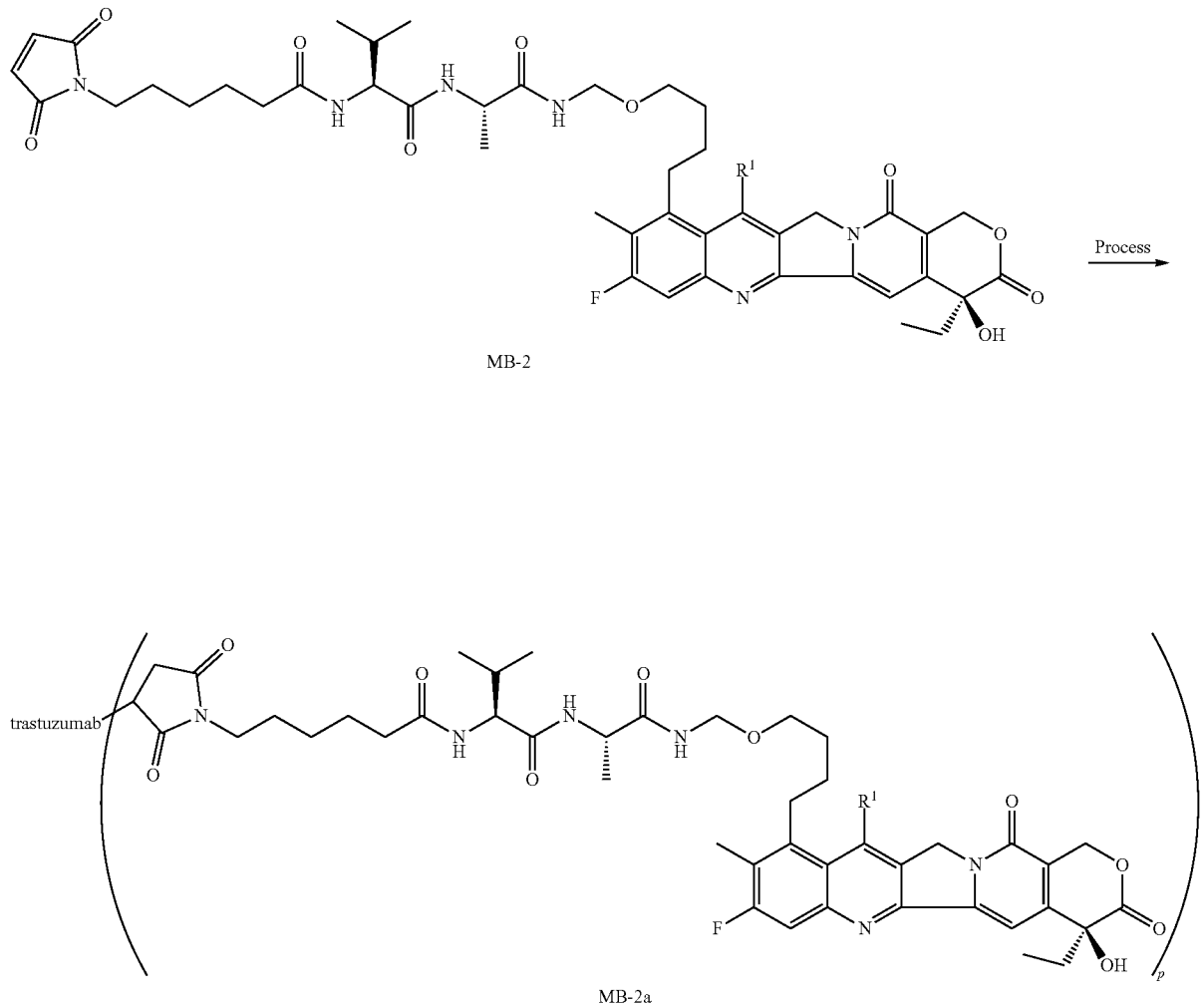

In embodiments, an antibody-drug conjugate is MB-3a (trastuzumab meditecan). In embodiments, Scheme 7 provides an exemplary synthetic method for described antibody-drug conjugate MB-3a (trastuzumab meditecan):

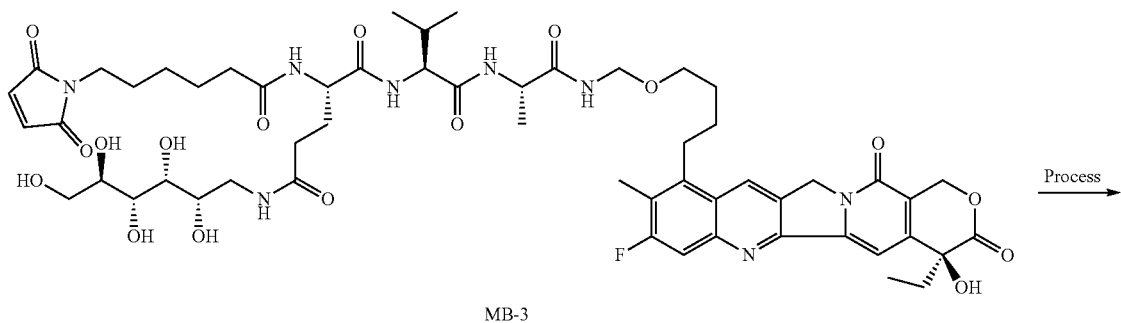

-continued

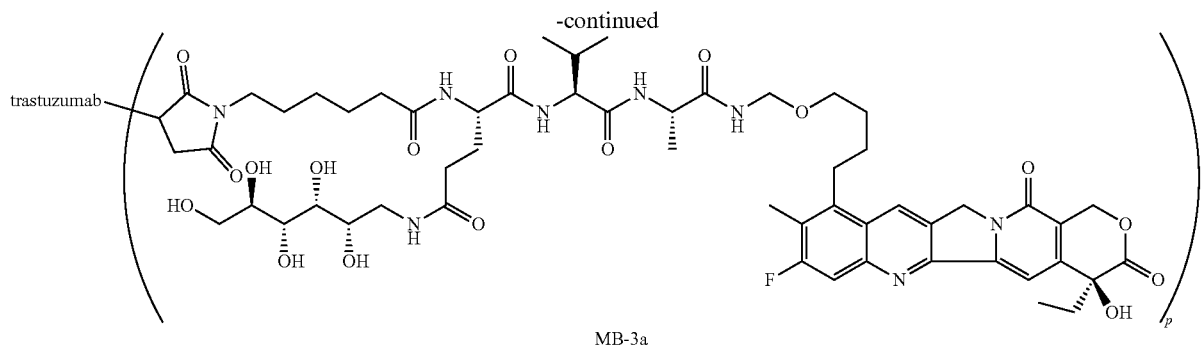

MB-3a

Methods of Treatment

In another aspect, the invention features a method of treating a cell proliferative disease or disorder or inhibiting abnormal cell growth, said method comprising administering any compound of Formula (PL-A) such as MB-2a or MB-3a (trastuzumab meditecan), or a pharmaceutically acceptable salt thereof, as described herein, or a pharmaceutical composition comprising any compound of Formula (PL-A) (e.g., MB-2a or MB-3a (trastuzumab meditecan)), or a pharmaceutically acceptable salt thereof, as described herein.

In embodiments, the method is for treating cancer. In embodiments, a cancer is characterized by HER2 overexpression, and/or is metastatic and/or is trastuzumab resistant.

In embodiments, a cancer is adenocarcinoma, brain cancer, bladder cancer, breast cancer, cervical cancer, choriocarcinoma, a CNS tumor, colon or colorectal cancer, diffuse intrinsic pontine glioma (DIPG), endometrial cancer, esophageal cancer, Ewing's sarcoma, fallopian tube cancer, gall bladder cancer, gastric cancer, glioblastoma, head and neck cancer, hematological cancer, Hodgkin's lymphoma, kidney cancer, laryngeal cancer, leukemia, liver cancer, lung cancer, lymphoma, melanoma, Merkel cell carcinoma, mesothelioma, multiple myeloma, myelodysplastic syndrome (MDS), neuroblastoma, non-Hodgkin's lymphoma, osteosarcoma, pancreatic cancer, peritoneal cancer, prostate cancer, ovarian cancer, renal cancer, rhabdomyosarcoma salivary gland cancer, sarcoma, skin cancer, small intestine cancer, squamous cell carcinoma, testicular cancer, thyroid cancer, uterine cancer, or Wilms tumor.

In embodiments, a cancer is lung cancer, urothelial cancer, colorectal cancer, prostate cancer, ovarian cancer, pancreatic cancer, breast cancer, bladder cancer, gastric cancer, gastrointestinal stromal tumor, uterine cervix cancer, esophageal cancer, squamous cell carcinoma, peritoneal cancer, liver cancer, hepatocellular cancer, colon cancer, rectal cancer, colorectal cancer, endometrial cancer, uterine cancer, salivary gland cancer, kidney cancer, vulval cancer, thyroid cancer, penis cancer, leukemia, malignant lymphoma, plasmacytoma, myeloma, or sarcoma.

In embodiments, a cancer is breast cancer, gastric cancer, lung cancer (e.g., non-small cell lung cancer), and ovarian cancer and has been reported to be a negative prognosis factor for breast cancer.

In embodiments, a cancer is characterized by low HER2-expression.

In embodiments, a cancer is characterized by moderate HER2-expression.

In embodiments, a cancer is characterized by high HER2-expression.

In embodiments, a cancer is characterized by HER2 overexpression.

In embodiments, a cancer is trastuzumab resistant.

In embodiments, a cancer is breast cancer. In embodiments, the breast cancer is metastatic. In embodiments, the breast cancer is characterized by low Her2-expression. In embodiments, the breast cancer is characterized by moderate Her2-expression. In embodiments, the breast cancer is characterized by high Her2-expression. In embodiments, the breast cancer is trastuzumab resistant.

In embodiments, the cancer is gastric cancer. In embodiments, the gastric cancer is metastatic. In embodiments, the gastric cancer is characterized by low Her2-expression. In embodiments, the gastric cancer is characterized by moderate Her2-expression. In embodiments, the gastric cancer is characterized by high Her2-expression. In embodiments, the gastric cancer is trastuzumab resistant.

In embodiments, the cancer is lung cancer (e.g., non-small cell lung cancer). In embodiments, the lung cancer (e.g., non-small cell lung cancer) is metastatic. In embodiments, the lung cancer (e.g., non-small cell lung cancer) is characterized by low Her2-expression. In embodiments, the lung cancer (e.g., non-small cell lung cancer) is characterized by moderate Her2-expression. In embodiments, the lung cancer (e.g., non-small cell lung cancer) is characterized by high Her2-expression. In embodiments, the lung cancer (e.g., non-small cell lung cancer) is trastuzumab resistant.

In embodiments, the cancer is ovarian cancer. In embodiments, the ovarian cancer is metastatic. In embodiments, the ovarian cancer is characterized by low Her2-expression. In embodiments, the ovarian cancer is characterized by moderate Her2-expression. In embodiments, the ovarian cancer is characterized by high Her2-expression. In embodiments, the ovarian cancer is trastuzumab resistant.

Cancers, including, but not limited to, a tumor, metastasis, or other disease or disorder characterized by uncontrolled cell growth, can be treated or inhibited by administration of a camptothecin conjugate.

In other embodiments, methods for treating cancer are provided, including administering to a patient in need thereof an effective amount of a camptothecin conjugate and a chemotherapeutic agent. In one embodiment, the chemotherapeutic agent is that with which treatment of the cancer has not been found to be refractory. In another embodiment, the chemotherapeutic agent is that with which the treatment of cancer has been found to be refractory. The camptothecin conjugates can be administered to a patient that has also undergone surgery as treatment for the cancer.

In embodiments, the patient also receives an additional treatment, such as radiation therapy. In a specific embodiment, the camptothecin conjugate is administered concurrently with the chemotherapeutic agent or with radiation therapy. In another specific embodiment, the chemotherapeutic agent or radiation therapy is administered prior or subsequent to administration of a camptothecin conjugate (e.g., MB-2a or MB-3a (trastuzumab meditecan)).

A chemotherapeutic agent can be administered over a series of sessions. Any one or a combination of the chemotherapeutic agents, such a standard of care chemotherapeutic agent(s), can be administered.

Additionally, methods of treatment of cancer with a camptothecin conjugate are provided as an alternative to chemotherapy or radiation therapy where the chemotherapy or the radiation therapy has proven or can prove too toxic, e.g., results in unacceptable or unbearable side effects, for the subject being treated. The patient being treated can, optionally, be treated with another cancer treatment such as surgery, radiation therapy or chemotherapy, depending on which treatment is found to be acceptable or bearable.

In embodiments, a method of treatment described herein comprises administration of MB-2a, or a pharmaceutically acceptable salt thereof.

In embodiments, a method of treatment described herein comprises administration of MB-3a (trastuzumab meditecan).

Compositions and Methods of Administration

In another aspect, the invention features a pharmaceutical composition comprising any compound described herein (e.g., any compound of Formula (PL-A) such as MB-2a and MB-3a (trastuzumab meditecan)), or a pharmaceutically acceptable salt thereof, as described herein. In embodiments, a pharmaceutical composition comprises a pharmaceutically acceptable carrier.

In embodiments, a pharmaceutical composition comprises a conjugate according to Formula (PL-A) such as MB-2a or MB-3a (trastuzumab meditecan), or a pharmaceutically acceptable salt thereof.

In embodiments, a pharmaceutical composition comprises MB-2a, or a pharmaceutically acceptable salt thereof.

In embodiments, a pharmaceutical composition comprises MB-3a (trastuzumab meditecan), or a pharmaceutically acceptable salt thereof.

In embodiments, the invention provides pharmaceutical compositions comprising the camptothecin conjugates described herein (e.g., any compound of Formula (PL-A) such as MB-2a or MB-3a (trastuzumab meditecan)) and a pharmaceutically acceptable carrier. The camptothecin conjugates can be in any form that allows the compound to be administered to a patient for treatment of a disorder associated with expression of the antigen to which the cell binding agent binds. For example, the conjugates can be in the form of a liquid or solid. The preferred route of administration is parenteral. Parenteral administration includes subcutaneous injections, intravenous, intramuscular, intrasternal injection or infusion techniques. In one aspect, the compositions are administered parenterally. In one aspect, the conjugates are administered intravenously. Administration can be by any convenient route, for example by infusion or bolus injection.

Pharmaceutical compositions can be formulated to allow a compound to be bioavailable upon administration of the composition to a patient. Compositions can take the form of one or more dosage units.

Materials used in preparing the pharmaceutical compositions can be non-toxic in the amounts used. It will be evident to those of ordinary skill in the art that the optimal dosage of the active ingredient(s) in the pharmaceutical composition will depend on a variety of factors. Relevant factors include, without limitation, the type of animal (e.g., human), the particular form of the compound, the manner of administration, and the composition employed.

The composition can be, for example, in the form of a liquid. The liquid can be useful for delivery by injection. In a composition for administration by injection, one or more of a surfactant, preservative, wetting agent, dispersing agent, suspending agent, buffer, stabilizer and isotonic agent can also be included.

The liquid compositions, whether they are solutions, suspensions or other like form, can also include one or more of the following: sterile diluents such as water for injection, saline solution, preferably physiological saline, Ringer's solution, isotonic sodium chloride, fixed oils such as synthetic mono or diglycerides which can serve as the solvent or suspending medium, polyethylene glycols, glycerin, cyclodextrin, propylene glycol or other solvents; antibacterial agents such as benzyl alcohol or methyl paraben; antioxidants such as ascorbic acid or sodium bisulfite; chelating agents such as ethylenediaminetetraacetic acid; buffers such as amino acids, acetates, citrates or phosphates; detergents, such as nonionic surfactants, polyols; and agents for the adjustment of tonicity such as sodium chloride or dextrose. A parenteral composition can be enclosed in ampoule, a disposable syringe or a multiple-dose vial made of glass, plastic or other material. Physiological saline is an exemplary adjuvant. An injectable composition is preferably sterile.

The amount of the conjugate that is effective in the treatment of a particular disorder or condition will depend on the nature of the disorder or condition, and can be determined by standard clinical techniques. In addition, in vitro or in vivo assays can optionally be employed to help identify optimal dosage ranges. The precise dose to be employed in the compositions will also depend on the route of administration, and the seriousness of the disease or disorder, and should be decided according to the judgment of the practitioner and each patient's circumstances.

The compositions comprise an effective amount of a compound such that a suitable dosage will be obtained. Typically, this amount is at least about 0.01% of a compound by weight of the composition.

For intravenous administration, the composition can comprise from about 0.01 to about 100 mg of a camptothecin conjugate per kg of the animal's body weight. In one aspect, the composition can include from about 1 to about 100 mg of a Camptothecin Conjugate per kg of the animal's body weight. In another aspect, the amount administered will be in the range from about 0.1 to about 25 mg/kg of body weight of a compound. Depending on the drug used, the dosage can be even lower, for example, 1.0 µg/kg to 5.0 mg/kg, 4.0 mg/kg, 3.0 mg/kg, 2.0 mg/kg or 1.0 µg/kg, or 1.0 µg/kg to 500.0 µg/kg of the subject's body weight.

Generally, the dosage of a conjugate administered to a patient is typically about 0.01 mg/kg to about 100 mg/kg of the subject's body weight or from 1.0 µg/kg to 5.0 mg/kg of the subject's body weight. In embodiments, the dosage administered to a patient is between about 0.01 mg/kg to about 15 mg/kg of the subject's body weight. In embodiments, the dosage administered to a patient is between about 0.1 mg/kg and about 15 mg/kg of the subject's body weight. In embodiments, the dosage administered to a patient is between about 0.1 mg/kg and about 20 mg/kg of the subject's body weight. In embodiments, the dosage administered is between about 0.1 mg/kg to about 5 mg/kg or about 0.1 mg/kg to about 10 mg/kg of the subject's body weight. In embodiments, the dosage administered is between about 1 mg/kg to about 15 mg/kg of the subject's body weight. In embodiments, the dosage administered is between about 1 mg/kg to about 10 mg/kg of the subject's body weight. In embodiments, the dosage administered is between about 0.1 to 4 mg/kg, even more preferably 0.1 to 3.2 mg/kg, or even more preferably 0.1 to 2.7 mg/kg of the subject's body weight over a treatment cycle.

The term "carrier" refers to a diluent, adjuvant or excipient, with which a compound is administered. Such pharmaceutical carriers can be liquids, such as water and oils, including those of petroleum, animal, vegetable or synthetic origin, such as peanut oil, soybean oil, mineral oil, sesame oil. The carriers can be saline, gum acacia, gelatin, starch paste, talc, keratin, colloidal silica, urea. In addition, auxiliary, stabilizing, thickening, lubricating and coloring agents can be used. In one embodiment, when administered to a patient, the compound or compositions and pharmaceutically acceptable carriers are sterile.

Water is an exemplary carrier when the compounds are administered intravenously. Saline solutions and aqueous dextrose and glycerol solutions can also be employed as liquid carriers, particularly for injectable solutions. Suitable pharmaceutical carriers also include excipients such as starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol. The present compositions, if desired, can also contain minor amounts of wetting or emulsifying agents, or pH buffering agents.

In an embodiment, the conjugates are formulated in accordance with routine procedures as a pharmaceutical composition adapted for intravenous administration to animals, particularly human beings. Typically, the carriers or vehicles for intravenous administration are sterile isotonic aqueous buffer solutions. Where necessary, the compositions can also include a solubilizing agent. Compositions for intravenous administration can optionally comprise a local anesthetic such as lignocaine to ease pain at the site of the injection. Generally, the ingredients are supplied either separately or mixed together in unit dosage form, for example, as a dry lyophilized powder or water free concentrate in a hermetically sealed container such as an ampoule or sachets indicating the quantity of active agent. Where a conjugate is to be administered by infusion, it can be dispensed, for example, with an infusion bottle containing sterile pharmaceutical grade water or saline. Where the conjugate is administered by injection, an ampoule of sterile water for injection or saline can be provided so that the ingredients can be mixed prior to administration.

The pharmaceutical compositions are generally formulated as sterile, substantially isotonic and in full compliance with all Good Manufacturing Practice (GMP) regulations of the U.S. Food and Drug Administration.

Kits for Therapeutic Use

In some aspects, kits for use in cancer treatment and the treatment of autoimmune diseases are provided. Such kits can include a pharmaceutical composition that comprises a camptothecin conjugate described herein.

In embodiments, the kit can include instructions for use in any of the therapeutic methods described herein. The included instructions can provide a description of administration of the pharmaceutical compositions to a subject to achieve the intended activity, e.g., treatment of a disease or condition such as cancer, in a subject. In embodiments, the instructions relating to the use of the pharmaceutical compositions described herein can include information as to dosage, dosing schedule, and route of administration for the intended treatment. The containers can be unit doses, bulk packages (e.g., multi-dose packages) or sub-unit doses. Instructions supplied in the kits of the disclosure are typically written instructions on a label or package insert. The label or package insert indicates that the pharmaceutical compositions are used for treating, delaying the onset, and/or alleviating a disease or disorder in a subject.

In embodiments, the kits provided herein are in suitable packaging. Suitable packaging includes, but is not limited to, vials, bottles, jars, flexible packaging, and the like. Also contemplated are packages for use in combination with a specific device, such as an inhaler, nasal administration device, or an infusion device. In embodiments, a kit can have a sterile access port (for example, the container can be an intravenous solution bag or a vial having a stopper pierceable by a hypodermic injection needle).

In embodiments, the kits provided herein include an additional therapeutic agent useful in treating a cancer of autoimmune disease as described herein.

Multi-Modality Therapy for Cancer

Cancers, including, but not limited to, a tumor, metastasis, or other disease or disorder characterized by uncontrolled cell growth, can be treated or inhibited by administration of a camptothecin conjugate.

In other embodiments, methods for treating cancer are provided, including administering to a patient in need thereof an effective amount of a camptothecin conjugate and a chemotherapeutic agent. In one embodiment, the chemotherapeutic agent is that with which treatment of the cancer has not been found to be refractory. In another embodiment, the chemotherapeutic agent is that with which the treatment of cancer has been found to be refractory. The camptothecin conjugates can be administered to a patient that has also undergone surgery as treatment for the cancer.

In embodiments, the patient also receives an additional treatment, such as radiation therapy. In a specific embodiment, the camptothecin conjugate is administered concurrently with the chemotherapeutic agent or with radiation therapy. In another specific embodiment, the chemotherapeutic agent or radiation therapy is administered prior or subsequent to administration of a camptothecin conjugate.

A chemotherapeutic agent can be administered over a series of sessions. Any one or a combination of the chemotherapeutic agents, such a standard of care chemotherapeutic agent(s), can be administered.

Additionally, methods of treatment of cancer with a camptothecin conjugate are provided as an alternative to chemotherapy or radiation therapy where the chemotherapy or the radiation therapy has proven or can prove too toxic, e.g., results in unacceptable or unbearable side effects, for the subject being treated. The patient being treated can, optionally, be treated with another cancer treatment such as surgery, radiation therapy or chemotherapy, depending on which treatment is found to be acceptable or bearable.

The disclosure is further illustrated by the following examples, which are not to be construed as limiting this disclosure in scope or spirit to the specific procedures herein described. It is to be understood that the examples are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

EXAMPLES

The present invention is specifically described in view of the examples shown below. However, the present invention is not limited to these. Further, it is by no means interpreted in a limited way. Further, unless specifically described otherwise, the reagent, solvent, and starting material described in the specification can be easily obtained from a commercial supplier.

The following abbreviations are used for the following terms:

ADCs Antibody-drug conjugates
ACN Acetonitrile
DAR Drug to antibody ratio
DCC N,N'-Dicyclohexylcarbodiimide
DCM Dichloromethane
DTPA Diisopropylamine
DIPEA Diisopropylethylamine
DMF Dimethylformamide
DMSO Dimethylsulfoxide
DMTMM 4-(4,6-Dimethoxy-1,3,5-triazin-2-yl)-4-methylmorpholinium chloride
DMTMMT 4-(4,6-Dimethoxy-1,3,5-triazin-2-yl)-4-methylmorpholinium tetrafluoroborate
DTPA Diethylenetriaminepentaacetic acid
EDCI 1-Ethyl-3-(3-dimethylaminopropyl)carbodiimide
HOPO 2-Hydroxypyridine-1-oxide
i.v. Intravenous
M molar
nM nanomolar
NMM N-methylmorpholine
PPTS Pyridinium p-toluenesulfonate
PTSA 4-methylbenzenesulfonic acid
SEC Size exclusion chromatography
TBS tert-Butyldimethylsilyl
TCEP 3,3',3''-phosphinetriyltripropanoic acid hydrochloride
TEA Triethylamine
TFA Trifluoroacetic acid
THF Tetrahydrofuran
TLC Thin layer chromatography
p-TsOH p-Toluenesulfonic acid Example 1. Exemplary Syntheses of Compound MB-1 (P1)

General procedure for preparation of 2,6-dibromo-4-fluoro-3-methyl-aniline (1-2)

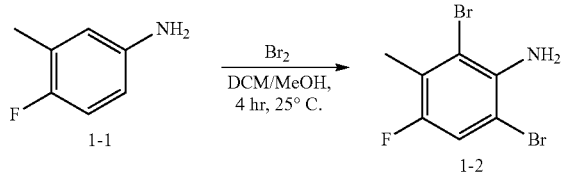

To a stirred solution of compound 1-1 (70 g, 559.36 mmol, 1 eq) in CH$_2$Cl$_2$/methanol (1:1, 1.2 L) was added a solution of Br$_2$ (223.48 g, 1.40 mol, 72.09 mL, 2.5 eq) in CH$_2$C1$_2$/methanol (1:1, 200 mL) dropwise at 15° C. over 1.5 hrs using an addition funnel. The reaction mixture was stirred at 25° C. for 4 hrs and TLC (petroleum ether/ethyl acetate=6/1, Rf=0.6) showed that the starting material was consumed. Three additional vials were set up as describe above and the mixtures from the four reactions were combined and concentrated. To the resulting residue was added 1 N Na$_2$S$_2$O$_3$ (1.5 L) and ethyl acetate (1.5 L). The solution was stirred for 10 min and then carefully basified with 1 N Na$_2$CO$_3$ (150 mL). It was transferred into a separatory funnel and the organic layer was isolated. The aqueous layer was extracted with ethyl acetate (2×1 L). The combined organic layers were washed with 1 N Na$_2$S$_2$O$_3$ (1 L), followed by brine (1 L), then dried over Na$_2$SO$_4$. It was filtered and concentrated under reduced pressure to give a residue. The residue was triturated with petroleum ether (1 L) and filtered to afford product 1-2 (574 g, 1.93 mol, yield 86%, purity 95%) as a light purple solid. $^1$H NMR (400 MHz, CHLOROFORM-d) δ 7.18 (d, J=8.6 Hz, 1H), 4.52-4.30 (m, 2H), 2.29 (d, J=2.4 Hz, 3H).

General procedure for preparation of 1,3-dibromo-5-fluoro-2-iodo-4-methyl-benzene (1-3)

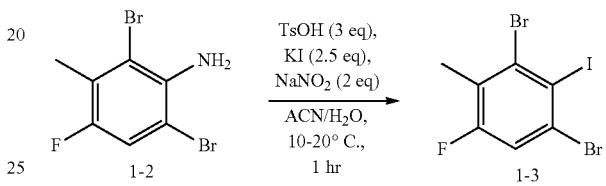

To a solution of p-TsOH (90 g, 522.2 mmol, 3 eq) in acetonitrile (700 mL) was added compound 1-2 (49.25 g, 174.07 mmol, 1 eq). The resulting white suspension was cooled to 10-15° C. and then a solution of NaNO$_2$ (24.02 g, 348.14 mmol, 2 eq) and KI (73.22 g, 435.13 mmol, 2.5 eq) in water (105 mL) was added gradually. The suspension became dark brown and there was gas released. The thick mixture was stirred for 10 min at 10° C., then at 20° C. for additional 1 hr. TLC (petroleum ether/ethyl acetate=6/1, Rf=0.6) showed that the starting material was consumed. The reaction mixture was poured into water (400 mL). 1 N sodium hydrogen carbonate solution (200 mL) was added to adjust the pH to 9-10 followed by the addition of 2 N solution of sodium thiosulfate (200 mL). The obtained mixture was extracted with ethyl acetate (3×500 mL). Eleven additional vials were set up as described above. The combined organic layers from the 12 reactions were combined, dried over Na$_2$SO$_4$ and concentrated under reduced pressure. The obtained residue was purified by silica gel chromatography and eluted with petroleum ether to afford product 1-3 (504 g, 1.09 mol, yield 56%, purity 85%) as a yellow solid. $^1$H NMR (400 MHz, CHLOROFORM-d) δ 7.41 (d, J=8.8 Hz, 1H), 2.43 (d, J=2.4 Hz, 3H).

General procedure for preparation of 2,6-dibromo-4-fluoro-3-methyl-benzaldehyde (1-4)

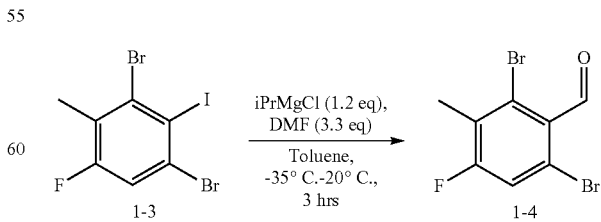

To a solution of compound 1-3 (50.4 g, 127.98 mmol, 1 eq) in anhydrous toluene (300 mL) was added a solution of chloro(isopropyl)magnesium (2 M in tetrahydrofuran, 76.80 mL, 1.2 eq) over a period of 10 min while maintaining the internal temperature below −25° C. A clear brown solution was obtained and the mixture was stirred for 1.5 hrs. followed by the addition of N,N-dimethylformamide (30.86 g, 422.33 mmol, 3.3 eq) in 10 min. The temperature of the reaction mixture increased to −19° C. after the addition. The reaction mixture was warmed to 20° C. over 0.5 hr and stirred for 1.5 hrs. TLC (petroleum ether/ethyl acetate=10/1, Rf=0.45) showed the reaction completed. The reaction mixture was quenched with saturated aqueous NH$_4$Cl (50 mL). Ten additional vials were set up as described above and all eleven reaction mixture were combined. The combined mixture was filtered and the filtrate was evaporated under reduced pressure to give a residue. The residue was purified by silica-gel column chromatography and eluted with petroleum ether to give product 1-4 (253 g, 812.18 mmol, yield 60%, purity 95%) as a yellow solid. $^1$H NMR (400 MHz, CHLOROFORM-d) δ 10.22 (s, 1H), 7.40 (d, J=8.6 Hz, 1H), 2.37 (d, J=2.4 Hz, 3H).

General procedure for preparation of 2-(2,6-dibromo-4-fluoro-3-methyl-phenyl)-1, 3-dioxolane (4)

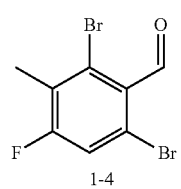
1-4 ethylene glycol (5 eq),
CH(OEt)$_3$ (0.86 eq),
PTSA (0.1 eq)
──────────────→
DCE, 80° C.,
3 hrs

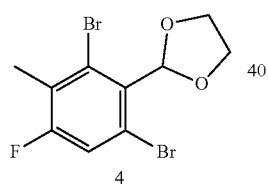
4

To a solution of compound 1-4 (50.6 g, 170.99 mmol, 1 eq) in 1,2-dichloroethane (430 mL) was added ethylene glycol (53.06 g, 878.58 mmol, 47.80 mL, 5 eq), triethyl orthoformate (25.34 g, 170.99 mmol, 28.44 mL, 1 eq) and p-toluene sulphonic acid (1.47 g, 8.55 mmol, 0.05 eq). The reaction mixture was stirred at 80° C. for 3 hrs and TLC (petroleum ether/ethyl acetate=10/1, Rf=0.59) showed that the reaction completed. Four additional vials were set up as described above and the reaction mixtures from the five reactions were combined. The combined reaction mixture was washed subsequently with saturated aqueous Na$_2$CO$_3$ (1 L), saturated aqueous NH$_4$Cl (1 L) and water (1 L). The organic layer was dried over Na$_2$SO$_4$, filtered and evaporated under reduced pressure to give crude product. The crude product was triturated with petroleum ether at 20° C. for 15 min and filtered to give product 4 (280 g, 741.21 mmol, yield 84%, purity 90%) as a light yellow solid. $^1$H NMR (400 MHz, CHLOROFORM-d) δ 7.34 (d, J=8.6 Hz, 1H), 6.44 (s, 1H), 4.37-4.31 (m, 2H), 4.11-4.06 (m, 2H), 2.34 (d, J=2.4 Hz, 3H).

General procedure for preparation of N-[3-bromo-2-(1,3-dioxolan-2-yl)-5-fluoro-4-methyl-phenyl]-1, 1-diphenyl-methanimine (5)

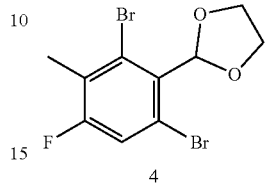 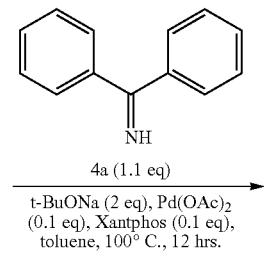
4

4a (1.1 eq)
──────────────→
t-BuONa (2 eq), Pd(OAc)$_2$
(0.1 eq), Xantphos (0.1 eq),
toluene, 100° C., 12 hrs.

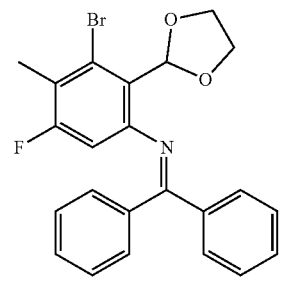
5

To a solution of compound 4 (53 g, 155.89 mmol, 1 eq) in toluene (100 mL) was added compound 4a (29.67 g, 163.69 mmol, 27.46 mL, 1.05 eq), sodium tert-butoxide (29.97 g, 311.78 mmol, 2 eq), palladium(II) acetate (3.5 g, 15.59 mmol, 0.1 eq) and 4,5-bis(diphenylphosphino)-9,9-dimethylxanthene (9.02 g, 15.59 mmol, 0.1 eq) under N$_2$ protection. The reaction mixture was stirred at 100° C. for 12 hrs under N$_2$ protection and TLC (petroleum ether/ethyl acetate=10/1, Rf=0.32) showed the reaction completed. Two additional vials were set up as described above and all three reaction mixtures were combined and filtered via a celite pad. The filter cake was washed with ethyl acetate (500 mL). The combined filtrate was concentrated under reduced pressure to give a residue. The residue was purified by column chromatography and eluted with petroleum ether/ethyl acetate=10/1 to give product 5 (105 g, 214.62 mmol, yield 45.61%, 80% purity) as a yellow solid. The product was used in the next step without further purification. $^1$H NMR (400 MHz, CHLOROFORM-d) δ 7.77 (br d, J=7.3 Hz, 2H), 7.54-7.37 (m, 4H), 7.31 (br d, J=4.5 Hz, 3H), 7.26-7.22 (m, 1H), 6.48 (s, 1H), 5.93 (d, J=10.3 Hz, 1H), 4.11-4.05 (m, 2H), 3.96-3.91 (m, 2H), 2.23 (d, J=2.3 Hz, 3H).

General procedure for preparation of N-[3-[4-[tert-butyl(dimethyl)silyl]oxybutyl]-2-(1,3-dioxolan-2-yl)-5-fluoro-4-methyl-phenyl]-1,1-diphenyl-methanimine (1-6)

General procedure for preparation of (19S)-19-ethyl-6-fluoro-19-hydroxy-8-(4-hydroxybutyl)-7-methyl-17-oxa-3,13-diazapentacyclo[11.8.0.0$^{2,11}$.0$^{4,9}$.0$^{15,20}$]henicosa-1(21),2,4,6,8,10,15(20)-heptaene-14,18-dione (MB-1, hydrotecen, 海洛替康)

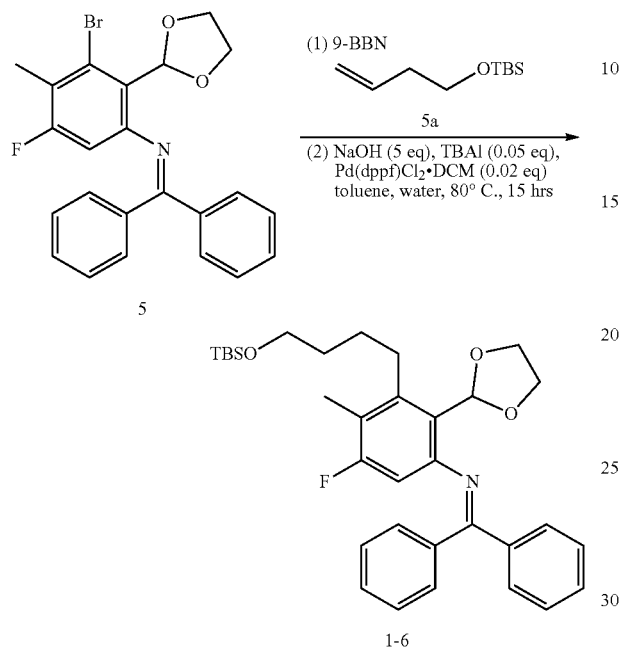

To a stirred mixture of compound 5a (5.3 g, 28.44 mmol, 1 eq) in toluene (80 mL) was added 9-BBN (0.5 M in tetrahydrofuran, 68.13 mL, 1.2 eq) at 10° C. under nitrogen atmosphere. The resulting mixture was stirred at 80° C. for 20 min under nitrogen protection and TLC (petroleum ether/ethyl acetate=1/1, Product Rf=0.2, I$_2$) showed the reaction completed. A solution of NaOH (2.27 g, 56.78 mmol, 2 eq) in water (20 mL) was added to the above mixture at 10° C. under nitrogen atmosphere. The resulting mixture was stirred at 10° C. for 10 min followed by the addition of compound 5 (10.00 g, 22.71 mmol, 0.8 eq), tetrabutylammonium iodide (524.31 mg, 1.42 mmol, 0.05 eq) and [1,1-Bis(diphenyl-phosphino)ferrocene]palladium (II) dichloride dichloromethane adduct (463.7 mg, 568.8 mol, 0.02 eq) at 10° C. under nitrogen atmosphere. The resulting mixture was stirred at 80° C. for 15 hrs under nitrogen atmosphere and LCMS (retention time=3.620) showed reaction completed. Seven additional vials were set up as described above and all eight reaction mixtures were combined. The combined reaction mixture was washed with water (500 mL×3), dried over Na$_2$SO$_4$, filtered and concentrated under reduced pressure. The obtained residue was purified by column chromatography (SiO$_2$, petroleum ether/ethyl acetate=10/1 to 5/1) to give the crude product which was further purified by reversed-phase HPLC to give product 1-6 (45 g, 82.15 mmol, yield 50%, purity 80%) as a yellow gum. $^1$H NMR (400 MHz, DMSO-d6) δ 7.72-7.61 (m, 2H), 7.59-7.51 (m, 1H), 7.50-7.42 (m, 2H), 7.37-7.22 (m, 4H), 7.19 (br d, J=3.5 Hz, 1H), 6.03 (s, 1H), 5.89 (s, 1H), 4.07-3.99 (m, 2H), 3.93-3.78 (m, 2H), 3.65-3.56 (m, 2H), 2.75-2.64 (m, 2H), 2.01 (s, 2H), 1.64 (s, 1H), 1.59-1.44 (m, 4H), 0.87 (s, 9H), 0.03 (s, 6H).

To a solution of compound 7 (2.4 g, 1 eq) in ethanol (100 mL) was added 35% HCl (5.7 g, 6 eq) and the solution was heated to 50-60° C., then compound 1-6 (10 g, 2 eq) in ethanol (100 mL) was added dropwise in 2 hours. It continued to be stirred at 50-60° C. for 1.5 hours. The heating bath was removed, and the reaction mixture was cooled to room temperature. Methyl-tert-butyl ether (2000 mL) was added to precipitate the product. It was filtered and washed the solid with methyl-tert-butyl ether to give product MB-1 (hydrotecan, 海洛替康) as a light yellowish solid (2.45 g, 59% yield and 98% purity). $^1$H NMR (400 MHz, DMSO-d6) δ 8.89 (s, 1H), 7.77 (d, J=11.0 Hz, 1H), 7.31 (s, 1H), 6.54 (br s, 1H), 5.53-5.33 (m, 2H), 5.26 (s, 2H), 4.80-4.06 (m, 1H), 3.49 (br t, J=5.9 Hz, 2H), 3.19-3.11 (m, 2H), 2.43 (d, J=1.8 Hz, 3H), 1.86 (tt, J=7.2, 14.5 Hz, 2H), 1.62 (br s, 4H), 0.88 (t, J=7.3 Hz, 3H).

Example 2. Exemplary Synthesis of Compound MB-2 (PL1)

General Procedure for Preparation of C$_{17}$H$_{14}$NO$_4$ (S2)

A column charged with 2-(9H-fluoren-9-ylmethoxycarbonylamino)acetic acid (74.92 g, 252.10 mmol, 2 eq), Trt-resin S$_1$ (120.00 g, 126.05 mmol, 1 eq) and N,N-Diisopropylethylamine (162.85 g, 1.26 mol, 219.47 mL, 10 eq) in dichloromethane (1500 mL) was bubbled with nitrogen at 20° C. for 12 hrs. After filtration, the residue was washed with dichloromethane (3×300 mL), dimethyl formamide dichloromethane/methanol=1/1 (3×300 mL) and dimethyl formamide (3×300 mL) subsequently. The residue was further dried on high vacuum to give crude resin-C$_{17}$H$_{14}$NO$_4$ (150 g, 123.66 mmol, 98.10% yield, crude purity) as a yellow solid. The product was used in the next step directly without purification. A column charged with resin-C$_{17}$H$_{14}$NO$_4$ (150 g, 123.66 mmol, 1 eq) in DMF (1200 mL) was added piperidine (105.30 g, 1.24 mol, 122.13 mL, 10 eq). The mixture was bubbled with N$_2$ at 20° C. for 1 hrs. The resulting resin was filtered out and washed subsequently with dimethyl formamide (2×500 mL) and dichloromethane (2×500 mL). The resin was dried to afford resin-C$_2$H$_4$NO$_2$ (S2) (120 g, 121.21 mmol, 98.02% yield) as a yellow solid and used in next step directly.

and N,N-Diisopropylethylamine (78.33 g, 606.06 mmol, 105.56 mL, 5 eq). The mixture was bubbled with N$_2$ at 20° C. for 1 hr. The resulting resin was filtered out and washed with dimethyl formamide (2×500 mL) and dichloromethane (2×500 mL) successively. It was dried to afford resin-C$_{20}$H$_{19}$N$_2$O$_5$ (150 g, crude) as a yellow solid which was directly used in next step. A column charged with the resin-C$_{20}$H$_{19}$N$_2$O$_5$ (150 g, 116.91 mmol, 1 eq) in dimethyl formamide (1200 mL) was added piperidine (99.55 g, 1.17 mol, 115.46 mL, 10 eq). The mixture was bubbled with N$_2$ at 20° C. for 1 hr. The resulting resin was filtered out and washed with dimethyl formamide (2×500 mL) and dichloromethane (2×500 mL) successively. It was dried to afford resin C$_5$H$_9$N$_2$O$_3$ (S$_3$) (120 g, crude) as a yellow solid and used in next step directly.

General procedure for preparation of 2-[[(2S)-2-[[(2S)-2-(9H-fluoren-9-ylmethoxy-carbonylamino)-3-methyl-butanoyl]amino]propanoyl]amino]acetic acid (1-7)

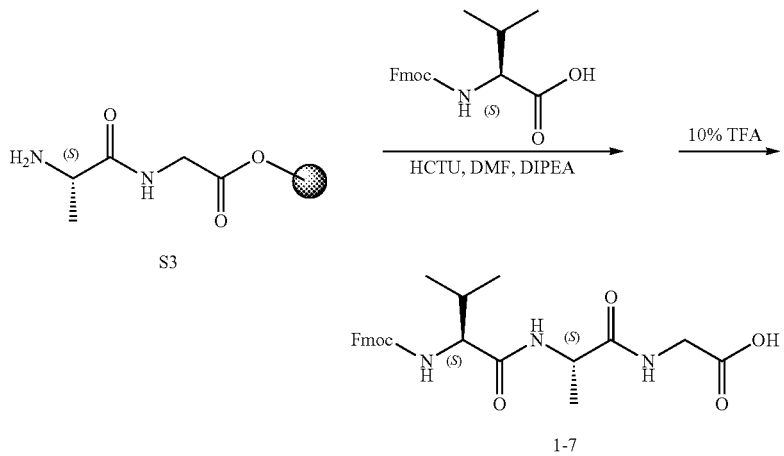

General Procedure for Preparation of Resin-C$_5$H$_9$N$_2$O$_3$ (S3)

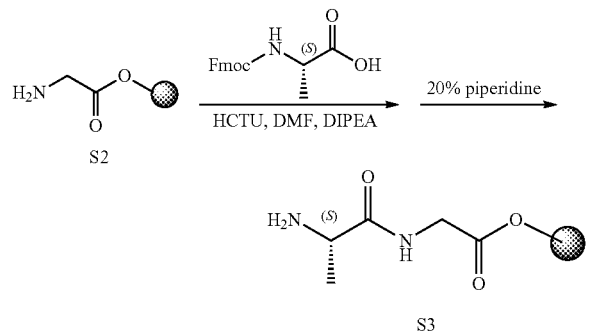

A column charged with (2S)-2-(9H-fluoren-9-ylmethoxycarbonylamino)propanoic acid (75.47 g, 242.42 mmol, 2 eq) and resin-C$_2$H$_4$NO$_2$ (S$_2$) (120 g, 121.21 mmol, 1 eq) in dimethyl formamide (1200 mL) was added HCTU (O-(6-Chloro-1-hydrocibenzotriazol-1-yl)-1,1,3,3-tetramethyluroniumhexafluorophosphate) (100.29 g, 242.42 mmol, 2 eq)

To a column charged with resin C$_5$H$_9$N$_2$O$_3$ (S3) (120 g, 112.99 mmol, 1 eq) and (2S)-2-(9H-fluoren-9-ylmethoxycarbonylamino)-3-methyl-butanoic acid (76.70 g, 225.99 mmol, 2 eq) in dimethyl formamide (200 mL) was added O-(6-Chloro-1-hydrocibenzotriazol-1-yl)-1,1,3,3-tetramethyluroniumhexafluorophosphate (93.49 g, 225.99 mmol, 2 eq) and N,N-Diisopropyl-ethylamine (73.02 g, 564.97 mmol, 98.41 mL, 5 eq). The mixture was bubbled with N$_2$ at 20° C. for 12 hrs. The resulting resin was filtered out and washed with dimethyl formamide (2×500 mL) and dichloromethane (2×500 mL) successively. The resin was quenched with trifluoroacetic acid/dichloromethane (10%, 3×500 mL). The organic layers were combined and concentrated under reduced pressure to give a residue. The residue was triturated with n-hexane at 20° C. for 12 hrs. It was filtered to give product 1-7 (60 g, 39.05 mmol, yield 34.56%, purity 90%) as a white solid. $^1$H NMR (400 MHz, DMSO-d6) δ 8.17 (br t, J=5.7 Hz, 1H), 7.99 (d, J=7.5 Hz, 1H), 7.89 (d, J=7.3 Hz, 2H), 7.74 (t, J=6.6 Hz, 2H), 7.45-7.38 (m, 3H), 7.37-7.29 (m, 2H), 4.39-4.19 (m, 4H), 3.93-3.66 (m, 3H), 2.03-1.92 (m, 1H), 1.22 (d, J=7.1 Hz, 3H), 0.85 (dd, J=6.9, 9.8 Hz, 6H).

General procedure for preparation of [[(2S)-2-[[(2S)-2-(9H-fluoren-9-ylmethoxycarbonyl amino)-3-methyl-butanoyl]amino]propanoyl]amino]methyl acetate (1-8)

A solution of compound 1-7 (90.0 g), pyridine (30.6 g, 2 eq), lead (IV) acetate (189 g, 2 eq), and Cu(OAc)$_2$ (3.6 g, 0.1 eq) in THF (1000 mL) and toluene (250 mL) was stirred at 50-60° C. for 2 h. The reaction mixture was cooled to room temperature and filtered to remove the insoluble salts. The filtrate was diluted with THF/MTBE (1:4) to precipitate the desired product. It was filtered and the solid was washed with THF/MTBE (1:4) to give product 1-8 as a light yellowish solid (84.2 g, yield=90.8%, purity 91.9%). $^1$H NMR (400 MHz, DMSO-d6) δ 8.03-7.93 (m, 1H), 7.89 (d, J=7.5 Hz, 2H), 7.74 (br t, J=6.3 Hz, 2H), 7.47-7.36 (m, 3H), 7.36-7.28 (m, 2H), 5.16-5.02 (m, 1H), 4.39-4.26 (m, 2H), 4.22 (br d, J=3.9 Hz, 2H), 3.93-3.82 (m, 1H), 1.98 (s, 2H), 1.78 (s, 1H), 1.27-1.13 (m, 3H), 0.92-0.75 (m, 6H).

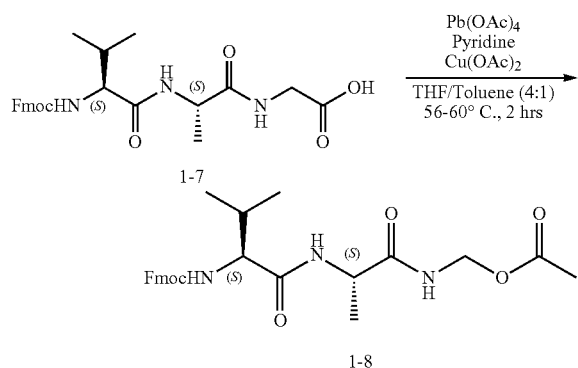

General procedure for preparation of (2S)-2-amino-N-[(1S)-2-[4-[(19S)-19-ethyl-6-fluoro-19-hydroxy-7-methyl-14,18-dioxo-17-oxa-3,13-diazapentacyclo[11.8.0.0$^{2,11}$.0$^{4,9}$.0$^{15,20}$]henicosa-1(21),2,4,6,8,10,15(20)-heptaen-8-yl]butoxymethylamino]-1-methyl-2-oxo-ethyl]-3-methyl-butanamide (1-10)

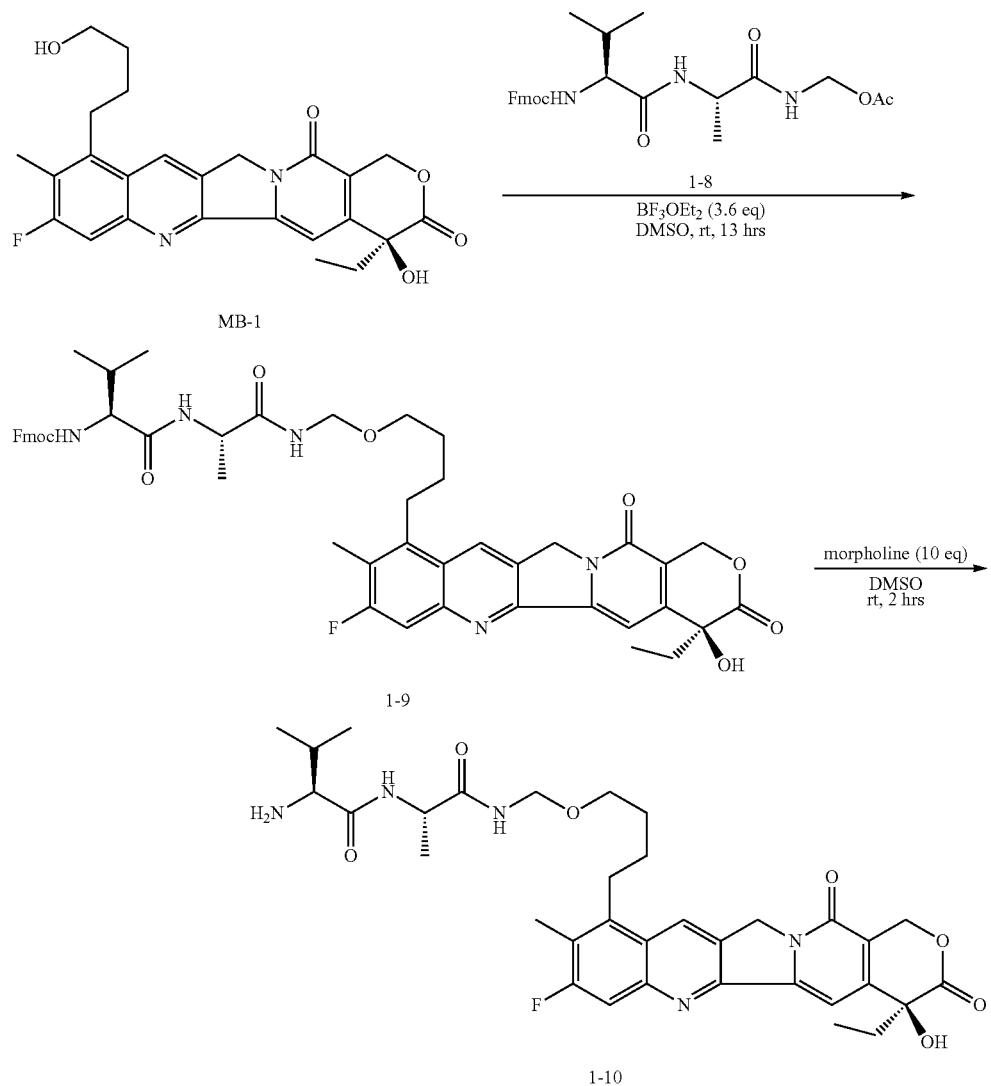

To a stirring solution of MB-1 (hydrotecan) (10.7 g, 0.0236 mol) and compound 1-8 (14.7 g, 0.0306 mol, 1.3 eq) in anhydrous DMSO (90 mL) was added $BF_3$ etherate (12.1 g, 0.0852 mol, 3.6 eq) at room temperature. The reaction solution continued to be stirred at room temperature for 13 hours. LCMS of the reaction sample showed that around 75% of product 1-9 formed and 6% of starting material MB-1 left. Morpholine (20.5 g, 0.236 mol) was added into the reaction solution and the reaction solution continued to be stirred at room temperature for 2 hours. It was directly purified by preparative HPLC (C18 column, mobile phase $CH_3CN/H_2O$) to give product 1-10 as an off-white solid after lyophilization (9.1 g, y=59%, purity 96.1%). $^1$H NMR (400 MHz, DMSO-d6) δ 8.87 (s, 1H), 8.68 (br s, 1H), 8.09 (br s, 1H), 7.77 (br d, J=10.6 Hz, 1H), 7.32 (s, 1H), 6.51 (s, 1H), 5.43 (s, 2H), 5.29 (br s, 2H), 4.55 (br s, 2H), 4.28 (br s, 1H), 3.46 (br s, 1H), 3.45-3.42 (m, 1H), 3.14 (br s, 2H), 3.02 (br s, 1H), 2.43 (br s, 3H), 1.88 (br dd, J=7.9, 14.8 Hz, 3H), 1.70 (br s, 2H), 1.58 (br s, 2H), 1.19 (br d, J=6.8 Hz, 3H), 0.88 (br t, J=7.2 Hz, 3H), 0.82 (br d, J=6.6 Hz, 3H), 0.73 (br d, J=6.6 Hz, 3H).

General procedure for preparation of 6-(2,5-di-oxopyrrol-1-yl)-N-[(1S)-1-[[(1S)-2-[4-[(19S)-19-ethyl-6-fluoro-19-hydroxy-7-methyl-14,18-dioxo-17-oxa-3,13-diazapentacyclo[11.8.0.0$^{2,11}$.0$^{4,9}$.0$^{15,20}$]henicosa-1(21),2,4,6,8,10,15(20)-heptaen-8-yl]butoxymethylamino]-1-methyl-2-oxo-ethyl]carbamoyl]-2-methyl-propyl]hexanamide (MB-2)

reaction mixture was filtered and the filtrate was purified by prep-HPLC using acetonitrile and deionized water as mobile phase to give product MB-2 (173 mg, 203.9 mol, yield 33.36%, purity 95.74%) as a white solid. $^1$H NMR (400 MHz, DMSO-d6) δ 8.87 (s, 1H), 8.57 (t, J=6.4 Hz, 1H), 7.97 (d, J=7.2 Hz, 1H), 7.81-7.71 (m, 2H), 7.32 (s, 1H), 6.99 (s, 2H), 6.52 (s, 1H), 5.43 (s, 1H), 5.49-5.37 (m, 1H), 5.30 (s, 2H), 4.54 (dq, J=6.6, 10.1 Hz, 2H), 4.21 (quin, J=7.1 Hz, 1H), 4.10 (dd, J=6.8, 8.4 Hz, 1H), 3.48-3.41 (m, 2H), 3.37-3.34 (m, 2H), 3.20-3.08 (m, 2H), 2.43 (d, J=2.0 Hz, 3H), 2.18-2.01 (m, 2H), 1.95-1.79 (m, 3H), 1.68 (br d, J=7.0 Hz, 2H), 1.58 (br s, 2H), 1.51-1.38 (m, 4H), 1.20-1.10 (m, 5H), 0.88 (t, J=7.3 Hz, 3H), 0.76 (dd, J=6.8, 9.3 Hz, 6H). $^{13}$C NMR (101 MHz, DMSO-d6) δ 173.09, 172.54, 172.26, 171.09, 170.85, 160.54, 156.86, 152.36, 150.00, 147.85, 145.38, 140.13, 134.46, 129.33, 128.33, 125.02, 124.04, 119.05, 110.14, 96.73, 72.40, 69.18, 66.72, 65.27 (br s, 1C), 57.44, 50.49 (br s, 1C), 48.29, 37.02, 34.88, 30.31 (br s, 1C), 29.00, 27.78, 27.62 (br s, 1C), 26.73 (br s, 1C), 25.78, 24.89, 19.18, 18.03 (br d, J=5.8 Hz, 1C), 11.46, 7.80. HRMS (ESI-TOF) m/z: [M+H]$^+$ calcd 845.39; found 845.3859.

Prep-HPLC Method:

Gilson 281 semi-preparative HPLC system and Phenomenex Gemini C18 column (75×40 mm×3 um); Mobile phase:

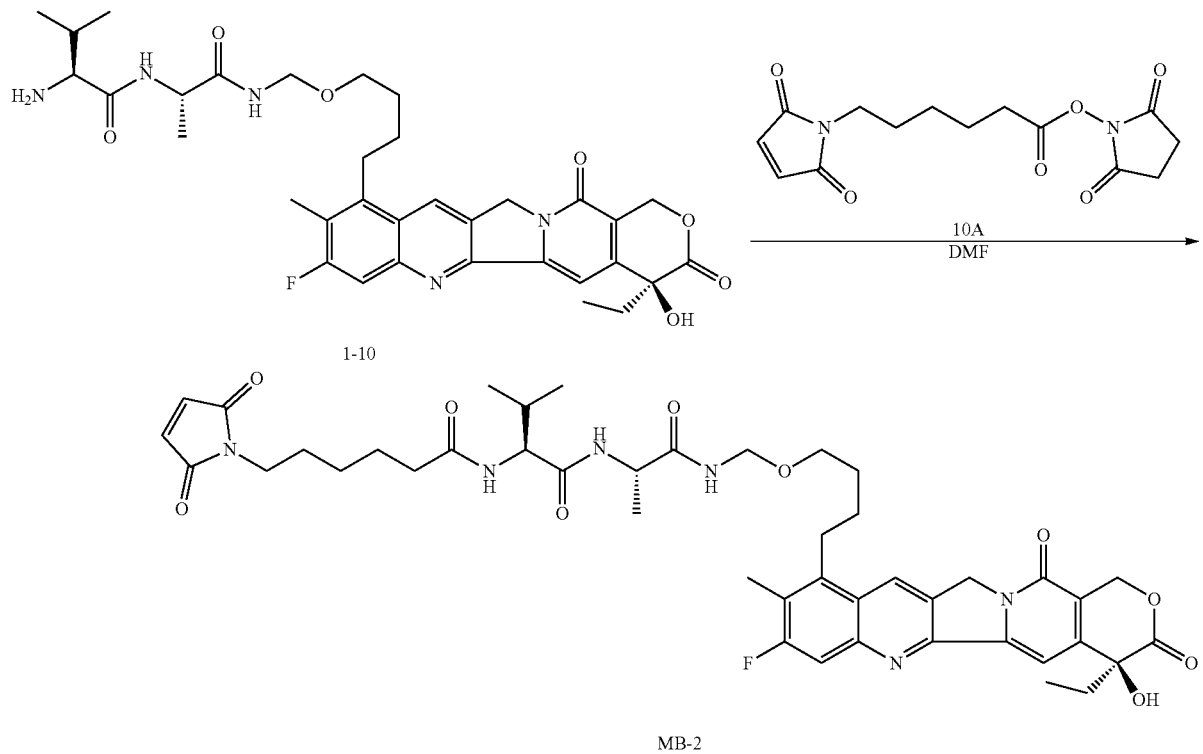

1-10

MB-2

To a solution of compound 1-10 (400 mg, 613.8 mol, 1 eq) in N,N-dimethylformamide (10 mL) was added compound 10A (283.8 mg, 920.6 mol, 1.5 eq). The reaction mixture was stirred at 15° C. for 12 hrs. LCMS (retention time of product=2.080) showed that all of compound 1-10 was consumed and new peak with desired MS was detected. The acetonitrile and water; Flow rate: 25 mL/min; Monitor wavelength: 220&254 nm. Gradient: 30% to 50% acetonitrile in 8 minutes, 50% to 100% acetonitrile in 0.2 minutes, 100% acetonitrile for 2 minutes, 100% to 30% acetonitrile in 0.1 minute then 30% acetonitrile for 1.2 minutes.

Example 3. Exemplary Synthesis of MB-3 (Meditecan, 美迪替康) (PL3)

General procedure for preparation of benzyl (2S)-2-(benzyloxycarbonylamino)-5-oxo-5-[[(2S,3R,4R,5R)-2,3,4,5,6-pentahydroxyhexyl]amino]pentanoate (1-12)

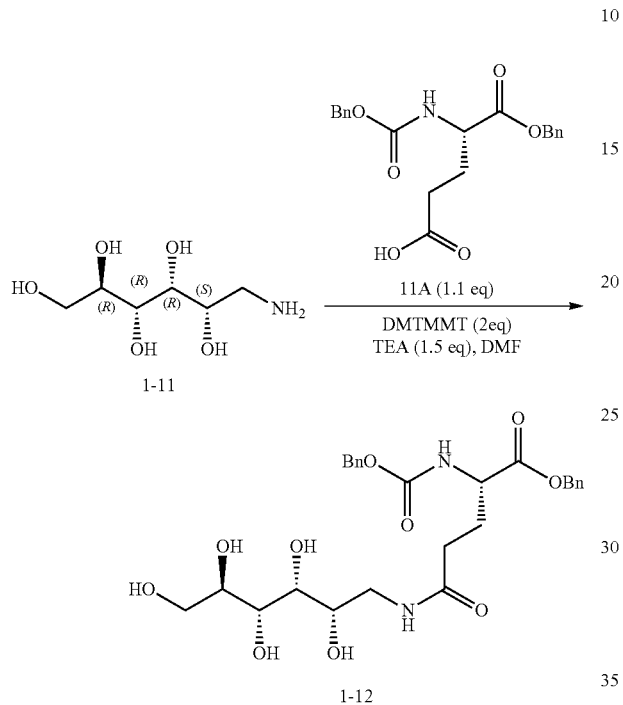

General procedure for preparation of (2S)-2-amino-5-oxo-5-[[(2S,3R,4R,5R)-2,3,4,5,6-pentahydroxyhexyl]amino]pentanoic acid (1-13)

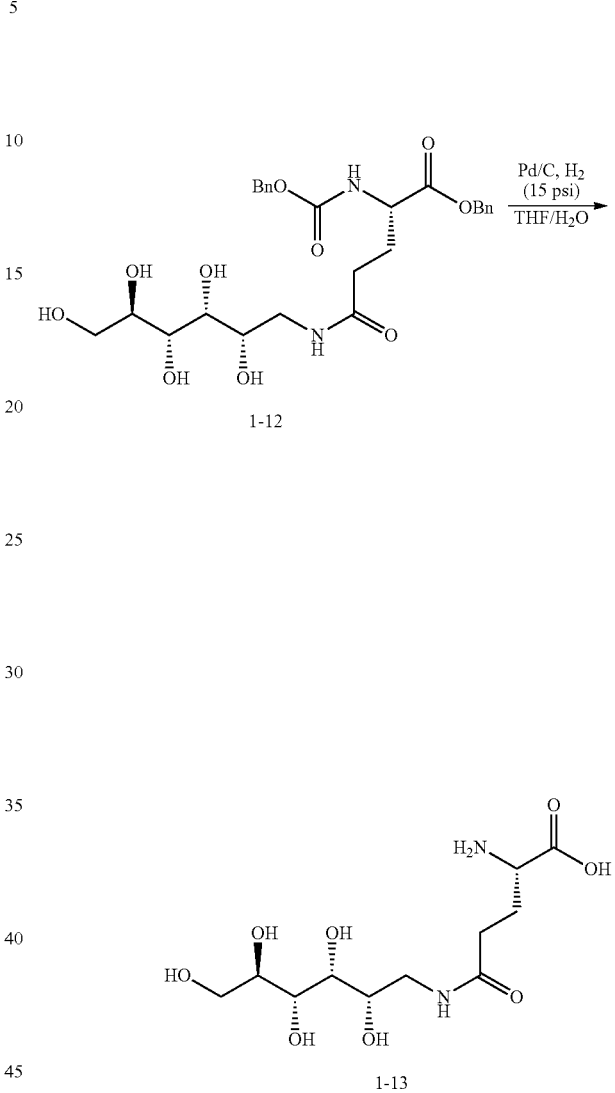

To a solution of compound 11A (6.03 g, 16.27 mmol, 1.1 eq) in N,N-dimethylformamide (27 mL) was added 4-(4,6-dimethoxy-1,3,5-triazin-2-yl)-4-methylmorpholinium tetrafluoroborate (DMTMMT) (9.7 g, 29.59 mmol, 2 eq) and triethylamine (2.24 g, 22.19 mmol, 1.5 eq) successively. After stirred at 25° C. for 0.5 hr, compound 1-11 (2.68 g, 14.79 mmol, 1 eq) was added and the reaction mixture was stirred at 25° C. for 12 hrs. LCMS (retention time of product=0.253) showed the starting material was consumed and new peak with desired MS was detected. The reaction mixture was diluted with water (50 mL) and extracted with dichloromethane (6×50 mL). The combined organic layers were washed with brine (3×130 mL), dried over $Na_2SO_4$ and filtered. The filtrate was concentrated under reduced pressure and the residue was high vacuumed to give an oil. The oil was purified by reverse phase HPLC (3 kg Agela C18 column, $CH_3CN/H_2O$, 300 mL/min, gradient: 30% $CH_3CN$ for 10 min, 30% to 45% $CH_3CN$ in 30 min, 45% $CH_3CN$ for 35 min; about 15 grams of crude product was dissolved in 70 mL of DMF to load on the column) to afford product 1-12 (4 g, 6.74 mmol, yield 46.1%, purity 99%) as a white solid. $^1H$ NMR (400 MHz, DMSO-d6) δ 1.72-1.85 (m, 1H) 1.91-2.03 (m, 1H) 2.18 (br t, J=7.44 Hz, 2H) 2.96-3.03 (m, 1H) 3.24 (dt, J=13.16, 5.17 Hz, 2H) 3.37-3.40 (m, 2H) 3.44 (br s, 2H) 4.04-4.11 (m, 1H) 4.29 (d, J=6.38 Hz, 1H) 4.39-4.45 (m, 2H) 4.51 (d, J=5.63 Hz, 1H) 4.75 (d, J=4.63 Hz, 1H) 4.96-5.14 (m, 4H) 7.19-7.46 (m, 10H) 7.68-7.85 (m, 2H).

To a solution of compound 1-12 (4 g, 7.48 mmol, 1 eq) in water (192 mL) and tetrahydrofuran (48 mL) was added Pd/C (15.86 g, 14.96 mmol, 10 wt %, 2 eq). The mixture was stirred at 25° C. for 12 hrs under $H_2$ (15 psi). LCMS (retention time of product=0.137) showed the starting material was consumed and desired product was detected. The mixture was filtered through a celite pad and the filtrate was concentrated to give product 1-13 (2 g, 6.26 mmol, yield 83.6%, purity 97.1%) as a white solid. $^1H$ NMR (400 MHz, DEUTERIUM OXIDE) δ 3.84 (dt, J=7.76, 4.74 Hz, 1H) 3.70-3.80 (m, 4H) 3.58-3.64 (m, 2H) 3.41 (dd, J=14.06, 4.03 Hz, 1H) 3.25 (dd, J=14.06, 7.83 Hz, 1H) 2.41 (br s, 2H) 2.10 (br s, 2H).

General procedure for preparation of (2S)-2-[6-(2,5-dioxopyrrol-1-yl)hexanoylamino]-5-oxo-5-[[(2S,3R,4R,5R)-2,3,4,5,6-pentahydroxyhexyl]amino]pentanoic acid (1-14)

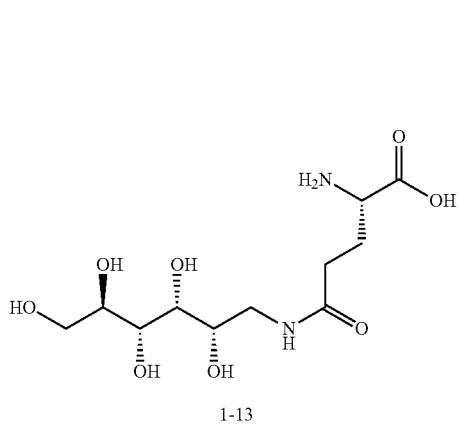

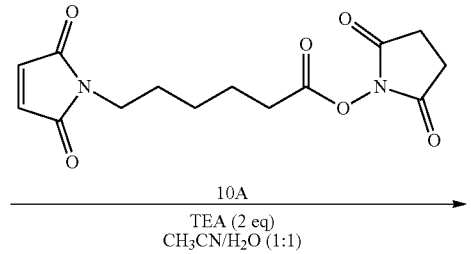

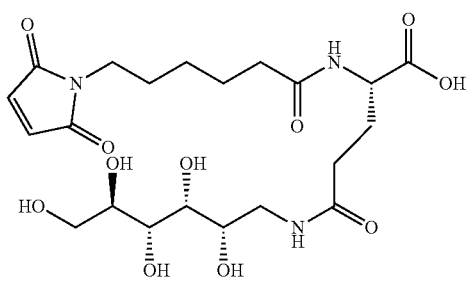

To a stirring solution of compound 1-13 (contained water and 0.0361 mol or 11.2 g of 1-13) and 10A (11.13 g, 0.0361 mol) in acetonitrile (100 mL) and water (100 mL) was added TEA (7.3 g, 0.0722 mol) at 10-20° C. The reaction solution continued to be stirred at 10-20° C. for 18 hours. It was purified by preparative HPLC (C18 column, mobile phase: CH$_3$CN and water) to give product 1-14 as a light red solid (9.7 g, y=53%, purity 95.7%) after lyophilization. $^1$H NMR (400 MHz, DEUTERIUM OXIDE) δ 6.78 (s, 1H) 4.30 (dd, J=9.11, 5.07 Hz, 1H) 3.83 (dt, J=7.89, 4.74 Hz, 1H) 3.79-3.74 (m, 1H) 3.74-3.68 (m, 2H) 3.65-3.57 (m, 2H) 3.46 (t, J=6.91 Hz, 2H) 3.40 (dd, J=14.06, 4.16 Hz, 1H) 3.23 (dd, J=14.00, 7.89 Hz, 1H) 2.39-2.30 (m, 2H) 2.24 (t, J=7.27 Hz, 2H) 2.20-2.08 (m, 1H) 2.04-1.89 (m, 1H) 1.55 (dquin, J=14.04, 7.19, 7.19, 7.19, 7.19 Hz, 4H) 1.28-1.17 (m, 2H).

General procedure for preparation of (2S)-2-[6-(2,5-dioxopyrrol-1-yl)hexanoylamino]-N-[(1S)-1-[[(1S)-2-[4-[(19S)-19-ethyl-6-fluoro-19-hydroxy-7-methyl-14,18-dioxo-17-oxa-3,13-diazapentacyclo[11.8.0.0$^{2,11}$.0$^{4,9}$.0$^{15,20}$]henicosa-1(21),2,4,6,8,10,15(20)-heptaen-8-yl]butoxymethylamino]-1-methyl-2-oxo-ethyl]carbamoyl]-2-methyl-propyl]-N'-[(2S,3R,4R,5R)-2,3,4,5,6-pentahydroxyhexyl]pentanediamide (MB-3, meditecan, 美迪梣康)

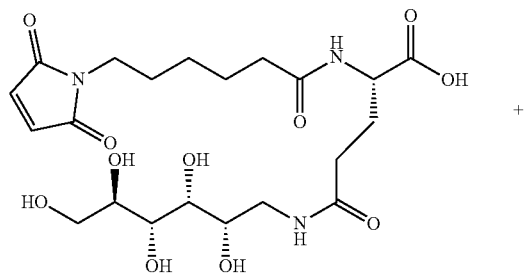

+

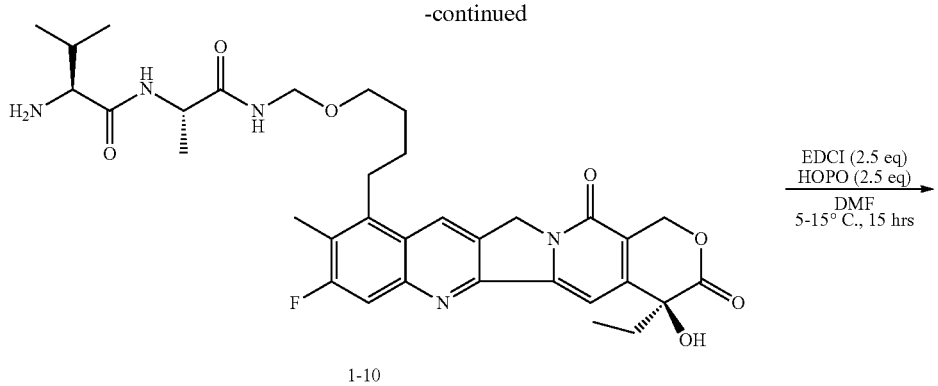

1-10

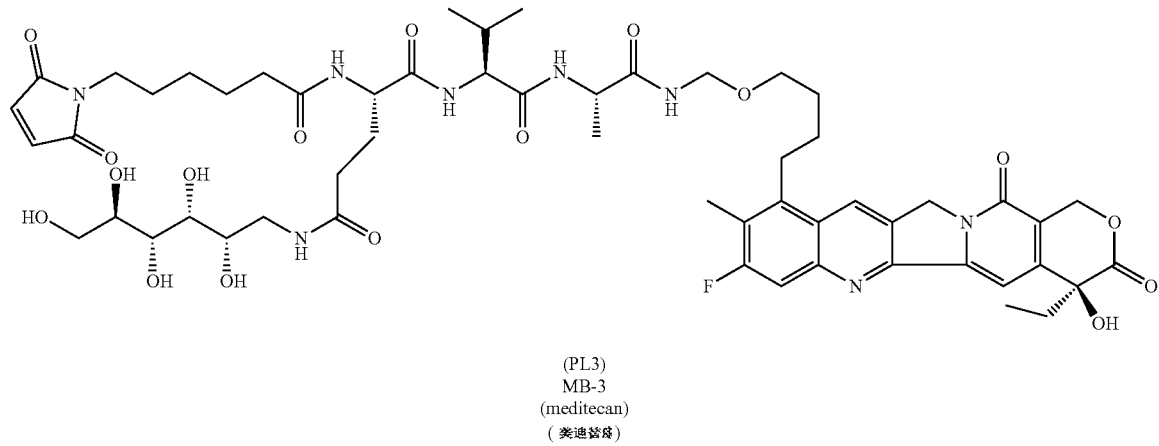

(PL3)
MB-3
(meditecan)
(美迪替康)

To a stirring solution of compound 1-10 (15 g, purity: 90.1%, 0.0207 mol) and compound 1-14 (8.7 g, 0.0173 mol) in anhydrous DMF (400 mL) was added a mixture of EDCI (8.04 g, 0.0518 mol) and HOPO (5.75 g, 0.0518 mol) at 5-15° C. It continued to be stirred at 5-15° C. for 13.5 hours and purified by preparative HPLC (C18 column, mobile phase: $CH_3CN/H_2O$) to give product MB-3 (meditecan, 美迪替康) as an off-white solid (7.1 g, y=30.2%, purity 98.8%). $^1$H NMR (400 MHz, DMSO-d6) δ 8.87 (s, 1H), 8.60 (br s, 1H), 8.08 (br d, J=6.2 Hz, 1H), 8.00 (br d, J=7.7 Hz, 1H), 7.77 (br d, J=11.5 Hz, 1H), 7.72 (br s, 1H), 7.63 (br d, J=9.3 Hz, 1H), 7.32 (s, 1H), 6.99 (s, 2H), 6.53 (s, 1H), 5.43 (br s, 2H), 5.29 (br s, 2H), 4.74 (br s, 1H), 4.57 (br s, 1H), 4.52 (br d, J=6.6 Hz, 1H), 4.47 (br d, J=5.5 Hz, 1H), 4.38 (br d, J=5.1 Hz, 1H), 4.33 (br s, 1H), 4.26 (br d, J=6.4 Hz, 1H), 4.23 (br d, J=6.6 Hz, 2H), 4.13 (br s, 1H), 3.55 (br d, J=4.4 Hz, 3H), 3.45 (br s, 7H), 3.14 (br s, 3H), 3.00 (br s, 1H), 2.42 (br s, 3H), 2.08 (br d, J=5.7 Hz, 4H), 1.96-1.78 (m, 1H), 1.96-1.78 (m, 4H), 1.69 (br s, 3H), 1.58 (br s, 2H), 1.45 (br s, 4H), 1.18 (br d, J=6.4 Hz, 5H), 0.88 (br t, J=7.1 Hz, 3H), 0.76-0.76 (m, 1H), 0.76 (br dd, J=6.9, 11.4 Hz, 5H). $^{13}$C NMR (101 MHz, DMSO-d6) δ 173.14, 172.49 (d, J=10.3 Hz, 1C), 172.08, 171.53, 171.14, 170.58, 163.06, 160.59, 156.93, 152.35, 150.07, 147.96 (d, J=13.9 Hz, 1C), 145.41, 140.24, 134.48, 129.34, 128.39, 125.08, 124.09, 119.08, 110.24 (br d, J=22.7 Hz, 1C), 96.83, 72.44, 72.10, 71.78, 71.55, 69.67, 69.25, 66.80, 65.33, 63.38, 57.25, 52.34, 50.52, 48.41, 42.09, 37.02, 34.99, 31.98, 30.69, 30.36, 29.01, 27.81, 27.65 (br s, 1C), 26.75, 25.82, 24.80, 19.12, 17.88 (d, J=11.7 Hz, 1C), 11.44 (d, J=5.9 Hz, 1C), 7.81. HRMS (ESI-TOF) m/z: [M+H]$^+$ calcd 1137.52; found 1137.5140.

Example 4. Exemplary Synthesis of Antibody-Drug Conjugates MB-2a and MB-3a (Trastuzumab Meditecan)

General Procedure for Preparation of Trastuzumab-Drug Conjugate MB-2a

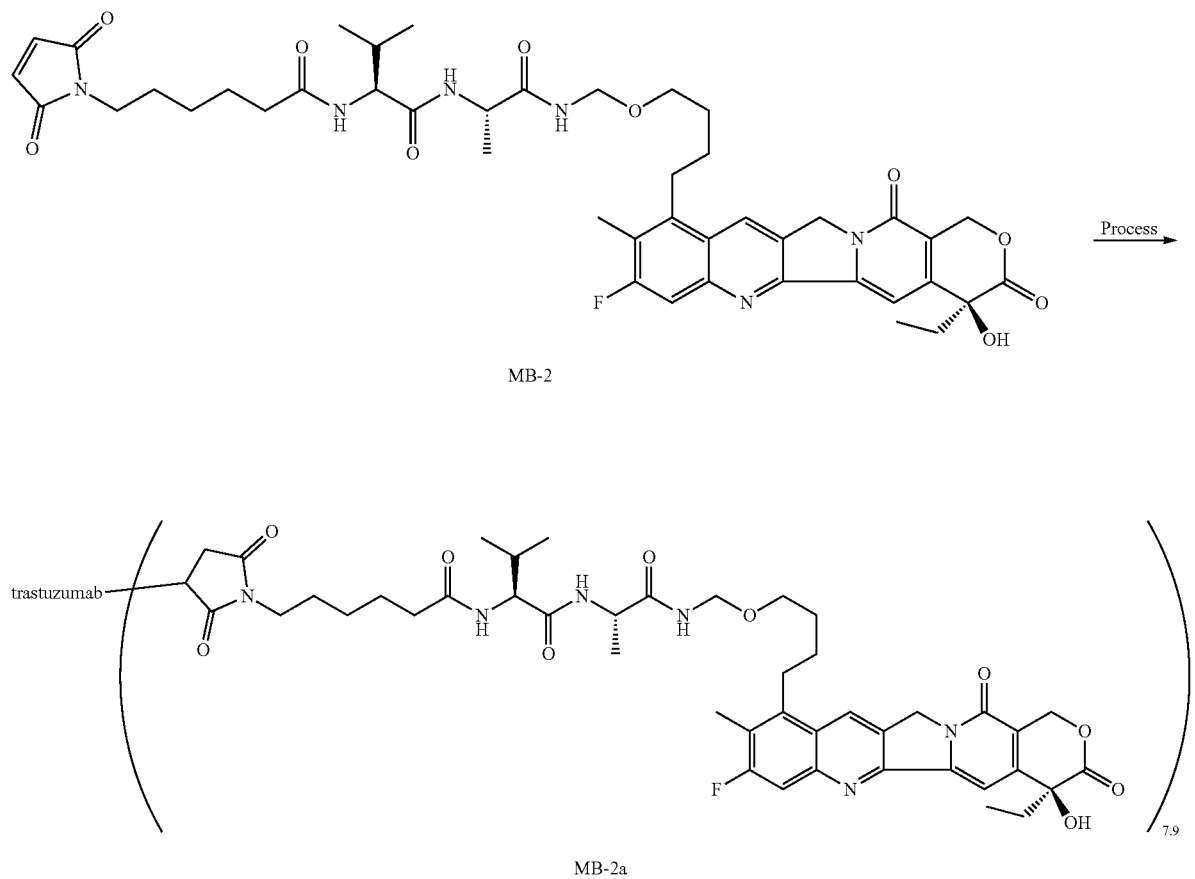

50 mM conjugation buffer (pH 7.4): One liter contains 6.86 g of $Na_2HPO_4 \cdot 2H_2O$ and 1.58 g of $NaH_2PO_4 \cdot H_2O$.

10 mM DTPA (pentetic acid) solution: One liter contains 3.90 g of DTPA and 1.20 g of NaOH.

25 mM His/His-HCl formulation buffer (pH 5.5): One liter contains 0.90 g of L-histidine and 4.04 g of L-histidine hydrochloride monohydrate.

Antibody preparation: 452 mg of lyophilized trastuzumab powder was dissolved in 22 mL of purified water. The obtained antibody solution was dialyzed 4 cycles with the 50 mM conjugation buffer using ultrafiltration tube (30 KD) to give an antibody concentration of 8.63 mg/ml (extinction coefficient of trastuzumab $\varepsilon_{280}=213380\ M^{-1}cm^{-1}$ was used).

Reduction of the antibody: To a tube containing 12.2 mL (105 mg, 0.000724 mmol of trastuzumab) of above prepared trastuzumab solution was added 6.2 mL of 50 mM conjugation buffer followed by the addition of 579.2 µl of TCEP (10 mM) and 2.1 mL of 10 mM DTPA. The tube was put into the Thermomixer and the reduction reaction was run at 25° C. for 2 hours.

Conjugation between antibody and payload: To the above trastuzumab reduction solution was added a solution of MB-2 (7.45 mg, 0.00882 mmol) in DMSO (1.76 mL). The tube was put into the Thermomixer and the conjugation reaction was run at 25° C. for 1 hour.

Purification: The above conjugation reaction solution was subjected to the purification using ultrafiltration tube (30 KD) for 6 cycles with the 25 mM His/His-HCl formulation buffer to give 5.5 mL (15.1 mg/mL, antibody yield=83 mg, % yield=79%) of MB-2a in the formulation buffer.

Physicochemical Characterization of MB-2a (Extinction Coefficient of the Payload $\varepsilon_{280}=4546\ M^{-1}cm^{-1}$ and $\varepsilon_{360}=17513\ M^{-1}cm^{-1}$ were Used) (Table 1):

TABLE 1

| Analysis Items | Methods | Results | | |
|---|---|---|---|---|
| Monomer level | SEC-HPLC | 99.4 % | | |
| DAR | HIC-HPLC | DAR = 7.9 | | |
| | | D6 = 5.9% | | |
| | | D8 = 94.1% | | |
| Concentration | UV-Vis | Mass concentration | | 15.1 mg/ml |
| | | Molarity | Antibody | 98.9 µmol/L |
| | | | Payload | 797.3 µmol/L |

General Procedure for Preparation of Trastuzumab-Drug Conjugate MB-3a

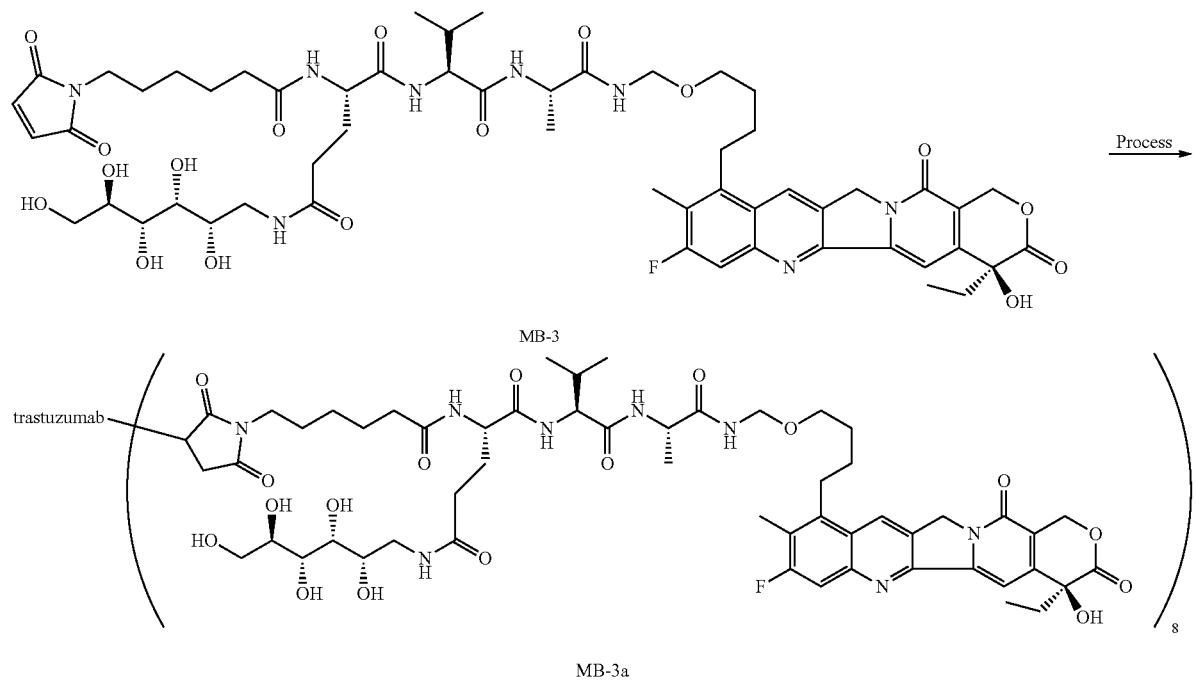

50 mM conjugation buffer (pH 7.4): One liter contains 6.86 g of $Na_2HPO_4·2H_2O$ and 1.58 g of $NaH_2PO_4H_2O$.

10 mM DTPA (pentetic acid) solution: One liter contains 3.90 g of DTPA and 1.20 g of NaOH.

25 mM His/His-HCl formulation buffer (pH 5.5): One liter contains 0.90 g of L-histidine and 4.04 g of L-histidine hydrochloride monohydrate.

Antibody preparation: 452 mg of lyophilized trastuzumab powder was dissolved in 22 mL of purified water. The obtained antibody solution was dialyzed 4 cycles with the 50 mM conjugation buffer using ultrafiltration tube (30 KD) to give an antibody concentration of 8.63 mg/ml (extinction coefficient of trastuzumab $\varepsilon_{280}=213380\ M^{-1}cm^{-1}$ was used).

Reduction of the antibody: To a tube containing 12.2 mL (105 mg, 0.000724 mmol of trastuzumab) of above prepared trastuzumab solution was added 6.2 mL of 50 mM conjugation buffer followed by the addition of 579.2 μl of TCEP (10 mM) and 2.1 mL of 10 mM DTPA. The tube was put into the Thermomixer and the reduction reaction was run at 25° C. for 2 hours.

Conjugation between antibody and payload: To the above trastuzumab reduction solution was added a solution of MB-3 (10.02 mg, 0.00886 mmol) in DMSO (1.77 mL). The tube was put into the Thermomixer and the conjugation reaction was run at 25° C. for 1 hour.

Purification: The above conjugation reaction solution was subjected to purification using ultrafiltration tube (30 KD) for 6 cycles with the 25 mM His/His-HCl formulation buffer to give 6.2 mL (14.6 mg/mL, antibody yield=90.5 mg, % yield=86%) of MB-3a in the formulation buffer.

Physicochemical Characterization of MB-3a (Extinction Coefficient of the Payload $\varepsilon_{280}=4546\ M^{-1}cm^{-1}$ and $\varepsilon_{360}=17513\ M^{-1}cm^{-1}$ were Used) (Table 2):

TABLE 2

| Analysis Items | Methods | Results | |
|---|---|---|---|
| Monomer level | SEC-HPLC | 98.4 % | |
| DAR | HIC-HPLC | DAR = 8 | |
| | | D8 = 100% | |
| Concentration | UV-Vis | Mass concentration | 14.6 mg/ml |
| | | Molarity Antibody | 94.8 μmol/L |
| | | Payload | 772.5 μmol/L |

Example 5. In Vitro Assays of the Toxins and ADCs

Dispensed 175 μL cell suspension in 96-well plate at 1500 cells per well and incubate for 24 hours in a humidified incubator (37° C., 5% $CO_2$). For antibody blocking, incubate cells (15000 cells/mL) with $2\times10^{-6}$ M of trastuzumab (final concentration 1 μM). Added 25 μL various concentrations of compound as a 5× solution into the cell culture medium (Fetal bovine serum, Invitrogen) in the plate and incubated for 120 hours in the incubator. Thawed CCK-8 on the bench top or in a 37° C. water bath, added 10 μL of CCK-8 to each well of the incubated plate (be careful not introducing air bubbles into the wells since they would interfere with the O. D. reading) and then further incubated for 1-4 hours in the incubator. Measured the absorbance at 450 nm using a SpectraMax i3× Microplate Reader and calculated the cell inhibition rate. The $IC_{50}$ curves were generated along with the $IC_{50}$ values by using GraphPad Prism software.

The results of the in vitro cytotoxicity assay of the toxins (the expected metabolites of the ADCs) are summarized in the following Table 3 and FIGS. 1A-1F. The cytotoxicities of metabolite MB-1 are comparable to DXd which is the metabolite of DS-8201a (Enhertu) in multiple cell lines, except in moderate Her-2 expression and trastuzumab-resistant cell line JIMT-1, in which MB-1 is ten folds more potent than DXd.

TABLE 3

| Compound | Cell Lines (IC$_{50}$, nM) | | | | | | |
|---|---|---|---|---|---|---|---|
| | SK-BR-3 | MCF-7 | NCI-N87 | SK-OV-3 | MDA-MB-468 | JIMT-1 | OVCAR-3 |
| 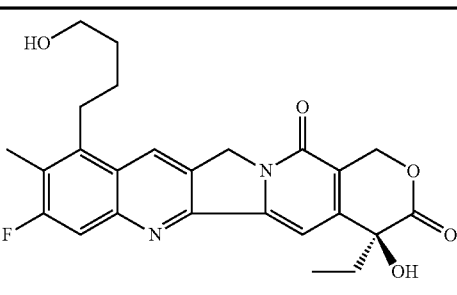 MB-1 | 0.77 | 0.37 | 1.3 | 1.0 | 0.42 | 0.78 | 0.10 |
| 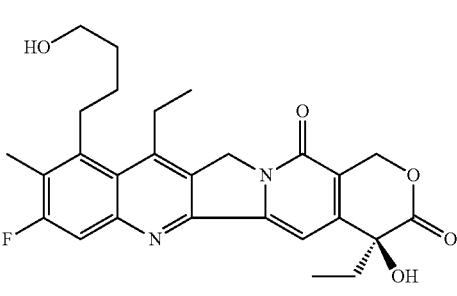 P2 | >30 | | >30 | | >30 | >30 | |
| 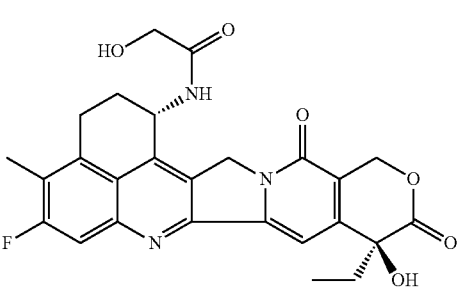 DXd | 1.9 | 0.57 | 3.6 | 4.7 | 0.57 | 8.7 | 0.20 |

Figure 2A:
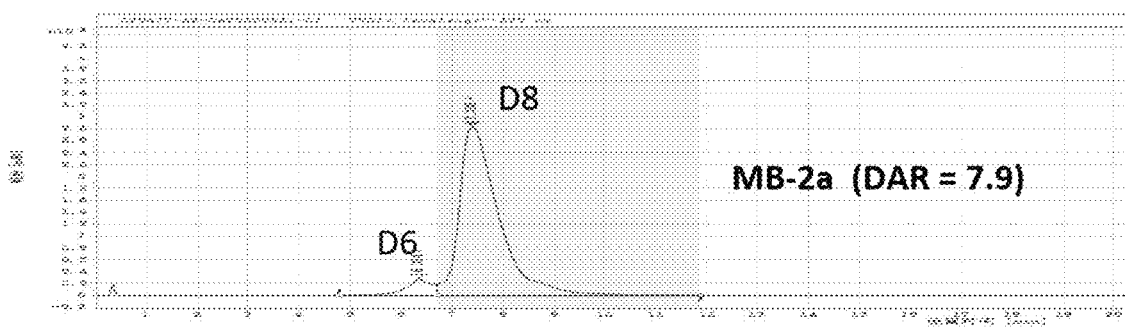
FIGS. 2A-2C depicts HIC-HPLC of the ADCs MB-2a (FIG. 2A); MB-3a (FIG. 2B) and DS-8201a (Enhertu) (FIG. 2C).
Figure 2B:
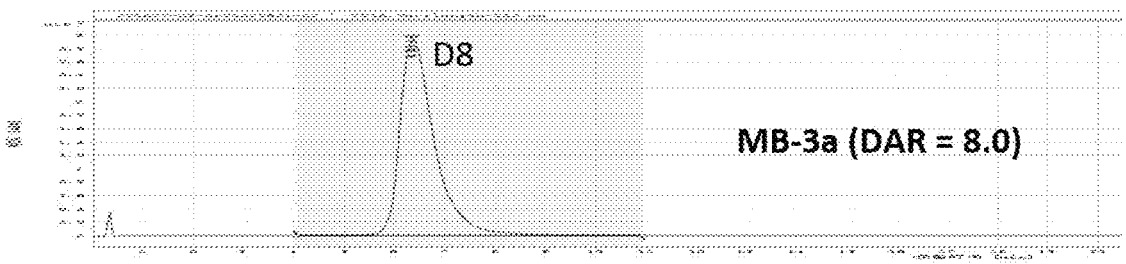
Figure 2C:
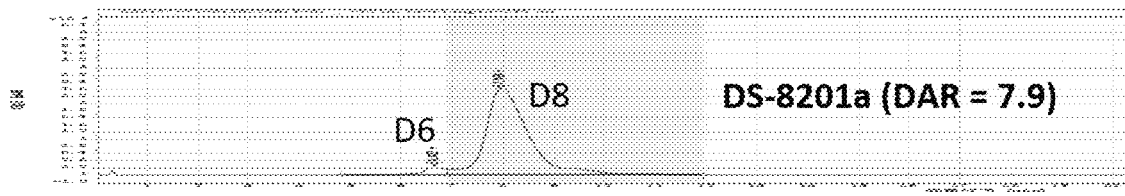

Payload MB-3 (meditecan) is more hydrophilic than MB-2 and Daiichi's payload deruxtecan due to the present of the polyol moiety in the linker. Thus, MB-3 is more reactive with disulfide-reduced trastuzumab to give MB-3a (trastuzumab meditecan) which is a homogenous ADC with DAR value being 8. In contrast, both MB-2a and DS-8201a (trastuzumab deruxtecan) contain small percentage of DAR6 species because of the less reactivity of their payloads toward the reduced antibody. The HIC-HPLC spectra of the ADCs are shown in FIGS. 2A-2C. Hydrophilic payload MB-3 is more reactive in the conjugation reaction to give MB-3a as a homogeneous ADC. Payloads MB-2 and MB-3 which are incorporated in ADCs MB-2a and MB-3a respectively, are designed to enable the ADCs having better bystander activity than DS-8201a (Enhertu).

The results of the in vitro cytotoxicity assay of the ADCs are summarized in the following Table 4 and FIGS. 3A-3D.

Figure 3A:
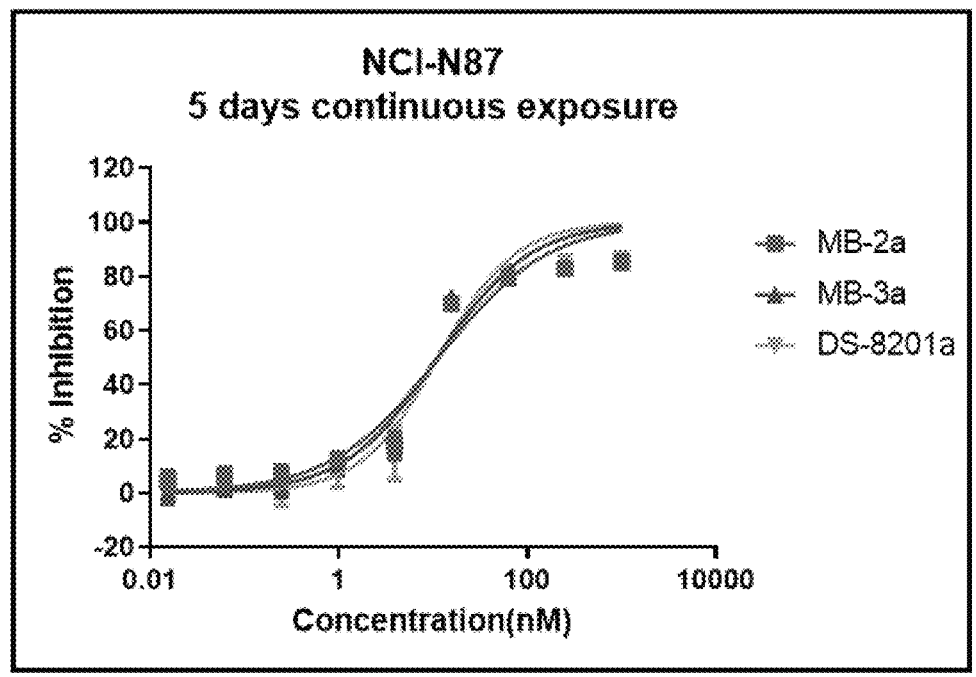
FIG. 3A-3D show exemplary results of in vitro cell growth inhibitory activity of ADCs in Her2 high expression cell line NCI-N87 (FIG. 3A); NCI-N87 with trastuzumab blocking (FIG. 3B); JIMT-1 which has a moderate Her2-expression and is a trastuzumab-resistant cell line (FIG. 3C); and Her2 negative cell line MDA-MB-468 (FIG. 3D).
Figure 3B:
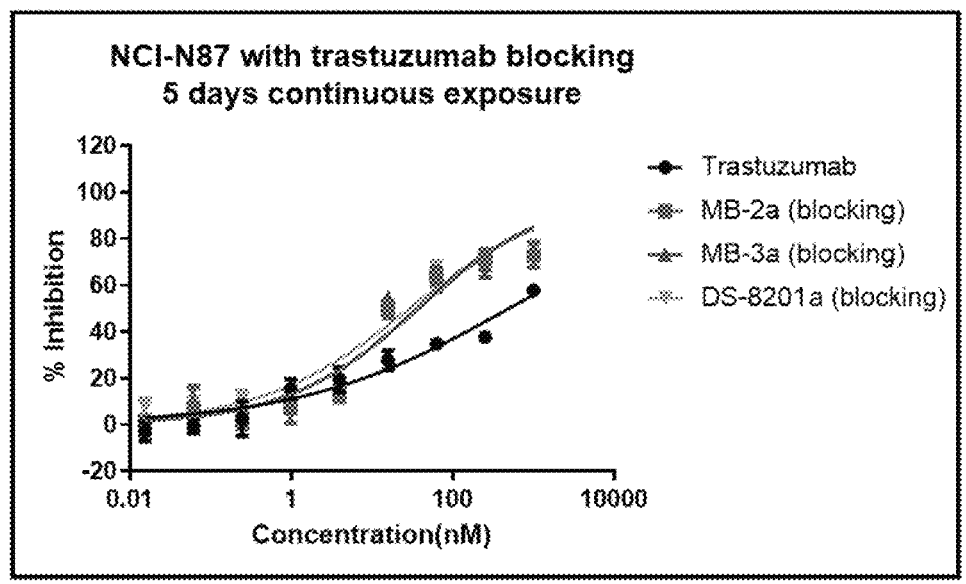
Figure 3C:
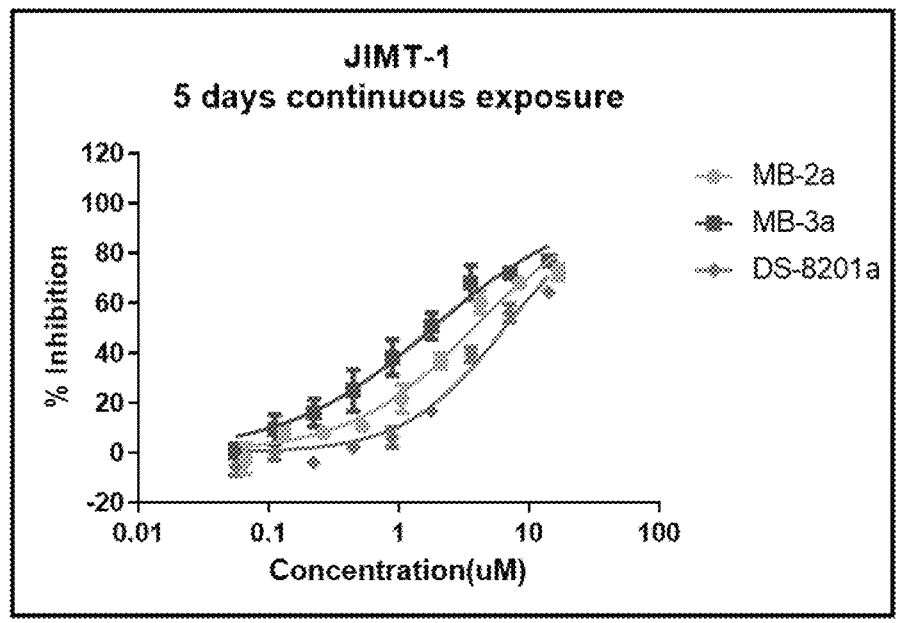
Figure 3D:
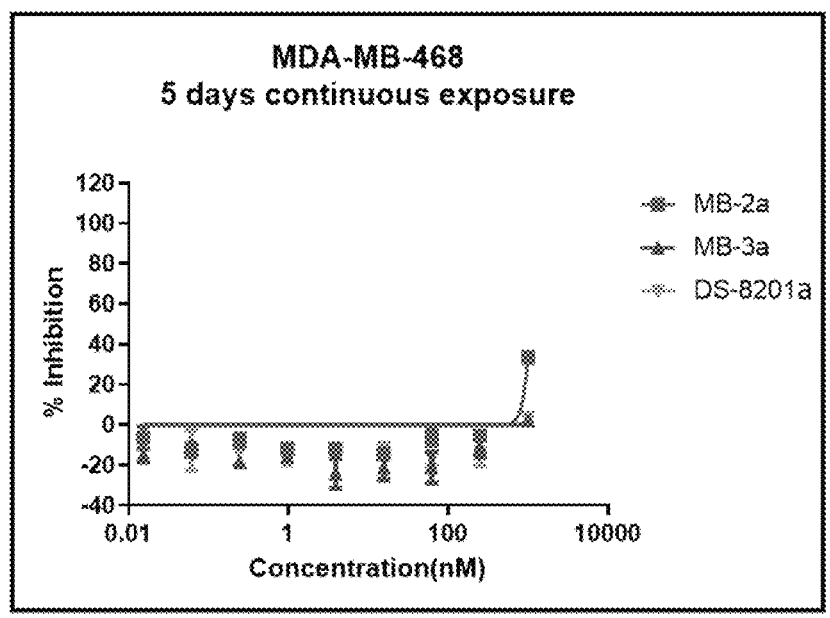

In addition to exemplary compounds of Formula III such as MB-2a and MB-3a, the activity of trastuzumab and the ADC trastuzumab deruxtecan (DS-8201a) were also evaluated for the sake of comparison. As shown in Table 4 and FIGS. 3A-3D, trastuzumab ADCs MB-2a and MB-3a showed the same potency as DS-8201a in a Her2 high expression cell line, NCI-N87 (FIG. 3A). However, when the Her2 antigens were blocked with trastuzumab, the cell growth inhibition ability of the ADCs decreased (FIG. 3B). In addition, the ADCs are not potent in Her2 negative cell line MDA-MB-468 (FIG. 3D), demonstrating specificity of the ADCs for Her2-expressing cells. Although the ADCs are not sensitive in the in vitro assay in JIMT-1 cells which has moderate level of Her2 expression, MB-2a and MB-3a are still relative more potent than DS-8201a in this cell line (FIG. 3C).

TABLE 4

| Compound | NCI-N87 | NCI-N87 with trastuzumab blocking | JIMT-1 | MDA-MB-468 | SK-Br-3 |
|---|---|---|---|---|---|
| Trastuzumab | 495 | | | | 0.56 |
| MB-2a | 11.5 | 37.8 | 3773 | >1000 | |
| MB-3a | 11.1 | 36.4 | 1815 | >1000 | 0.12 |
| DS-8201a | 11.3 | 29 | 6496 | >1000 | 0.09 |

Cell Lines (IC$_{50}$, nM)

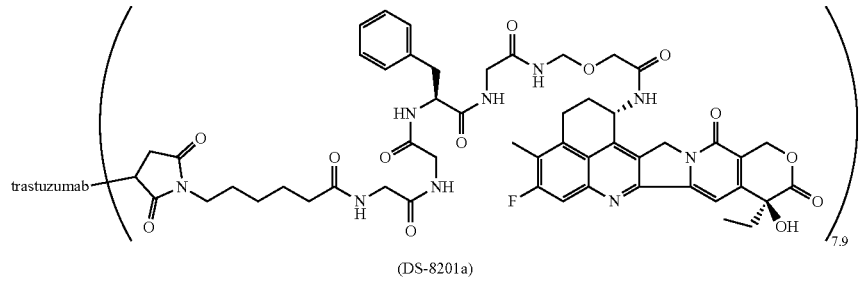

(DS-8201a)

In a stability study of the ADCs in the formulation buffer, MB-2a, MB-3a and DS-8201a are all stable at room temperature. The DAR values did not change either at 25° C. or 37° C., which indicated that no payloads fell off from the antibodies. MB-2a and DS-8201a formulations demonstrated increased high molecular weight (HMW) and low molecular weight (LMW) species over time at 37° C. Only LMW species slightly increased after 6 days at 37° C. for MB-3a. MB-3a is more stable than MB-2a and DS-8201a at elevated temperature because it incorporated a more hydrophilic payload. The stability data are shown in Table 5.

TABLE 5

| ADCs | Temperature | Time (Day) | SEC(%) HMW | SEC(%) Monomer | SEC(%) LMW | HIC DAR |
|---|---|---|---|---|---|---|
| MB-2a | 25° C. | 0 | 0.6 | 99.4 | / | 7.55 |
| | | 1 | 0.7 | 99.3 | / | 7.52 |
| | | 3 | 1.0 | 98.4 | 0.6 | 7.53 |
| | 37° C. | 3 | 0.7 | 91.3 | 8 | 7.56 |
| | | 6 | 3.9 | 86.0 | 9.1 | 7.51 |
| MB-3a | 25° C. | 0 | 0.7 | 99.3 | / | 8 |
| | | 1 | 0.7 | 99.1 | 0.2 | 8 |
| | | 3 | 0.7 | 99.1 | 0.2 | 8 |
| | 37° C. | 3 | 0.8 | 95.0 | 4.2 | 8 |
| | | 6 | 0.9 | 94.2 | 4.9 | 8 |
| DS-8201a | 25° C. | 0 | 0.9 | 99.1 | / | 7.55 |
| | | 1 | 1.0 | 99.0 | / | 7.55 |
| | | 3 | 0.8 | 99.2 | / | 7.57 |
| | 37° C. | 3 | 0.8 | 94.9 | 4.3 | 7.58 |
| | | 6 | 3.7 | 86.6 | 9.7 | 7.58 |

Example 6. In Vivo Efficacy of the ADCs in NCI-N87 CDX Model

Each mouse (female Balb/c-Nude from Vital Rivers) was inoculated subcutaneously at the right flank with NCI-N87 tumor cells (5×10$^6$) mixed with Matrigel (50:50) in 0.2 mL of PBS for tumor development. The animals were randomly grouped on day 6 after tumor inoculation, when the average tumor volume reached around 160 mm$^3$, then treatment started for the efficacy study. Each group contained 8 mice. The test and control articles were administered to the tumor-bearing mice via tail vein at a volume of 5 mL/kg.

Tumor size was measured twice a week in two dimensions using a caliper, and the volume was expressed in mm$^3$ using the formula: V=0.5 a×b$^2$ where a and b were the long and short dimensions of the tumor, respectively. Results were represented by mean and the standard error (Mean±SEM).

Statistical analysis: Two-way ANOVA was performed to compare tumor volume between two groups. All data were analyzed using Graphpad Prism 6.0 and P<0.05 was considered to be statistically significant. Both statistical analysis and biological observations were taken into consideration.

Tumor growth inhibition: The tumor size was used for calculations of T/C values. T/C (%) of relative tumor proliferation rate was calculated using the formula: T/C (%)= (Ti/T0)/(Vi/V0)×100%. The relative tumor growth inhibition was calculated by formula: TGI (%)=[1−(Ti/T0)/(Vi/V0)]×100%. Ti refer to the mean tumor volume of treatment group measured at each indicated time point following treatment; T0 refer to the tumor volume of treatment group when grouping; Vi refer to the mean tumor volume of vehicle control group measured at each indicated time point following treatment; V0 refer to the tumor volume of vehicle control group when grouping. If T/C>40%, there is no efficacy; if T/C=<40%, and p value<0.05, there is tumor inhibition.

Figure 4:
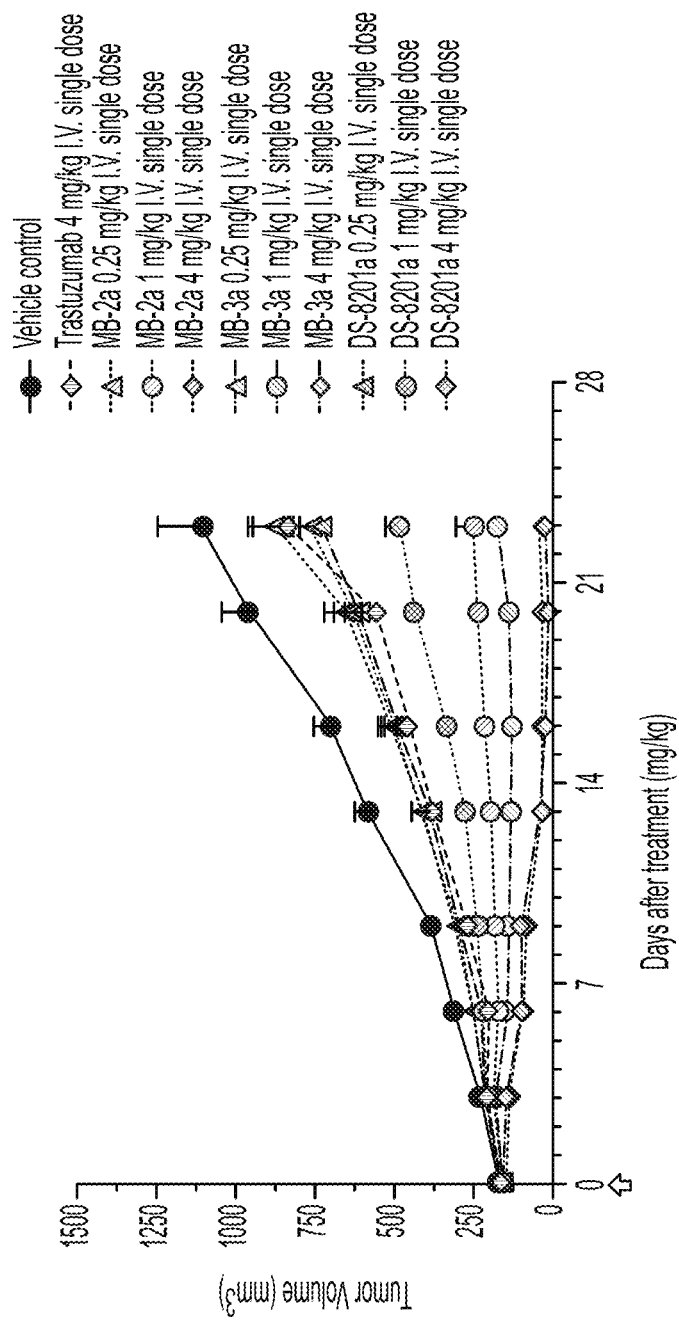
FIG. 4 illustrates tumor growth inhibition effects of the antibody drug conjugates (ADCs) in the NCI-N87 CDX model. MB-2a and MB-3a are ADCs encompassed by the present formula, which were studied along with a vehicle control, trastuzumab, and the ADC DS-8201a (Enhertu). As shown in this figure MB-2a (1 mg/kg and 4 mg/kg dosages) and MB-3a (1 mg/kg and 4 mg/kg dosages) demonstrated a strong antitumor effect. DS-8201a (Enhertu) was included in the study for the sake of comparison.

The antitumor effects of the ADCs in the NCI-N87 CDX model is illustrated in FIG. 4 and Table 6. As illustrated in FIG. 4, both MB-2a (1 mg/kg and 4 mg/kg doses) and MB-3a (1 mg/kg and 4 mg/kg doses) demonstrated a strong antitumor effect and are more efficacious than DS-8201a (Enhertu).

TABLE 6

| Model | ADCs | Dosage (mg/Kg, single i.v.) | Regressions Partial | Regressions Complete | TGI (%) (day 23) | Comments |
|---|---|---|---|---|---|---|
| NCI-N87 | Vehicle | N/A | — | — | — | — |
| | Trastuzumab | 4 | 0/8 | 0/8 | 16.8 | inactive |
| | MB-2a | 0.25 | 0/8 | 0/8 | 12.0 | inactive |
| | MB-3a | 0.25 | 0/8 | 0/8 | 28.1 | inactive |
| | DS-8201a | 0.25 | 0/8 | 0/8 | 24.7 | inactive |
| | MB-2a | 1 | 2/8 | 0/8 | 75.5 | active |
| | MB-3a | 1 | 3/8 | 0/8 | 82.4 | highly active |
| | DS-8201a | 1 | 0/8 | 0/8 | 52.2 | active |
| | MB-2a | 4 | 5/8 | 3/8 | 97.1 | highly active |

TABLE 6-continued

| Model | ADCs | Dosage (mg/Kg, single i.v.) | Regressions Partial | Regressions Complete | TGI (%) (day 23) | Comments |
|---|---|---|---|---|---|---|
| | MB-3a | 4 | 5/8 | 3/8 | 97.6 | highly active |
| | DS-8201a | 4 | 8/8 | 0/8 | 97.3 | highly active |

Example 7. In Vivo Efficacy of the ADCs in JIMT-1 CDX Model

Each mouse (Scid-Beige from Shanghai Lingchang Biotech) was inoculated subcutaneously at the right flank with JIMT-1 tumor cells ($1\times10^7$) mixed with Matrigel (50:50) in 0.2 mL of PBS for tumor development. The animals were randomly grouped on day 6 after tumor inoculation, when the average tumor volume reached around 175 mm$^3$, then treatment started for the efficacy study. Each group contained 8 mice. The test and control articles were administered to the tumor-bearing mice via tail vein at a volume of 5 mL/kg.

Tumor size was measured twice a week in two dimensions using a caliper, and the volume was expressed in mm$^3$ using the formula: V=0.5 a×b$^2$ where a and b were the long and short dimensions of the tumor, respectively. Results were represented by mean and the standard error (Mean±SEM).

Statistical analysis: Two-way ANOVA was performed to compare tumor volume between two groups. All data were analyzed using Graphpad Prism 6.0 and P<0.05 was considered to be statistically significant. Both statistical analysis and biological observations were taken into consideration.

Tumor growth inhibition: The tumor size was used for calculations of T/C values. T/C (%) of relative tumor proliferation rate was calculated using the formula: T/C (%)=(Ti/T0)/(Vi/V0)×100%. The relative tumor growth inhibition was calculated by formula: TGI (%)=[1−(Ti/T0)/(Vi/V0)]×100%. Ti refer to the mean tumor volume of treatment group measured at each indicated time point following treatment; T0 refer to the tumor volume of treatment group when grouping; Vi refer to the mean tumor volume of vehicle control group measured at each indicated time point following treatment; V0 refer to the tumor volume of vehicle control group when grouping. If T/C>40%, there is no efficacy; if T/C=<40%, and p value<0.05, there is tumor inhibition.

Figure 5:
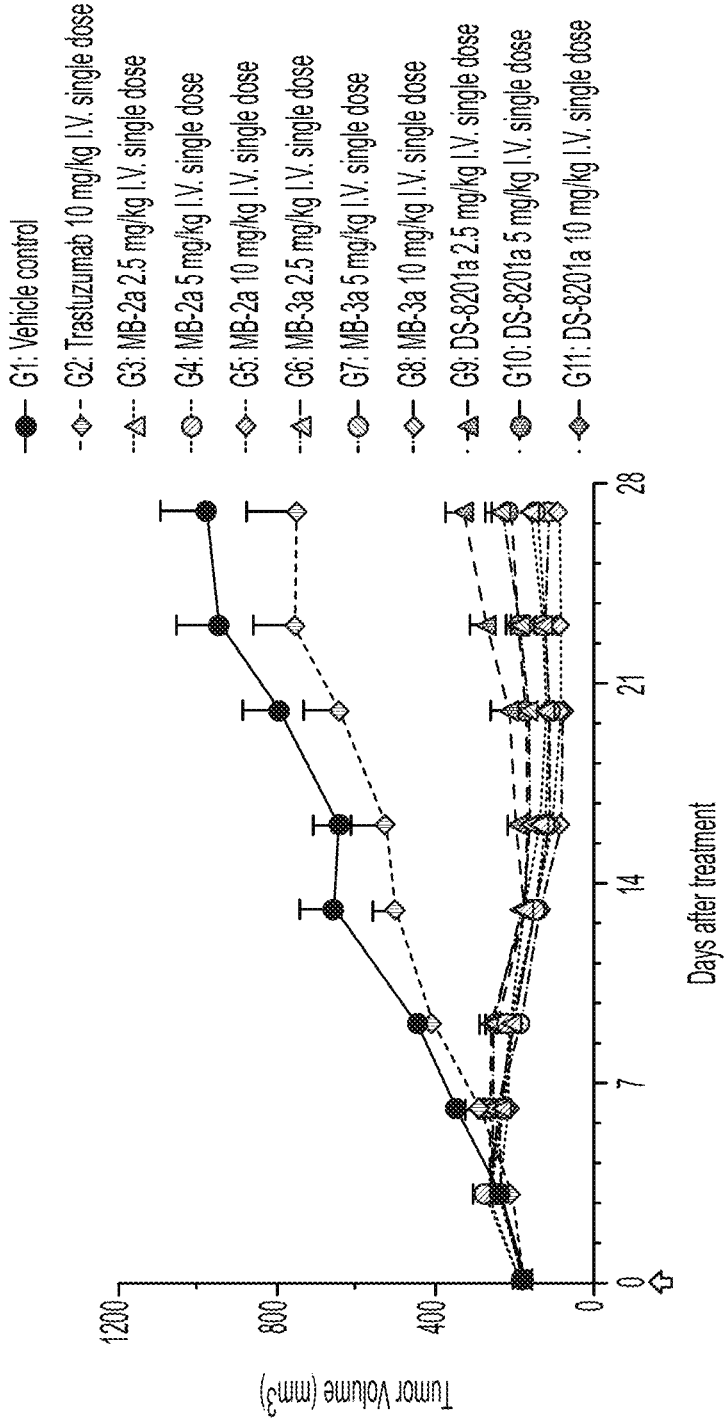
FIG. 5 illustrates tumor growth inhibition effects of the antibody drug conjugates (ADCs) in the JIMT-1 CDX model. In this study, all three doses of MB-2a and MB-3a (trastuzumab meditecan) studied showed a significant antitumor effect. DS-8201a (Enhertu) was included in the study for the sake of comparison.
Figure 6:
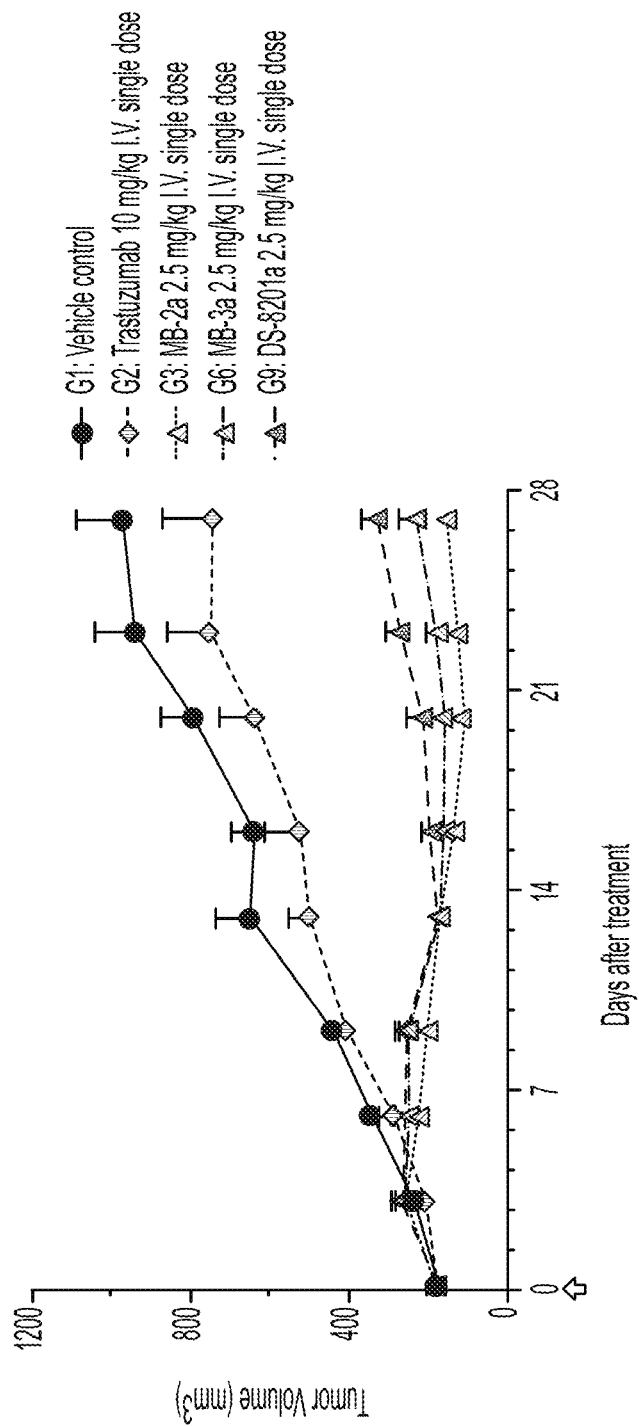
Figure 7:
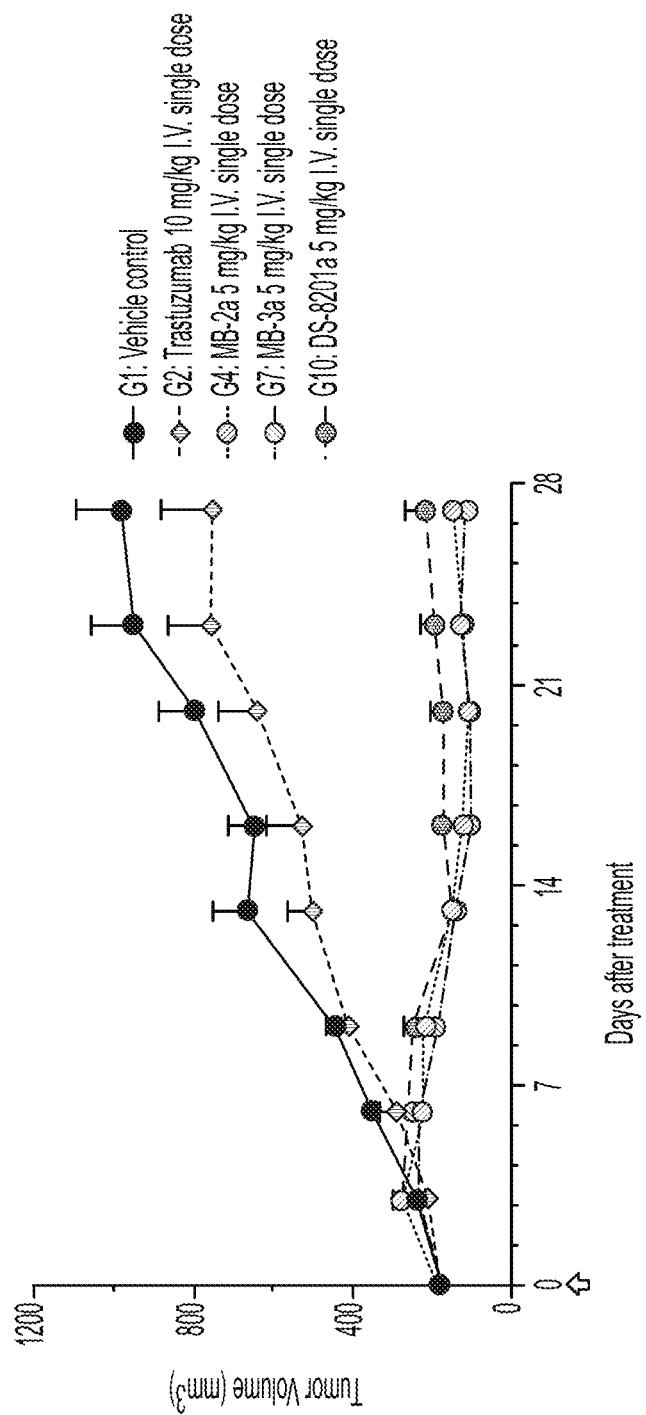
Figure 8:
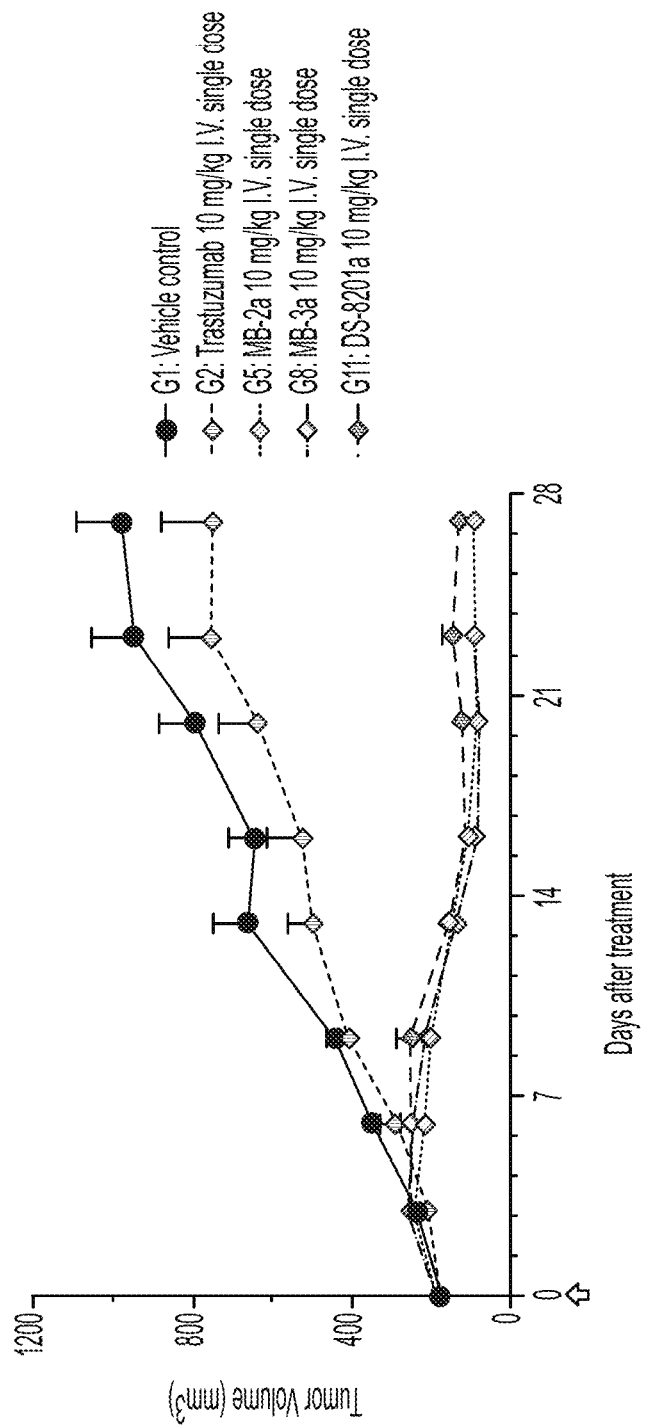
Figure 9:
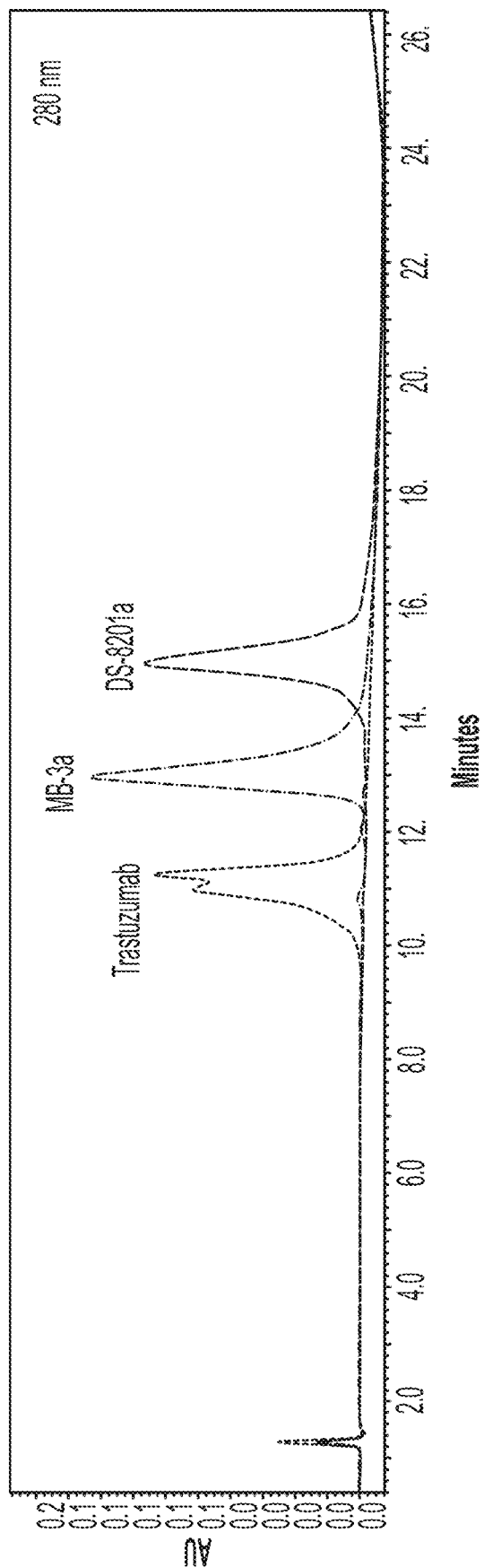
FIG. 9 illustrates the comparison of the hydrophilicity of MB-3a, DS-8201a, and trastuzumab.
Figure 10:
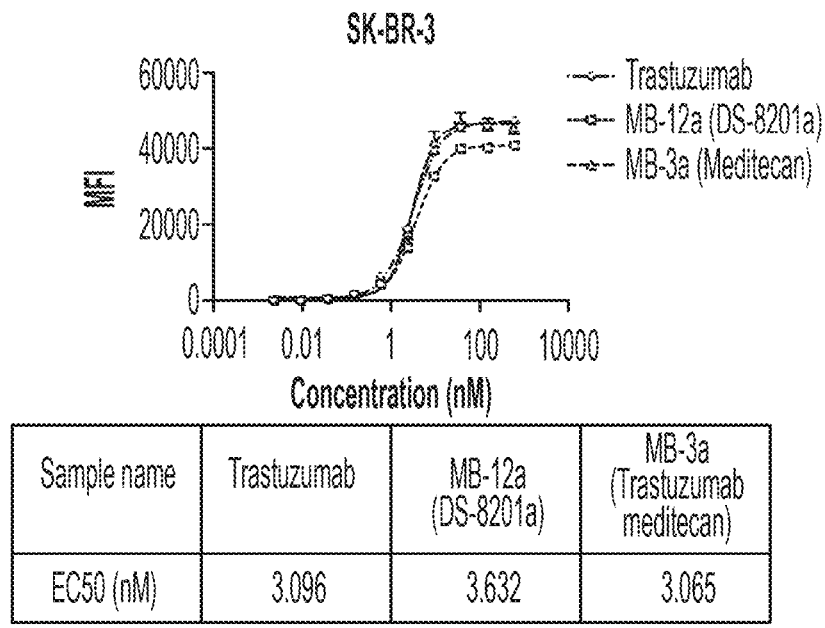
FIG. 10 illustrates the antigen binding affinity of MB-3a, DS-8201a, and trastuzumab.
Figure 11:
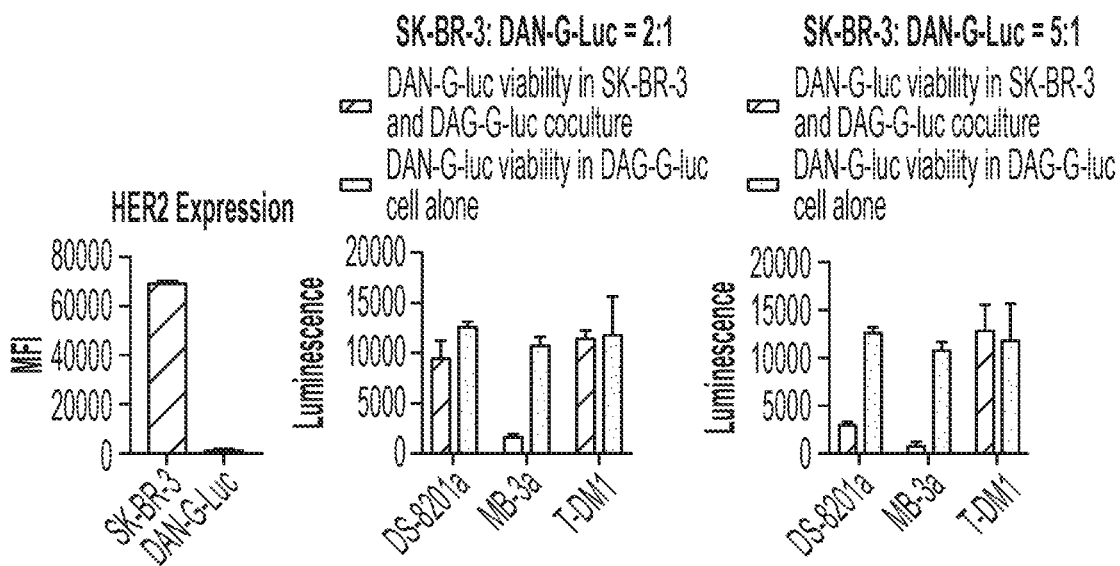
FIG. 11 illustrates the bystander effect of MB-3a, DS-8201a, and T-DM1. For each tested compound, the graph shows the Dan-G-Luc viability in SK-BR-3 and DAN-G-Luc coculture (left) and the Dan-G-Luc viability in DAN-G-Luc cell alone (right).

The antitumor effect of the ADCs in the JIMT-1 CDX model is illustrated in FIGS. 5-8 and in Table 7. FIG. 5 illustrates effects of antibody drug conjugates (ADCs) in the JIMT-1 CDX model at three different doses. In this study, all three doses of MB-2a and MB-3a studied showed a significant antitumor effect. The different doses studied in these experiments are also separately illustrated in FIG. 6 (2.5 mg/kg IV single doses), FIG. 7 (5 mg/kb IV single doses), and FIG. 8 (10 mg/kg IV single doses).

TABLE 7

| Model | ADCs | Dosage (mg/Kg, single i.v.) | Regressions Partial | Regressions Complete | TGI (%) (day 27) | Comments |
|---|---|---|---|---|---|---|
| JIMT-1 | Vehicle | N/A | — | — | — | — |
| | Trastuzumab | 10 | 0/8 | 0/8 | 22.5 | inactive |
| | MB-2a | 2.5 | 5/8 | 0/8 | 83.9 | highly active |
| | MB-3a | 2.5 | 3/8 | 0/8 | 76.2 | active |
| | DS-8201a | 2.5 | 1/8 | 0/8 | 66.3 | active |
| | MB-2a | 5 | 6/8 | 0/8 | 85.1 | highly active |
| | MB-3a | 5 | 7/8 | 0/8 | 88.4 | highly active |
| | DS-8201a | 5 | 4/8 | 0/8 | 78.4 | active |
| | MB-2a | 10 | 8/8 | 0/8 | 90.9 | highly active |
| | MB-3a | 10 | 6/8 | 1/8 | 90.9 | highly active |
| | DS-8201a | 10 | 7/8 | 0/8 | 87.5 | highly active |

All publications and patent applications cited in this specification are hereby incorporated by reference herein in their entireties and for all purposes as if each individual publication or patent application were specifically and individually indicated as being incorporated by reference and as if each reference was fully set forth in its entirety. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A compound, or a pharmaceutically acceptable salt thereof, selected from:

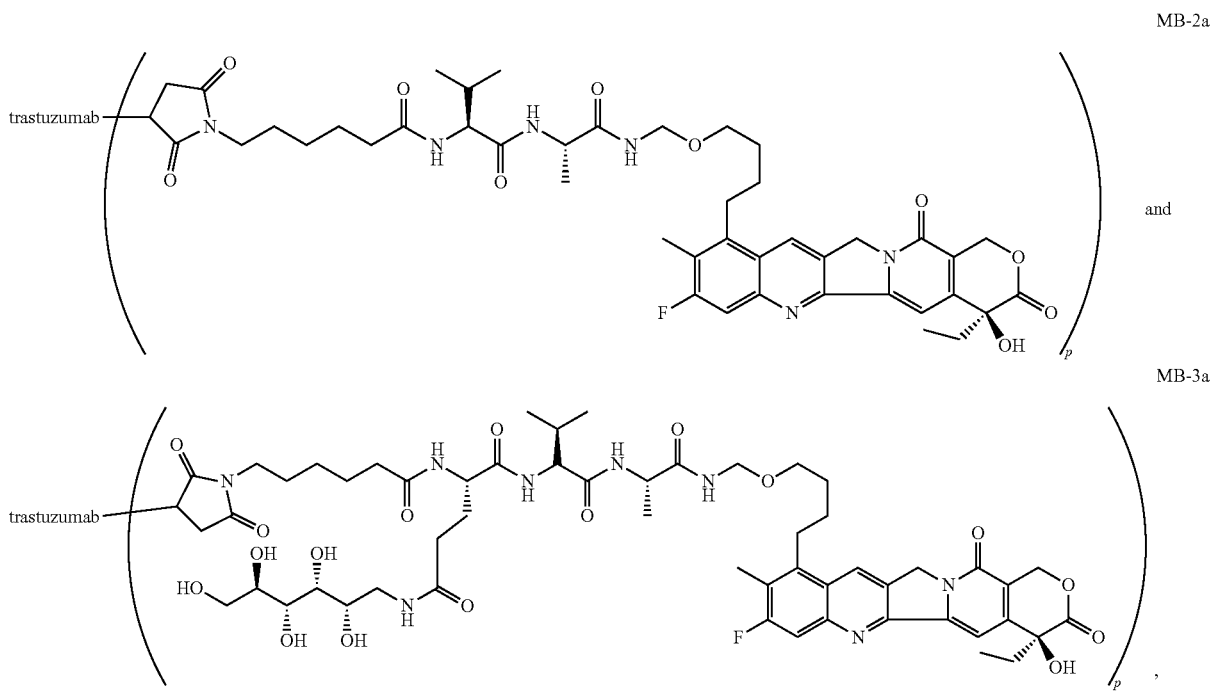

wherein p is 4-8, or 7-8.

2. The compound of claim 1, wherein p is 7-8.
3. The compound of claim 2, wherein p is 8.
4. A pharmaceutical composition comprising the compound of claim 1, or a pharmaceutically acceptable salt thereof.
5. A method of treating cancer comprising administering to a subject in need thereof the compound of claim 1, or a pharmaceutically acceptable salt thereof.
6. The method of claim 5, wherein p is 7-8.
7. The method of claim 6, wherein p is 8.
8. A compound having the following structure:

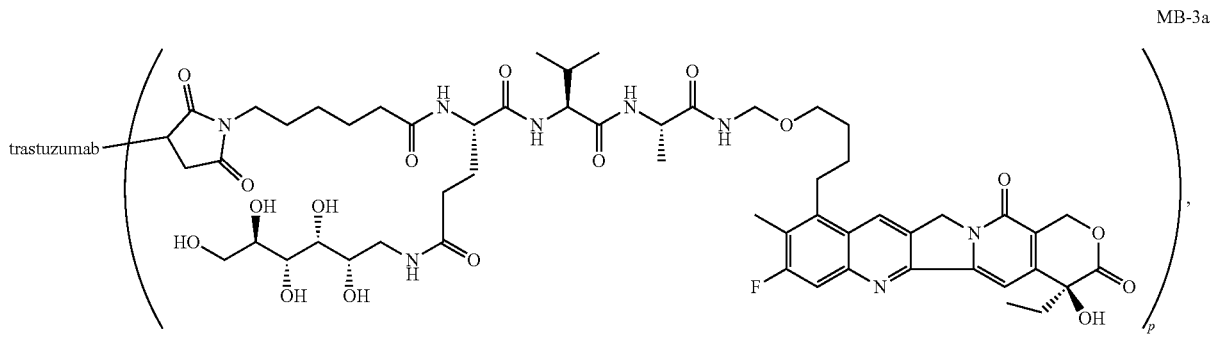

or a pharmaceutically acceptable salt thereof,
wherein p is the drug to antibody ratio (DAR), which is an average number that is 7-8.

9. The compound of claim 8, wherein p is 8.
10. A method of treating cancer comprising administering to a subject in need thereof the compound of claim 9, or a pharmaceutically acceptable salt thereof, and wherein the cancer is breast cancer, gastric cancer, lung cancer, or ovarian cancer.
11. A method of treating cancer comprising administering to a subject in need thereof the compound of claim 8, or a pharmaceutically acceptable salt thereof, and wherein the cancer is breast cancer, gastric cancer, lung cancer, or ovarian cancer.

12. A compound having the following structure:

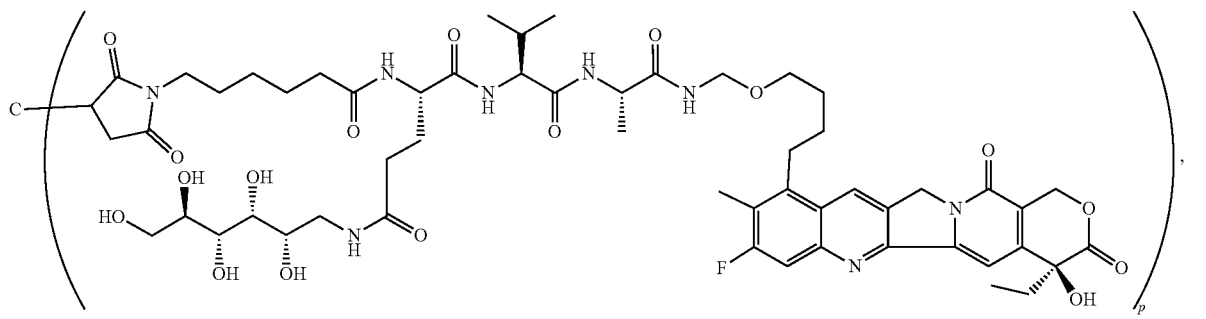

PL-2 or a pharmaceutically acceptable salt thereof, wherein p is the drug to antibody ratio (DAR), which is an average number that is 7-8; and C is an anti-HER2 antibody comprising the following CDRs:
- a HCDR1 having the sequence GFNIKDTYIH (SEQ ID NO:3);
- a HCDR2 having the sequence RIYPTNGYTRYADSVKG (SEQ ID NO: 4);
- a HCDR3 having the sequence WGGDGFYAMDY (SEQ ID NO:5);
- a LCDR1 having the sequence RASQDVNTAVA (SEQ ID NO:6);
- a LCDR2 having the sequence SASFLYS (SEQ ID NO:7); and
- a CCDR3 having the sequence QQHYTTPPT (SEQ ID NO:8).

13. The compound of claim 12, wherein C is trastuzumab, trastuzumab-dkst, trastuzumab-pkrb, trastuzumab-dttb, trastuzumab-qyyp, or trastuzumab-anns and/or p is 8.

14. A method of treating cancer comprising administering to a subject in need thereof the compound of claim 13, or a pharmaceutically acceptable salt thereof, and wherein the cancer is breast cancer, gastric cancer, lung cancer, or ovarian cancer.

15. A method of treating cancer comprising administering to a subject in need thereof the compound of claim 12, or a pharmaceutically acceptable salt thereof, and wherein the cancer is breast cancer, gastric cancer, lung cancer, or ovarian cancer.

* * * * *